US012252391B2

(12) United States Patent
Zumbrum et al.

(10) Patent No.: US 12,252,391 B2
(45) **Date of Patent: *Mar. 18, 2025**

(54) SYSTEM FOR SIMULTANEOUS DISTRIBUTION OF FLUID TO MULTIPLE VESSELS AND METHOD OF USING THE SAME

(71) Applicant: Sartorius Stedim North America Inc., Bohemia, NY (US)

(72) Inventors: Michael A. Zumbrum, New Oxford, PA (US); Kevin M. Perdue, Havre de Grace, MD (US); William Kimmick, Mechanicsburg, PA (US); Jan Neuhaus, Dransfeld (DE)

(73) Assignee: Sartorius Stedim North America Inc., Bohemia, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 18/107,264

(22) Filed: Feb. 8, 2023

(65) Prior Publication Data

US 2023/0202827 A1 Jun. 29, 2023

Related U.S. Application Data

(63) Continuation-in-part of application No. 17/362,166, filed on Jun. 29, 2021, now Pat. No. 11,691,866,
(Continued)

(51) Int. Cl.

| | |
|---|---|
| ***B67D 7/02*** | (2010.01) |
| ***B67D 7/38*** | (2010.01) |
| ***B67D 7/58*** | (2010.01) |

(52) U.S. Cl.

CPC .............. *B67D 7/0288* (2013.01); *B67D 7/38* (2013.01); *B67D 7/58* (2013.01)

(58) Field of Classification Search

CPC ....... B67D 7/58; B67D 7/0288; B67D 7/0294

See application file for complete search history.

(56) References Cited

U.S. PATENT DOCUMENTS

| | | | |
|---|---|---|---|
| 553,734 | A | 1/1896 | Yedale |
| 585,051 | A | 6/1897 | Allen |

(Continued)

FOREIGN PATENT DOCUMENTS

| | | | |
|---|---|---|---|
| CN | 2832508 | Y | 11/2006 |
| CN | 1877288 | A | 12/2006 |

(Continued)

OTHER PUBLICATIONS

Screenshots of Lucky Penny Shop video; publically available video, published Aug. 5, 2014, titled "Bunch O Balloons Review 100 water balloons in less than a minute!—Water Balloon Fight!", web address: https://www.youtube.com/watch?v=S1DaXYT6O2A (Year: 2014).

(Continued)

*Primary Examiner* — Timothy L Maust

(74) *Attorney, Agent, or Firm* — Womble Bond Dickinson (US) LLP

(57) ABSTRACT

A fluid distribution system includes an input tube, a plurality of vessels, and a distribution hub. The input tube is configured to extend from a supply vessel. Each vessel of the plurality of vessels includes an inflow conduit. The distribution hub includes a single inlet and a plurality of outlets. The single inlet is defined in a bottom of the distribution hub and is in fluid communication with the input tube such that the distribution hub is configured to receive fluid from the input tube through the single inlet. Each outlet of the plurality of outlets is in fluid communication with the single inlet and in fluid communication with a respective inflow conduit such that the distribution hub is configured to (Continued)

provide an equal portion of the fluid received through the single inlet to each of the inflow conduits.

20 Claims, 72 Drawing Sheets

Related U.S. Application Data which is a continuation-in-part of application No. 17/132,958, filed on Dec. 23, 2020, now Pat. No. 11,623,856, application No. 18/107,264 is a continuation-in-part of application No. 17/011,148, filed on Sep. 3, 2020, now Pat. No. 11,584,571, said application No. 17/132,958 is a continuation of application No. 16/682,673, filed on Nov. 13, 2019, which is a continuation-in-part of application No. 16/519,345, filed on Jul. 23, 2019, now Pat. No. 11,319,201, and a continuation-in-part of application No. 16/189,898, filed on Nov. 13, 2018, now Pat. No. 11,027,108, said application No. 17/011,148 is a continuation of application No. 16/015,256, filed on Jun. 22, 2018, now Pat. No. 10,773,863.

(60) Provisional application No. 62/585,699, filed on Nov. 14, 2017.

(56) References Cited

U.S. PATENT DOCUMENTS 858,051 A 6/1907 Allen
1,438,899 A 12/1922 Cassidy
1,577,539 A 3/1926 Hamilton
1,834,085 A 12/1931 Bloom
2,186,908 A 1/1940 Page et al.
2,191,495 A 2/1940 Nesset
2,226,312 A 12/1940 Kuhns
2,439,572 A 4/1948 Baruch
2,460,542 A 2/1949 Smith
2,744,661 A 5/1956 Davis
3,130,260 A 4/1964 Gray
3,276,447 A 10/1966 Hamilton
3,354,012 A 11/1967 Forman et al.
3,360,008 A 12/1967 Papale et al.
3,458,619 A 7/1969 Prochaska
3,467,270 A 9/1969 Eady
3,499,568 A 3/1970 Riera
3,793,672 A 2/1974 Wetmore
3,794,333 A 2/1974 Czernik et al.
3,938,035 A 2/1976 Fletcher et al.
4,032,311 A 6/1977 Bohmrich et al.
4,045,860 A 9/1977 Winckler
4,080,989 A 3/1978 Chapelsky et al.
4,116,199 A 9/1978 Bryne
4,165,814 A 8/1979 Seel
4,174,743 A 11/1979 Beny et al.
4,334,993 A 6/1982 Norton
4,335,717 A 6/1982 Bujan et al.
4,336,802 A 6/1982 Stone et al.
4,360,776 A 11/1982 Bauman
4,396,016 A 8/1983 Becker
4,461,387 A 7/1984 Belokin, Jr.
4,499,148 A 2/1985 Goodale et al.
4,512,368 A 4/1985 Kaminaka
4,581,012 A 4/1986 Brown et al.
4,676,898 A 6/1987 Saxena
4,700,861 A 10/1987 Neward
4,701,159 A 10/1987 Brown et al.
4,715,359 A 12/1987 Ryo
4,784,299 A 11/1988 Stenger
4,785,974 A 11/1988 Rudick et al.
4,804,208 A 2/1989 Dye
4,863,030 A 9/1989 Bayer et al.
4,938,371 A 7/1990 Vercillo
4,993,573 A 2/1991 Freidel et al.
5,025,955 A 6/1991 Stenger
5,052,105 A 10/1991 Mische et al.
D324,568 S 3/1992 Marken
5,100,010 A 3/1992 Waters
5,114,045 A 5/1992 Herpe
5,168,905 A 12/1992 Phallen
5,197,895 A 3/1993 Stupecky
5,219,185 A 6/1993 Oddenino
5,245,955 A 9/1993 Husted
5,250,041 A 10/1993 Folden et al.
5,300,060 A 4/1994 Nelson
5,350,080 A 9/1994 Brown et al.
5,358,872 A 10/1994 Mussi et al.
5,362,642 A 11/1994 Kern
5,381,839 A 1/1995 Dowd
H1430 H 4/1995 Apel et al.
5,441,197 A 8/1995 Gellert et al.
5,476,116 A 12/1995 Price et al.
5,478,119 A 12/1995 Dye
5,492,531 A 2/1996 Post et al.
5,505,495 A 4/1996 Godeau
5,507,904 A 4/1996 Fisher et al.
5,518,047 A 5/1996 Alexandrowski
5,522,155 A 6/1996 Bradford
5,695,215 A 12/1997 Headley et al.
5,733,452 A 3/1998 Whitlock
5,839,471 A 11/1998 Yang
5,988,422 A 11/1999 Vallot
6,032,543 A 3/2000 Arthun et al.
6,039,718 A 3/2000 Niedospial, Jr.
6,062,440 A 5/2000 Murray et al.
6,071,005 A 6/2000 Ekambaram et al.
6,095,356 A 8/2000 Rits
6,158,484 A 12/2000 Greenlee
6,165,362 A 12/2000 Nohren et al.
6,179,823 B1 1/2001 Niedospial
6,223,938 B1 5/2001 Pare et al.
6,225,562 B1 5/2001 Fujishita et al.
6,234,545 B1 5/2001 Babuder et al.
6,290,265 B1 9/2001 Warburton-Pitt et al.
6,334,888 B1 1/2002 Collas et al.
6,340,033 B2 1/2002 Paradis et al.
6,354,636 B2 3/2002 Matsuzawa et al.
6,430,033 B1 8/2002 Mitsui et al.
6,499,618 B1 12/2002 Leclerc et al.
6,520,505 B1 2/2003 Koegler et al.
6,523,711 B1 2/2003 Hughes et al.
6,578,802 B1 6/2003 Thier
6,581,637 B2 6/2003 Hamamoto et al.
6,610,200 B1 8/2003 Leijon et al.
6,719,037 B2 4/2004 Crook
6,733,730 B1 5/2004 Griffiths et al.
6,779,575 B1 8/2004 Arthun
6,905,595 B2 6/2005 Gebauer
6,951,228 B2 10/2005 Steigerwalt et al.
6,966,581 B2 11/2005 Mastropaolo
6,994,699 B2 2/2006 Houwaert et al.
7,087,047 B2 8/2006 Kraus et al.
7,093,859 B2 8/2006 Warburton-Pitt et al.
7,108,024 B2 * 9/2006 Navarro .................... F04B 5/02
141/237
7,140,404 B2 11/2006 Cupples et al.
7,293,477 B2 11/2007 Furey et al.
7,306,583 B2 12/2007 Goudaliez et al.
7,350,833 B2 4/2008 Bongiorno
7,407,612 B2 8/2008 Warburton-Pitt et al.
7,497,130 B2 3/2009 Woods et al.
7,500,949 B2 3/2009 Gottlieb et al.
7,563,243 B2 7/2009 Mendels
7,686,037 B2 3/2010 Krywitsky
7,708,923 B1 5/2010 Helicke et al.
7,731,241 B2 6/2010 Aoki et al.
7,784,630 B2 8/2010 Walsh
7,874,467 B2 1/2011 Pardes et al.
7,931,859 B2 4/2011 Mlodzinski et al.
8,008,065 B2 8/2011 Selker et al.
8,025,271 B2 9/2011 Kolodner et al.

(56) References Cited

U.S. PATENT DOCUMENTS 8,092,409 B2 1/2012 Miros et al.
8,196,614 B2 6/2012 Kriheli
8,235,067 B2 8/2012 Gagne et al.
8,281,672 B2 10/2012 Lee et al.
8,281,807 B2 10/2012 Trombley et al.
8,336,313 B2 12/2012 McMasters et al.
8,342,737 B2 1/2013 Greller et al.
8,372,058 B2 2/2013 Schilp et al.
8,505,396 B2 8/2013 Zumbrum
8,505,586 B2 8/2013 Zumbrum
8,524,174 B2 9/2013 Yobas et al.
8,562,572 B2 10/2013 Proulx et al.
8,573,424 B2 11/2013 Dubs et al.
8,690,120 B2 4/2014 Hartnett et al.
8,865,427 B2 10/2014 Poo et al.
8,871,317 B2 10/2014 Cai et al.
9,095,693 B2 8/2015 Buisson
9,211,364 B2 12/2015 Croizat et al.
9,227,046 B1 1/2016 Douglas
9,259,563 B2 2/2016 Klingel et al.
9,358,333 B2 6/2016 Trombley, III et al.
9,376,224 B2 6/2016 Gonnelli et al.
9,376,305 B2 6/2016 Zumbrum
9,526,886 B2 12/2016 Mastri et al.
9,528,632 B2 12/2016 Glaun
9,550,969 B2 1/2017 Chotteau et al.
9,597,732 B2 3/2017 Lewis et al.
9,675,520 B2 6/2017 Rogers et al.
9,700,844 B2 7/2017 Schick
9,706,793 B2 7/2017 Hayakawa
9,708,168 B2 * 7/2017 Knieling ................. F16L 41/03
9,726,314 B2 8/2017 Py
9,771,629 B2 9/2017 Soloway
9,784,111 B2 10/2017 Luo et al.
9,802,172 B2 10/2017 Danders et al.
9,857,002 B2 1/2018 Ott et al.
9,901,729 B2 2/2018 Vigna et al.
9,907,728 B2 3/2018 Kyle et al.
9,926,185 B2 3/2018 Davis et al.
9,938,128 B2 4/2018 Py et al.
9,944,510 B2 4/2018 Zumbrum
9,975,753 B1 5/2018 Zumbrum et al.
9,987,508 B2 6/2018 Cockerham et al.
10,006,567 B2 6/2018 Zumbrum
10,486,959 B2 11/2019 Zumbrum
10,773,863 B2 * 9/2020 Zumbrum ............... F16L 23/16
11,319,201 B2 5/2022 Zumbrum et al.
11,577,953 B2 2/2023 Zumbrum et al.
11,584,571 B2 2/2023 Zumbrum
11,623,856 B2 * 4/2023 Zumbrum ............ B67D 7/0288
141/144
11,787,680 B2 10/2023 Hartridge et al.
11,814,200 B2 11/2023 Seal et al.
2001/0015226 A1 8/2001 Hamamoto et al.
2001/0017161 A1 8/2001 Paradis et al.
2001/0035093 A1 11/2001 Yokota
2002/0162648 A1 11/2002 Crook
2002/0185186 A1 12/2002 Juliar et al.
2003/0052074 A1 3/2003 Chang et al.
2003/0208151 A1 11/2003 Kraus et al.
2003/0230521 A1 12/2003 Schick
2004/0026265 A1 2/2004 Nadanami et al.
2004/0059178 A1 3/2004 McCarthy
2004/0064086 A1 4/2004 Gottlieb et al.
2004/0099154 A1 5/2004 Raschle
2004/0260265 A1 12/2004 Goudaliez et al.
2005/0067367 A1 3/2005 Carballido
2005/0115917 A1 6/2005 Odet et al.
2005/0124935 A1 6/2005 McMichael
2005/0132821 A1 6/2005 Furey
2005/0142315 A1 6/2005 Desimone et al.
2005/0167390 A1 8/2005 Dubs et al.
2005/0256461 A1 11/2005 DiFiore et al.
2005/0267445 A1 12/2005 Mendels
2006/0010991 A1 1/2006 Woods et al.
2006/0086758 A1 4/2006 Coles
2006/0272432 A1 12/2006 Belongia
2007/0161970 A1 7/2007 Spohn
2007/0193375 A1 8/2007 Pandori et al.
2007/0290004 A1 12/2007 Lee
2008/0087626 A1 4/2008 Tsai
2008/0277926 A1 11/2008 Inman, Jr. et al.
2008/0281200 A1 11/2008 Voic et al.
2009/0049988 A1 2/2009 Meindl
2009/0090689 A1 4/2009 Walsh
2009/0236374 A1 9/2009 Pardes et al.
2010/0065305 A1 3/2010 Bernauer
2010/0123094 A1 5/2010 Zumbrum
2010/0133459 A1 6/2010 Zumbrum
2010/0154569 A1 6/2010 Guedon
2010/0158759 A1 6/2010 Olivier
2010/0164176 A1 7/2010 Beele
2010/0183251 A1 7/2010 Neltner et al.
2010/0288382 A1 11/2010 Levent et al.
2010/0318069 A1 12/2010 Hall et al.
2011/0018206 A1 1/2011 Beele
2011/0121558 A1 5/2011 Kanner
2011/0155258 A1 6/2011 Zumbrum
2011/0155274 A1 6/2011 Zumbrum
2012/0064274 A1 3/2012 Cai et al.
2012/0074051 A1 3/2012 Gebauer et al.
2013/0304039 A1 11/2013 Chung
2014/0074015 A1 3/2014 Mastri et al.
2014/0076454 A1 3/2014 Kjar
2014/0103077 A1 4/2014 Zumbrum
2014/0135719 A1 5/2014 Jaeb et al.
2014/0137519 A1 5/2014 Goodwin
2014/0190570 A1 7/2014 Zumbrum
2014/0191501 A1 7/2014 Brugger et al.
2014/0353878 A1 12/2014 Driessen et al.
2015/0080814 A1 3/2015 Lambert et al.
2015/0108034 A1 4/2015 Deutschle et al.
2015/0114515 A1 * 4/2015 Phallen ................... B67C 3/288
141/238
2015/0259085 A1 9/2015 Malone
2016/0114922 A1 4/2016 Boira Bonhora
2016/0195208 A1 7/2016 Cassiday et al.
2016/0199914 A1 7/2016 Potter
2016/0202101 A1 7/2016 Sparks et al.
2016/0238324 A1 8/2016 Butcher et al.
2016/0311674 A1 10/2016 Zumbrum
2016/0361488 A1 12/2016 Perrenoud et al.
2017/0021355 A1 1/2017 Olivier et al.
2017/0102089 A1 4/2017 Griffin, Jr. et al.
2017/0167652 A1 6/2017 Snyder et al.
2017/0173495 A1 6/2017 Valery et al.
2017/0204989 A1 7/2017 Burkhart et al.
2017/0219134 A1 8/2017 Kedor et al.
2017/0239141 A1 8/2017 Davis et al.
2017/0306766 A1 10/2017 Munzer
2018/0163898 A1 6/2018 Von Arb
2018/0297753 A1 10/2018 Zumbrum
2019/0143093 A1 5/2019 Zumbrum et al.
2020/0180938 A1 6/2020 Zumbrum et al.
2021/0024338 A1 1/2021 Zumbrum et al.
2023/0202827 A1 6/2023 Zumbrum et al.

FOREIGN PATENT DOCUMENTS

CN 102218226 A 10/2011
CN 104555014 A 4/2015
DE 3505492 A1 8/1986
DE 102014104334 A1 10/2015
EP 1591517 A1 11/2005
EP 2144589 A1 1/2010
EP 2802415 A1 11/2014
EP 2805737 A1 11/2014
EP 3206816 A1 8/2017
EP 3215286 A1 9/2017
GB 0781520 A 8/1957
JP 2001031126 A 2/2001
JP 2003125753 A 5/2003
JP 2007176537 A 7/2007
JP 4466778 B1 5/2010

(56) References Cited

FOREIGN PATENT DOCUMENTS

| | | | |
|---|---|---|---|
| JP | 2010120250 | A | 6/2010 |
| KR | 0116728 | | 4/1998 |
| KR | 1020010016728 | | 3/2001 |
| KR | 20170000033 | A | 1/2017 |
| WO | 9630274 | A1 | 10/1996 |
| WO | 1998054568 | A1 | 12/1998 |
| WO | 2005084372 | A2 | 9/2005 |
| WO | 2008136720 | A1 | 11/2008 |
| WO | 2010008396 | A2 | 1/2010 |
| WO | 2012177250 | A1 | 12/2012 |
| WO | 2013072348 | A1 | 5/2013 |
| WO | 2013105966 | A1 | 7/2013 |
| WO | 2015084388 | A1 | 6/2015 |
| WO | 2016078800 | A1 | 5/2016 |
| WO | 2016091629 | A1 | 6/2016 |
| WO | 2017063623 | A1 | 4/2017 |
| WO | 2017082895 | A1 | 5/2017 |
| WO | 2017156240 | A1 | 9/2017 |
| WO | 2018117949 | A1 | 6/2018 |
| WO | 2019099406 | A1 | 5/2019 |

OTHER PUBLICATIONS

"How it's made: Silicone Hoses manufacturing by Viper Performance" (Viperperformanceuk) Oct. 1, 2014, Available Online at <https://www.youtube.com/watch?v=iuO0TdzHnWo> 5:30-6:30, 1 page.

"Saint-Gobain Biopharm C-Flex EZ Top container closures", Available Online at <http://www.biopharm.saint-gobain.com/en/products.asp?id=66>, Oct. 15, 2013.

Disposable Polyethylene Vent Cap, Corning Life Sciences Catalot, http://catalog2.corning.com/LifeSciences/en-US/Shopping/ProductsDetails.a- - spx?pid . . . , known at least as early as Mar. 18, 2014, 2 pages.

GE Healthcare Life Sciences, "Disposable Cellbag bioreactors for WAVE Bioreactor systems", Data file 28-9511-36 AF, Sweden, Jun. 2012, pp. 1-12.

Injection-Molded Silicone Stoppers Platinum Cured, AdvantaPure, known at least as early as Jun. 6, 2011, 2 pages.

International Preliminary Report on Patentability received for PCT Patent Application No. PCT/US2018/060828, dated May 28, 2020, 10 pages.

Omnifit Solvent Safety Bottle Caps, Bio Chem Fluidics, known at least as early as Jun. 6, 2011, 16 pages.

PTFE Faced Silicone Septa for GL25 Open Top PBT Screw Cap, Corning Life Sciences Catalog, https://catalog2.corning.com/LifeSciences/en-US/Shopping/ProductDetails.a- spx?category . . . , known at least as early as Mar. 18, 2014, 1 page.

Sanl-Tech EZ Top Container Closure, Saint-Gobain Performance Plastics, known at least as early as Jun. 6, 2011, 2 pages.

International Preliminary Report on Patentability received for PCT Patent Application No. PCT/US2019/061229, dated May 27, 2021, 9 pages.

Chinese Office Action received for Application No. 201980074746.8, dated Jun. 21, 2022, 10 pages.

European Search Report and Search Opinion received for EP Application No. 18154629.2, dated Jun. 19, 2018, 5 pages.

European Search Report and Search Opinion received for EP Application No. 19181109, dated Oct. 16, 2019, 8 pages.

European Search Report and Search Opinion received for EP Application No. 11860858.6, dated Dec. 18, 2014, 7 pages.

International Preliminary Report on Patentability received for PCT Patent Application No. PCT/US2013/073508, dated Jun. 16, 2016, 13 pages.

International Preliminary Report on Patentability received for PCT Patent Application No. PCT/US2011/041462, dated Feb. 27, 2012, 15 pages.

International Preliminary Report on Patentability received for PCT Patent Application No. PCT/US2013/073508, dated Mar. 4, 2014, 14 pages.

Non Final Office Action received for U.S. Appl. No. 15/171,947, dated Feb. 19, 2019, 9 pages.

Office Action received for European Application No. 11868058.6, dated May 17, 2017, 4 pages.

Office Action received for U.S. Appl. No. 17/132,958, dated Feb. 1, 2022, 17 pages.

European Search Report and Search Opinion received for EP Application No. 11868058.6, dated Dec. 18, 2014, 7 pages.

International Preliminary Report on Patentability received for PCT Patent Application No. PCT/US2011/041462, dated Jan. 9, 2014, 10 pages.

International Search Report and the Written Opinion of the International Searching Authority for PCT/US2018/060828 dated Feb. 1, 2019, 11 pages.

International Search Report and the Written Opinion of the International Searching Authority for PCT/US2019/061229 dated Jan. 29, 2020, 9 pages.

Office Action for EP Pending Application 19883833.6 issued Oct. 1, 2024, 5 pages.

* cited by examiner

Data based on distribution device disclosed in FIG. 3

Material = CE 231

| | 250rpm ~ Watson Marlow 600 Series Pump | | | | | | | | | | | | |
|---|---|---|---|---|---|---|---|---|---|---|---|---|---|
| | Bottle Mass (g) | Total Mass (g) | Fluid Mass (g) | Deviation from Mean (+/- %) | Bottle Mass (g) | Total Mass (g) | Fluid Mass (g) | Deviation from Mean (+/- %) | Bottle Mass (g) | Total Mass (g) | Fluid Mass (g) | Deviation from Mean (+/- %) | AVERAGE |
| Bottle # 1 | 109.0 | 551.8 | 442.8 | 0.27 | 108.9 | 552.1 | 443.2 | 0.24 | 109.1 | 552.3 | 443.2 | 0.22 | 443.1 |
| Bottle # 2 | 110.1 | 552.8 | 442.7 | 0.29 | 110.0 | 552.9 | 442.9 | 0.31 | 109.8 | 553.2 | 443.4 | 0.17 | 443.0 |
| Bottle # 3 | 108.9 | 554.0 | 445.1 | 0.25 | 109.3 | 554.8 | 445.5 | 0.28 | 109.0 | 554.1 | 445.1 | 0.21 | 445.2 |
| Bottle # 4 | 109.4 | 551.2 | 441.8 | 0.49 | 109.4 | 551.7 | 442.3 | 0.44 | 109.3 | 551.6 | 442.3 | 0.42 | 442.1 |
| Bottle # 5 | 110.4 | 557.4 | 447.0 | 0.68 | 110.4 | 557.8 | 447.4 | 0.70 | 110.3 | 557.4 | 447.1 | 0.66 | 447.2 |
| Bottle # 6 | 109.9 | 556.2 | 446.3 | 0.52 | 109.9 | 556.2 | 446.3 | 0.46 | 110.0 | 556.3 | 446.3 | 0.48 | 446.3 |
| Bottle # 7 | 110 .0 | 553.6 | 443.6 | 0.09 | 110.0 | 553.8 | 443.8 | 0.11 | 110.2 | 553.7 | 443.5 | 0.15 | 443.6 |
| Bottle # 8 | 109.1 | 551.7 | 442.6 | 0.31 | 109.2 | 552.0 | 442.8 | 0.33 | 109.0 | 551.5 | 442.5 | 0.38 | 442.6 |
| Collection Bottle | 64.8 | 84.9 | 20.1 | | | 64.6 | 84.7 | 20.1 | 64.8 | 85.0 | 20.2 | | 20.1 |
| Mean of Mass (g) | | | 444.0 | | | | | 444.3 | | | 444.2 | | |
| Average Deviation (+/- %) | | | | 0.36 | | | | 0.36 | | | | 0.34 | 0.35 |

FIG. 83

Data based on distribution device disclosed in FIG. 78

Material ~ MPU 100

| | 5.00L @ 265rpm - Watson Marlow 600 Series Pump | | | | | | | | | | | | |
|---|---|---|---|---|---|---|---|---|---|---|---|---|---|
| | Bottle Mass (g) | Total Mass (g) | Fluid Mass (g) | Deviation from Mean (+/- %) | Bottle Mass (g) | Total Mass (g) | Fluid Mass (g) | Deviation from Mean (+/- %) | Bottle Mass (g) | Total Mass (g) | Fluid Mass (g) | Deviation from Mean (+/- %) | |
| Bottle # 1 | 107.4 | 573.7 | 466.3 | 2.10 | 107.3 | 281.6 | 174.3 | 0.34 | 63.9 | 282.4 | 218.5 | 0.26 | |
| Bottle # 2 | 106.4 | 565.0 | 458.6 | 3.73 | 106.4 | 277.5 | 171.2 | 1.45 | 63.7 | 279.4 | 215.7 | 1.53 | |
| Bottle # 3 | 106.0 | 570.3 | 464.3 | 2.54 | 106.0 | 281.7 | 175.7 | 1.19 | 64.1 | 282.3 | 218.2 | 0.39 | |
| Bottle # 4 | 106.0 | 579.0 | 473.0 | 0.70 | 106.0 | 286.7 | 180.7 | 4.03 | 63.7 | 287.9 | 224.2 | 2.35 | |
| Bottle # 5 | 107.2 | 581.2 | 474.0 | 0.50 | 107.2 | 278.9 | 171.7 | 1.11 | 63.7 | 281.6 | 217.9 | 0.53 | |
| Bottle # 6 | 107.2 | 591.8 | 484.6 | 1.73 | 107.1 | 281.9 | 174.8 | 0.64 | 64.3 | 283.3 | 219.0 | 0.03 | |
| Bottle # 7 | 106.0 | 594.5 | 488.5 | 2.54 | 106.0 | 274.3 | 168.3 | 3.10 | 63.9 | 284.6 | 220.7 | 0.75 | |
| Bottle # 8 | 106.8 | 598.7 | 491.9 | 3.27 | 106.8 | 280.4 | 173.6 | 0.02 | 64.0 | 281.9 | 217.9 | 0.53 | |
| Bottle # 9 | 107.4 | 593.0 | 485.7 | 1.95 | 107.4 | 283.9 | 176.5 | 1.65 | 64.1 | 285.8 | 221.7 | 1.21 | |
| Bottle # 10 | 107.5 | 584.3 | 476.8 | 0.09 | 107.5 | 277.4 | 169.9 | 2.18 | 64.4 | 281.2 | 216.8 | 1.03 | AVERAGE |
| Mean of Mass (g) | | | 476.4 | | | | 173.7 | | | | 219.1 | | |
| Average Deviation (+/- %) | | | | 1.91 | | | | 1.57 | | | | 0.86 | 1.45 |

FIG. 84

SYSTEM FOR SIMULTANEOUS DISTRIBUTION OF FLUID TO MULTIPLE VESSELS AND METHOD OF USING THE SAME

CROSS REFERENCE TO RELATED APPLICATIONS

This application is a continuation-in-part of U.S. patent application Ser. No. 17/362,166, filed Jun. 29, 2021, which is a continuation-in-part of U.S. patent application Ser. No. 17/132,958, filed Dec. 23, 2020, which is a continuation of U.S. patent application Ser. No. 16/682,673, filed Nov. 13, 2019, which is a continuation-in-part of U.S. patent application Ser. No. 16/519,345, filed Jul. 23, 2019, now U.S. Pat. No. 11,319,201, and U.S. patent application Ser. No. 16/189,898, filed Nov. 13, 2018, now U.S. Pat. No. 11,027,108, which claims priority to U.S. Provisional Patent Application Ser. No. 62/585,699, filed Nov. 14, 2017. This application is also a continuation-in-part of U.S. patent application Ser. No. 17/011,148, filed Sep. 3, 2020, which is a continuation of U.S. patent application Ser. No. 16/015,256, filed Jun. 22, 2018, now U.S. Pat. No. 10,773,863. The entire contents of each of the above applications is incorporated by reference.

TECHNICAL FIELD

The present disclosure relates to aseptic fluid transfer assemblies, and more specifically, to a system for distributing a substantially equal amount of fluid to multiple containers simultaneously.

BACKGROUND

Biopharmaceutical and pharmaceutical drug developers and manufactures often develop and manufacture products in a fluid form. These products must be handled with care to maintain an aseptic environment and avoid contamination. Drugs developed and produced by biopharmaceutical and pharmaceutical companies are often produced through a multitude of steps that may require transfer of the fluids through conduits for purposes of sampling, packaging, mixing, separating, or passing between stations for various steps of the manufacturing process.

The manufacturing and testing processes required by biopharmaceutical and pharmaceutical companies require significant opportunities for fluid transfer. Each occurrence of fluid transfer that relies upon separate containers, conduits, or components to leave the source and arrive at the destination creates an opportunity for leaks to occur or contamination to enter.

Often, several fluid pathways are required to enter or exit various containers. Traditionally, the fluid pathways have all been maintained independent of one another, requiring a large number of separate fittings between conduits and requiring a significant amount of space to accommodate the fittings for each fluid pathway separately. In addition, sequential filling of multiple containers, one container at a time, consumed significant amounts of time and resources in a cleanroom environment and at considerable cost.

The present disclosure describes improvements to maintain aseptic environments and avoid contamination during fluid transfer by minimizing leak points, increasing organization of fluid pathways, reducing space requirements, and simplifying assembly to produce a reliable low-cost fluid transfer assembly. Because fluid transfer assemblies are often rendered aseptic and are intended for a single use, maintaining a low cost through reducing assembly steps can provide significant advantages.

SUMMARY

In an embodiment of the present disclosure a method of aseptically distributing fluid to a plurality of vessels includes securing the plurality of vessels relative to a hub and flowing fluid through an input tube into a plenum of the hub such that an equal amount of fluid flows from the plenum into each of the vessels simultaneously. Each vessel has an inflow conduit extending from the hub to the vessel such that an arc segment is formed by the inflow conduit between the hub and the vessel. Each arc segment to each vessel is substantially the same length and substantially the same inner diameter. Further, each vessel is located in the same plane relative to the other vessels. Simultaneous filling allows for reduction in filling time by a factor of 5, 10, or even 20 times. In one embodiment of the present disclosure, the fluid pathway from the input tube to the vessel, and at all points between, is rendered substantially aseptic.

In embodiments, flowing the fluid through the input tube includes activating a pump to flow the fluid through the input tube at a predetermined flow rate. Activating the pump may include increasing the pressure of the fluid within the input tube from a first vessel to the plenum of the hub.

In some embodiments, flowing fluid through the input tube includes flowing fluid from the plenum into each of the vessel such that each of the vessels receives within ±5% of the average amount of fluid in each of the other vessels, and in some embodiments, within ±1%. As used herein, "average" refers to the mean. Flowing the fluid through the input tube into the plenum may distribute an equal amount of fluid to each of between five and twenty vessels simultaneously.

In particular embodiments, securing the plurality of vessels to the hub includes each vessel being a bag and securing the inflow conduit of each vessel a predetermined distance from the hub such that the bag is suspended by a frame which also centrally locates the input tube. The inflow conduit to each vessel being substantially the same length and substantially the same inner diameter. Each vessel also being in the same plane as the other vessels. Securing the plurality of vessels may include securing the inflow conduit using a barb fitting, a needleless access site, or any other fittings commonly used on bags in the pharmaceutical and biopharmaceutical industry. The vessels may be located at a predetermined distance from the hub such that the bag is suspended by either the inflow conduit, an outlet conduit, or both. Securing the plurality of vessels to the input conduits may include inserting a clip into a vessel slot of a hub disc to suspend a vessel relative to the hub. On each vessel associated with a clip, the respective clip supports the inflow conduit to the vessel. Securing the plurality of vessels may also include inserting a clip into a vessel retainer on a vessel collar attached to the vessel.

In certain embodiments, securing the plurality of vessels includes each vessel being a rigid or semi rigid container including a neck and a cap and securing the inflow conduit of each vessel a predetermined tube distance from the hub and includes receiving the neck of the container in a vessel retainer on a vessel collar attached to the vessel. The inflow conduits all being substantially the same length and substantially the same inner diameter. The vessels all being in the same plane relative to one another. Securing the plurality of vessels may include positioning the container in a slot of a plate, the plate supporting the container.

In some embodiments, the method includes supporting the hub on a reusable stand such that the hub is level and each vessel is suspended about the hub. The method includes using inflow conduits from the hub to the vessels wherein the conduits are substantially the same length and substantially the same inner diameter. The vessels being in the same plane relative to one another. The method may include reversing fluid flow such that an equal amount of fluid is simultaneously drawn from each of the vessels into hub and then into the input tube.

In another embodiment of the present disclosure, a fluid distribution system includes an input tube, a plurality of vessels and a distribution hub. Each vessel of the plurality of vessels includes an inflow conduit and an outflow conduit. The distribution hub including an input end, a distribution end, and a plenum. The input end includes a single inlet that is defined through the input end. The input tube is secured about the input end and is in fluid communication with the plenum. The distribution end includes a plurality of conduit connectors with each conduit connector defining an outlet therethrough. Each outlet is in fluid communication with a respective inflow conduit which, in turn, is in fluid communication with its respective vessel. The plenum is disposed between the inlet and the outlets and is configured to provide fluid communication between the inlet end and the outlets. The plenum is configured to distribute fluid from the input tube to each of the vessels through the inflow conduits in a substantially equal amount. In an alternative embodiment, the fluid distribution system reverses the flow of the fluid and instead draws a substantially equal amount of fluid from each of the vessels into the input tube.

In some embodiments, the plenum is configured to distribute fluid to or draw fluid from each of the vessels such that a substantially equal amount of fluid is distributed to or drawn from each vessel such that the amounts in each vessel is within ±5% of the average amount of fluid in each of the other vessels, and some embodiments, within ±4%, and some embodiments, within ±3%, and some embodiments, within ±2%, and with some embodiments, within ±1%. Each vessel of the plurality of vessels is a bag suspended about the hub. In some embodiments, the vessels are all located in the same plane relative to another and the hub.

In certain embodiments, the fluid distribution system includes a frame assembly that is configured to position each vessel an equal distance from the hub such that the inflow conduits of the respective vessels form arc segments between the hub and the vessel, the inflow conduits being the same length and diameter. The vessels being in the same plane relative to one another. The frame assembly may include a stand and a holding disc. The holding disc may be supported by the hub such that the hub is suspended from the holding disk. The holding disc supporting the inflow tube and the inflow conduits going to each vessel such that the vessels are suspended from the holding disc. The stand may include legs with each leg extending through the holding disc to support the holding disc above a fixed surface.

In particular embodiments, the frame assembly includes a reusable stand. The stand may be configured to support the frame assembly above a fixed surface. The frame assembly may include a set of lower arms, a vessel collar, and a support collar. The support collar may be supported by the stand with the hub supported by the support collar. Each lower arm may extend outward form the support collar and support the vessel collar about the hub. Each vessel suspended from the respective vessel collar.

In another embodiment of the present disclosure, a method of aseptically distributing fluid includes fluidly connecting a primary vessel to a fluid distribution system via a feedline of the supply vessel to form a closed system, priming the feedline to purge trapped gases and fluid from the feedline via a purge valve, simultaneously distributing fluid from the primary vessel to a plurality of secondary vessels of the fluid distribution system via the feedline, sensing a complete fill of the plurality of secondary vessels with the control system, and stopping the distribution of fluid when the complete fill is sensed by the control system.

In embodiments, priming the feedline may include purging trapped gases and fluid to a purge receptacle. Priming the feedline may include purging at least 10 mL or 1 L of fluid from the feedline.

In some embodiments, the method includes aseptically disconnecting each of the secondary vessels from the fluid distribution system. Aseptically disconnecting each of the secondary vessels may include severing an inflow conduit of each of the secondary vessels.

In certain embodiments, priming the feedline may include the controller activating a pump to provide fluid from the primary vessel to the feedline. Priming the feedline may include the fill valve being in a closed position and the purge valve being in an open position such that gases within the feedline flow through the purge valve. Priming the feedline may include the controller receiving a fluid signal from a fluid sensor disposed downstream of the purge valve of the fluid detected. The controller may close the purge valve in response to receiving the fluid signal.

In particular embodiments, sensing the complete fill includes measuring a mass or a weight of the fluid distribution system. Sensing the complete fill of fluid may include a scale providing a target signal to the controller indicative of the complete fill. Providing the target signal may include the scale determining the complete fill. Sensing the complete fill may include the controller recording an initial mass or weight of the fluid distribution system before opening the fill valve and determining the complete fill from a difference of the initial mass or weight after opening the fill valve. Sensing the complete fill may include the controller measuring a mass flow of fluid into the fluid distribution system.

In embodiments, priming the feedline includes purging a manifold. The purge valve may be in fluid communication with the manifold via an inlet tube directly connected to a first branch of the manifold. Fluidly connecting the primary vessel to the fluid distribution system may include aseptically securing a supply tube of the fluid distribution system to the first branch or a second branch of the manifold.

In some embodiments, the method may include aseptically disconnecting the fluid distribution system from the first branch or the second branch of the manifold and aseptically connecting another fluid distribution system to another branch of the manifold such that the other fluid distribution system is fluidly connected with the primary vessel via the manifold after aseptically disconnecting the fluid distribution system.

In another embodiment of the present disclosure, a non-transitory computer-readable medium has instructions stored thereon that, when executed by a controller, cause the controller to prime feedline from a primary vessel by operating a purge valve to vent gas from the feedline and aseptically distribution fluid form the primary vessel to a plurality of secondary vessels such that a target amount of fluid is simultaneously provided to each of the secondary vessels. The controller operates a fill valve and the purge valve to distribute the fluid.

In embodiments, priming the feedline or distribution of the fluid includes the controller activating a pump to provide fluid from a primary vessel.

In another embodiment of the present disclosure, a fluid distribution system includes a primary vessel, a supply tube, a plurality of secondary vessels, a distribution hub, and a controller system. Each of the plurality of secondary vessels include an inflow conduit. The distribution hub includes a single inlet and a plurality of outlets. The single inlet is in fluid communication with the supply tube. Each outlet is in fluid communication with the single inlet and in fluid communication with a respective inflow conduit such that the distribution hub is configured to simultaneously provide an equal portion of fluid received through the single inlet to each of the inflow conduits. The control system includes an inlet tube, a fill valve, a purge valve, and a controller. The inlet tube is fluidly connected to the primary vessel via a feedline. The fill valve is disposed between the feedline and the supply tube. The purge valve is in fluid communication with the inlet tube. The controller is configured to purge the feedline of gas by operating the purge valve and configured to provide fluid to the distribution hub through the supply tube such that a target amount of fluid is distributed into each of the secondary vessels by operating the purge valve and the fill valve.

In embodiments, the fluid distribution system includes a pump with the controller configured to activate and deactivate the pump to purge the feedline and provide fluid. The fluid distribution system may include a scale. The distribution hub and the plurality of secondary vessels may be supported on the scale. The scale may transmit a mass or weight of the distribution hub and the plurality of secondary vessels to the controller to determine the target amount of fluid.

In another embodiment of the present disclosure, a method of aseptically distributing fluid includes fluidly connecting a supply line of a distribution system to a feedline of a primary vessel to form a closed system, priming the feedline via a controller of a control system operating a purge valve such that gases are purged from the feedline, and distributing fluid simultaneously from the primary vessel into a plurality of secondary vessels of the fluid distribution system. The fluid distribution system includes a distribution hub such that fluid is simultaneously supplied to each secondary vessel of the plurality of secondary vessels. The controller operates a fill valve and the purge valve to distribute a target amount of fluid into each of the secondary vessels after priming the feedline.

In embodiments, priming the feedline includes the controller activating a pump to provide fluid from the primary vessel. Priming the feedline includes the fill valve being in a closed position and the purge valve being in an open position such that gases within the control system flow through the purge valve. Priming the feedline may include flowing fluid through the purge valve into a purge vessel.

In some embodiments, distributing fluid includes determining the target amount of fluid by measuring a mass or a weight of the fluid distribution system. Determining the target amount of fluid may include a scale providing a target signal to the controller indicative of the target amount of fluid being in each of the secondary vessels. Providing the target signal may include the scale determining when the target amount of fluid is reached. Determining the target amount of fluid may include the controller recording an initial mass or weight of the fluid distribution system before opening the fill valve and determining the target amount of fluid from a difference of the initial mass or weight after opening the fill valve.

In particular embodiments, determining the target amount of fluid includes the controller measuring a mass flow of fluid into the fluid distribution system. Distributing fluid may include the controller closing the fill valve after the target amount of fluid is reached.

In certain embodiments, the method includes aseptically sealing each of the secondary vessels with the target amount of fluid in each of the secondary vessels. Aseptically sealing each of the secondary vessels includes severing an inflow conduit of each of the secondary vessels.

In another embodiment of the present disclosure, a fluid distribution system includes an input tube, a plurality of vessels, and a distribution hub. The input tube is configured to extend from a supply vessel. Each vessel of the plurality of vessels includes an inflow conduit. The distribution hub includes a single inlet and a plurality of outlets. The single inlet is defined in a bottom of the distribution hub and is in fluid communication with the input tube such that the distribution hub is configured to receive fluid from the input tube through the single inlet. Each outlet of the plurality of outlets is in fluid communication with the single inlet and in fluid communication with a respective inflow conduit such that the distribution hub is configured to provide an equal portion of the fluid received through the single inlet to each of the inflow conduits.

In embodiments, the inflow conduits are free of obstructions between the plurality of outlets and the respective vessel of the plurality of vessels. The fluid distribution system may be configured to aseptically transfer fluid from the supply vessel to each of the plurality of vessels. The single inlet may be centrally located in the bottom of the distribution hub.

In some embodiments, each vessel of the plurality of vessels includes a vessel cap that has an inlet aperture and an outlet aperture defined therethrough. The vessel cap may seal an interior of a respective vessel. The inlet aperture of each vessel cap may be in fluid communication with a respective one of outlets via a respective inflow conduit. The outlet aperture of each vessel cap may be configured to vent air from within the vessel. The vessel may include an outlet conduit. The outlet apparatus of each vessel cap may be in fluid communication with a vent through the outlet conduit of the vessel.

In certain embodiment, the distribution hub includes a plenum disposed between the single inlet and the plurality of outlets. The fluid distribution system may include a frame assembly that is configured to position each vessel a substantially equal distance from the distribution hub such that the inflow conduit of the respective vessels form an arc segment between the distribution hub and the vessel. The distribution hub may be configured to provide±5% of fluid to each of the vessels of the plurality of vessels. The arc of each inflow conduit between a respective outlet to a respective vessel may control an amount of fluid flowing through the inflow conduit.

In particular embodiments, the fluid distribution system includes a stand that supports each of the vessels. The stand may support each of the vessels an equal distance from the distribution hub.

In another embodiment of the present disclosure, a fluid distribution system includes an inlet pipe, and plurality of receptacles, and a fluid distribution manifold. The inlet pipe is configured to extend from a supply vessel. Each receptacle of the plurality of receptacles includes an outlet fluid conduit. The distribution manifold includes a single inlet and a plurality of outlets. The single inlet is defined in a bottom of the fluid distribution manifold and is in fluid communication with the inlet pipe such that the fluid distribution manifold is configured to receive fluid from the inlet pipe through the single inlet. Each outlet of the plurality of outlets is in fluid communication with the single inlet and in fluid communication with a respective outlet fluid conduit such that the fluid distribution manifold is configured to provide an equal portion of the fluid received through the single inlet to each of the outlet fluid conduits.

In embodiments, the fluid distribution system is configured to aseptically transfer fluid from the supply vessel to each of the plurality of receptacles. Each receptacle may include a vent conduit.

In certain embodiments, the fluid distribution system includes a support stand that supports each of the vessels an equal distance from the fluid distribution manifold. An arc of each outlet fluid conduit between a respective outlet to a respective receptacle may control an amount of fluid flowing through the outlet fluid conduit.

In another embodiment of the present disclosure, a method of aseptically distributing fluid to a plurality of vessels includes securing a plurality of vessels relative to a hub such that each vessel has an inflow conduit extending from the hub to the vessel. The method also includes aseptically flowing fluid from a supply vessel through an input tube into the hub through a single inlet defined in a bottom of the hub such that a substantially equal amount of fluid flows from the hub into each of the vessels simultaneously.

These and other aspects of the present disclosure will become apparent to those skilled in the art after a reading of the following description of the preferred embodiments, when considered in conjunction with the drawings. It should be understood that both the foregoing general description and the following detailed description are explanatory only and are not restrictive of the invention as claimed. Further, to the extent consistent, any of the aspects or embodiments described herein may be used in conjunction with any or all of the other aspects described herein.

BRIEF DESCRIPTION OF THE DRAWINGS

Various aspects of the present disclosure are described herein below with reference to the drawings, which are incorporated in and constitute a part of this specification, wherein:

FIG. 83 is a chart showing data for fluid distribution using the embodiment disclosed in FIG. 3;

FIG. 84 is a chart showing data for fluid distribution using the embodiment disclosed in FIG. 78;

DETAILED DESCRIPTION

Exemplary embodiments of this disclosure are described below and illustrated in the accompanying figures, in which like numerals refer to like parts throughout the several views. The embodiments described provide examples and should not be interpreted as limiting the scope of the invention. Other embodiments, and modifications and improvements of the described embodiments, will occur to those skilled in the art and all such other embodiments, modifications and improvements are within the scope of the present invention. Features from one embodiment or aspect may be combined with features from any other embodiment or aspect in any appropriate combination. For example, any individual or collective features of method aspects or embodiments may be applied to apparatus, product or component aspects or embodiments and vice versa.

Figure 1:
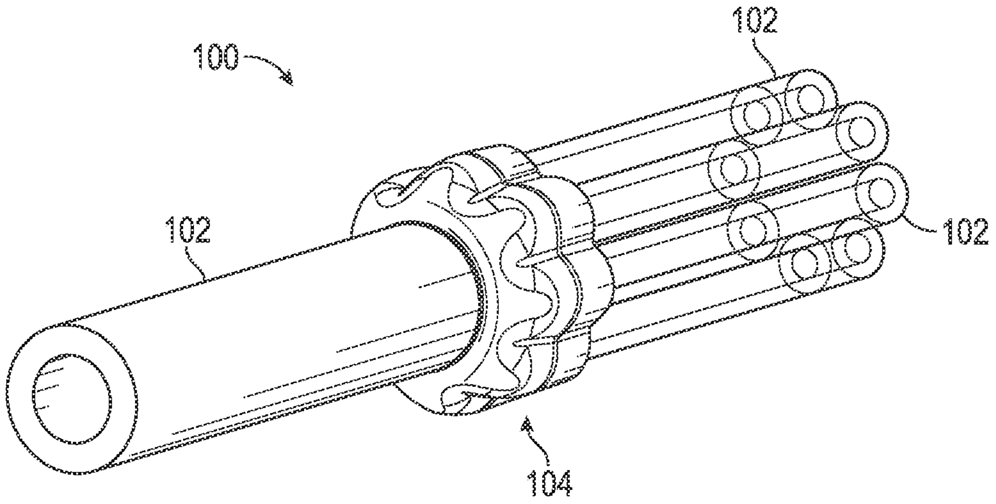
FIG. 1 illustrates a fluid transfer assembly according to a first embodiment.

FIG. 1 is a fluid transfer assembly 100 that may be suitable for use in conveying liquids, mixtures, or suspensions during the manufacture of biopharmaceutical and pharmaceutical products in an aseptic manner. The fluid transfer assembly 100 is intended to provide aseptic fluid transfer paths. The fluid transfer assembly 100 is not particularly limited to use in pharmaceutical development or manufacturing.

The fluid transfer assembly 100 is shown with a number of fluid conduits 102 attached to a junction 104. In the illustrated embodiment, fluid conduits 102 are attached to both the upstream and downstream portions of the junction 104. In other embodiments, one of the upstream or downstream portions of the junction 104 may be attached to vessels or other containers.

As used herein, the terms upstream and downstream are used for clarity of the description to refer to the optional direction of flow of fluid through the junction 104. One skilled in the art will appreciate that the junctions 104 described herein are not particularly limited to a specific direction of flow. Therefore, while the upstream and downstream portions are distinct from one another, the portions may be reversed so that the upstream side becomes the downstream side and vice versa simply by reversing the flow of fluid through the junction in use. Thus, in some embodiments, the junctions 104 are capable of being used in either flow direction.

The conduits 102 may preferably be flexible conduits suitable for use in medical environments. The conduits 102 may be constructed of a thermoset or a thermoplastic polymer. If a thermoset is used, silicones, polyurethanes, fluoroelastomers or perfluoropolyethers are preferred construction materials for the conduits. If a thermoplastic is used, C-Flex® tubing, block copolymers of styrene-ethylene-butylene-styrene, PureWeld®, PVC, polyolefins, polyethylene, blends of EPDM and polypropylene (such as Santoprene™) are preferred construction materials. Semi-rigid thermoplastics including, but not limited to, fluoropolymers PFA, FEP, PTFE, THV, PVDF and other thermoplastics, such as polyamide, polyether sulfone, polyolefins, polystyrene, PEEK, also can be used in one or more portions or sections of the conduits to render them flexible. Composites of thermosets in thermoplastics can also be used such as silicone in ePTFE, as produced by W.L. Gore & Associates, Inc. as STA-PURE® brand tubing. The multiple conduits 102 attached to the junction 104 may be made from different materials. In some embodiments, at least one of the conduits 102 attached to the junction may be a rigid conduit.

Figure 9:
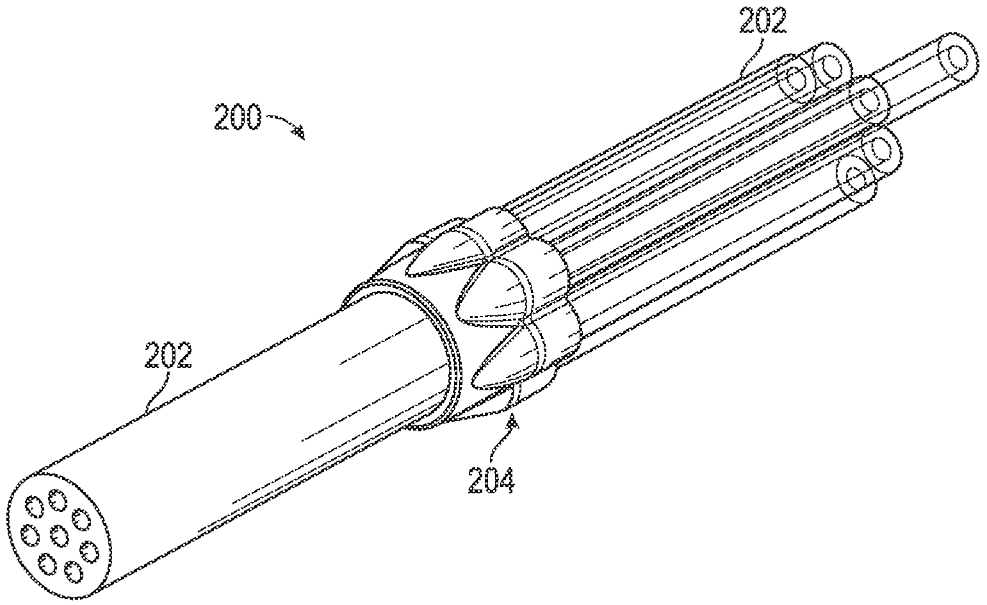

The conduits 102 may be various sizes in outer diameter and inner diameter depending upon the intended use of the fluid transfer assembly 100. The conduits 102 may be single-lumen conduits as shown in FIG. 1 or at least one of the conduits may be a multiple-lumen conduit as shown in FIG. 9. Where the conduit 102 includes multiple lumens, each lumen may be the same diameter or cross section, or the lumens may have more than one diameter or cross section within a single conduit 102.

Figure 1A:
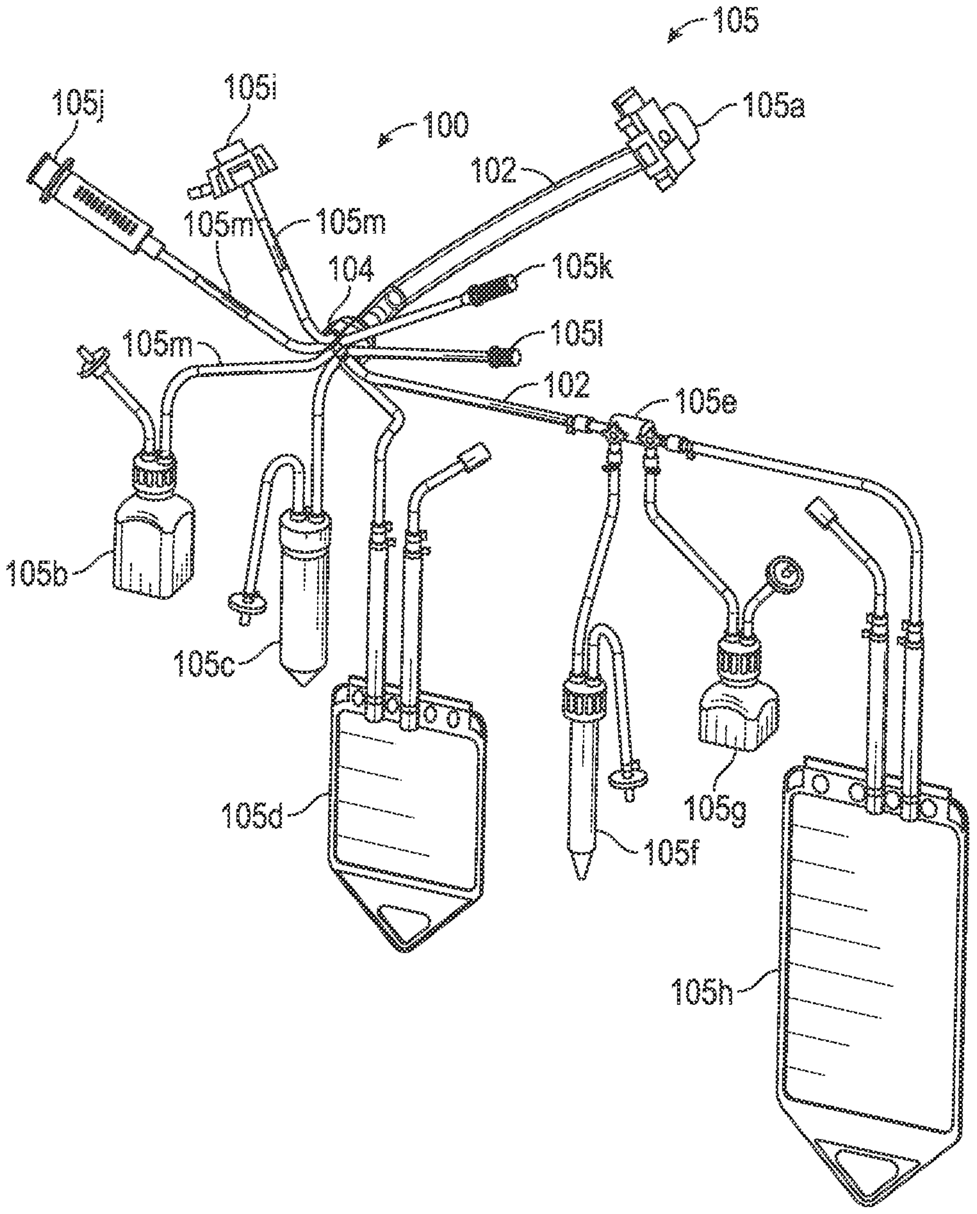
FIG. 1A illustrates the fluid transfer assembly of FIG. 1 with optional additional components.

As shown in FIG. 1A, the conduits 102 may lead from or to additional components 105, which may form part of the fluid transfer assembly. The additional components 105 may include one or more vessels including but not limited to containers, beakers, bottles, canisters, flasks, bags, receptacles, tanks, vats, vials, tubes, syringes, carboys, tanks, pipes and the like that are generally used to contain liquids, slurries, and other similar substances. The vessels may be closed by a MYCAP®, available from Sartorius Stedim North America. The conduits 102 may terminate in components 105 that include other aseptic connectors or fittings such as an AseptiQuik® connector available from Colder Products Company of St. Paul Minnesota, a BENCHMARK' fitting available from Sartorius Stedim North America, an OPTA® aseptic connector available from Sartorius Stedim North America, a ReadyMate® connector available from GE Healthcare of Chicago, Illinois, or other terminus such as syringes, centrifuge tubes, or a plug. The illustrated embodiment of FIG. 1A includes a junction 104 and a plurality of conduits 102, which lead to the following optional and exemplary components: a ⅜" hose barb AseptiQuik® aseptic connector 105*a*; a 60 ml bottle assembly with MYCAP™ 105b; a 50 ml centrifuge tube assembly with MYCAP™ 105c; a 50 ml bag assembly 105*d*; a 2-gang stopcock valve assembly 105*e* with a 15 ml centrifuge tube 105*f*, a 30 ml bottle with MYCAP® 105*g*, and a 500 ml purge bag 105*h*; an AseptiQuik® aseptic connector 105*i*; a 10 cc syringe 105*j*; a needleless access site with a cap 105*k*; and a capped luer fitting 1051. Some of the conduits 102 are provided with a QUICKSEAL® 105*m* available from Sartorius Stedim North America. The example shown in FIG. 1A is for illustration of a small sample of the available vessels, connectors, and fittings available for use in fluid communication with the junction 104, and is not intended to limit the present disclosure.

Figure 2:
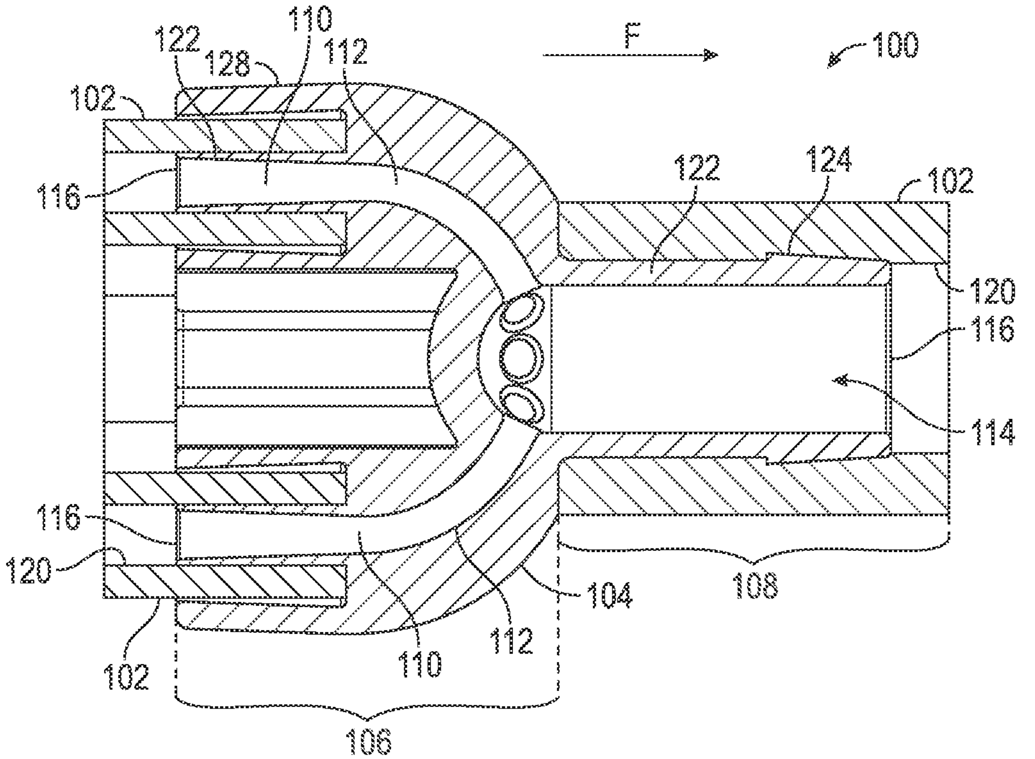
FIG. 2 illustrates a longitudinal cross section of the fluid transfer assembly of FIG. 1.
Figure 7:
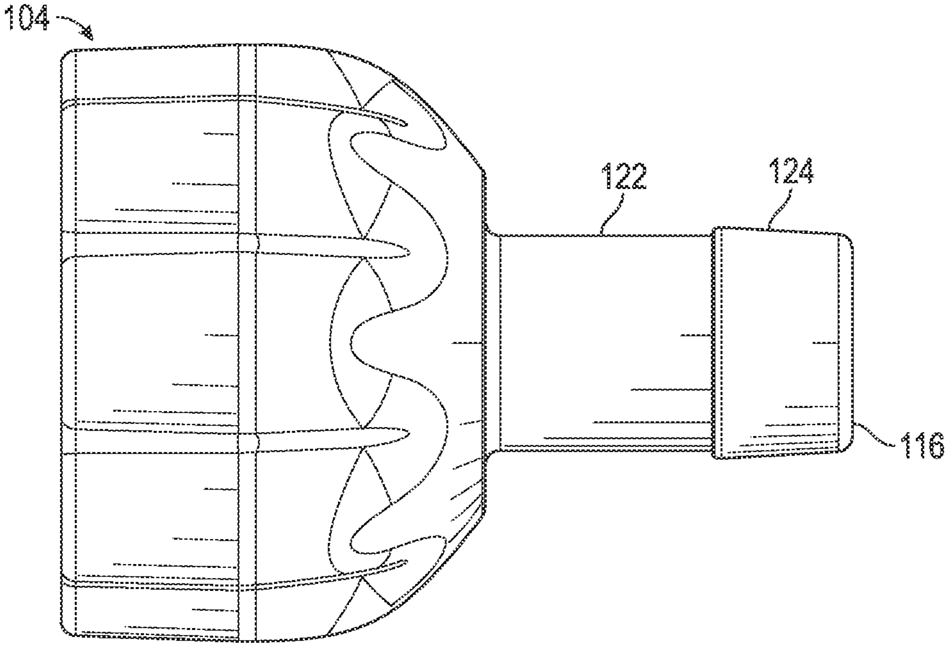
FIG. 7 illustrates a side view of the junction of the fluid transfer assembly of FIG. 1.

FIG. 2 shows a cross section of the junction 104. FIGS. 3-7 show various perspective and plan views of the junction 104 according to one embodiment. Notably, FIG. 7 shows a side view of the junction 104, which is shown as rotationally symmetric.

The junction 104 is preferably constructed as a unitary body of a one-piece construction. Once manufactured, the junction 104 is one-piece and does not require assembly of two or more components. One-piece unitary bodies are being formed from processes known in the art, such as injection molding, and casting parts that are machined. As used herein, additive manufacturing processes also produce "unitary" bodies. In one embodiment, the junction 104 is made using an additive manufacturing process. As known in the art, additive manufacturing, also known as 3D printing, involves the creation of thin layers of substantially similar thickness being stacked upon one another to build material and form a body. Therefore, in some embodiments, the junction 104 of the present disclosure may be both a "unitary" construction and be formed from a plurality of layers of material, each layer being approximately the same thickness. In traditional additive manufacturing, the layers are built up, one on top of the layer below. Alternatively, in another embodiment, the present disclosure can employ CLIP technology, e.g., as offered by Carbon, Inc. of Redwood City, CA, which, e.g., uses digital light synthesis to use patterns of light to partially cure a product layer by layer with the uncured material draining away from the body. After excess resin removal, thermal post-processing converts the printed polymer to the fully cross-linked final article.

Suitable materials for the junction 104 include thermoplastics such as polyolefins, polypropylene, polyethylene, polysulfone, polyester, polycarbonate, and glass filled thermoplastics. The junction may also be made from thermosets such as epoxies, pheonolics, silicone, copolymers of silicone and novolacs. Other suitable materials may include polyamide, PEEK, PVDF, polysulfone, cyanate ester, polyurethanes, MPU100, CE221, acrylates, methacrylates, and urethane methacrylate. Yet metallic materials, such as stainless steel, aluminum, titanium, etc., or ceramics, such as aluminum oxide, may be used. The present disclosure however is not limited to a junction made from any particular material (s) and any suitable materials or combinations thereof may be used without departing from the scope of the present disclosure.

Additive manufacturing techniques may allow for the creation of structures that may not be capable of being manufactured with traditional molding or machining steps. These structures can lead to a reduction in packaging space and a reduction in the number of components, which can help to reduce leak points and reduce the costs of assembling the fluid transfer assembly 100.

In some embodiments, the junction 104 may be surface treated to affect appearance, hydrophobicity, and/or surface roughness. In bioprocesses particularly, minimizing surface roughness is preferred to minimize the potential for trapped bacteria. Examples of surface treatment can include metalizing with electroless nickel, copper, or other metal to fill in surface pits. A metalized surface may also improve adhesion and allow the junction 104 to be inductively heated. In another example, the junction 104 can be coated with an inorganic material, such as oxides of silicon (glass or glass like) or coated with organometallic materials. Silane coupling agents can be applied to the surface to change the surface hydrophobicity. If metallic, the junction 104 can be electropolished to improve surface roughness. The junction further can be polished using paste abrasives, such as paste abrasives available from Extrude Hone, LLC of Pennsylvania.

With reference to FIG. 2, the junction 104 may be described as having an upstream portion 106 and a downstream portion 108. For this example, fluid is imagined as flowing from left to right across FIG. 2 as represented by the arrow F. As discussed above, the junction 104 is capable of use with the fluid flowing in the opposite direction. Therefore, the terms upstream and downstream are applied to the portions 106, 108 solely as one example, and may be reversed. The junction 104 provides a plurality of fluid pathways 110 between the upstream portion 106 and the downstream portion 108. Preferably, at least a portion of each pathway 110 is a curved segment 112. A curved segment is one that deviates from a straight line without sharp breaks or angularity. The curvature is preferred to be able to go from a small area (i.e., an end of a multi-lumen conduit, or a single-lumen conduit) to multiple independent conduits, which necessarily take up more space. To connect the two extremes in surface area, the shortest, smoothest path between them is believed to be a curved one. Traditionally, curved paths have not been used because curved paths are difficult or impossible to fabricate with conventional molding or machining processes.

The junction 104 of FIGS. 1-7 includes eight fluid pathways 110, though other suitable number of fluid pathways can be employed, such as four, five, six, seven, nine, ten, or more fluid pathways, without departing from the scope of the present disclosure. The fluid pathways 110 in the junction 104 share a common pathway segment 114. With fluid flowing in direction F, the fluid pathways 110 may be described as combining at the common pathway segment 114. If flow is reversed, fluid from the common pathway segment 114 may be described as splitting to create the eight illustrated fluid pathways 110.

In embodiments, where the junction 104 is a unitary structure, the junction itself would be free from additional components. For example, the plurality of fluid pathways 110 from the upstream portion to the downstream portion may be free from diaphragms capable of restricting or stopping flow. In other words, valves would not be inserted into the junction to control the flow of fluid.

The junction 104 of FIGS. 1-7 includes eight apertures 116 on the upstream portion 106 corresponding to the eight fluid pathways 110 and one aperture 116 on the downstream portion 108 because all of the illustrated fluid pathways 110 combine into a single common pathway segment 114 that leads to the aperture 116 on the downstream portion of the junction. Therefore, in embodiments that involve a common pathway segment 114, the number of apertures 116 on the upstream portion 106 may not correspond with the number of apertures on the downstream portion 108. In some embodiments, not shown, the common pathway segment 114 may include an intermediate mixing chamber with an equal number of separate path segments extending upstream and downstream therefrom.

With reference to FIG. 2, a fluid conduit 102 is attached, and preferably sealed, to the junction 104 to place the one or more lumens 120 of the fluid conduit 102 in fluid communication with a respective fluid pathway 110. Preferably, the junction 104 includes corresponding male inserts 122 for each lumen 120 of each fluid conduit 102. The male inserts 122 are configured to be inserted into a respective lumen 120. According to the embodiment of FIG. 2, the male inserts 122 on the upstream portion 106 of the junction 104 include cylindrical tubular structures. In the illustrated embodiment, the plurality of male inserts 122 are substantially parallel with one another. As shown on the downstream portion 108, the male insert 122 may be provided with one or more barbs 124 or teeth. The junction 104 is shown in FIGS. 1-7 as attaching to each lumen 120 of each conduit 102 with a male insert 122. In some embodiments, the junction 104 may include female attachment portions that surround the exterior of one or more of the conduits 102. In other embodiments, a male insert 122 may be configured to abut an end of the conduit instead of being inserted therein. For example, the insert 122 may terminate with a flange suitable for use with tri-clamps as well-known in the art of bioprocessing equipment. If a tri-clamp is used, the clamp union may be governed by ASME-BPE 2016.

Figure 3:
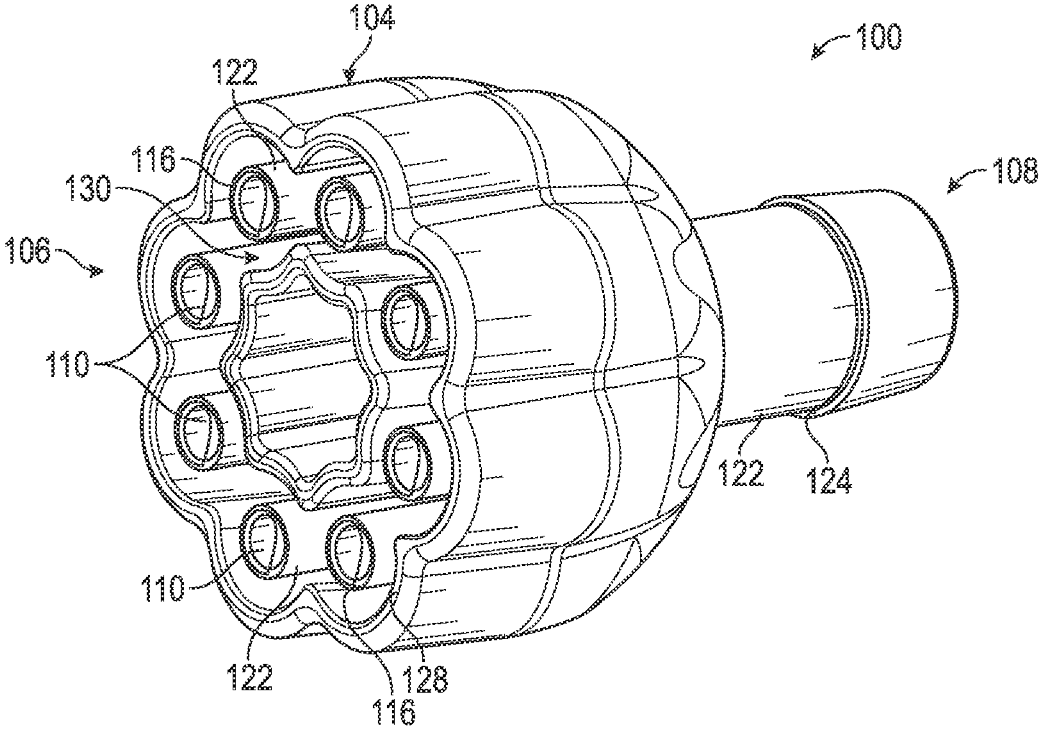
FIG. 3 illustrates a first perspective view of the junction of the fluid transfer assembly of FIG. 1.
Figure 4:
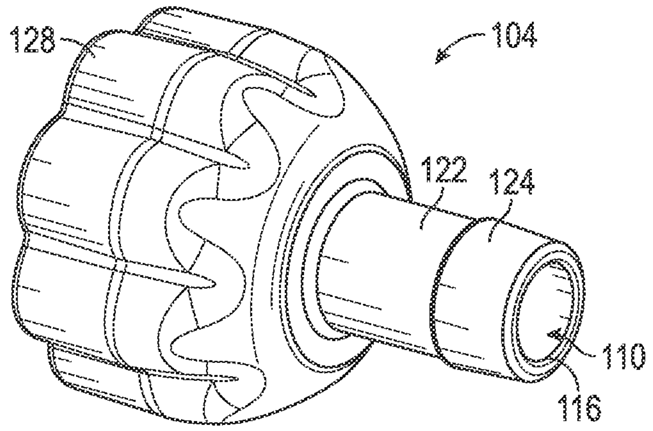
FIG. 4 illustrates a second perspective view of the junction of the fluid transfer assembly of FIG. 1.
Figure 5:
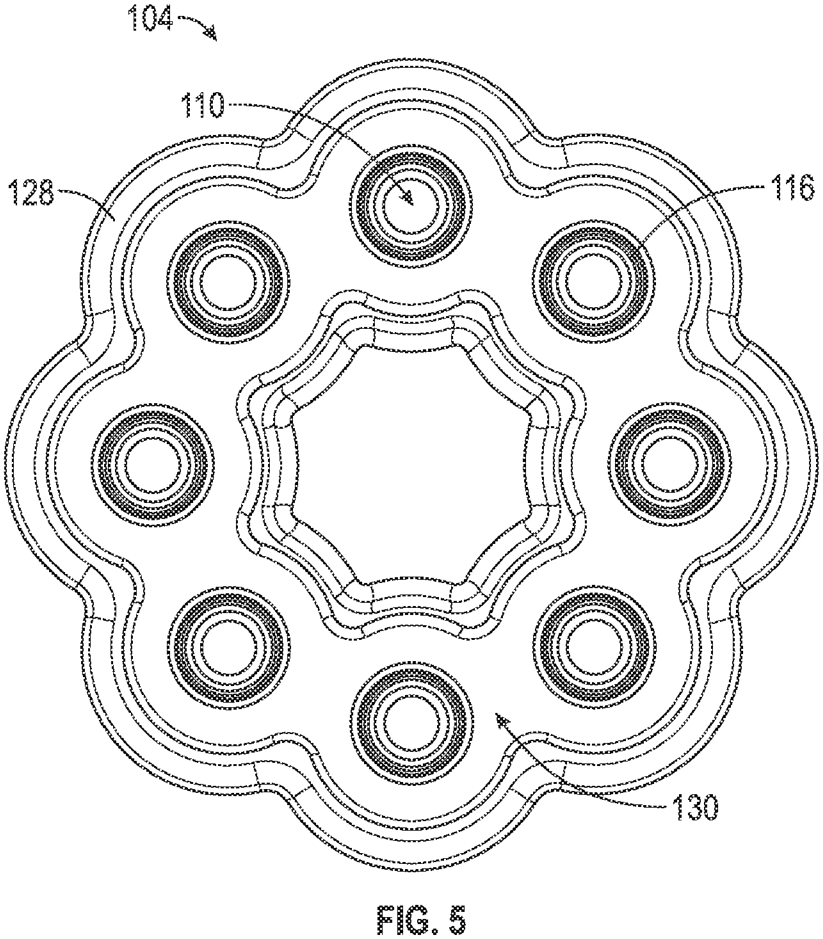
FIG. 5 illustrates a first end view of the junction of the fluid transfer assembly of FIG. 1.
Figure 6:
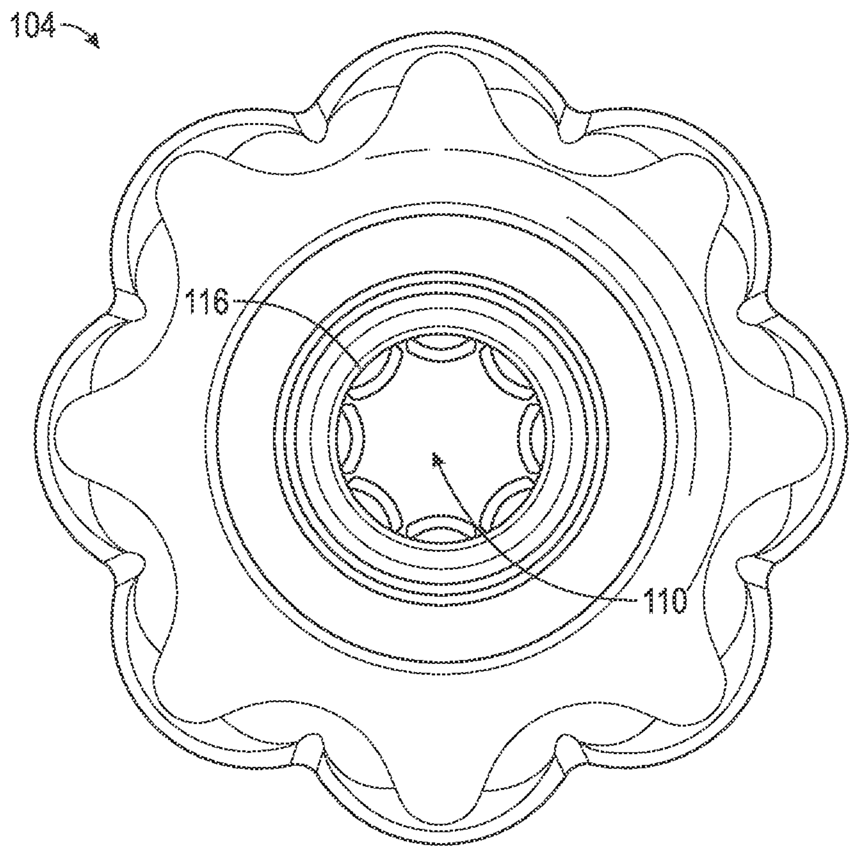
FIG. 6 illustrates a second end view of the junction of the fluid transfer assembly of FIG. 1.

Turning to FIGS. 2 and 3, the plurality of male inserts 122 on the upstream portion of the junction 104 are surrounded by a peripheral wall 128, which also may be referred to as a flange or skirt. The peripheral wall 128 creates a cavity 130 comprised of the interstitial space between the male inserts 122. In one embodiment, the peripheral wall 128 is scalloped to closely follow the outline of a plurality of fluid conduits 102 attached to the corresponding portion of the junction 104.

In some embodiments, the peripheral wall 128 is configured to contain an adhesive or a curable material used to secure the fluid conduits 102 to the junction 104. In one embodiment, silicone adhesive (LIM 8040) may be placed within the peripheral wall 128 of the junction 104 and then a multi-lumen silicone conduit 102 may be placed into the cavity. In one variation, the adhesive can be heat cured at about 150° C. for about 30 minutes, though other temperatures (e.g., about 140° C. to about 160° C. or other numbers there between) and durations (e.g., about 20 to about 40 minutes or other suitable times there between) may be used without departing from the scope of the present disclosure. In some embodiments, the curable material may provide a cast seal. If used, the cast seal surrounds and secures the conduits 102 to the junction 104. In an embodiment, the cast seal is constructed from a self-leveling, pourable silicone such as room-temperature-vulcanizing ("RTV") silicone. The RTV silicone may be a two-component system (base plus curative) ranging in hardness from relatively soft to a medium hardness, such as from approximately 9 Shore A to approximately 70 Shore A. Suitable RTV silicones include Wacker® Elastocil® RT 622, a pourable, addition-cured two-component silicone rubber that vulcanizes at room temperature (available from Wacker Chemie AG), and Rhodorsil® RTV 1556, a two-component, high strength, addition-cured, room temperature or heat vulcanized silicone rubber compound (available from Blue Star Silicones). Both the Wacker® Elastocil® RT 622 and the Bluestar Silicones Rhodorsil® RTV 1556 have a viscosity of approximately 12,000 cP (mPa·s). The aforementioned silicones and their equivalents offer low viscosity, high tear cut resistance, high temperature and chemical resistance, excellent flexibility, low shrinkage, and the ability to cure a cast silicone seal at temperatures as low as approximately 24° C. (approximately 75° F.). The cast seal may also be constructed from dimethyl silicone or low temperature diphenyl silicone or methyl phenyl silicone. An example of phenyl silicone is Nusil MED 6010. Phenyl silicones are particularly appropriate for low-temperature applications, for example, freezing at −80° C. In another embodiment, the casting agent is a perfluoropolyether liquid. A preferred perfluoropolyether liquid is Sifel 2167, available from Shin-Etsu Chemical Co., Ltd. of Tokyo, Japan. In some instances, a primer may be used to promote bonding of the cast seal to the conduits 102 and the junction 104. Suitable primers are SS-4155 available from Momentive™, Med-162 available from NuSil Technology, and Rodorsil® V-O6C available from Bluestar Silicones of Lyon, France.

The conduits 102 may be fixed to the junction 104, such as being secured around a male insert 122 using one or more of several other known attachment techniques. For example, the conduit 102 shown attached to the male insert 122 on the downstream portion 108 of the junction 104 of FIGS. 1 and 2 may be retained by friction and supplemented by the barb shown on the male insert. Additionally, or alternatively, several clamping methods are known in the art, including Oetiker clamps, hose clamps, cable ties, etc. The conduits 102 could also be welded to the junction 104. In some embodiments, the junction 104 may be fashioned with receivers for conduits 102 which facilitate a quick connect attachment similar to the MPC series of fittings by Colder Products Company of St. Paul, Minnesota.

Figure 8:
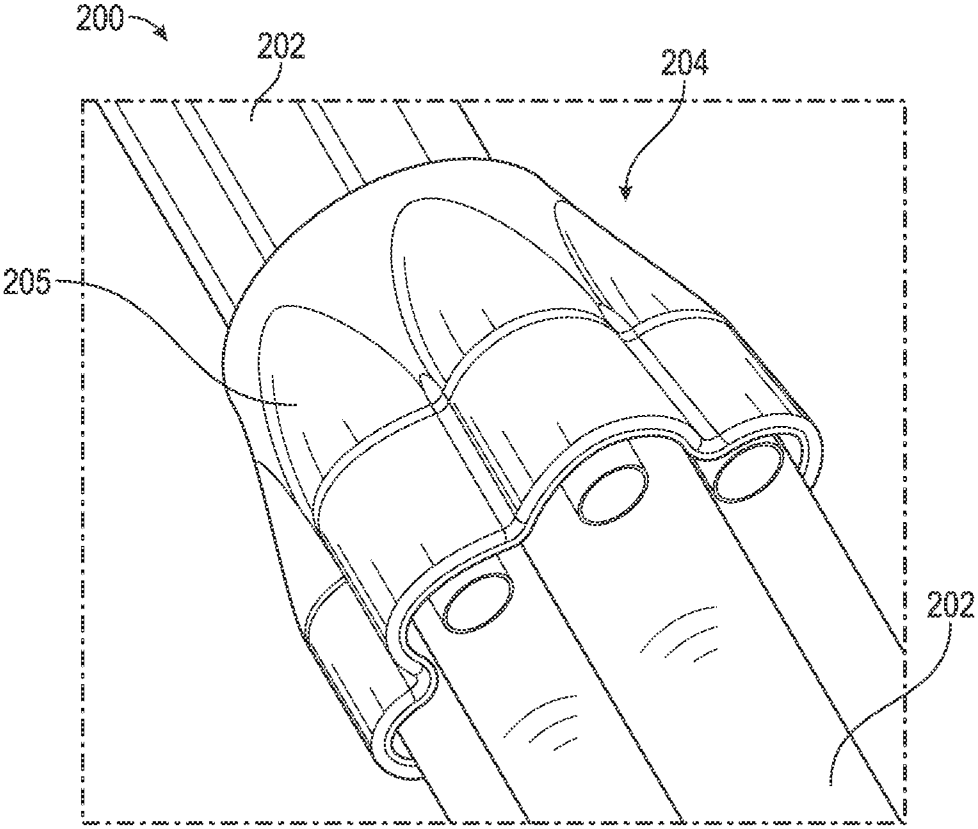
FIGS. 8 and 9 illustrate perspective views of a fluid transfer assembly according to a second embodiment.

FIGS. 8-15 illustrate a fluid transfer assembly 3200 with fluid conduits 202 and a junction 204. As shown in FIGS. 8-9, one of the fluid conduits 202 is a multi-lumen conduit. The illustrated multi-lumen conduit has a central lumen configured to be sealingly joined to the junction 204 and in fluid communication with a fluid pathway 210. The junction 204 is substantially similar to the junction 104 illustrated in FIGS. 1-7 but is configured with a central fluid pathway 210 and seven peripheral fluid pathways to correspond with the arrangement of lumen 220 through the multi-lumen conduit.

The central fluid pathway 210 does not have a curved segment 212 but the peripherally arranged fluid pathways do. Instead of a barb fitting as shown in FIG. 2, the junction 204 includes peripheral walls 228 on each of the upstream and downstream portions 206, 208 of the junction surrounding a plurality of male inserts 222.

Figure 16:
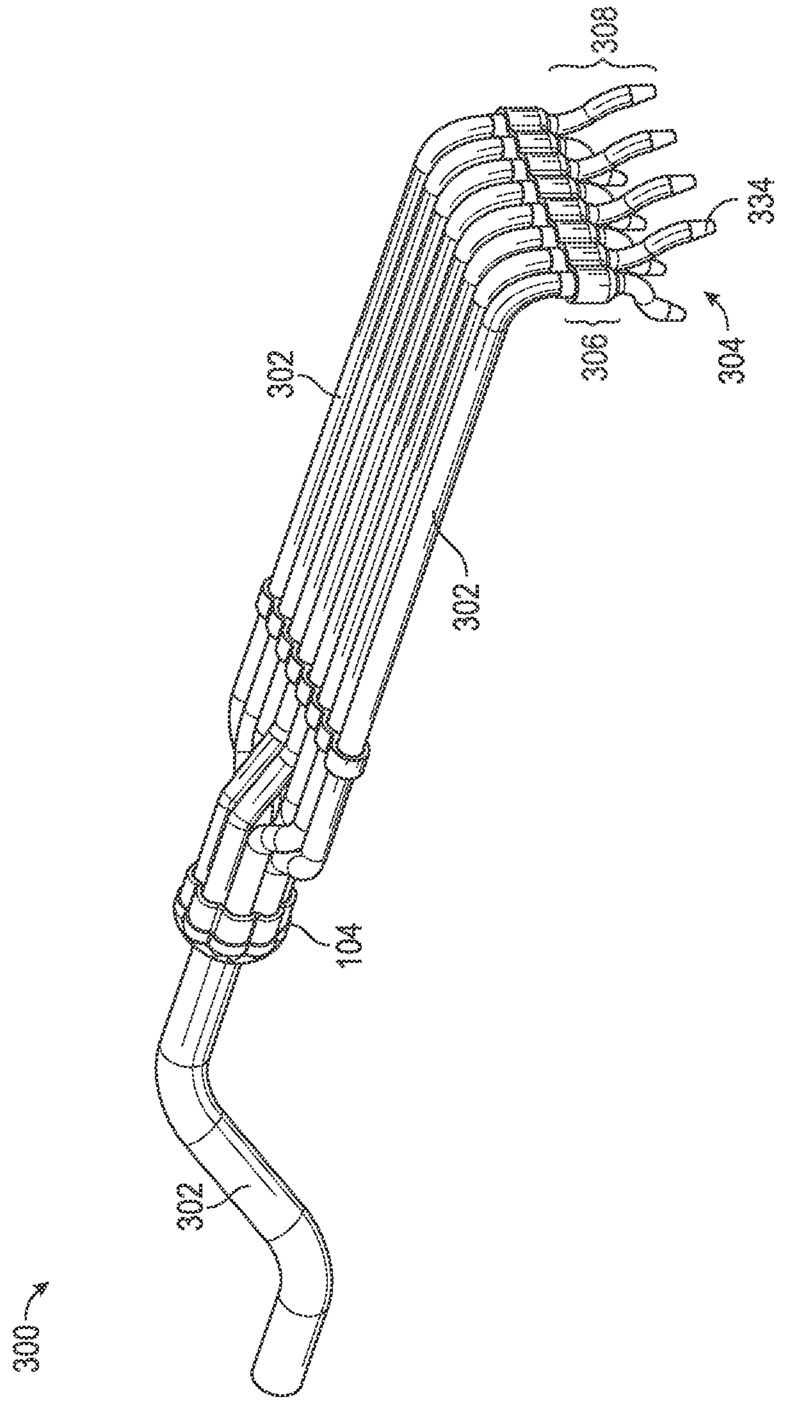
FIG. 16 illustrates a fluid transfer assembly according to a third embodiment.
Figure 17:
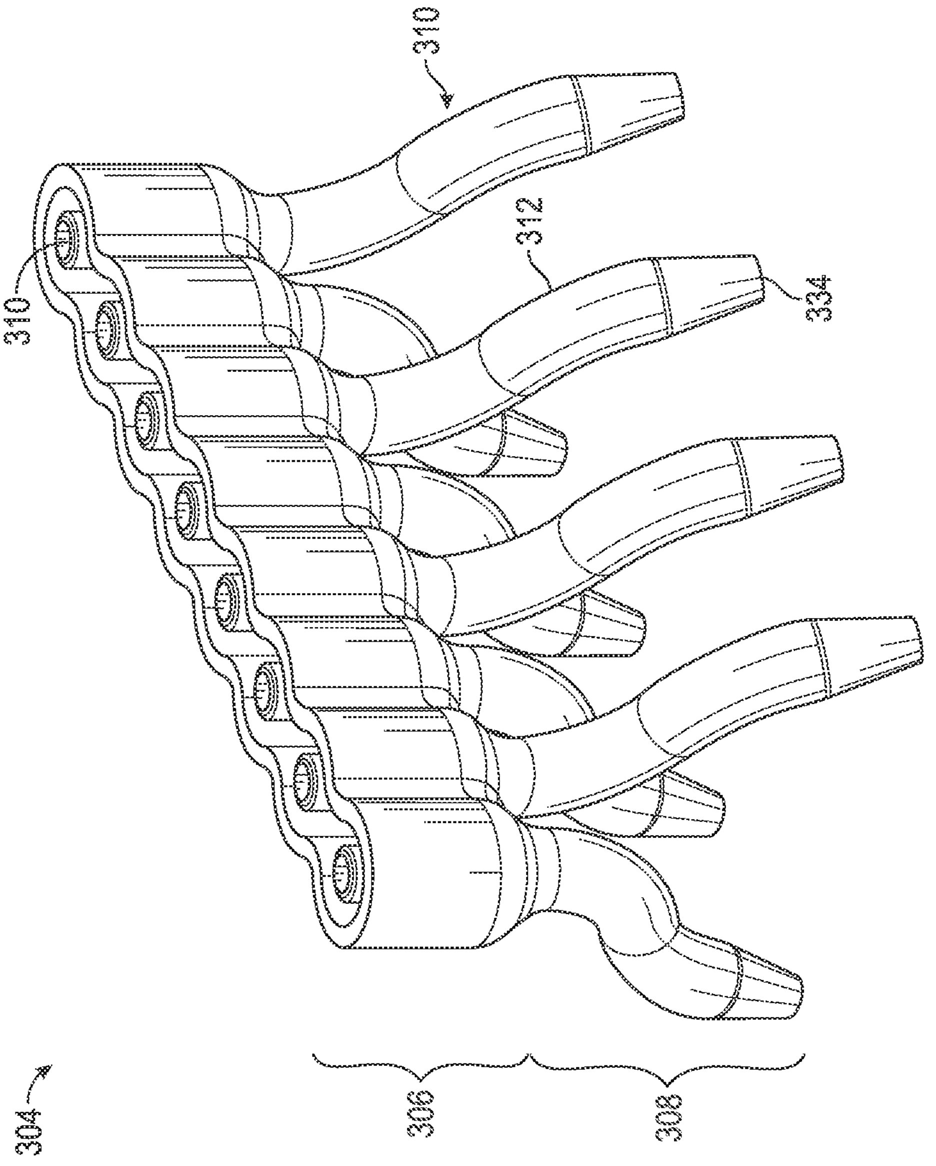
FIGS. 17, 18, 19, 20, and 21 illustrate multiple views of a junction used in the fluid transfer assembly of FIG. 16.
Figure 18:
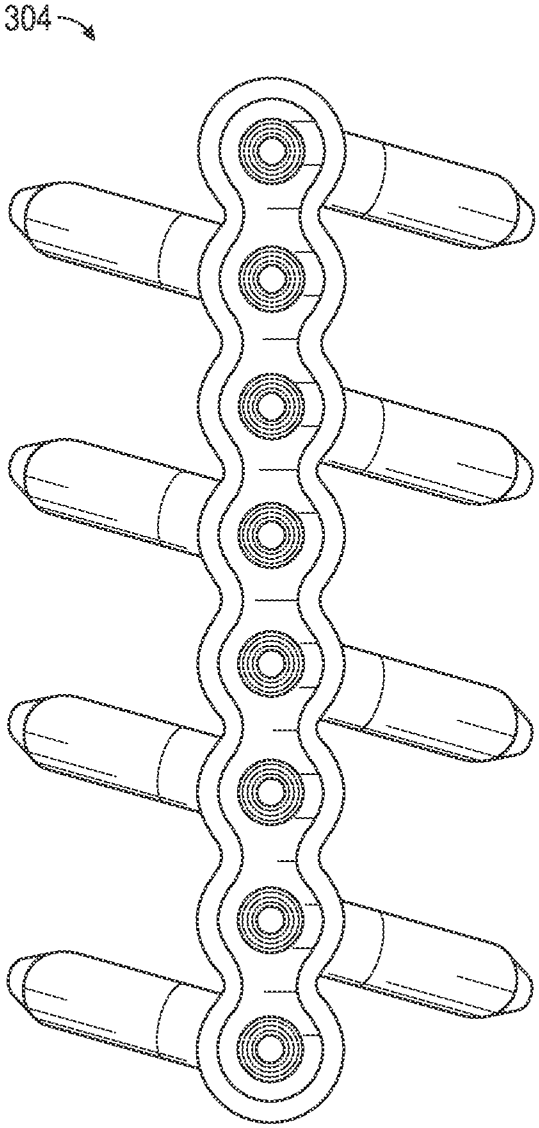
Figure 19:
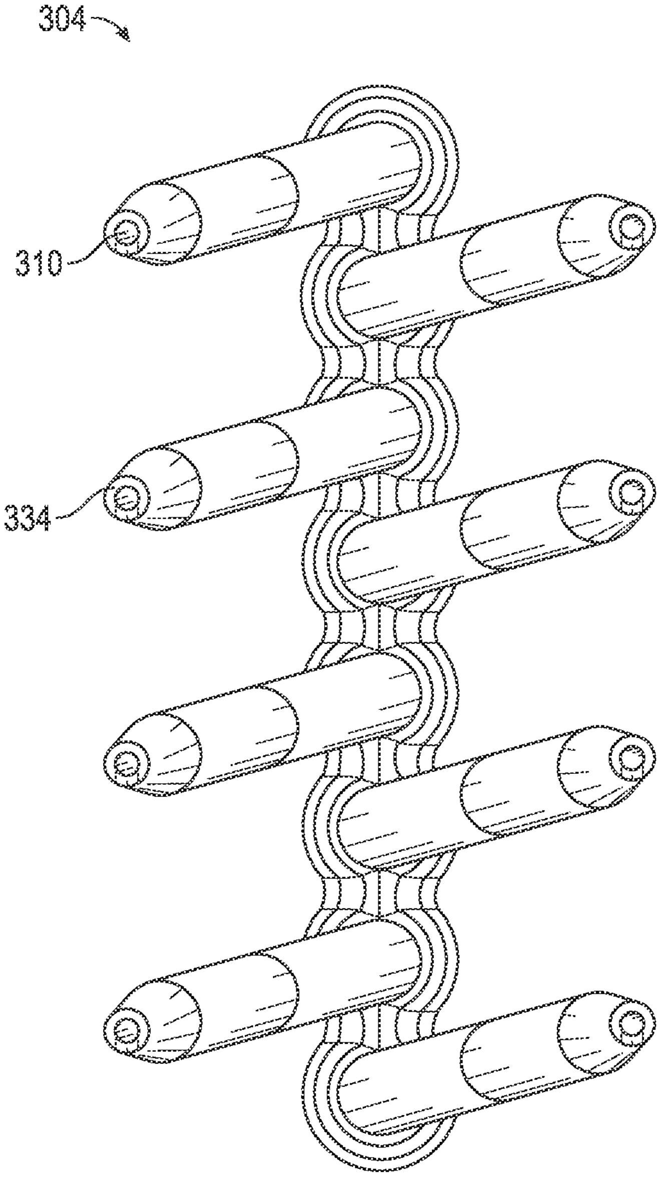
Figure 20:
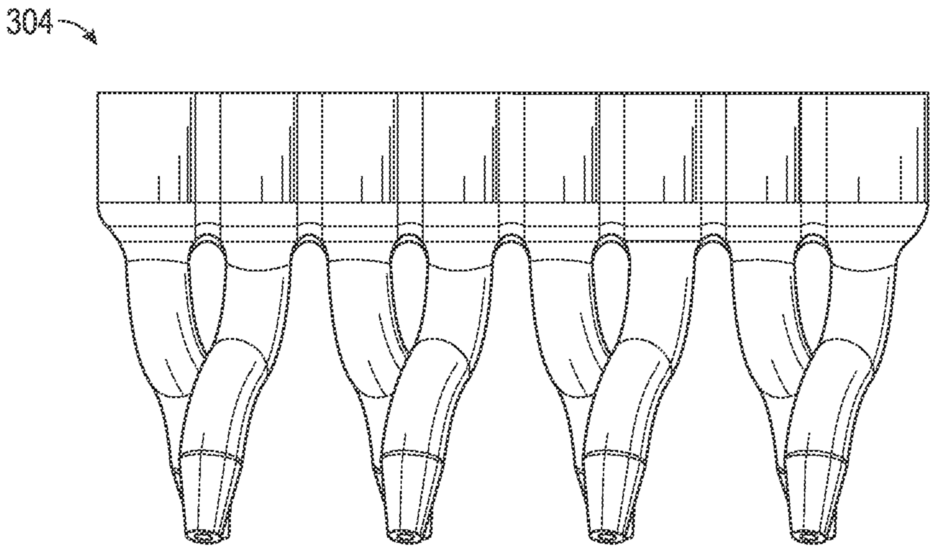
Figure 21:
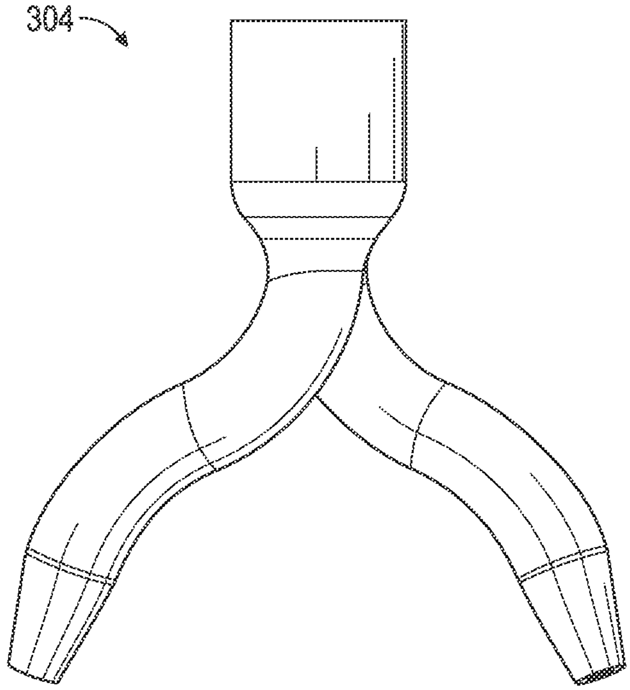

FIG. 16 shows a third fluid transfer assembly 300. The fluid transfer assembly 300 includes a junction 304 sealingly attached to the ends of a plurality of conduits 302, which themselves are coupled to a junction 104 or a junction 204 as discussed above. FIGS. 17-21 include a perspective view, top view, bottom view, major side view and minor side view respectively of the junction 304. Unlike the junctions 104, 204 of the first and second embodiment, the third embodiment of the junction 304 has a plurality of fluid pathways 310, each with a curved segment 312, but each pathway ends in a nozzle 334, thereby creating a predetermined upstream portion 306 and downstream portion 308 for the junction 304.

Figure 22:
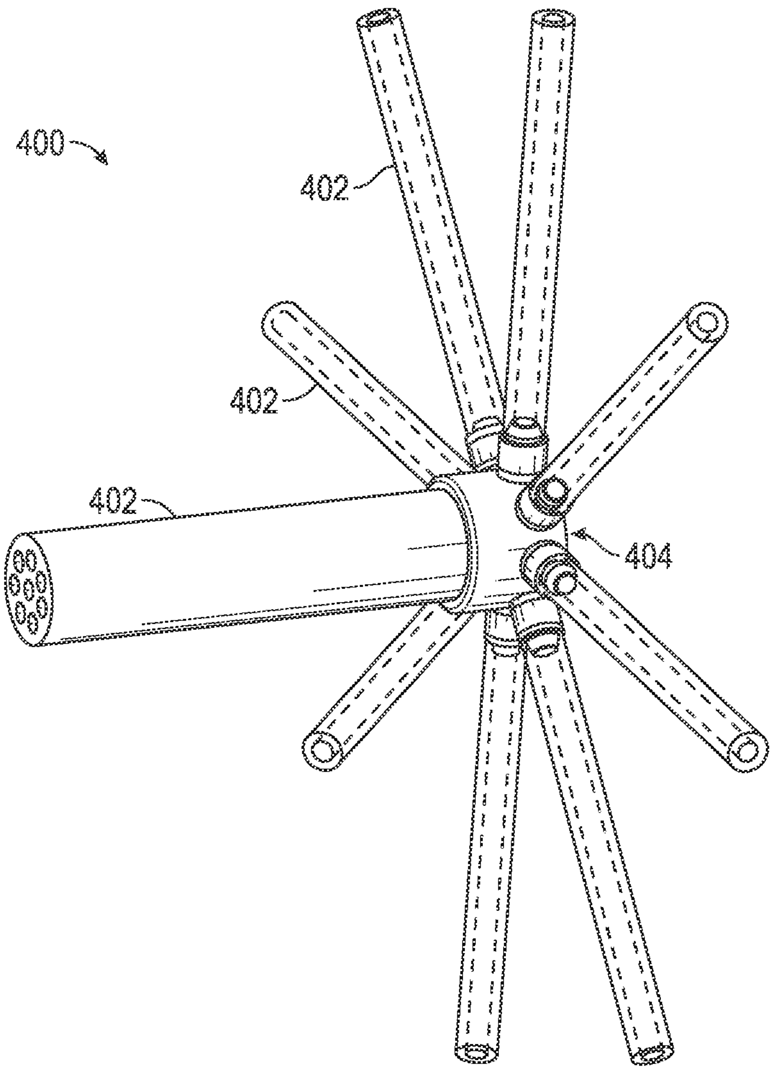
FIG. 22 illustrates a fluid transfer assembly according to a fourth embodiment.

FIG. 22 shows a fourth fluid transfer assembly 400. The fluid transfer assembly 400 includes a plurality of fluid conduits 402, including a multi-lumen conduit on one end of a junction 404 and a plurality of single-lumen conduits arranged radially around a central axis of the junction. FIGS. 23-29 show a variety of views of the junction 404. The junction 404 includes a plurality of male inserts 422 on the upstream portion 406 and a plurality of male inserts 422 on the downstream portion 408. The male inserts 422 on the downstream portion are arranged radially and illustrated in the form of barb fittings.

The junction 404 includes an optional indicia 440 adjacent to a single one of the plurality of male inserts 422, the indicia is adjacent to the single one of the male inserts that corresponds with a fluid pathway 410 accessible along the central axis of the junction 404. The indicia 440 is illustrated as a boss with an oval shape, but the indicia may be any marking capable of providing notice to a user of the male insert 422 that corresponds with a central one of the male inserts 122 on the upstream portion 406. Because the pathways 410 corresponding with the peripherally arranged inserts 422 of the upstream portion 406 may be apparent to the user, only a single indicium 440 with a single insert 422 may be necessary. In other embodiments, however, each pathway 410 may be labeled.

Figure 10:
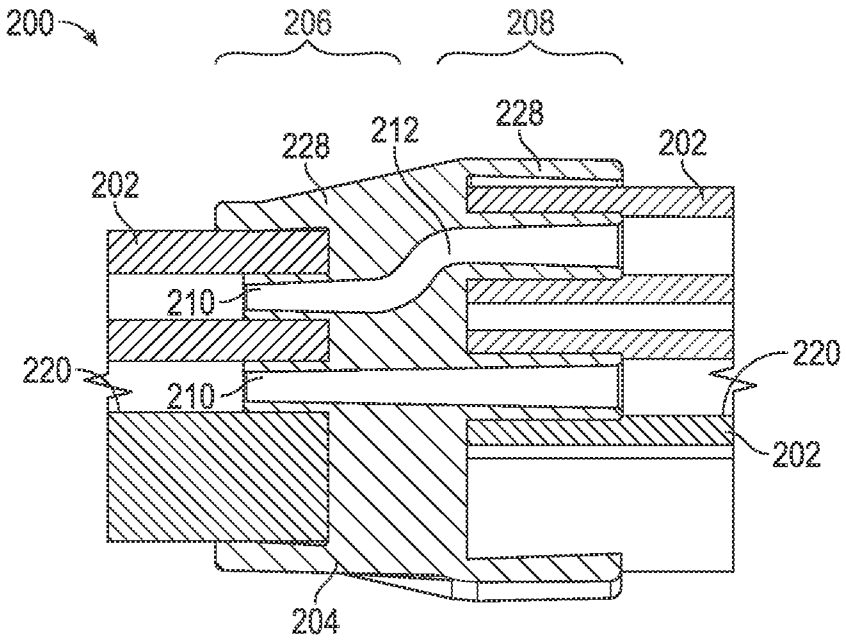
FIG. 10 illustrates a longitudinal cross section of the fluid transfer assembly of FIGS. 8 and 9.
Figure 11:
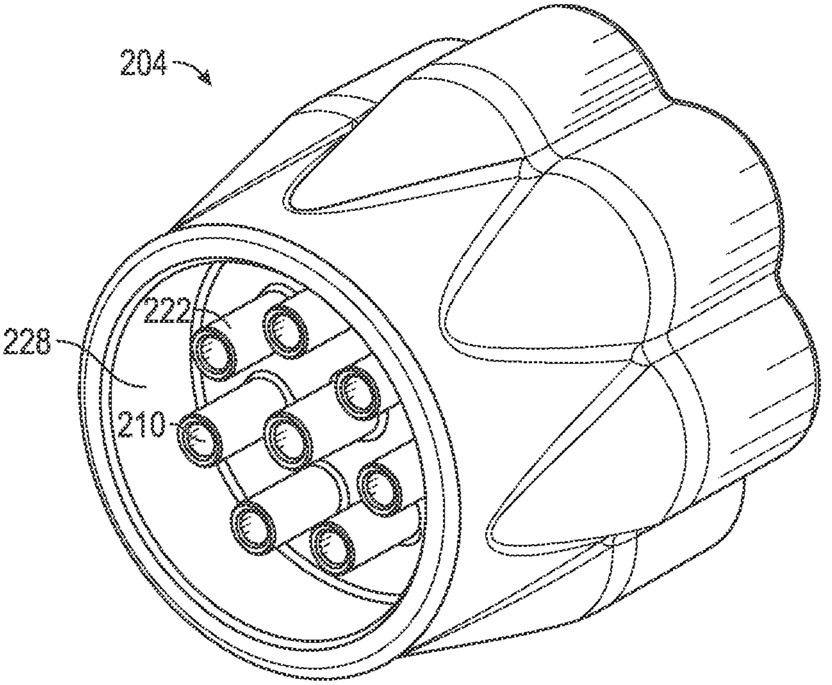
FIGS. 11 and 12 illustrate perspective views of a junction according to the embodiment of FIGS. 8 and 9.
Figure 12:
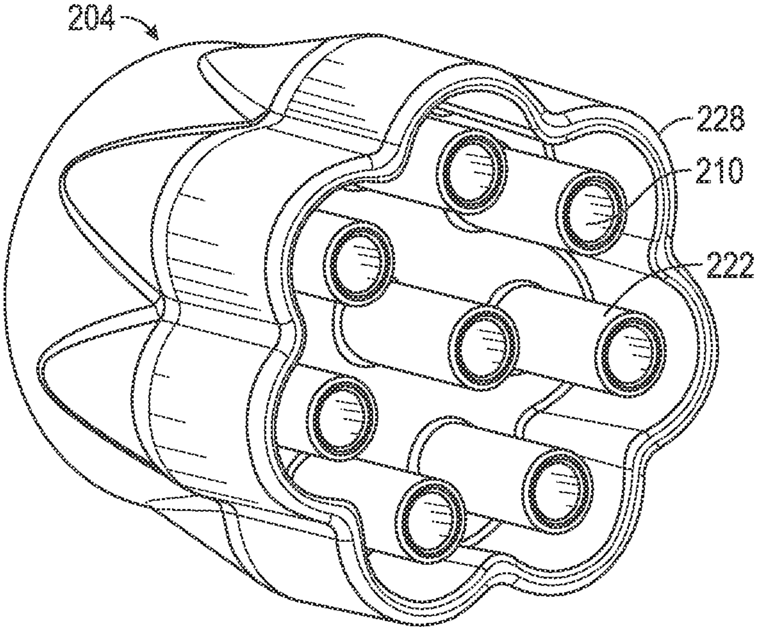
Figure 13:
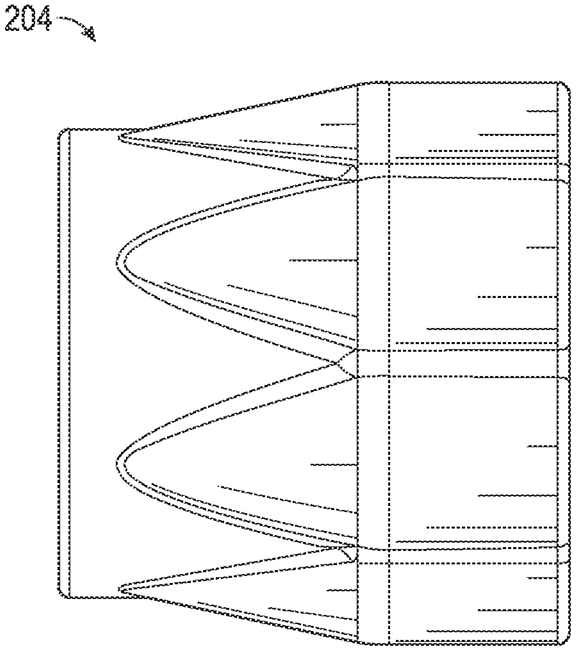
FIGS. 13, 14, and 15 illustrate a side view and two end views respectively of the junction of FIGS. 11 and 12.
Figure 14:
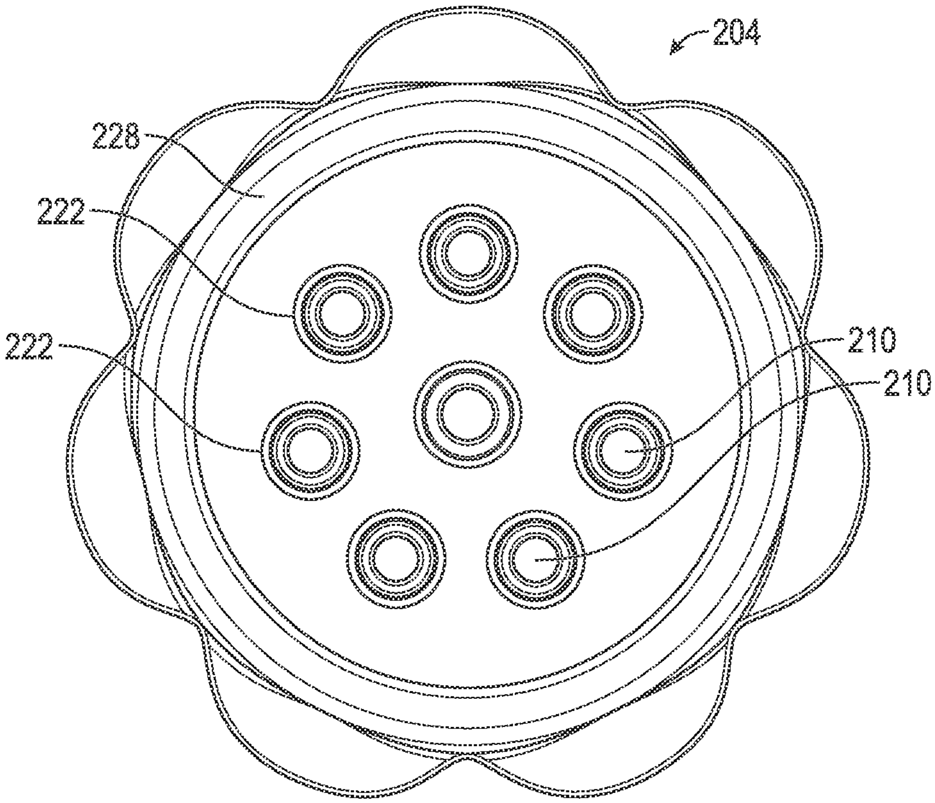
Figure 15:
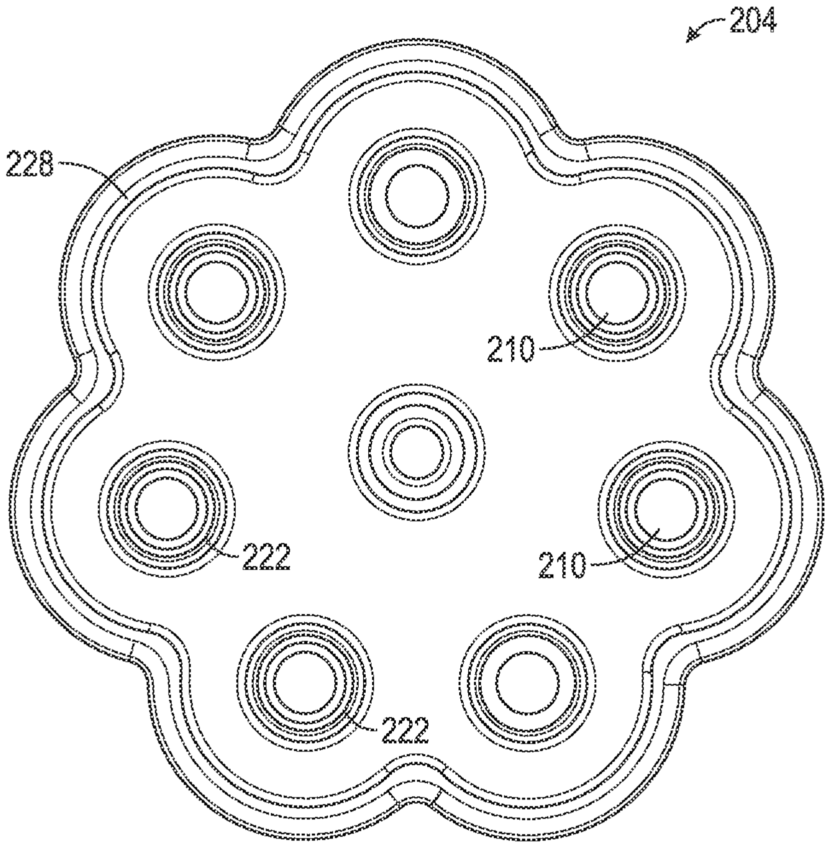
Figure 23:
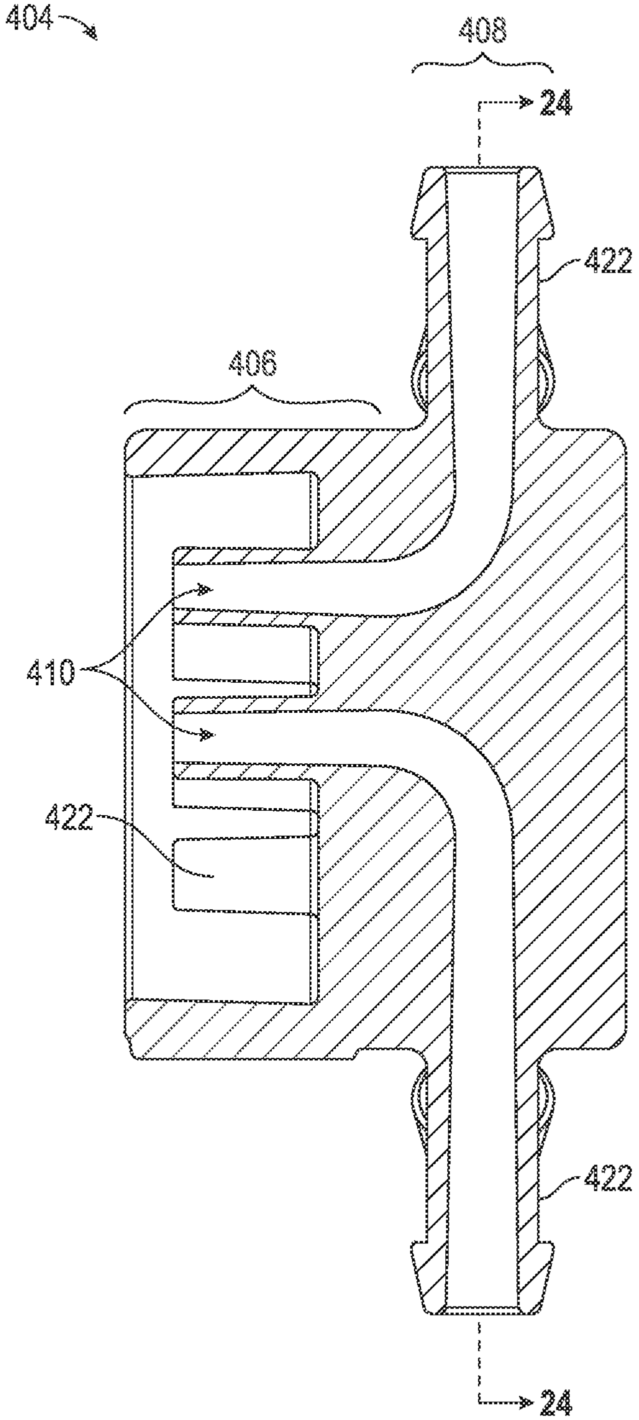
FIGS. 23, 24, 25, 26, 27, 28, and 29 illustrate several views of the junction of the fluid transfer assembly of FIG. 22.
Figure 24:
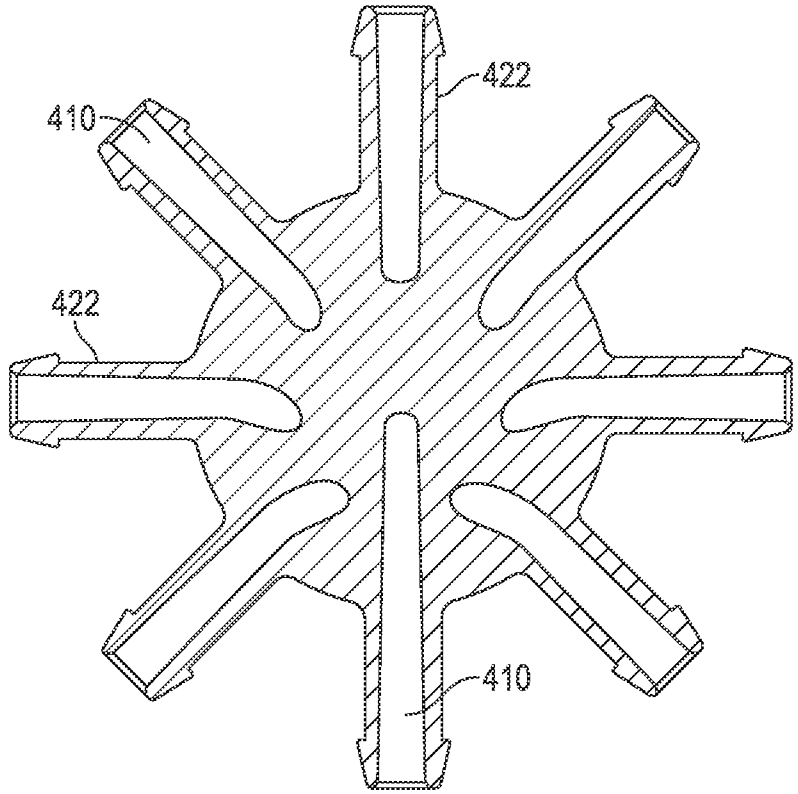
Figure 25:
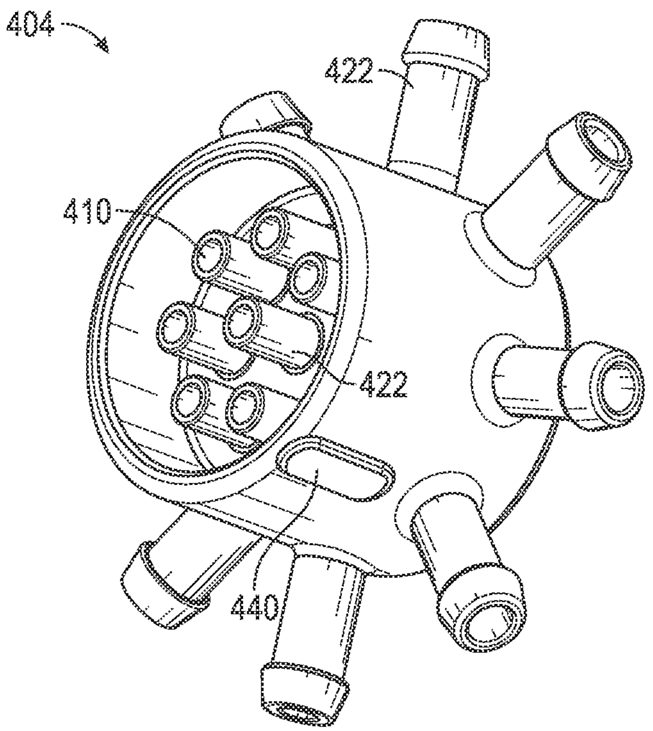
Figure 26:
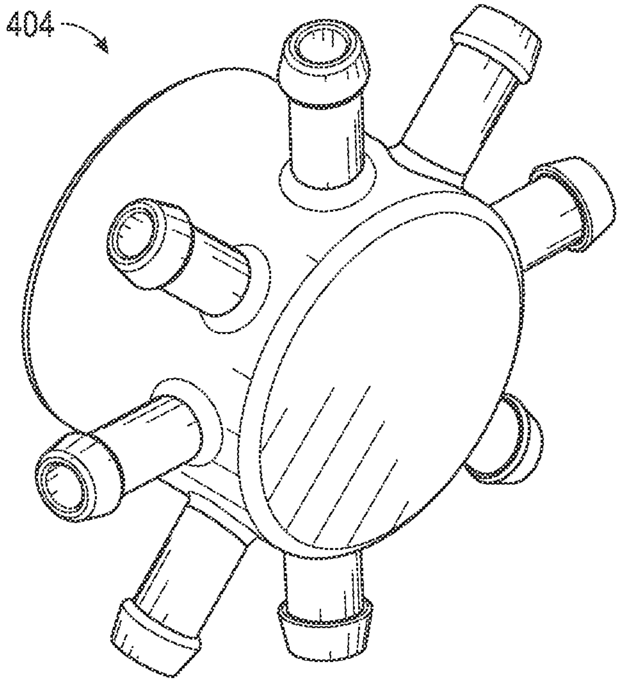
Figure 27:
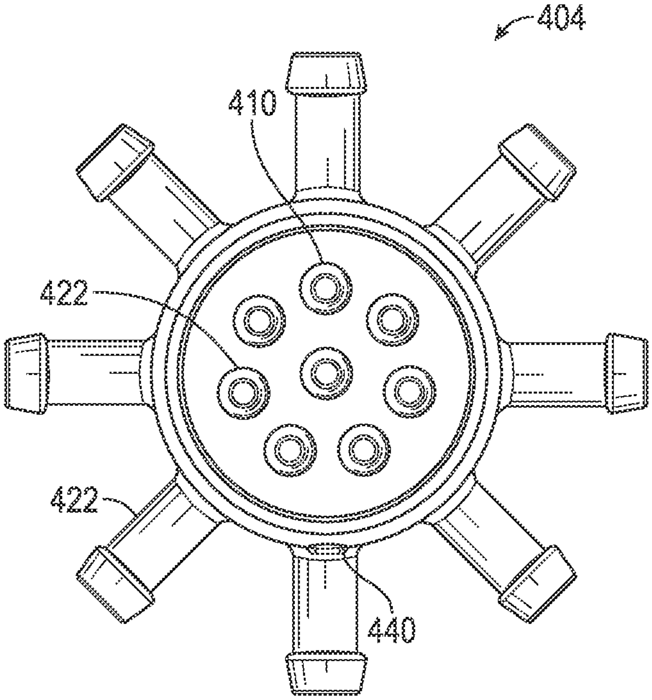
Figure 28:
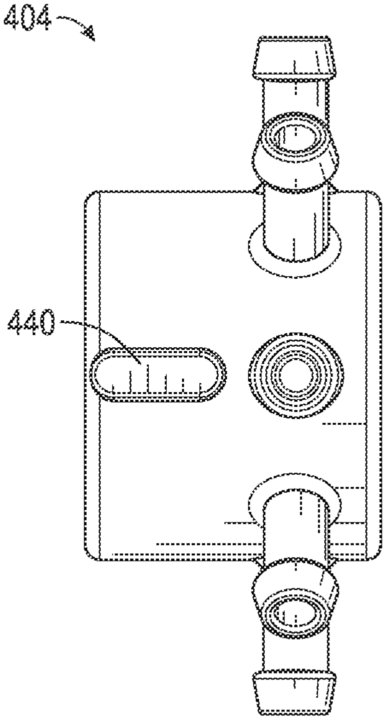
Figure 29:
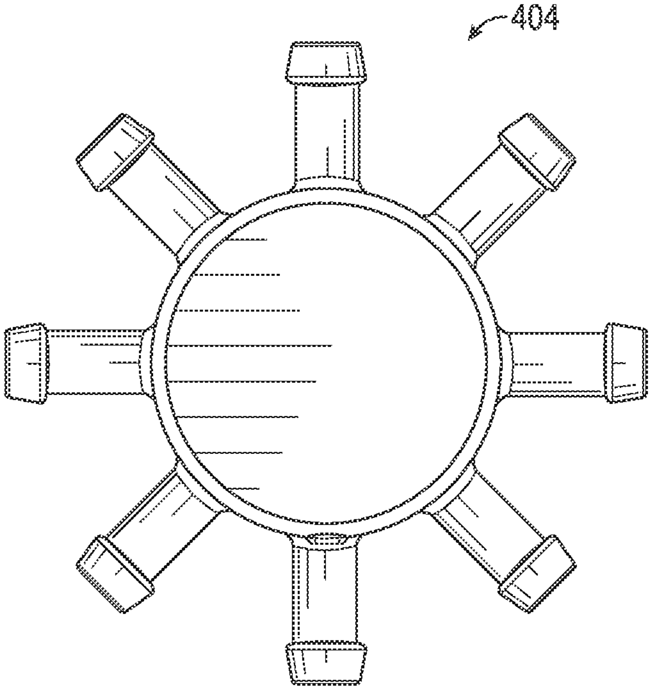
Figure 30:
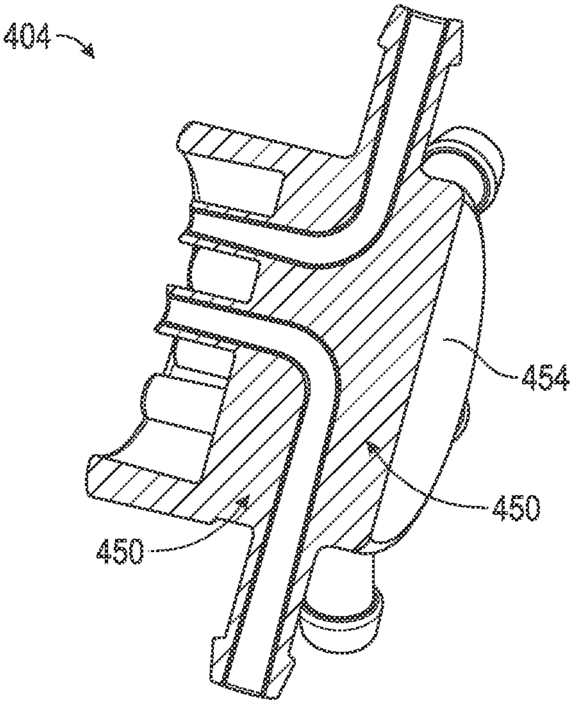
FIG. 30 illustrates an alternative cross section of the junction according to FIGS. 23-29.
Figure 31:
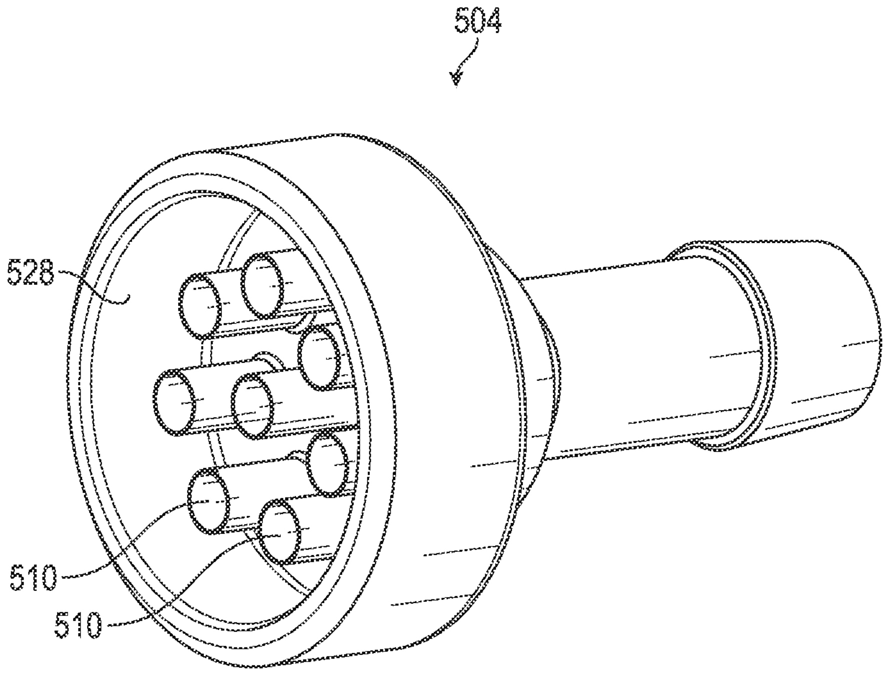
FIGS. 31, 32, 33, 34, 35, and 36 show multiple views of a junction suitable for use with the fluid transfer assemblies of FIGS. 1 and 8.
Figure 32:
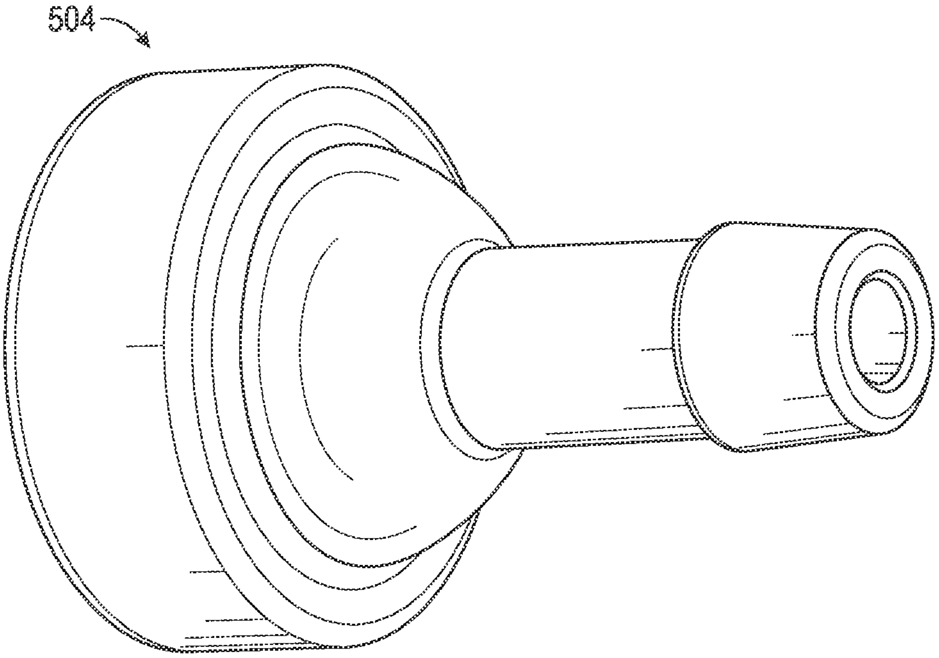
Figure 33:
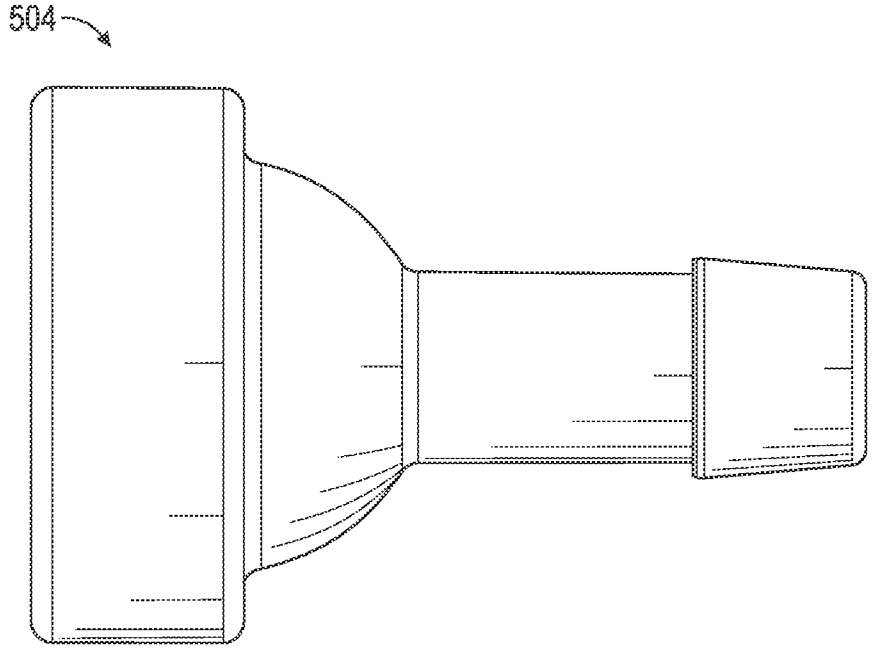
Figure 34:
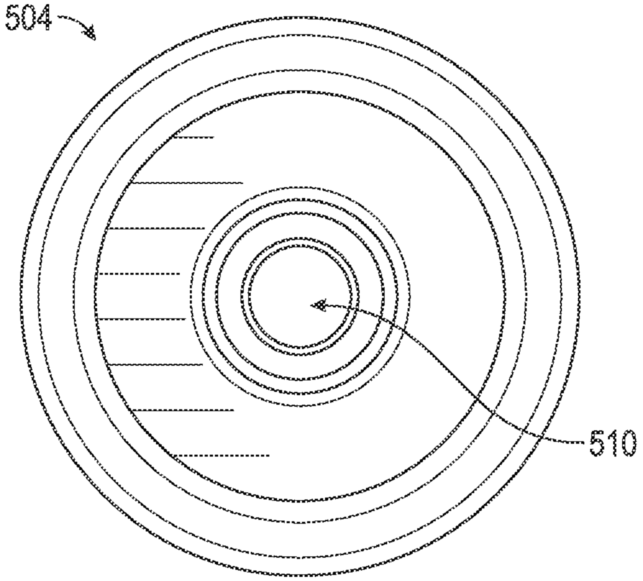
Figure 35:
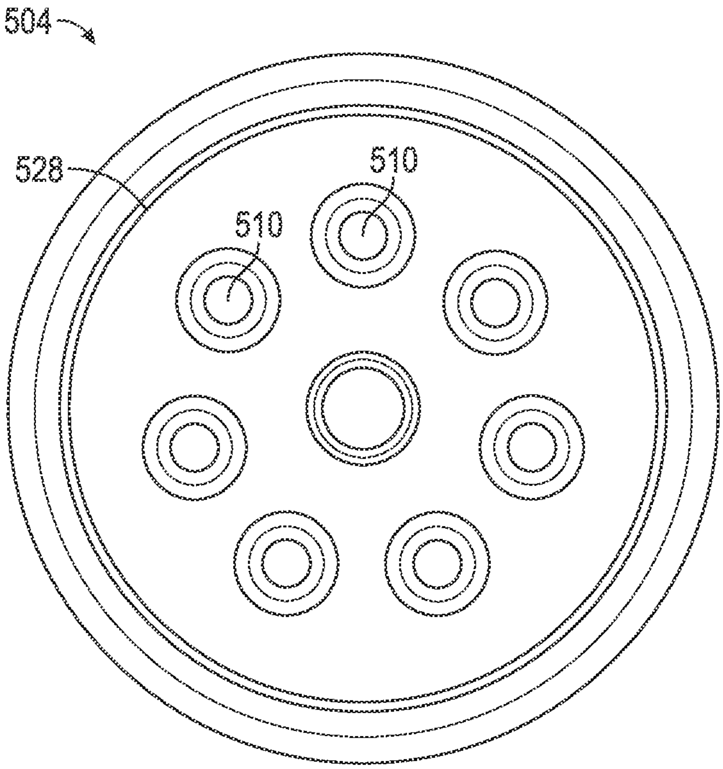

Junctions according to the various embodiments discussed above, particularly junctions 104, 204, 404 are shown in the cross sections of FIGS. 2, 10 and 23, as being substantially solid. By utilizing an additive manufacturing technique, however, the junctions (e.g., 104, 204, 404) can be created with one or more hollow cavities 450 (FIG. 30) independent of, i.e., not in fluid communication with, the plurality of fluid pathways 410. The inventors have determined that additive manufacturing provides an opportunity to build the walls of the fluid pathways 410 and the shell 454 of the junction 404 without necessarily filling in the remainder of the shell 454 with material. By creating one or more hollow cavities 450 within the junction 404, the cost of manufacturing the junction can be reduced because material costs are reduced as the volume of material used is reduced. Also, depositing less material leads to faster build times. Again, reducing the cost of manufacturing the junction.

Figure 36:
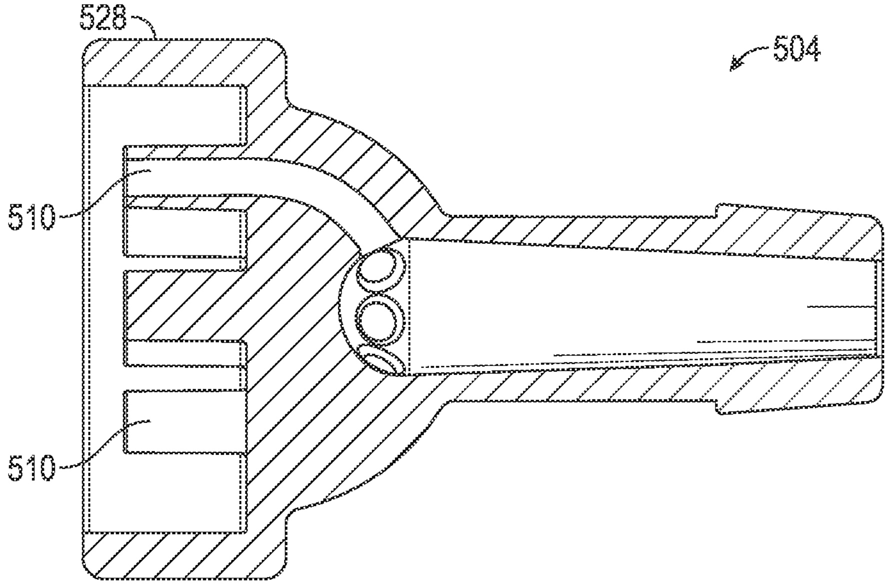
Figure 37:
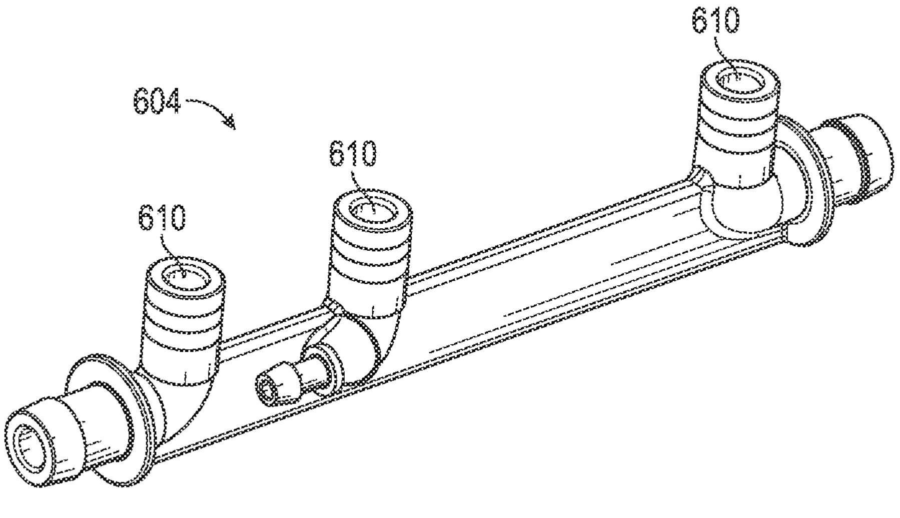
FIGS. 37, 38, 39, 40, 41, 42, and 43 illustrate several views of a junction according to yet another embodiment that is suitable for use in a fluid transfer assembly according to embodiments of the present disclosure.
Figure 38:
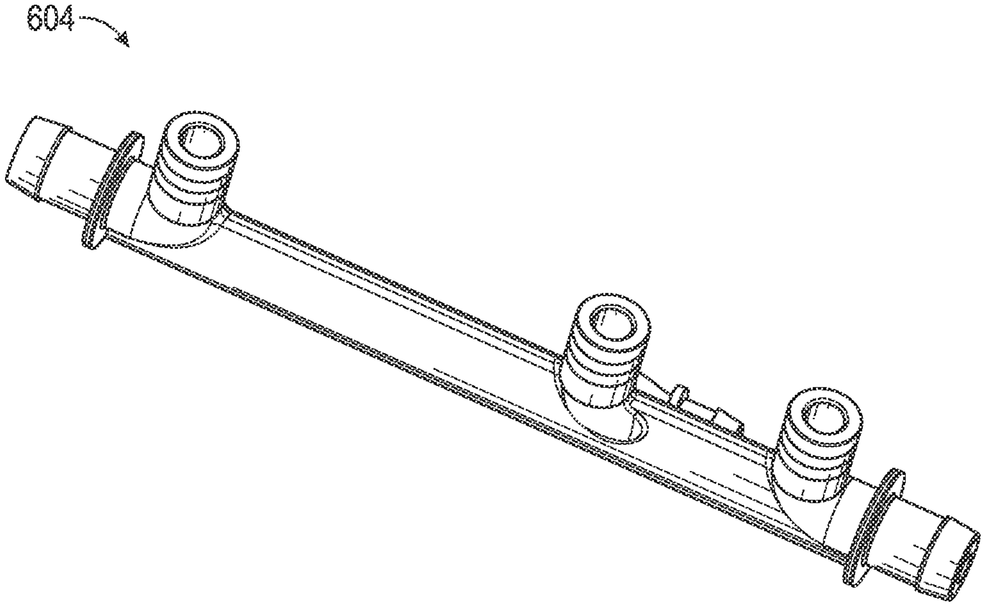
Figure 39:
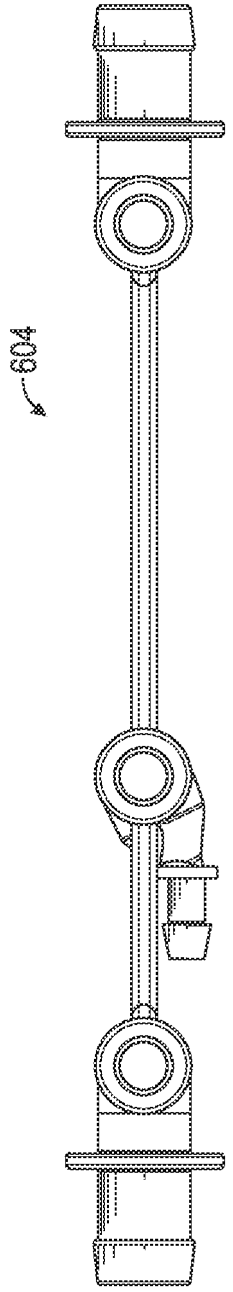
Figure 40:
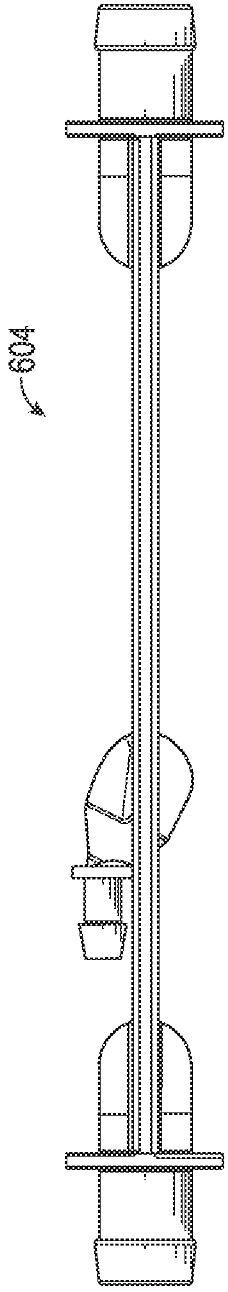
Figure 41:
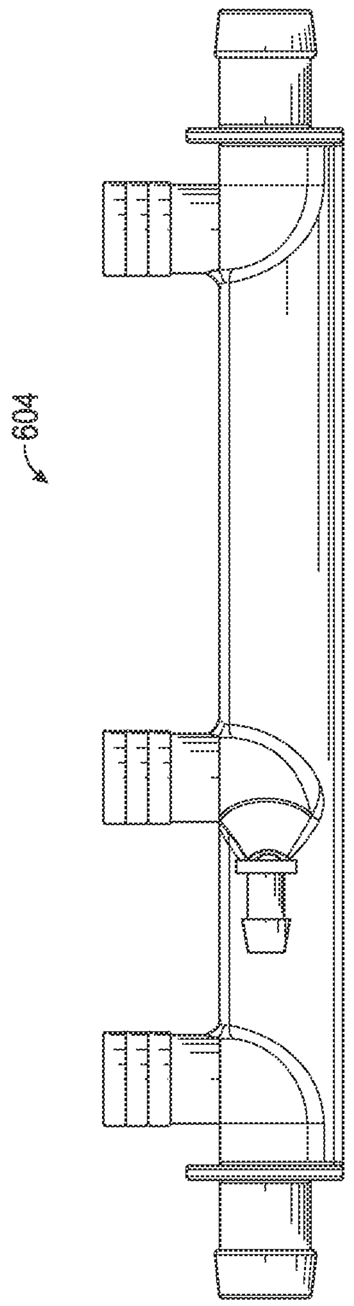
Figure 42:
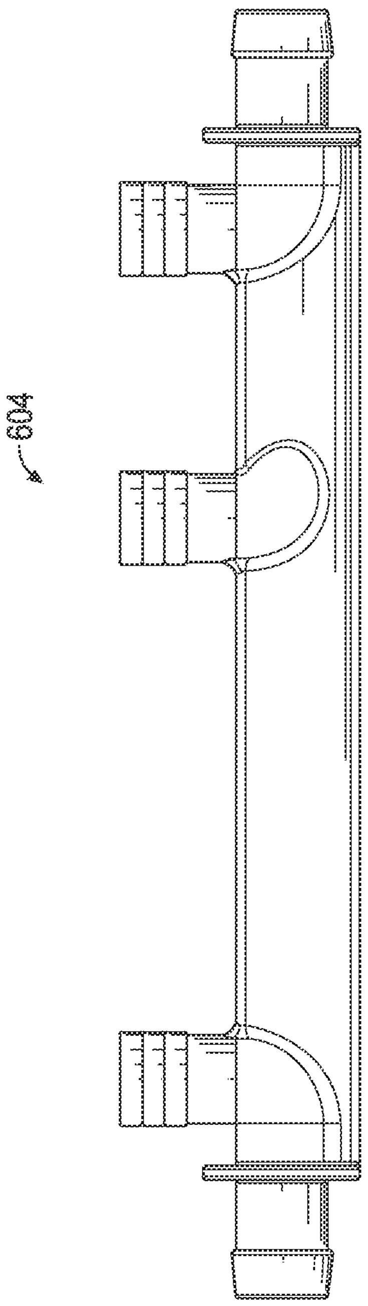
Figure 43:
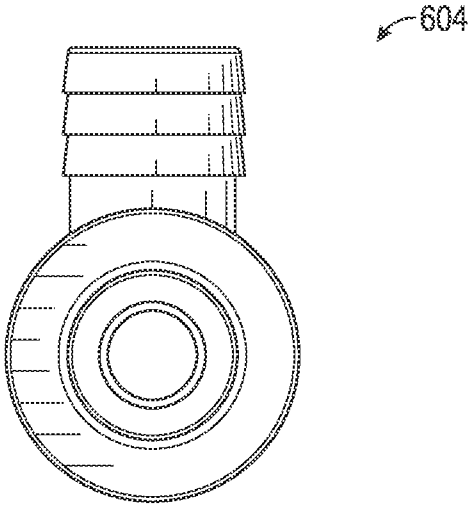

FIGS. 31-36 illustrate a junction 504 according to a fifth embodiment. The junction 504 includes a generally circular peripheral wall 528 instead of a scalloped one but is otherwise substantially similar to the junction 104 of the first embodiment (FIGS. 1-7). FIG. 36 shows the junction 504 as substantially solid in areas other than the fluid pathways 510. In other embodiments, a hollow cavity may be integrated into the junction 504.

FIGS. 37-43 illustrate a junction 604 according to a sixth embodiment. The junction 604 may be particularly suited for attachment adjacent to or directly onto openings in a flexible polymeric container, such as a bioprocessing bag. The junction 604 of the illustrated embodiment integrates three fluid pathways 610 in a fixed orientation to help maintain conduits in an organized manner. Packaging space can be reduced and the number of junctions minimized when a reducer is provided out of plane of the fluid pathways at the distal ends of the junction 604.

FIGS. 44-47 illustrate perspective and cross-sectional views of a junction 704 according to a seventh embodiment. As shown in FIGS. 44-47, the junction 704 generally includes a body 705 having an upstream portion 706 and a downstream portion 708 (e.g., fluid may flow from left to right across FIG. 46); however, the junction 704 also is capable of use with the fluid flowing in the opposite direction, and thus, the terms upstream and downstream as applied to the portions 706, 708 are used solely as one example, and may be reversed.

Figure 45:
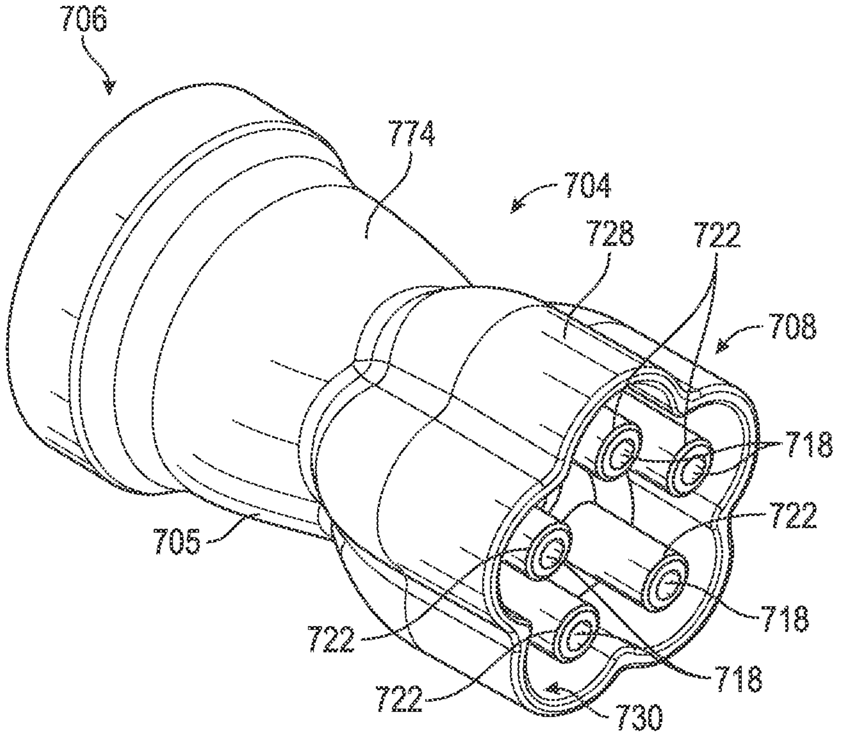
Figure 46:
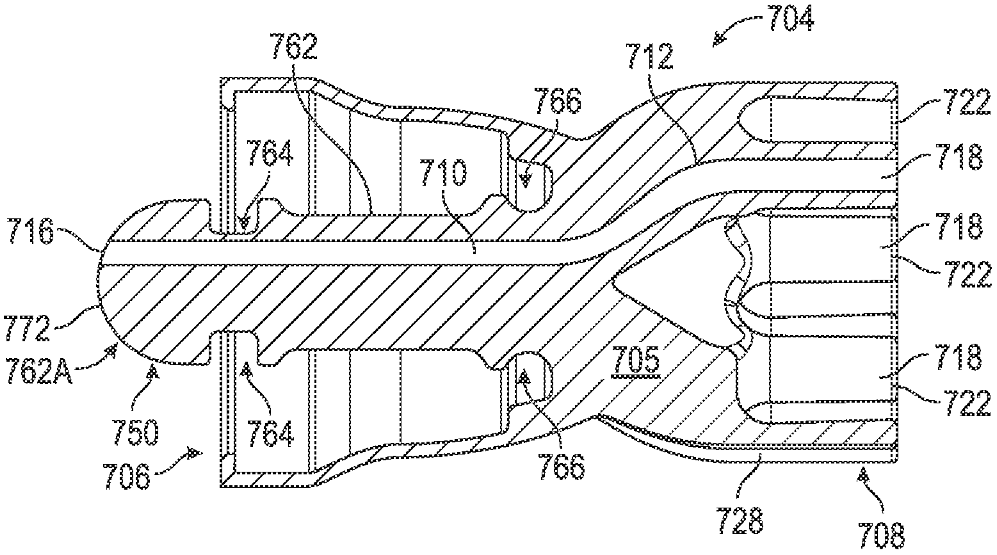

The junction 704 further includes a plurality of fluid pathways 710 defined through the junction body 705 between the upstream portion 706 and the downstream portion 708, with each fluid pathway 710 generally including at least one curved segment 712 (FIG. 46). In the illustrated embodiment, the junction 704 of FIGS. 44-46 includes five fluid pathways 710, though any suitable number of fluid pathways (e.g., less than five, such as three or four fluid pathways, or more than five, such as six, seven, eight, or more fluid pathways) can be used without departing from the scope of the present disclosure.

Figure 44:
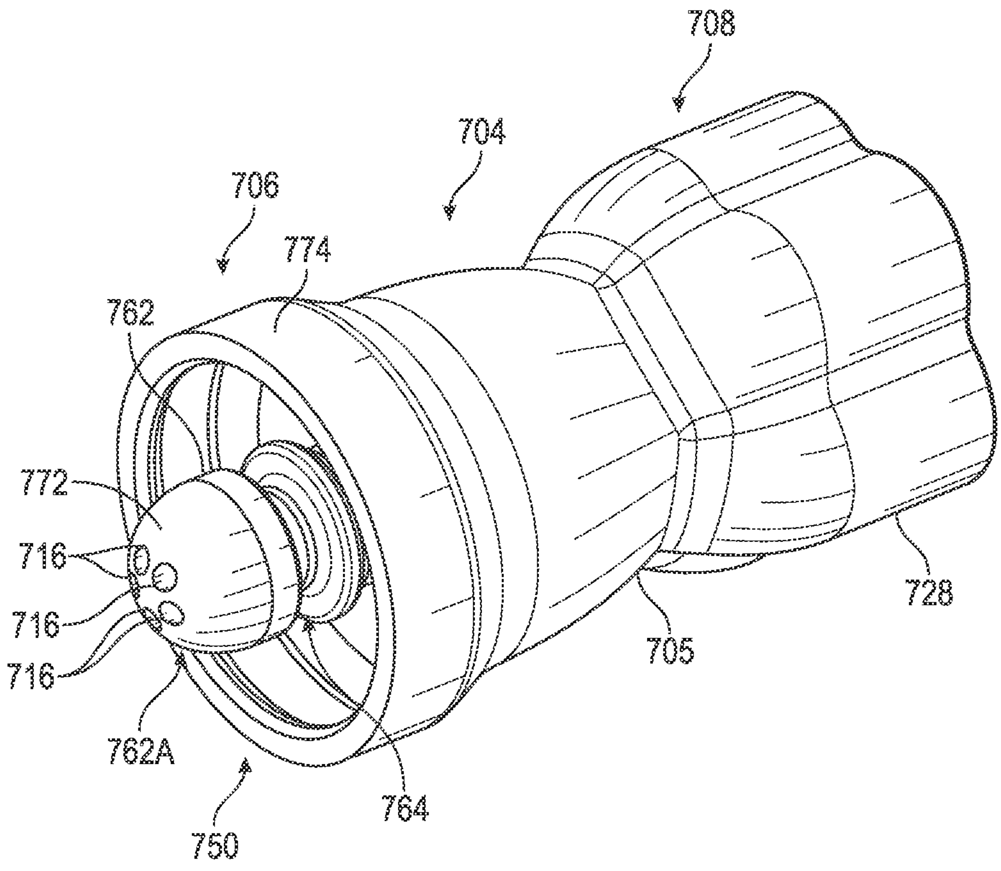
FIGS. 44, 45, 46, and 47 show perspective and cross-sectional views of a junction according to a further embodiment of the present disclosure.

The junction 704 of FIGS. 44-46 also includes five apertures 716 on the upstream portion 706 and five apertures 718 on the downstream portion 708 corresponding to the five fluid pathways 710. Each fluid pathway 710 extends between corresponding aperture 716 on the upstream portion 706 and a corresponding aperture 718 on the downstream portion 708 to place the apertures 716/718 in fluid communication with each other (e.g., to allow fluid flow into the aperture 716 and out from the aperture 718 or to allow fluid flow into the aperture 718 and out from the aperture 716).

Figure 47:
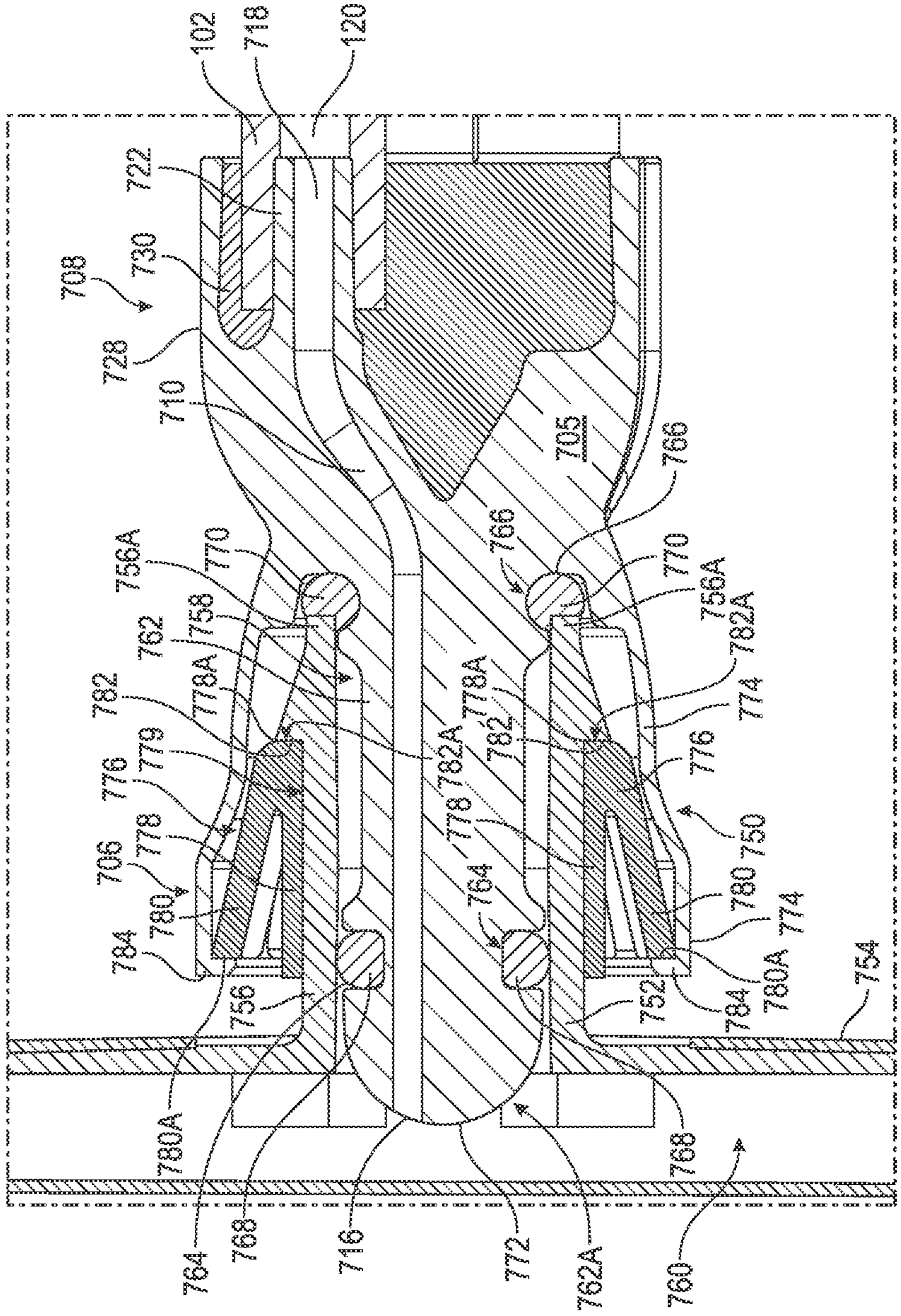

As shown in FIGS. 45, 46, and 47 the downstream portion 708 of the junction 704 additionally includes a plurality of male inserts 722 configured to attach or couple to a fluid conduit 102 to place one or more lumens 120 of the fluid conduit 102 in fluid communication with a respective fluid pathway 710. For example, the male inserts 722 each include at least a portion of the fluid pathway and include an aperture 718 defined therein. The male inserts 722 are configured to be inserted into a respective lumen 120, and generally include cylindrical tubular structures, though other suitable shapes, configurations, etc. are possible without departing from the scope of the present disclosure. The plurality of male inserts 722 further can be substantially parallel with one another. Although male inserts 722 are shown in the embodiment illustrated in FIGS. 44-47, other suitable attachment assemblies, such as female attachments or connectors (e.g., that at least partially surround and engage an exterior of the fluid conduits 102), for fluidly coupling the fluid conduits 102 to the fluid pathways 710 can be used without departing from the scope of the present disclosure.

The plurality of male inserts 722 on the downstream portion 708 of the junction 704 are surrounded by a peripheral wall 728, which also may be referred to as a flange or skirt. The peripheral wall 728 creates a cavity 730 comprised of the interstitial space between the male inserts 722. In one embodiment, the peripheral wall 728 is scalloped to generally follow the outline of a plurality of fluid conduits 102 attached to the corresponding portion of the junction 704. The plurality of fluid conduits 102 may engage at least a portion to the peripheral wall 728 when connected to the male inserts 722, e.g., to facilitate a fitted connection between the conduits and the junction, though the fluid conduits 102 may be spaced apart from (i.e., will not engage) the peripheral wall 728 when connected to the male inserts 722.

FIGS. 44-47 further show that the upstream portion 706 of the junction 704 includes a connection assembly 750 for connecting the junction 704 to a barbed connector 752 of a fluid containing vessel 754 (e.g., a fluid containing vessel including a flexible container, such as a bag, a rigid container, or other suitable vessel for receiving and storing a fluid). The barbed connector 752 can include a cylindrical body 756 defining a lumen or fluid pathway 758 that is in communication with a chamber 760 of the fluid containing vessel 754. The connection assembly 750 further includes a stem or post 762 (e.g., having a substantially cylindrical structure though other structures are possible) that is configured to be received within the lumen 758 of the barbed connector body 756, as generally shown in FIG. 47.

The stem or post 762 further includes a plurality of O-ring seats 764/766 defined there along (FIGS. 44, 46, and 47). The O-ring seats 764/766 are configured to receive an O-ring or other suitable sealing members, such as a first O-ring 768 and a second O-ring 770 (FIG. 47). With the stem 762 received within the lumen 758 of the barbed connector body 756, the first O-ring 768 engages the interior of the lumen 758 generating a primary seal between (e.g., substantially sealing) the barbed connector 752 and the junction 704. In addition, with the stem 762 received within the lumen 758, the second O-ring 770 engages an end portion 756A of the barbed connector body 756 to create an additional or secondary seal between the barbed connector 752 and the junction 704. The secondary seal formed by the second O-ring 770 may help to maintain substantial sealing between the barbed connector 752 and the junction 704, e.g., upon failure, leakage, etc. of the first O-ring 768.

Figure 49:
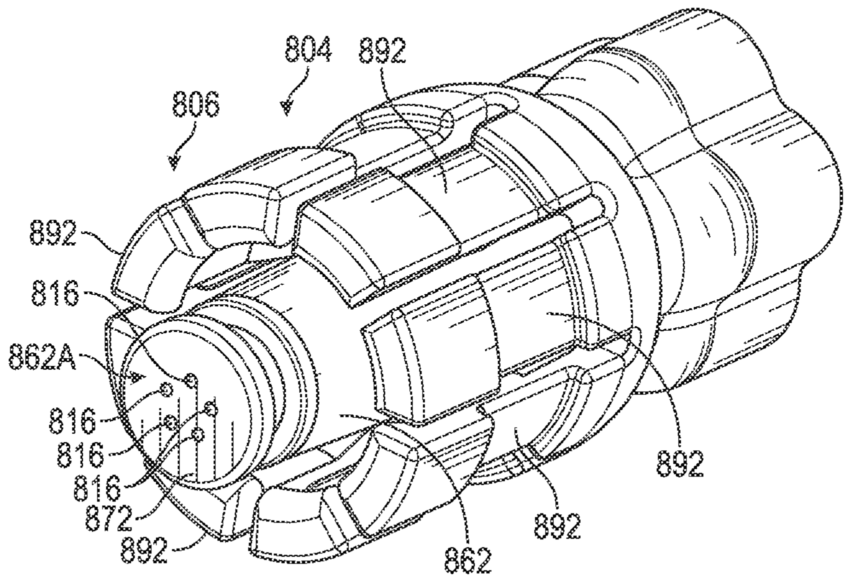
FIGS. 49, 50, 51, and 52 show perspective and cross-sectional views of a junction according to an even further embodiment of the present disclosure.
Figure 50:
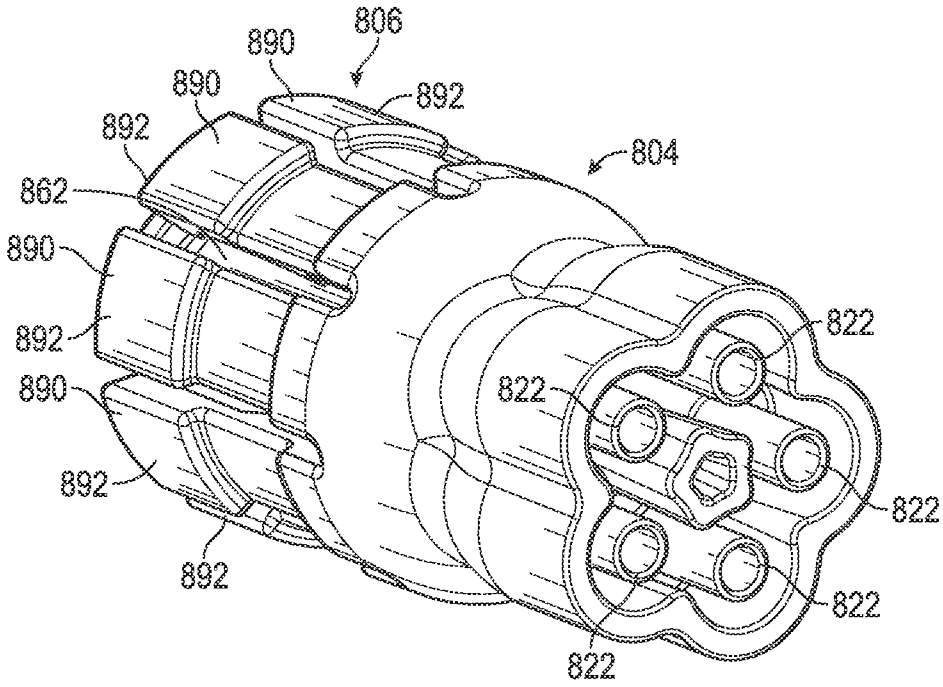
Figure 51:
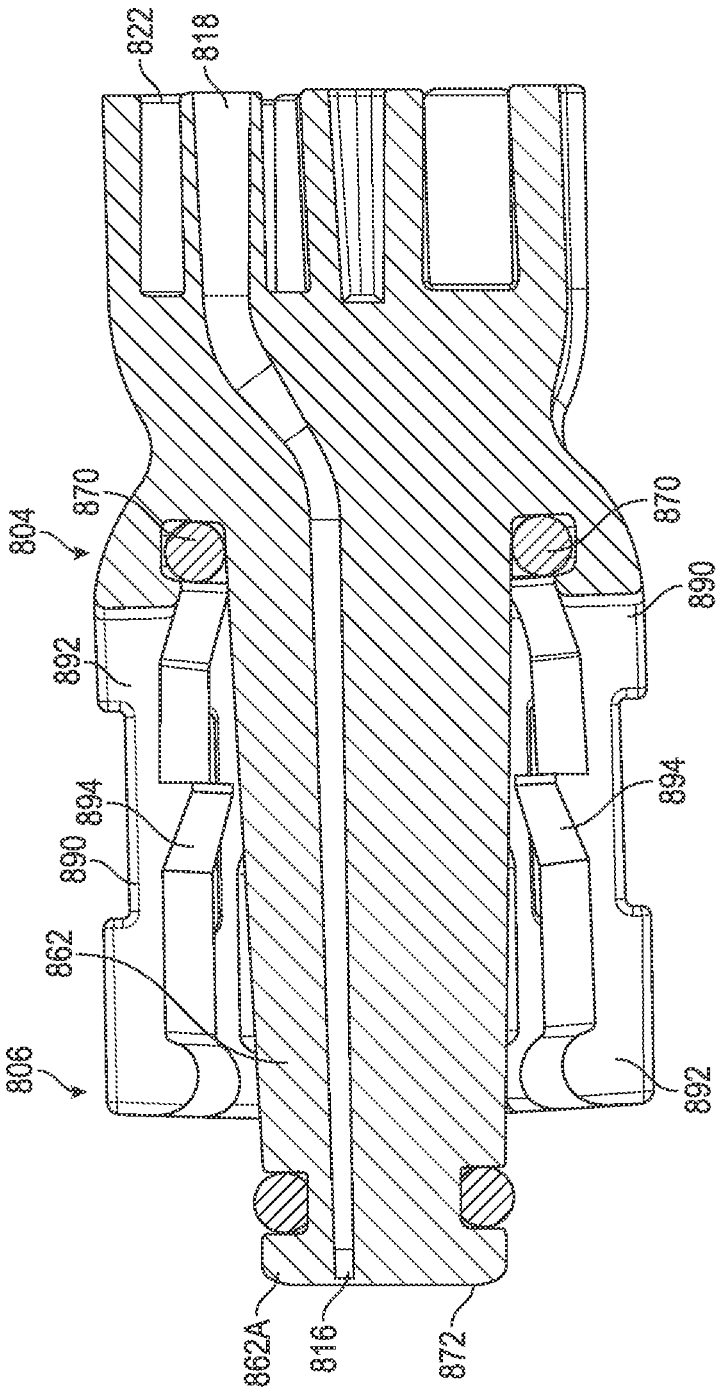
Figure 52:
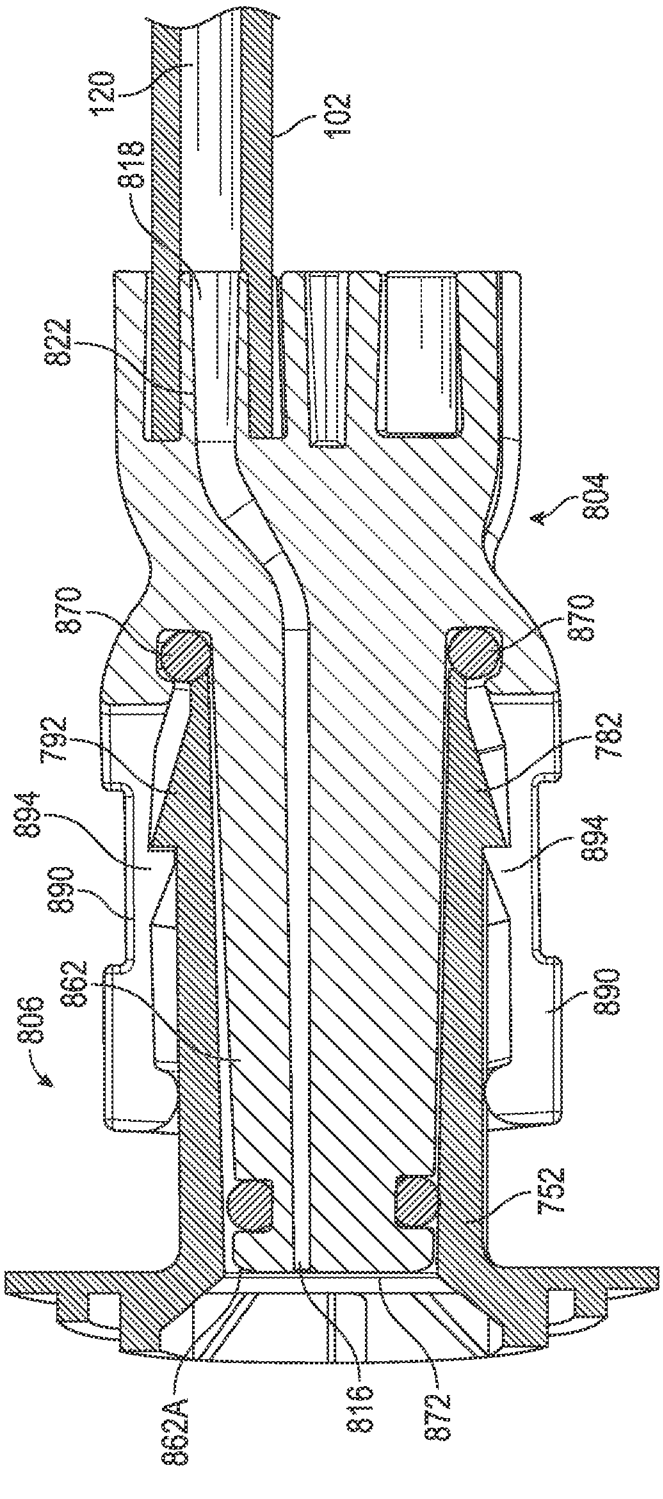

Additionally, as generally shown in FIGS. 44, 46, and 47, at least a portion of the flow pathways 710 are defined through the stem 762. The apertures 716 of the upstream portion 706 further are defined along an end portion 762A of the stem 762. In one embodiment, the end portion 762A of the stem 762 can have a generally domed, hemispherical, or arched structure, and the apertures 716 can be formed along a curved exterior surface or face 772 thereof. However, the end portion 762A of the stem 762 can have any suitable shape, structure, configuration, etc. (e.g., a substantially flat end 862A as shown in FIGS. 49, 51, and 52), without departing from the scope of the present disclosure.

Figure 48:
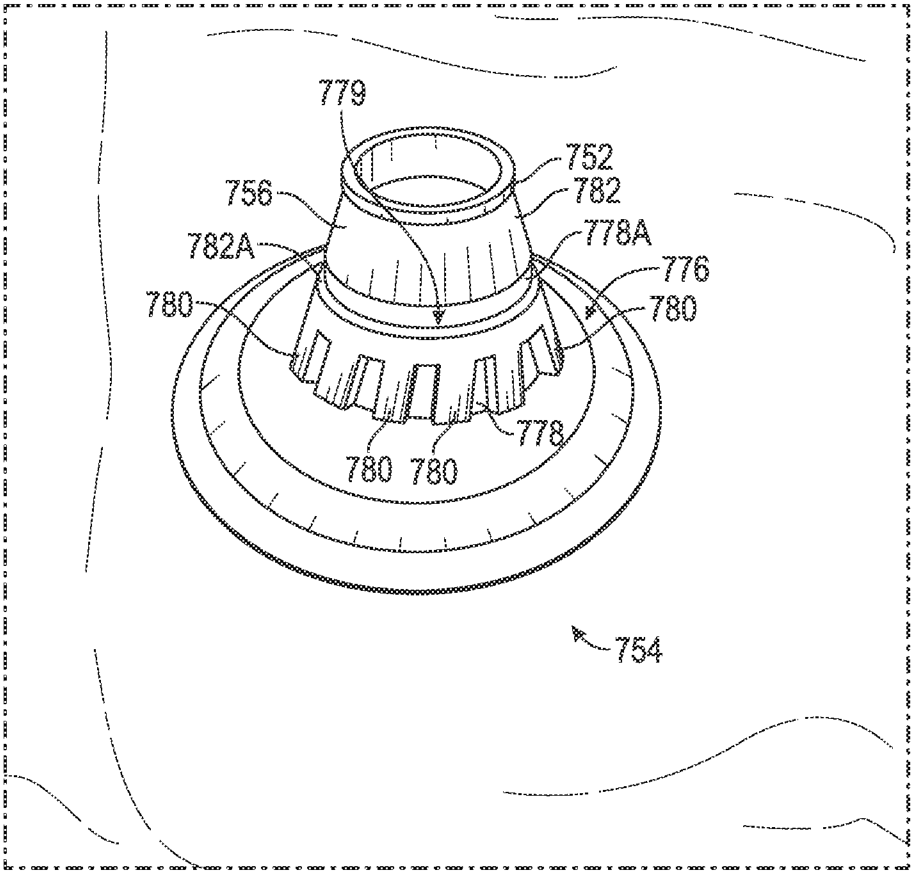
FIG. 48 shows an adapter or fitting for use with the junction shown in FIGS. 44 47.

The connection assembly 750 further includes a peripheral wall 774, which can also be referred to as a flange or skirt, that surrounds the stem 762 and is configured to facilitate connection between the junction 704 and the barbed connector 752. In one embodiment, as shown in FIGS. 47 and 48, the connection assembly 750 includes a fitting or adapter 776 that engages the peripheral wall 774 and the barbed connector body 756 to facilitate attachment/connection between the junction 704 and the barbed connector 752. The fitting 776 includes a body 778 (e.g., having a generally cylindrical structure) and a plurality of locking features 780 (e.g., projection portions or other suitable members/bodies having a generally cylindrical structure) extending from the fitting body 778. The fitting body 778 further has a passage 779 defined therethrough that is sized, shaped, configured, etc. to receive at least a portion of the barbed connector body 756. Accordingly, the fitting 776 can be received about the barbed connector body 756 such that an end portion 778A of the fitting body 778 engages a surface or face 782A defined by a barb 782 of the barbed connector 752. The peripheral wall 774 further can be received about the fitting 776 and the barbed connector 752 such that at least a portion of the locking features 780 (e.g., end portion 780A) engage a lip or shoulder 784 defined along the peripheral wall 774 to press the or engage the second O-ring 770 against the end portion 756A of the barbed connector body 756.

FIGS. 49-52 show perspective and cross-sectional views of a junction 804 according to an eighth embodiment. The junction 804 is substantially similar to the junction 704 shown in FIGS. 44-47, except that the end portion 862A of the stem 862 is generally flat (e.g., with the apertures 816 being arranged on a generally flat surface 872), and the peripheral wall 774 and the fitting 776 are omitted. As shown in FIGS. 49-52, the upstream portion 806 of the junction 804 instead includes a plurality of locking features 890 configured to facilitate attachment between the barbed connector 752 and the junction 804. The locking features 890 can include a plurality of spaced apart portions or bodies 892 that have a tab, protuberance, etc. 894 defined there along and configured to engage the barb 782 of the barbed connector 752. For example, the locking features 890 can be biased inwardly to engage the tab 894 against the barb 782 and/or to engage the tab 894 the barbed connector body 756. Accordingly, to attach/couple the junction 804 to the barbed connector 752, the locking features 890 can be received about the barbed connector body 756 until the tab 894 and the barb 782 lock into place pressing or engaging the O-ring 870 against the end portion 756A of the barbed connector body 756.

Figure 53:
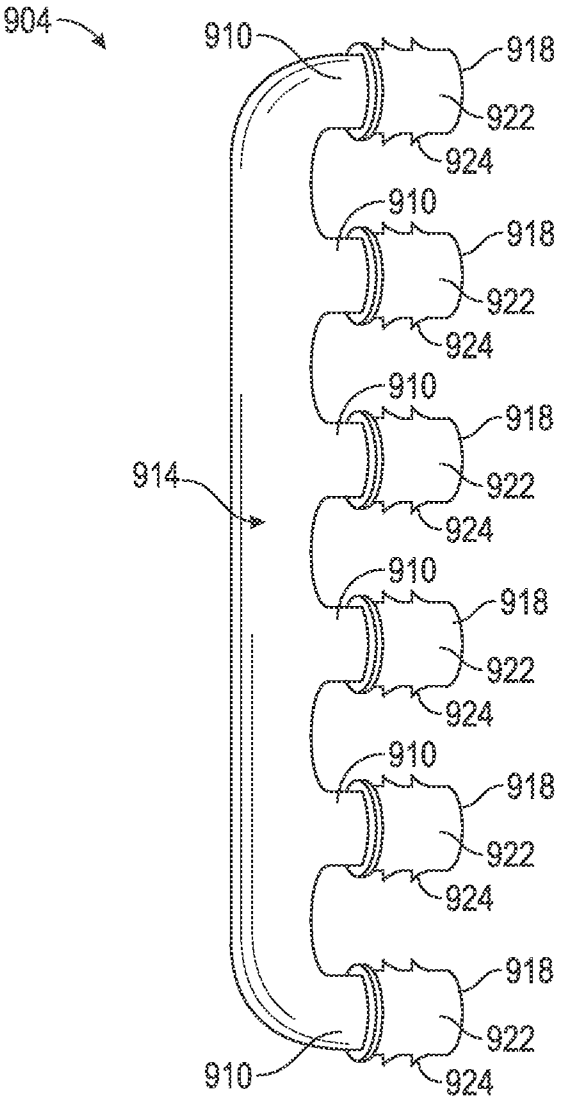
FIG. 53 illustrate a side view of a junction according to another embodiment of the present disclosure.

FIG. 53 illustrates a side view of a junction 904 according to a ninth embodiment of the present disclosure. As shown in FIG. 53, the junction 904 can include a plurality of fluid pathways 910 that are in communication with a common fluid pathway 914. In the illustrated embodiment, the junction 904 can include six fluid pathways 910 in communication with the common fluid pathway 914, though any suitable number of fluid pathways, such as two, three four, five, seven, eight, or more fluid pathways can be used without departing from the scope of the present disclosure. A set of the fluid pathways 910 can include a curved segment or portion 912. A curved segment is one that deviates from a straight line without sharp breaks or angularity. For example, the fluid pathways at the ends of the junction 904 can include a curved segment or portion 912. Another set of the fluid pathways 910 can be substantially straight (i.e., without curved segments or portions). For example, the fluid pathways 910 in between the fluid pathways 910 on the ends of the junction 904 can be substantially straight, e.g., without curved segments or portions, though fluid pathways between the ends of the fluid pathways on the ends of the junction 904 can include one or more curved segments.

FIG. 53 further shows that the junction 904 includes a plurality of male inserts 922 configured to be attached or coupled to a fluid conduit 102 to place one or more lumens 120 of the fluid conduit 102 in fluid communication with a respective fluid pathway 910. For example, the male inserts 922 each include at least a portion of the fluid pathway 910 and include an aperture 918 defined therein. The male inserts 922 are configured to be inserted into a respective lumen 120, and generally include cylindrical tubular structures. In the illustrated embodiment, the plurality of male inserts 922 are substantially parallel with one another. The male insert 922 further may be provided with one or more barbs or teeth 924 to facilitate connection/attachment to the fluid conduits 102. Though male inserts 922 are shown in the illustrated embodiment, other suitable attachment assemblies, such as female attachments or connectors (e.g., that at least partially surround and engage an exterior of the fluid conduits 102), for fluidly coupling the fluid conduits 102 to the fluid pathways 910 can be used without departing from the scope of the present disclosure.

Figure 54:
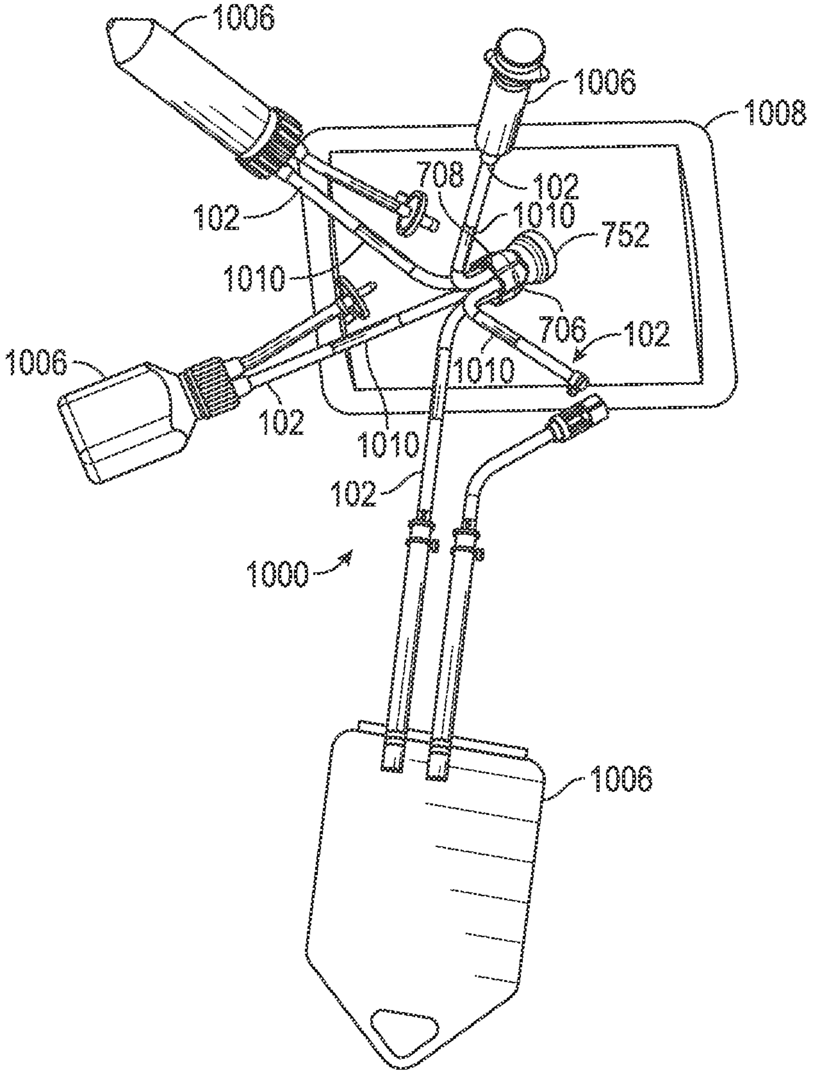
FIG. 54 illustrates a fluid transfer assembly according to one aspect of the present disclosure.

FIG. 54 shows an aseptic fluid transfer assembly 1000 according to one aspect of the present disclosure. The fluid transfer assembly 1000 includes a number of fluid conduits 102 attached to a junction (e.g., junction 704 as shown in FIGS. 44 47, though other suitable junctions as described herein, e.g., junction 804 as shown in FIGS. 49 52), may be used without departing from the scope of the present disclosure. The fluid conduits 102 are attached to the downstream portion 708 of the junction 704. The fluid conduits 102 may be attached to and lead from or to one or more vessels 1006 including but not limited to containers, beakers, bottles, canisters, flasks, bags, receptacles, tanks, vats, vials, tubes, syringes, carboys, tanks, pipes, etc. that are generally used to contain liquids, slurries, and other similar substances. Additionally, the upstream portion 706 of the junction 704 can be coupled to a barbed connector 752 of an additional vessel 1008. In one embodiment, the additional vessel 1008 can include a bag or other suitable, flexible container for containing liquids, slurries, and other similar substances, though the additional vessel 1008 can include rigid containers, such as bottles, flasks, beakers, or other rigid containers, without departing from the scope of the present disclosure. The barbed connector 752 can be fixed to the additional vessel 1008 by heat sealing or other suitable attachment method. The additional vessel 1008 generally has a volume that is substantially larger than the volume one or more of the vessels 1006, though the vessel 1008 can have a volume that is smaller than one or more of the vessels 1006, without departing from the scope of the present disclosure. The one or more vessels 1006 (or the vessel 1008) further can include one or more valves in communications therewith that can be activated, e.g., opened or closed, to initiate fluid transfer to and from the vessels 1006 (or the vessel 1008). For example, fluid flow may be initiated (e.g., upon opening a valve) due to pressure differentials between the vessels 1006 and the vessel 1008 (e.g., caused by a difference in volume between vessels (1006/1008)). The vessels 1006 further can include syringes or other mechanisms to draw fluid from vessel 1008.

Accordingly, with the aseptic fluid transfer assembly 1000 shown in FIG. 54, liquids, slurries, and other similar substances (e.g., provided to the vessel 1008 or the one or more vessels 1006) can be transferred between the one or more vessels 1006 and the vessel 1008 through the junction 704. In one embodiment, fluid from the vessel 1008 can flow into the apertures 716 of the upstream portion 706 of the junction 704, through the fluid pathways 710, and to the apertures 718 of the downstream portion 708 of the junction 704. Then, the fluid can flow out from the apertures 718 of the downstream portion 708 into the fluid conduits 102 and through the fluid conduits 102 into the one or more vessels 1006. For example, fluid samples can be transferred from the vessel 1008 to the one or more vessels 1006 for sterility testing, cell viability testing, or other suitable testing of biologic samples.

In addition, or in alternative embodiments, fluids can be transferred from the one or more vessels 1006 to the vessel 1008 (e.g., an acid or a base may be provided to the vessel 1008 from one or more of the vessels 1006, an antifoam agent can be provided from one or more of the vessels 1006 to the vessel 1008 to reduce foaming therein, small packages of cells can be provided from one or more of the vessels 1006 to the vessel 1008 to facilitate cell growth therein, or other suitable fluids can be provided or otherwise introduced from the one or more vessels 1006 to the vessel 1006, such as to inoculate the vessel 1008). For example, the fluid flows from the one or more vessels 1006 into the fluid conduits 102 and from the fluid conduits 102 into the apertures 718 of the downstream portion 708 of the junction 704. Thereafter, the fluid flows through the fluid pathway 710 in the junction 704 to the apertures 716 in the upstream portion 706 of the junction 704, and out from the apertures 716 and into the vessel 1008.

Turning again to the embodiment shown in FIGS. 44-47, the apertures 716 at the upstream portion 706 of the junction 704 can have a diameter that is substantially smaller than the diameter of the apertures 718 at the upstream portion 708 of the junction 704. For example, apertures 716 can have a diameter in the range of about 0.05 mm to about 5.0 mm, such as about 0.06 mm, about 0.07 mm, about 0.08 mm, about 0.1 mm, about 0.12 mm, about 0.13 mm, about 0.14 mm, about 0.15 mm, about 0.16 mm, about 0.17 mm, about 0.18 mm, about 0.19 mm, about 0.2 mm, about 0.3 mm, about 0.4 mm, about 0.5 mm, about 0.6 mm, about 0.7 mm, about 0.8 mm, about 0.9 mm, about 1.0 mm, about 2.0 mm, about 3.0 mm, about 4.0 mm, or other suitable numbers there between, though diameters less than 0.05 mm and greater than 5 mm can be used without departing from the scope of the present disclosure. On the other hand, the apertures 718 can have a diameter in the range of about 5 mm to about 20 mm, such as about 6 mm, about 7 mm, about 8 mm, about 9 mm, about 10 mm, about 11 mm, about 12 mm, about 13 mm, about 14 mm, about 15 mm, about 16 mm, about 17 mm, about 18 mm, about 19 mm, or other suitable numbers there between, though the diameters less than 5 mm and greater than 20 mm can be used without departing from the scope of the present disclosure. The apertures 716 are generally sized, dimensioned, configured, etc. such that liquids, slurries, and other similar substances of suitable viscosities can flow into and out from the apertures 716 through the junction 704, and further the apertures 716 can be generally sized, dimensioned, configured, etc. to help to substantially prevent, reduce, or inhibit back or return flow from the fluid pathways 710, e.g., back or return flow from the fluid pathway 710 when a sealable portion 1010 of the fluid conduits (FIG. 54) are clamped, crimped, or otherwise closed to seal off the conduits or other closing is applied to the conduits 102. The sealable portion can include QUICKSEAL® portions available from Sartorius Stedim North America, and example sealable portions are shown and described in co-owned U.S. Pat. No. 8,505,586, which is incorporated by reference herein as if set forth in its entirety. The apertures 816 and 818 of the junction 804 shown in FIGS. 49 to 52 further can have similar constructions (e.g., identical constructions) to the apertures 716 and 718 of the junction 704 shown in FIGS. 44-47.

A method of manufacturing/assembling a fluid transfer assembly can include fixing the barbed connector 752 to the vessel 1008 (e.g., if the vessel 1008 includes a bag, the barbed connector 752 can be fixed thereto by heat sealing the barbed connector 752 to the bag). The method additionally can include attaching a junction according to the embodiments described herein, such as junction 704, junction 804, or other suitable junction described herein to the barbed connector 752, e.g., the upstream portion 706/806 of the junction 704/806 can be attached to the barbed connector 752 as described above. Further, the conduits 102 can be attached to the downstream portion 708/808 of the junction 704/804 as described above. For example, the method may include inserting at least one of the plurality of male inserts 722/822 into a lumen 120 of a flexible fluid conduit 102 and securing the flexible fluid conduit to the junction. The conduits 102 further can be attached to the one or more vessels 1006. Upon assembly of fluid transfer assembly (e.g., upon connection of the vessel 1008, junction 704/804, conduits 105, and one or more vessels 1006), the fluid transfer assembly can be packaged in a single polyethylene bag, multiple polyethylene bags, or other suitable packaging, such as in thermoformed trays with removable lids or other suitable containers, e.g., to form a packaged assembly. After packaging the fluid transfer assembly, the packaged assembly can be rendered substantially aseptic, e.g., by applying gamma radiation, as described below. It will be understood, however, that above steps are not limited to any particular order or sequence and one or more of the above steps can be rearranged, omitted, or additional steps added, without departing from the scope of the present disclosure. For example, the assembly can be rendered substantially aseptic prior to packaging and/or one or more of the conduits and their corresponding vessels can be attached to the junction prior to attachment of the junction and the barbed connector.

To save space and minimize the use of separate components, the junctions 104, 204, 304, 404, 504, 604, 704, 804, and 904 of the present disclosure each have at least one fluid pathway through the junction that includes a non-linear, preferably curved segment. As mentioned above, implementing the preferred route of each fluid pathway can be difficult, or simply not feasible using traditional injection molding or boring techniques.

Therefore, in some embodiments, a method of manufacturing/assembling a fluid transfer assembly according to the present disclosure may include the step of depositing sequential layers of material using an additive manufacturing device (e.g., a 3D printer) to form a unitary junction having an upstream portion and a downstream portion, the unitary junction defining a plurality of curved fluid pathways between the upstream portion and the downstream portion. Alternatively, the junction can be formed using CLIP technology, e.g., as offered by Carbon, Inc., which, e.g., uses digital light synthesis to use patterns of light to partially cure a product layer by layer with the uncured material being cured to the bottom of the stack as a body of cured or semi-cured material is lifted from the reservoir of uncured material. In some embodiments, at least one of the upstream portion and the downstream portion comprises a plurality of male inserts respectively corresponding with the plurality of fluid paths.

During the step of depositing sequential layers of material, the act of deposition of material may create at least one hollow cavity within the junction that is sealed off from the plurality of fluid pathways. The method also includes inserting the plurality of male inserts into a lumen of a flexible fluid conduit and securing the flexible fluid conduit to the junction. In one embodiment, the step of securing the flexible fluid conduit to the junction comprises over-molding the conduit to the junction.

The method of manufacturing/assembling the fluid transfer assemblies further may comprise rendering the fluid transfer assembly substantially aseptic by, for example, gamma radiation. Alternatively, the entire fluid transfer assembly, or components, thereof may be rendered substantially aseptic by exposure to steam above 121° C. for a period of time long enough to eliminate microorganisms. The entire assemblies or components thereof may also be rendered aseptic by chemical treatment, such as with ethylene oxide (ETO) or by vaporized hydrogen peroxide (VHP). Electron-beam irradiation could also be used depending upon the configuration.

Figure 55:
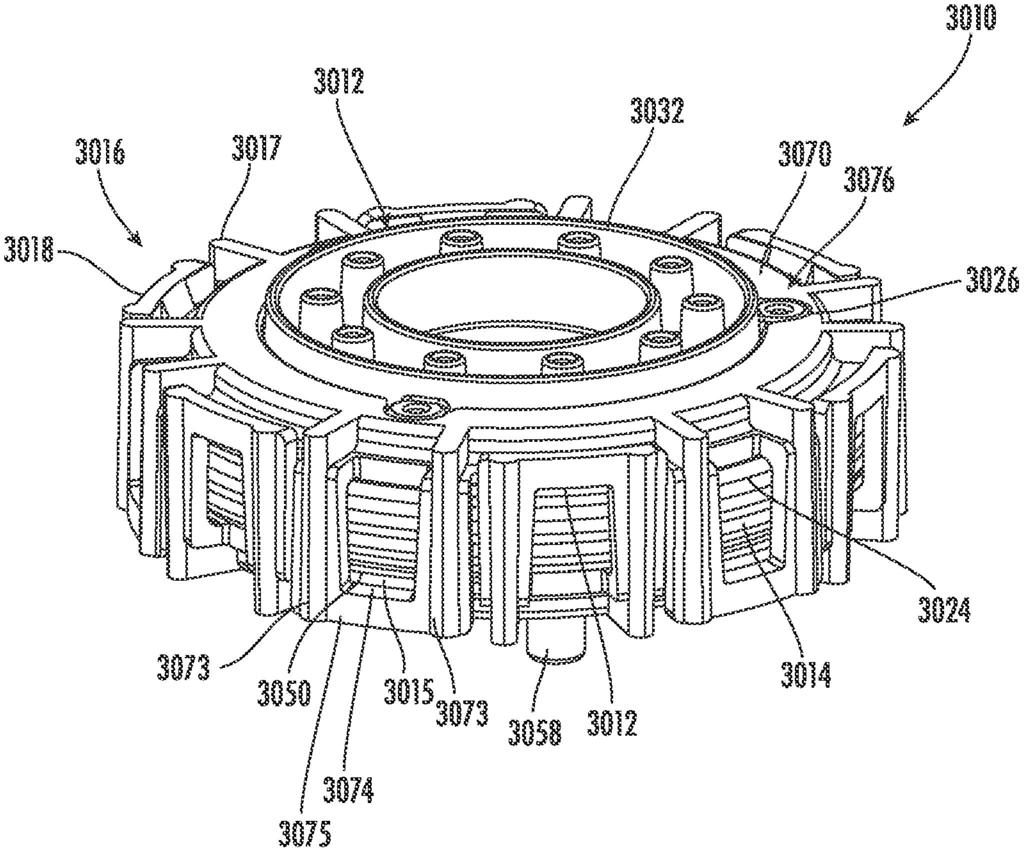
FIG. 55 is a perspective view of an exemplary hub assembly provided in accordance with the present disclosure.
Figure 56:
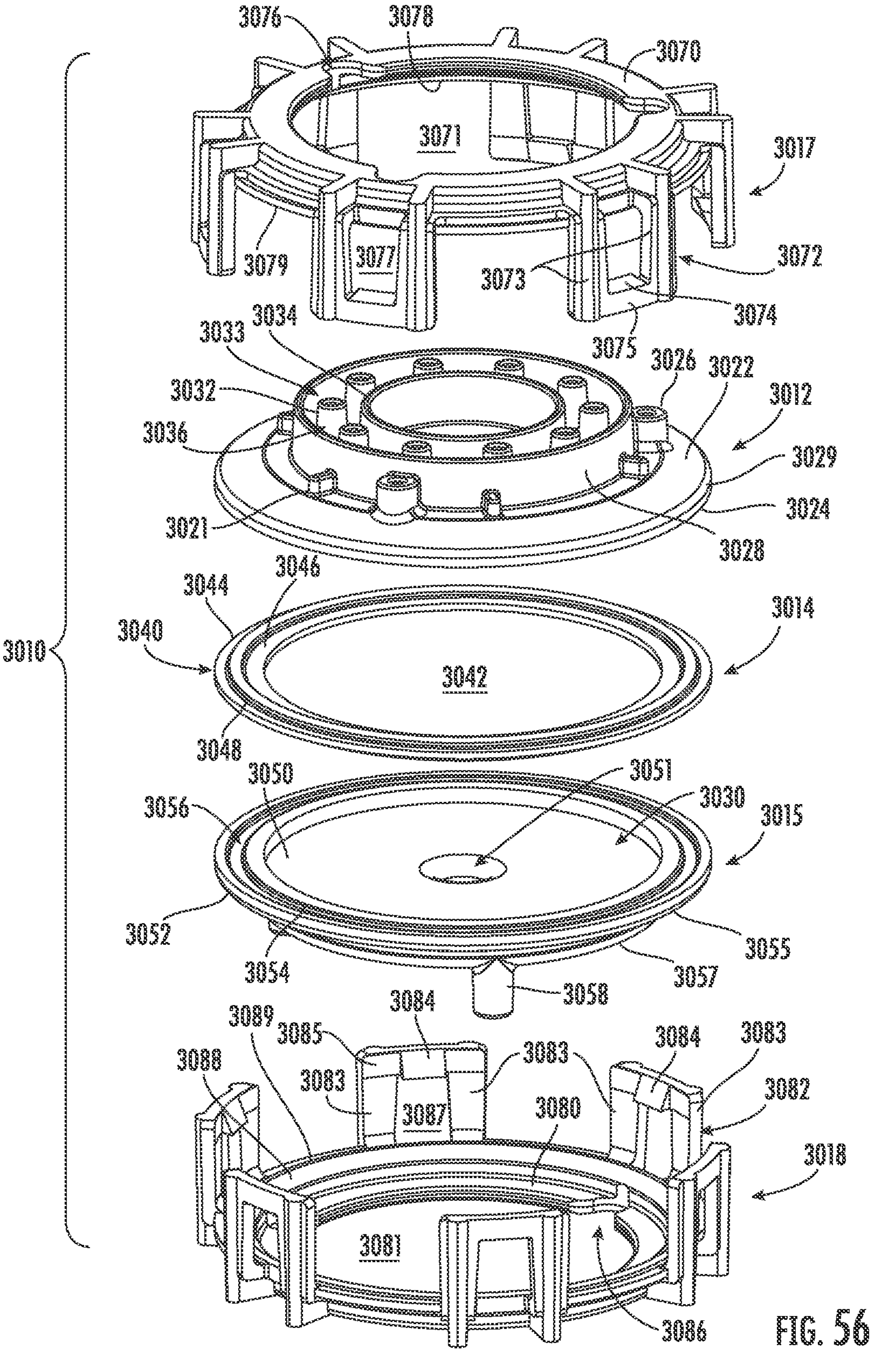
FIG. 56 is a perspective view, with parts separated, of the hub assembly of FIG. 55.

Referring to FIGS. 55 and 56, an exemplary hub assembly 3010 for distributing flow through an inlet 3051 to a plurality of outlets 3033 is provided in accordance with the present disclosure. The hub assembly 3010 includes an upper or distribution cap 3012, a lower or input cap 3015, a gasket 3014, and a hub clamp 3016 having an upper clamp 3017 and a lower clamp 3018. The hub assembly 3010 is releasably secured together by the hub clamp 3016. The upper clamp 3017 is clamped to the input cap 3015 and the lower clamp 3018 is clamped to the distribution cap 3012 such that the gasket 3015 is compressed between the caps 3012, 3015.

Figure 57:
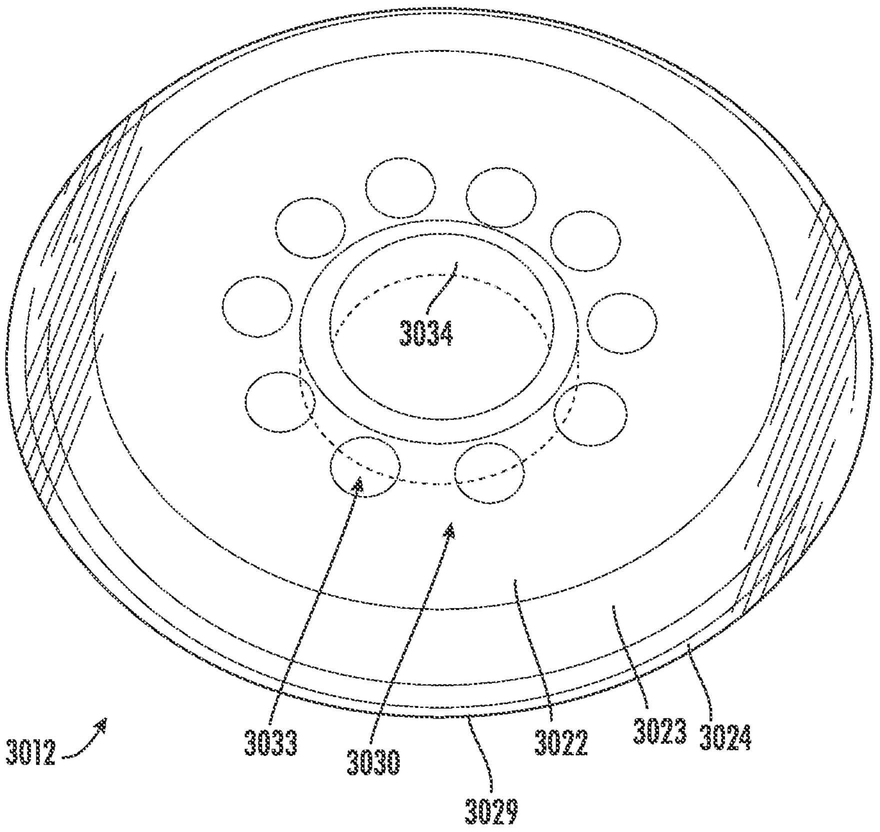
FIG. 57 is a bottom perspective view of a distribution cap of the hub assembly of FIG. 55.

With additional reference to FIG. 57, the distribution cap 3012 has an annular body 3022 in the form of a disc. The body 3022 includes an annular outer rim 3024 that extends downward from the body 3022 and an annular inner rim 3023 that extends downward from the body 3022 to define a groove 3025 between the inner and outer rims 3023, 3024. The upper surface of the groove 3025 may be defined by a lower surface of the body 3022. The outer rim 3024 may extend downward from the outer extremity of the body 3022 or may be spaced apart from the outer extremity of the body 3022 such that the body 3022 extends beyond the outer rim 3024. The inner rim 3023 defines an upper portion of a plenum 3030 with a diameter of the plenum 3030 determined by a diameter of the inner rim 3023 and a height of the upper portion of the plenum 3030 defined by the downward extension of the inner rim 3023 from the body 3022.

The distribution cap 3012 also includes a plurality of outlet conduit connectors 3032 that extend from an upper surface of the body 3022. Each of the outlet conduit connectors 3032 define an outlet 3033 that extends through the outlet conduit connector 3032 and into the plenum 3030. The outlet conduit connectors 3032 are spaced about a central axis of the body 3022 and define an outlet ring about the central axis of the body 3022. The outlet conduit connectors 3032 are radially spaced apart from one another and may be radially spaced apart from one another equal distances, e.g., $2\pi/n$ with n being the number of outlet conduit connectors 3032. Alternatively, the outlet conduit connectors 3032 may be radially spaced apart from one another unequal distances. As shown, a central axis of each of the outlets 3033 extends in a direction parallel to the central axis of the body 3022. In some embodiments, the central axis of each of outlets 3033 may extend at an angle to the central axis of the body 3022. For example, the central axis of each of the outlets 3033 may be angled towards or away from the central axis of the body 3022 by a predetermined angle with a radius of the outlet ring intersecting the central axis of the outlet 3033 and/or the central axis of each of the outlets 3033 may be angled relative to a tangent of the of the outlet ring intersecting the central axis of the outlet 3033. The outlet conduit connectors 3032 may be positioned in an annular recess 3036 that is defined between an annular outer wall 3028 and an annular inner wall 3034 that each extend from an upper surface of the body 3022.

The distribution cap 3012 may also include one or more alignment nubs 3026 that extend from the upper surface of the body 3022. The alignment nubs 3026 may be positioned between the outer wall 3028 and the outer extremity of the body 3022. The alignment nubs 3026 may be positioned about the body 3022 to form a ring about the central axis of the body 3022. The distribution cap 3012 may include three alignment nubs 3026 that are radially spaced about the body 3022 an equal distance from one another, e.g., 2π/3 apart, or may be unequally spaced apart from one another. The body 3022 may also define a ledge 3024 adjacent the outer extremity of the body 3022. The ledge 3024 may be positioned above the outer rim 3028 and have an upper surface below the upper surface of the remainder of the body 3022. The upper surface of the ledge 3024 may be positioned between the upper and lower surfaces of the body 3022 or may be positioned at the lower surface of the body 3022. The upper surface of the ledge 3024 may provide a clamping surface for the lower clamp 3018. In some embodiments, the distribution cap 3012 includes one or more risers 3021 that extend from the upper surface of the body 3022 and extend outward from the outer wall 3028. The risers 3021 extend from the upper surface of the body 3022 to a lesser extent than the alignment nubs 3026 extend from the upper surface of the body 3022. The risers 3021 may be positioned above or aligned with the inner rim 3023 such that downward pressure on the risers 3021, e.g., a clamping force, may be transferred to the inner rim 3023. The risers 3021 are radially spaced an equal distance from one another about the central axis of the body 3022.

Continuing to refer to FIGS. 55 and 56, the input cap 3015 includes an annular body 3050 in the form of a disc and defines the inlet 3051 that extends through the body 3050 about a central axis of the body 3050. The body 3050 includes an annular outer rim 3052 and an annular inner rim 3054 that extend from an upper surface of the body 3050 to define an annular groove 3056 there between. The outer rim 3052 may extend upward from the outer extremity of the body 3050 or may be spaced apart from the outer extremity of the body 3050 such that the body 3050 extends beyond the outer rim 3052. The inner rim 3054 defines a lower portion of the plenum 3030 with a diameter of the plenum 3030 determined by a diameter of the inner rim 3054 and a height of the lower portion of the plenum 3030 is defined by the upward extension of the inner rim 3054 from the body 3050. The outer rim 3052 may have a diameter similar to the outer rim 3024 of the distribution cap 3012 and the inner rim 3054 may have a diameter similar to the inner rim 3023 of the distribution cap 3012 such that the grooves 3025, 3056 may have similar dimensions.

The body 3050 of the input cap 3015 may include an outer wall 3057 and/or one or more alignment nubs 3058 that extend from a lower surface of the input cap 3015 opposite the upper surface of the input cap 3015. The outer wall 3057 is similar to the outer wall 3028 of the distribution cap 3012 and may have a diameter similar to the outer wall 3028. The alignment nubs 3058 may be similar to the alignment nubs 3026 of the distribution cap 3012 and may be positioned at a similar radius to the alignment nubs 3026. In addition, the input cap 3015 may include three alignment nubs 3058 that are radially spaced about the body 3050 an equal distance from one another, e.g., 2π/3 apart, or may be unequally spaced apart from one another. The body 3050 may also define a ledge 3055 adjacent the outer extremity of the body 3050. The ledge 3055 may be positioned below the outer rim 3052 and have a lower surface above the lower surface of the remainder of the body 3050. The lower surface of the ledge 3055 may be positioned between the upper and lower surfaces of the body 3050 or may be positioned at the upper surface of the body 3050. The lower surface of the ledge 3055 may provide a clamping surface for the upper clamp 3017. The input cap 3015 may also include risers (not shown) similar to risers 3021 detailed above with respect to the distribution cap 3012.

The distribution cap 3012 and the input cap 3015 may be molded, formed from an additive manufacturing process, thermoforming process, casting process, or injection molding process. For example, each of the caps 3012, 3015 may be three-dimensionally printed. Each of the caps 3012, 3015 may be monolithically formed. In some embodiments, the caps 3012, 3015 may be sterilized after being packaged for shipping. For example, gamma irradiation can be used to terminally sterilize the entire product assembly and packaging material.

With particular reference to FIG. 56, the gasket 3014 is configured to provide a seal between the distribution cap 3012 and the input cap 3015 such that the plenum 3030 is defined there between. The gasket 3014 includes an annular body 3040 that defines a central opening 42 passing therethrough about a central axis of the body 3040. The body 3040 includes an outer flange 3044, an inner flange 3046, and an annular rib 3048 positioned between the outer and inner flanges 3044, 3046. The rib 3048 is configured to be received and/or compressed within the grooves 3025, 3056 of the distribution cap 3012 and the input cap 3015. Specifically, the rib 3048 extends above and below the outer and inner flanges 3044, 3046. The rib 3048 may extend above and below the outer and inner flanges 3044, 3046 a height substantially equal to or greater than a depth of the grooves 3025, 3056 of the distribution cap 3012 and the input cap 3015, respectively. The thickness of the rib 3048 when measured along a radius of the gasket 3014 is substantially equal to a width of the grooves 3025, 3056 of the distribution cap 3012 and the input cap 3015 when measured along a radius of the respective cap 3012, 3015. Dimensions of the grooves 3025, 3056 and the rib 3048 may comply with ASME BPE 2009 standards for hygienic unions.

The outer flange 3044 extends outward from the rib 3048 and is configured to be compressed between the outer rim 3024 of the distribution cap 3012 and the outer rim 3052 of the input cap 3015. The outer flange 3044 may extend from the rib 3048 a distance equal to a thickness of the outer rims 3024, 3052 when measured along a radius of the respective cap 3012, 3015. The inner flange 3046 extends inward from the rib 3048 and is configured to be compressed between the inner rim 3023 of the distribution cap 3012 and the inner rim 3054 of the input cap 3015. The inner flange 3046 may extend from the rib 3048 a distance equal to a thickness of the inner rims 3023, 3054 when measured along a radius of the respective cap 3012, 3015. The central opening 3042 may define a central portion of the plenum 3030 between the upper and lower portions of the plenum 3030. The gasket 3014 is formed of an aseptic compressible material that is capable of forming a seal between the distribution cap 3012 and the input cap 3015. The gasket 3014 may be formed of a variety of materials including, but not limited to, copolymers of acrylonitrile and butadiene (BUNA-N), VITON™, fluoroelastomers as defined by ASTM D1418 (FKM), ethylene propylene diene monomer (EPDM), polytetrafluoroethylene (PTFE), silicone (VMQ), phenyl silicone (PMVQ), and others. In some embodiments, the gasket may be over-molded onto the distribution cap 3012 or the input cap 3015. The gasket 3014 is illustrated as an open gasket, but other types of gaskets are available that may be used within the hub assembly 3010. For example, the gasket 3014 may be an orifice gasket, a screen gasket, and a perforated plate gasket that may control flow of a fluid through the hub assembly 3010, or provide a filtering function. Each of these alternative gaskets are available in several sizes, or can be customized, based upon the dimensions of the fittings, the orifice diameter through the gasket, or the pore size of the perforated plate or screen gaskets. Suitable gaskets are available from Newman Sanitary Gasket Company, Flow Smart Inc., and others.

For additional details of similar distribution caps, input caps, and gaskets, reference may be made to U.S. Patent Publication Serial No. 2018/0297753, the entire contents of which are hereby incorporated by reference.

With continued reference to FIGS. 55 and 56, the upper and lower clamps 3017, 3018 of the hub clamp 3016 are substantially similar to one another with like elements labeled with similar labels, e.g., elements of the upper clamp 3017 are labeled with a preceding "307" and elements of the lower clamp are labeled with a preceding "308", such that the structure of each of the upper and lower clamps 3017, 3018 will be described with respect to the lower clamp 3018. The description of the lower clamp 3018 below includes references to elements of the distribution cap 3012 and the input cap 3015, these references are reversed with respect to the upper clamp 3017 as will be appreciated below when the assembly of the hub assembly is described in detail. In addition, the orientation of the upper clamp 3017 is flipped and rotated about the central axis thereof relative to the orientation of the lower clamp 3018.

The lower clamp 3018 includes an annular plate 3080 and a clamp ring 3088. The plate 3080 includes a clamping surface that is configured to oppose the plate 3070 of the upper clamp 3017. The clamping surface of the plate 3080 is within and offset from the clamp ring 3088 such that a clamping surface of the clamp ring 3088 is above clamping surface of the plate 3080. The offset of the clamping surface of the plate 3080 and the clamping surface of the clamp ring 3088 may be substantially equal to the height of risers of distribution or input caps 3012, 3015, e.g., risers 3021. The plate 3080 may engage risers (not shown) of the input cap 3012 to urge inner rim 3054 of input cap 3012 towards the distribution cap 3015. In embodiments where the input cap 3012 does not include risers, the plate 3080 may be positioned above a lower surface of the body 3050. The clamping surface of the clamp ring 3088 may have a width along a radius of the lower clamp 3018 equal to a lower surface of the body 3050 of the input cap 3015 that extends outward from the alignment nubs 3058. The clamp ring 3088 is configured to engage the body 3050 of the input cap 3015 to urge the input cap 3015 towards the distribution cap 3012. The lower clamp 3018 may include an alignment ring 3089 that extends upward from the clamp ring 3088 at an outer circumference thereof and is configured to be received within the ledge 3055 of the input cap 3015 to coaxially align the lower clamp 3018 with the input cap 3015.

The plate 3080 defines a central opening 3081 that is dimensioned to receive the outer wall 3057 of input cap 3015 to coaxially align the lower clamp 3018 with the input cap 3015. The plate 3080 also defines one or more detents 3086 adjacent the central opening 3081. The detents 3086 may extend through the plate 3080 and/or may be in communication with the central opening 3081. Each of the detents 3086 is configured to receive one of the alignment nubs 3058 of the input cap 3015 to radially align the lower clamp 3018 with the input cap 3015. In some embodiments, the plate 3080 includes an equal number of detents 3086 to the number of alignment nubs 3058 of the input cap 3015. In other embodiments, the plate 3080 includes greater number of detents 3086 to the number of alignment nubs 3058 of the input cap 3015.

The lower clamp 3018 includes a number of fingers 3082 configured to extend towards the upper clamp 3017 and engage the distribution cap 3012. Each of the fingers 3082 extend from an outer circumference of the clamp ring 3088 in a direction away from the plate 3080. The fingers 3082 are radially spaced about the outer circumference of the clamp ring 3088 and configured to engage the distribution cap 3012 to maintain a plane of the body 3022 of the distribution cap 3012 parallel to a plane of the plate 3080 and/or to apply equal pressure about the plane of the body 3022. Each finger 3082 defines a space between adjacent fingers 3082 which is sized to allow an opposing finger 3072 of the upper clamp ring 3017 to be received therein. Each finger 3082 includes a pair of legs 3083 that extend from the outer circumference of the clamp ring 3088 to an end spaced apart from the clamp ring 3088. The pair of legs 3083 support a bridge 3085 that connects ends of the legs 3083 spaced apart from the clamp ring 3088. The bridge 3085 supports a protuberance or lip 3084 that extends from the bridge 3085 towards the central axis of the lower clamp 3018. The fingers 3082 are biased inward such that the bridges 3085 are biased towards the central axis of the lower clamp 3018.

Each lip 3084 is configured to engage a surface of the distribution cap 3012 and prevent the distribution cap 3012 from moving away from the lower clamp 3018. In some embodiments, the lip 3084 engages an upper surface of the ledge 3029 of the distribution cap 3012. The lip 3084 may be wedge shaped such that as the lip 3084 engages the distribution cap 3012, the fingers 3082 are urged outward and away from the distribution cap 3012 until a clamping surface of the lips 3084 are positioned above the surface of the distribution cap 3012, e.g., the upper surface of the ledge 3029. When the clamping surface of a respective lip 3084 is positioned above the surface of the distribution cap 3012, the finger 3082 may bias the lip 3084 towards the central axis of the lower clamp 3018 such that the clamping surface of the lip 3084 is positioned above and/or engaged with the upper surface of the distribution cap 3012 to retain the distribution cap 3012 relative to the lower clamp 3080.

Continuing to refer to FIGS. 55 and 56, the assembly of the hub assembly 3010 is described in accordance with the present disclosure. Initially, the gasket 3014 is positioned relative to one of the caps 3012, 3015 such that the rib 3048 is received within a respective one of the grooves 3025, 3056. With the rib 3048 received within a respective one of the grooves 3025, 3056, the other one of the caps 3012, 3015 is positioned over the gasket 3014 such that the rib 3048 is received in the other one of the grooves 3025, 3056. With the rib 3048 received in each of the grooves 3025, 3056, the inner flange 3046 of the gasket 3030 is positioned between the inner rims 3023, 3054 of the caps 3012, 3015 and the outer flange 3044 of the gasket 3030 is positioned between the outer rims 3024, 3052 of the caps 3012, 3015 such that the gasket 3030 forms a seal between the caps 3012, 3015. With the gasket 3030 forming a seal between the caps 3012, 3015, the caps 3012, 3015 define the plenum 3030 there within between the inner rims 3023, 3054 and the bodies 3022, 3050.

With the gasket 3014 positioned between the caps 3012, 3015, the hub clamp 3016 is assembled over the caps 3012,

3015. As detailed below, the lower clamp 3018 is secured to the caps 3012, 3015 before the upper clamp 3017; however, this may be reversed with the upper clamp 3017 being secured to the caps 3012, 3015 before the lower clamp 3018. In some embodiments, the upper and lower clamps 3017, 3018 may be secured to the caps 3012, 3015 simultaneously.

To secure the lower clamp 3018 to the caps 3012, 3015, the lower clamp 3018 is positioned with the plate 3080 positioned about the outer wall 3057 of the input cap 3015 and the fingers 3082 extending towards the distribution cap 3012. As the plate 3080 approaches the outer wall 3057, the fingers 3082, and in particular the lips 3084, may engage the outer circumference of the input cap 3015, the gasket 3014, and/or the distribution cap 3012 which may urge the fingers 3082 outward, e.g., away from the central axis of the lower clamp 3018. Interaction of the outer wall 3057 of the input cap 3015 and the plate 3080 of the lower clamp 3018 and/or interaction of the ledge 3055 of the input cap 3015 and the alignment ring 3089 of the lower clamp 3018 axially aligns the lower clamp 3018 with the input cap 3015 such that the lower clamp 3018 and the input cap 3015 are coaxially aligned with one another. In addition, engagement of the fingers 3082 with the outer circumference of the input cap 3015, the gasket 3014, and/or the distribution cap 3012 may axially align the lower clamp 3018 with the input cap 3015. With the lower clamp 3018 coaxially aligned with the input cap 3015, the lower clamp 3018, or the input cap 3015, is rotated until the alignment nubs 3058 of the input cap 3015 are aligned with the detents 3086 of the lower clamp 3018 such that the lower clamp 3018 is rotationally or radially aligned with the input cap 3015. With the input cap 3015 radially aligned with the lower clamp 3018, the distribution cap 3012 is pressed into the lower clamp 3018 until the lips 3084 engage the ledge 3029 of the outer rim 3024 of the distribution cap 3012 to secure the distribution cap 3012 to the lower clamp 3018. When the lips 3084 engage the ledge 3029, the lower clamp 3018 is secured to the input cap 3015 with the gasket 3040 compressed between the caps 3012, 3015 to form a seal there between. The engagement of the lips 3084 and the ledge 3029 also secures the input cap 3015 to the lower clamp 3018 with the body 3050 of the input cap 3015 engaging the plate 3080 of the lower clamp 3018. In addition, when the lips 3084 engage the ledge 3029, portions of the body 3050 of the input cap 3015 may extend through the central opening 3081 of the lower clamp 3018, e.g., the alignment ring 3057 or the alignment nubs 3058.

With the lower clamp 3018 secured to the caps 3012, 3015, the upper clamp 3017 is secured to the caps 3012, 3015. To secure the upper clamp 3017 to the caps 3012, 3015, the upper clamp 3017 is positioned with the plate 3070 positioned about the outer wall 3028 of the distribution cap 3012 and the fingers 3072 extending towards the input cap 3015. As the plate 3070 approaches the outer wall 3028, the fingers 3072, and in particular the lips 3074, may engage the outer circumference of the distribution cap 3012, the gasket 3014, and/or the input cap 3015 which may urge the fingers 3072 outward, e.g., away from the central axis of the upper clamp 3017. Interaction of the outer wall 3028 of the distribution cap 3012 and the plate 3070 of the upper clamp 3017 and/or interaction of the ledge 3029 of the distribution cap 3012 and the alignment ring 3079 of the upper clamp 3017 axially aligns the upper clamp 3017 with the distribution cap 3012 such that the upper clamp 3017 and the distribution cap 3012 are coaxially aligned with one another. In addition, engagement of the fingers 3072 with the outer circumference of the distribution cap 3012, the gasket 3014, and/or the input cap 3015 may axially align the upper clamp 3017 with the distribution cap 3012. With the upper clamp 3017 coaxially aligned with the distribution cap 3012, the distribution cap 3012 is rotated until the alignment nubs 3026 of the distribution cap 3012 are aligned with the detents 3076 of upper clamp 3017 such that the upper clamp 3017 is rotationally or radially aligned with the distribution cap 3012. The engagement of the lower clamp 3018 with the distribution cap 3012 may make it difficult to rotate the distribution cap 3012 when the lower clamp 3018 is engaged therewith. In some embodiments, the upper clamp 3017 may be disposed over the distribution cap 3012 before the lower clamp 3018 is engaged with the distribution cap 3012 to radially align the upper clamp 3017 with the distribution cap 3012 during radial alignment of the lower clamp 3018 with the input cap 3015. With the distribution cap 3012 radially aligned with the upper clamp 3017, each finger 3072 of the upper clamp 3017 is positioned between adjacent fingers 3082 of the lower clamp 3018 and each finger 3082 of the lower clamp 3018 is positioned between adjacent fingers 3072 of the upper cap 3017. When the distribution cap 3012 is radially aligned with the distribution cap 3012, the input cap 3015 is pressed into the upper clamp 3017 until the lips 3074 engage the ledge 3055 of the outer rim 3052 of the input cap 3015 to secure the input cap 3015 to the upper clamp 3017. When the lips 3074 engage the ledge 3055, the upper clamp 3017 is secured to the input cap 3015 with the gasket 3040 compressed between the caps 3012, 3015 to form a seal there between. The engagement of the lips 3074 and the ledge 3055 also secures the distribution cap 3012 to the upper clamp 3017 with the body 3022 of the distribution cap 3012 engaging the plate 3070 of the upper clamp 3017. In addition, when the lips 3074 engage the ledge 3055, portions of the body 3022 of the distribution cap 3012 may extend through the central opening 3071 of the upper clamp 3017, e.g., the inner wall 3034, the outer wall 3058, or the conduit connectors 3032. With each clamp 3017, 3018 secured to the respective cap 3012, 3015, the hub assembly 3010 is formed with the hub clamp 3016 securing the caps 3012, 3015 together such that the gasket 3040 forms a seal between the caps 3012, 3015.

When the hub clamp 3016 is secured to the caps 3012, 3015, the plates 3070, 3080 of the clamps 3017, 3018 may engage risers, e.g., risers 3021, of the caps 3012, 3015 to apply pressure to the inner flange 3046 of the gasket 3040 and the clamp rings 3078, 3088 of the clamps 3017, 3018 may engage the caps 3012, 3015 outside of the alignment nubs 3026, 3058 to apply pressure to the outer flange 3048 of the gasket 3040. The pressure on the inner and outer flanges 3046, 3048 improve the seal formed by the flange 3040 between the caps 3012, 3015. For example, a desired pressure profile may be established across the seal from an inner edge of the inner flange 3044 to an outer edge of the outer flange 3046. In addition, when the hub clamp 3016 is secured to the caps 3012, 3015, each of the clamps 3017, 3018 independently secures the caps 3012, 3015 to one another and maintains the seal between the caps 3012, 3015. Further, when the hub clamp 3016 is secured to the caps 3012, 3015, the fingers 3072 of the upper clamp 3017 engage the input cap 3015 to urge the input cap 3015 upward in between the fingers 3082 of the lower clamp 3018 that engage the distribution cap 3012 to urge the distribution cap 3012 downward which alternates the pressure on the gasket 3040 to improve the seal formed between the caps 3012, 3015.

In some embodiments, the hub assembly 3010 is assembled by positioning one of the caps 3012, 3015 within a central opening 3071, 3081 of the one of the clamps 3017, 3018; positioning the rib 3048 of the gasket 3040 within the groove 3025, 3056 of the one of the caps 3012, 3015; positioning the other cap 3012, 3015 over the gasket 3040 with the rib 3048 received within the respective groove 3025, 3056; and positioning the other clamp 3017, 3018 over the other cap 3012, 3015 to form the hub assembly 3010. The clamps 3017, 3018 may be pressed together over the caps 3012, 3015 or may be sequentially secured to the respective cap 3012, 3015 as detailed above.

In certain embodiments, the hub assembly 3010 is assembled without the clamp assembly 3016 including the clamps 3017, 3018. For example, the hub assembly 3010 may be assembled with a single clamp, e.g., a single pin hygienic clamp. Alternatively, the caps 3012, 3015 may be secured together with an adhesive bond, overmolding, or by welding, e.g., ultrasonic welding, the caps 3012, 3015 to one another. In some embodiments, the gasket 3040 may adhesively secure the caps 3012, 3015 to one another. In particular embodiments, the gasket 3040 may be adhered or attached to one or both of the caps 3012, 3015.

Figure 58:
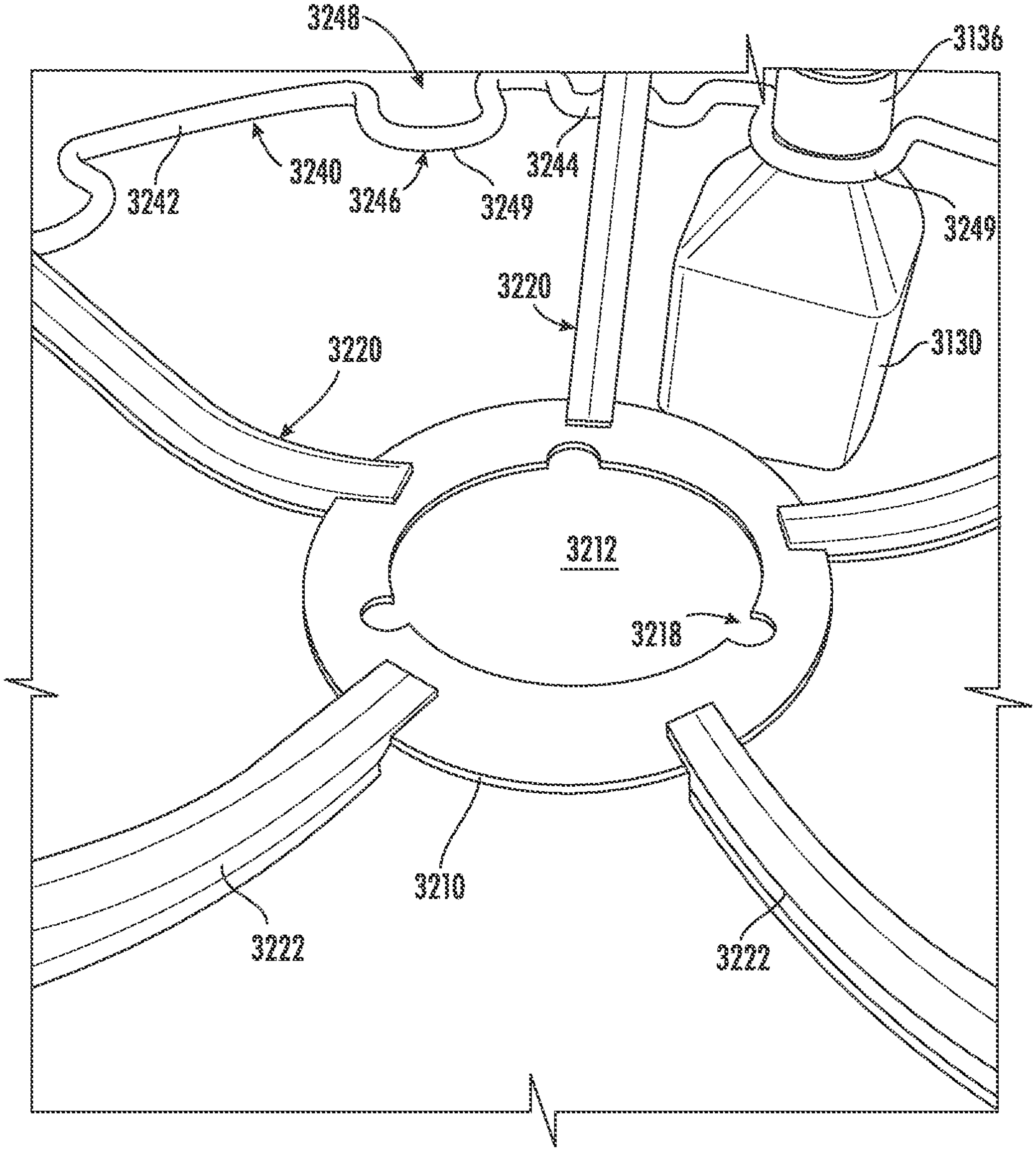
FIG. 58 is a perspective view of an exemplary frame assembly provided in accordance with the present disclosure including the hub assembly of FIG. 55.
Figure 59:
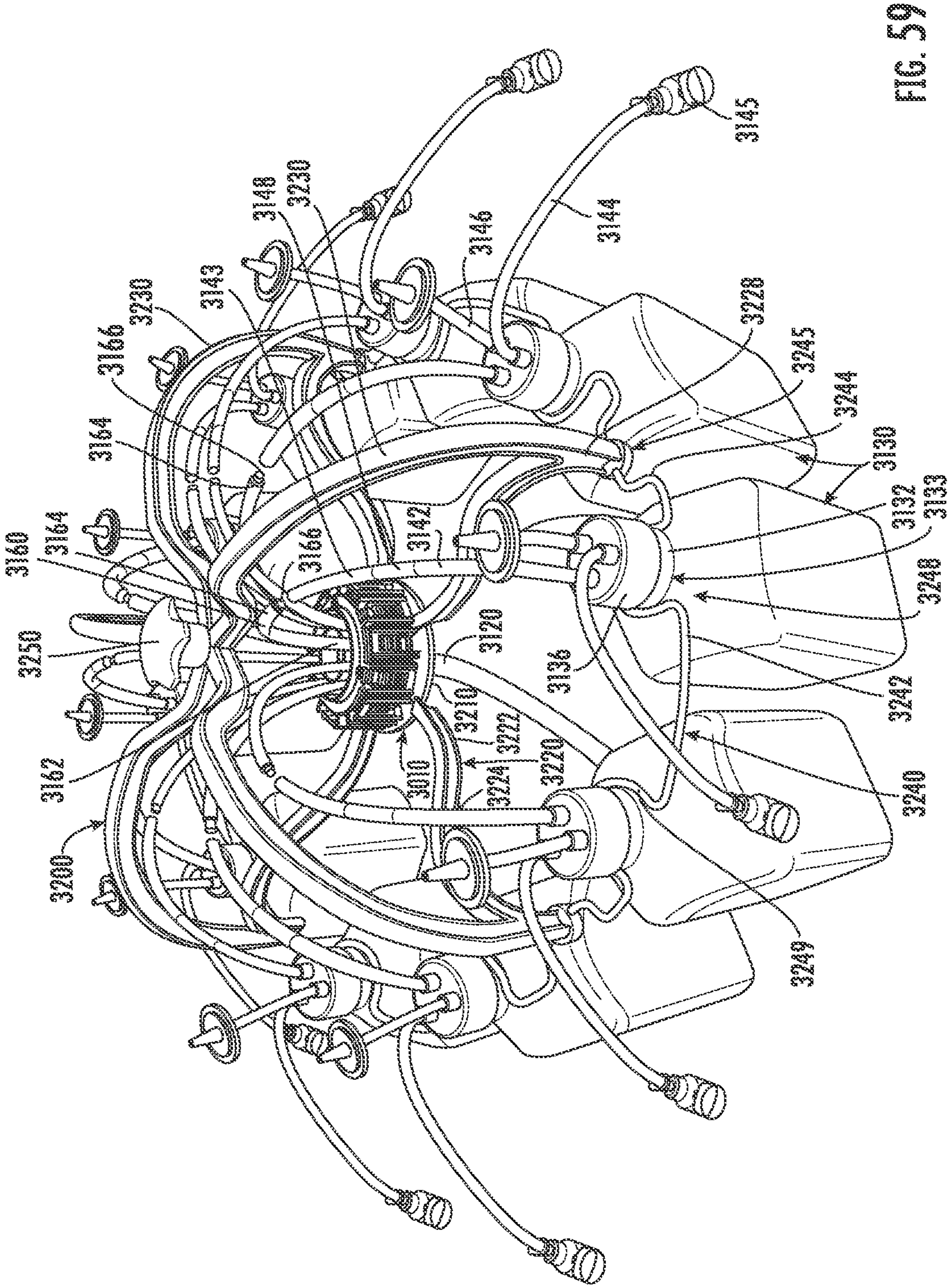
FIG. 59 is a perspective view of an exemplary fluid distribution system provided in accordance with the present disclosure including the frame assembly of FIG. 58 and the hub assembly of FIG. 55.
Figure 60:
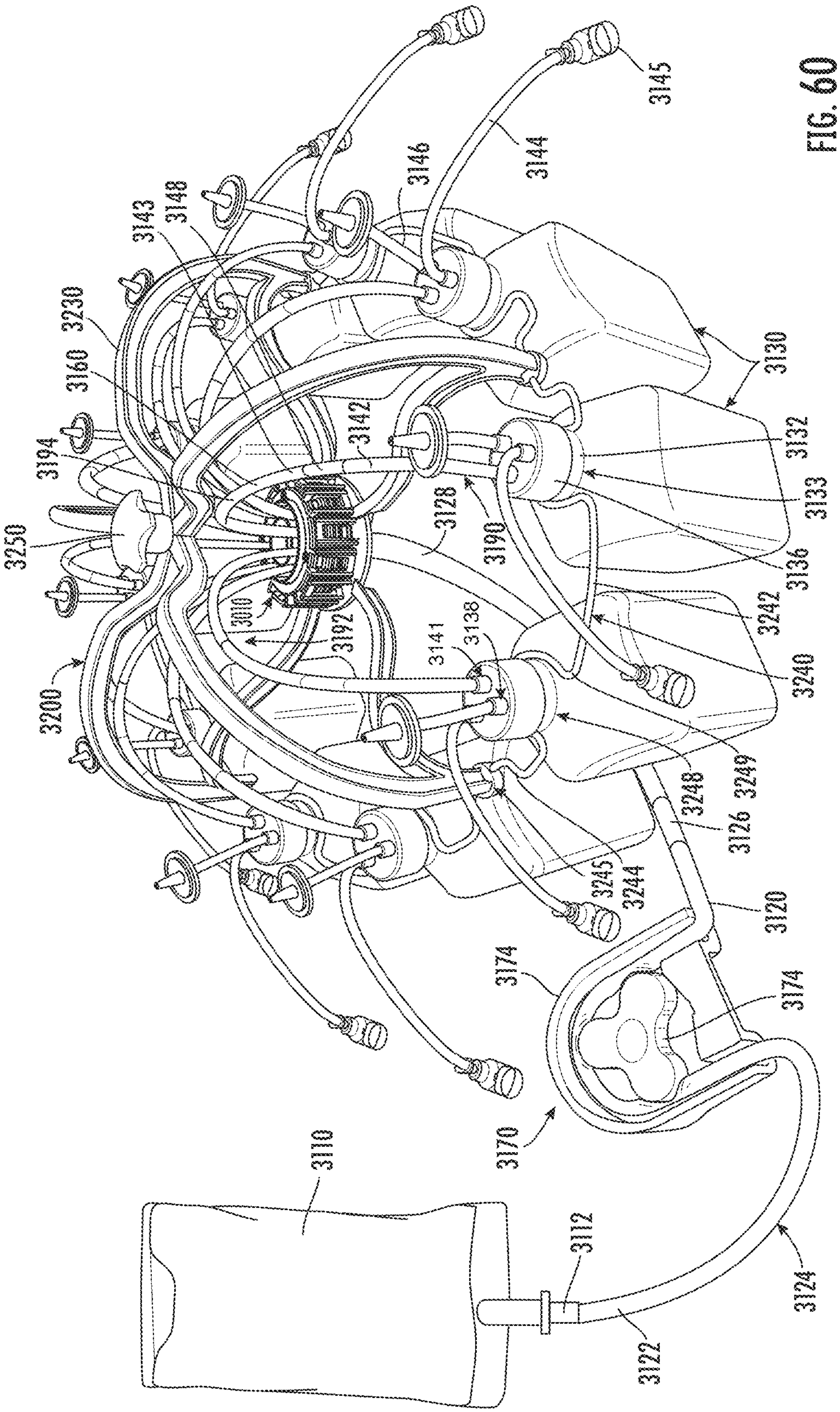
FIG. 60 is a perspective view of the fluid distribution system according to FIG. 59 with a first vessel and a pump.

With reference to FIGS. 58-60, a fluid distribution system 3001 for distributing a fluid from a primary vessel 3110 to plurality of secondary vessels 3130 is provided in accordance with the present disclosure. The fluid distribution system 3001 includes the hub assembly 3010, an input tube 3120, distribution conduits 3160, and a frame assembly 3200.

Figure 78:
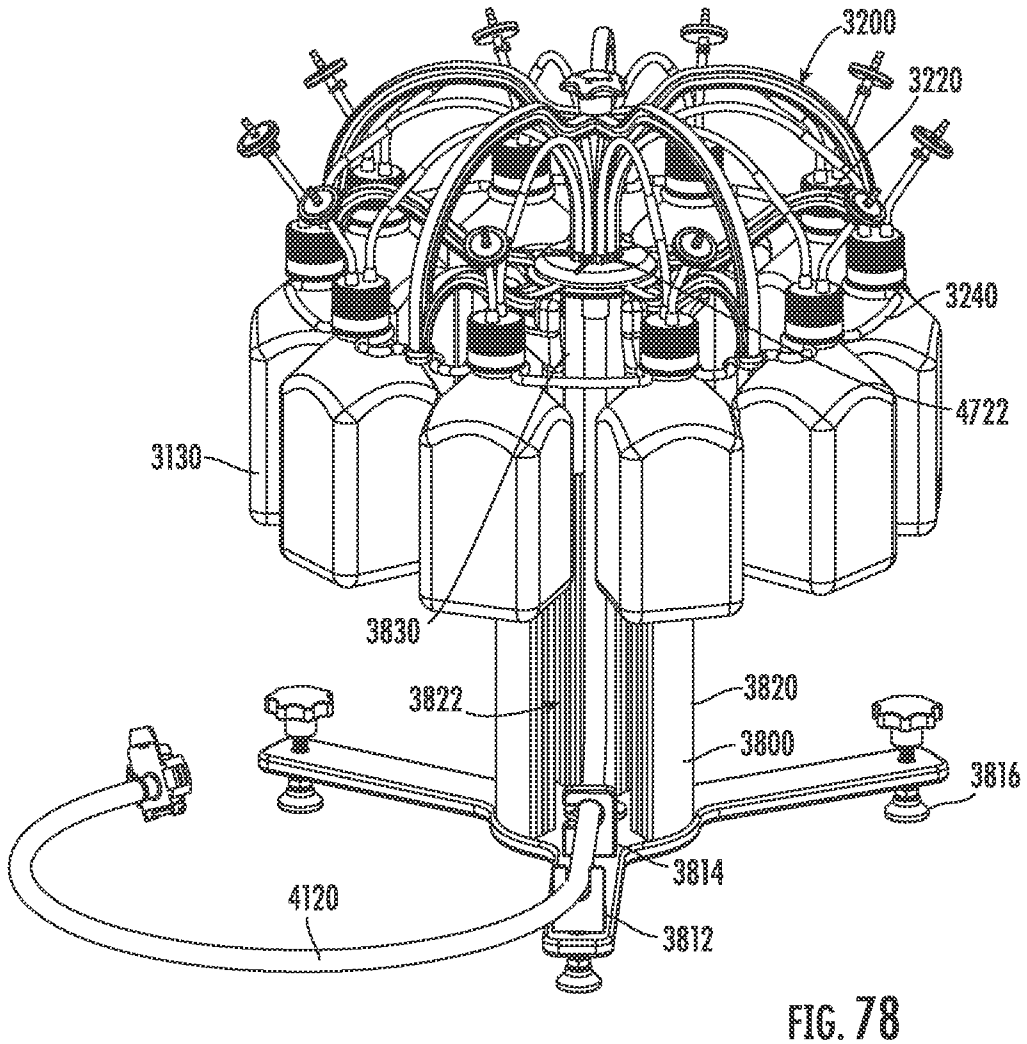
FIG. 78 is a perspective view of a fluid distribution system provided in accordance with the present disclosure including the stand of FIG. 75.
Figure 79:
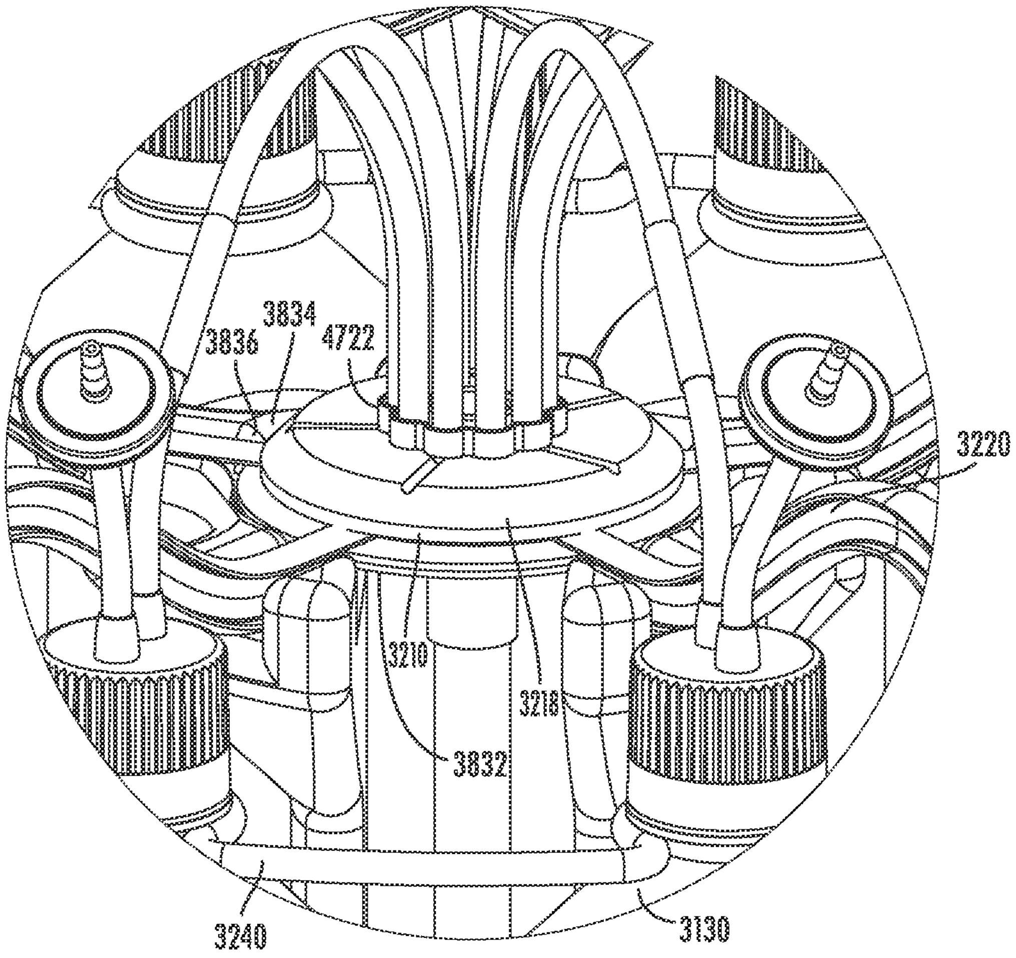
FIG. 79 is an enlarged view of a portion of the fluid distribution system of FIG. 78.

With particular reference to FIG. 59, the primary vessel 3110 includes a fluid to be distributed in substantially equal amounts to each one of the secondary vessels. In some embodiments the distribution is ±5% of the average amount of fluid in each secondary vessel 3130, and in some embodiments within ±4%, and in some embodiments within ±3%, and in some embodiments within ±2%, and in some embodiments within ±1% of the average amount of fluid in each vessel 3130. Data supporting these variations was collected using the embodiments disclosed in FIGS. 3 and 78 and is set forth in FIGS.

The primary vessel 3110 may be a rigid vessel, e.g., a bottle, or flexible vessel, e.g., a collapsible bag. The primary vessel 3110 may be positioned above, below, or level with the hub assembly 3010 and may be oriented with an opening 3112 oriented downwards or oriented upwards. For example, the primary vessel 3110 may be suspended from a hanger above hub assembly 3010. In addition, the primary vessel 3110 may be sealed or may be vented. In some embodiments, the primary vessel 3110 is vented with an aseptic hydrophobic vent to prevent contamination of a liquid contained there within.

The primary vessel 3110 is connected to the hub assembly 3010 via the input tube 3120. Input tube 3120 may be a flexible tube, rigid tube, or any fluid conduit vessel. The input tube 3120 includes a first terminus or end 3122 and a second terminus or end 3129, and defines an input lumen 3124 therethrough. The first end 3129 of the input tube 3120 may be connected to the primary vessel 3110 by any known means including a barb connection, a luer connection, an aseptic connection, aseptic welding, a nipple connection, a needle connection, etc. For example, the first end 3129 may be fitted with an aseptic connector to couple to the primary vessel 3110. A suitable aseptic connector is commercially available from Sartorius as an Opta® Sterile Connector. In some embodiments, the input tube 3120 is secured to an output of the primary vessel 3110 by a cast seal formed between the input tube 3120 and a cap (not shown) secured about the opening 3112 of the primary vessel 3110. The input tube 3120 includes a second terminus or end 3128 that is secured to the input cap 3015 (FIG. 57) of the hub assembly 3010 about the inlet 3051. The second end 3128 of the input tube 3120 may be secured to the input cap 3015 by a cast seal formed between the second end 3128 and the body 3050 of the input cap 3015. The input tube 3120 may be secured to the input cap 3015 before the hub assembly 3010 is assembled. For additional detail on suitable cast seals, reference may be made to U.S. Pat. No. 9,376,305 ("the '305 patent"), the entire contents of which are hereby incorporated reference.

The input tube 3120 may include a deformable sleeve 3126 at a location that facilitates substantially sealing, cutting, and detaching the deformable sleeve 3126. The deformable sleeve 3126 is formed of a material having plasticity such that pressure applied to the sleeve causes the deformable sleeve 3126 to deform about and seal the input tube 3120 and upon continued application of pressure to the deformable sleeve 3126, the deformable sleeve 3126 and input tube 3120 are cut and the deformable sleeve 3126 retains a deformed shape, thereby substantially sealing the input tube 3120. For additional detail on a suitable deformable sleeve, reference may be made to U.S. Pat. No. 8,505,586, the entire contents of which are hereby incorporated by reference.

The input tube 3120 is a flexible conduit and may be formed of thermoplastic tubing, elastomeric tubing, or a combination of thermoplastic and elastomeric tubing. The input tube 3120 may pass through a pump 3170 positioned between the primary vessel 3110 and the hub assembly 3010. The pump 3170 may be a peristaltic pump having a pump head 3174 that rotates to advance a fluid through the input tube 3120. The pump 3170 may include a deformable collar 3176 disposed substantially about the input tube 3120 to allow the pump head 3174 to compress the input tube 3120 without directly contacting the input tube 3120. The pump 3170 is configured to regulate flow rate and pressure of the fluid delivered by the input tube 3120 to the hub assembly 3010. The pump 3170 may increase a pressure or decrease a pressure of fluid within the input tube 3120 to deliver a desired pressure of fluid to the hub assembly 3010 for uniform distribution.

Continuing to refer to FIGS. 58-60, the frame assembly 3200 is configured to support the hub assembly 3010 and position each of the secondary vessels 3130 relative to the hub assembly 3010. Specifically, the frame assembly 3200 is configured to position each of the secondary vessels 3130 such that an arc segment 3192 (FIG. 60) of the distribution conduits 3160 is positioned to simultaneously provide a precise flow rate of fluid to each of the secondary vessels 3130. For example, the fluid distribution system 1 described herein has been shown to distribute fluid from the primary vessel 3110 to each of the secondary vessels 3130 with a variance of less than ±1% (i.e., 0.5%) of the average amount of fluid in each of the secondary vessels 3130. Thus, the fluid distribution system 1 may allow for improved accuracy and a reduction in time by simultaneously, accurately distributing a fluid from a primary vessel 3110 to a plurality of secondary vessels 3130. Each of the secondary vessels 3130 may be a rigid vessel, e.g., a bottle, or flexible vessel, e.g., a collapsible bag. To ensure accuracy, each of the secondary vessels are located in substantially the same plane relative to one another. To further ensure accuracy, each of the secondary vessels are located approximately the same distance from the hub. In addition, to further ensure accuracy, each of the secondary vessels are located in the same plane relative to one another and the hub.

The frame assembly 3200 includes a support collar 3210, lower arms 3220, upper arms 3230, and a vessel collar 3240. The support collar 3210 forms a ring having an outer diameter similar to the diameter of the hub assembly 3010. The support collar 3210 defines a central receiver 3212 with an inner diameter of the ring having a diameter similar to an outer diameter of the alignment nubs 3058 (FIG. 57) of the input cap 3015. Interaction between the support collar 3210 and the alignment nubs 3058 may axially align the hub assembly 3010 to within the central receiver 3212 of the support collar 3210. In some embodiments, the support collar 3210 defines alignment detents 3218 that are sized and dimensioned to receive the alignment nubs 3058 of the input cap 3015 to axially and rotationally align the hub assembly 3010 with the support collar 3210. The second end 3128 of the input tube 3120 may pass through the central receiver 3212 to connect to the inlet 3051. In addition, the support collar 3210 is supported above the surface supporting the secondary vessels 3130 to allow the input tube 3120 to enter from an underside of the hub assembly 3010 with a gentle curvature to avoid kinking or restrictions to flow through the input tube 3120. The support collar 3210 may be supported about the surface by the secondary vessels 3130 or by the lower arms 3220 contacting the surface. When the lower arms 3220 contact the surface, the secondary vessels 3130 may be suspended above the surface by the frame assembly 3200. In some embodiments, the entire frame assembly 3200 and the second vessels 3130 are suspended by a hanger or grip 3250 of the frame assembly 3200.

As shown, the frame assembly 3200 includes five sets of upper and lower arms 3220, 3230. In some embodiments, the frame assembly 3200 includes less than five sets of upper and lower arms 3220, 3230 or more than five sets of upper and lower arms 3220, 3230. For example, the frame assembly 3200 may include three, four, or six sets of upper and lower arms 3220 and 3230. In certain embodiments, the number of sets of upper and lower arms 3220, 3230 is half the number of secondary vessels 3130. Such an arrangement may allow for a precise location of each of the secondary vessels 3130 while minimizing material of the frame assembly 3200 and maximizing access to the secondary vessels 3130 and the hub assembly 3010.

The lower arms 3220 extend from the support collar 3210 to a joint 3228 where each of the lower arms 3220 forms a joint 3228 with one of the upper arms 3230. The lower arms 3220 are substantially S-shaped with a downward arcuate segment 3222 adjacent the support collar 3210 and an upward arcuate segment 3224 adjacent the joint 3228. The downward arcuate segment 3222 of each lower arm 3220 may contact an underlying surface to support or elevate the support collar 3210 above the underlying surface. As shown, each of the lower arms 3220 is substantially I-shaped in cross-section to increase rigidity thereof. The shape and cross-sectional shape of the lower arms 3220 should not been seen as limiting as the lower arms 3220 are configured to accurately position and rigidly secure the vessel collar 3240 relative to the support collar 3210. In certain embodiments, the lower arms 3220 may be linear elements, have any suitable cross-section, and include a foot (not shown) that extends downward to contact the underlying surface.

The upper arms 3230 extend from the joints 3228 to a central hub 3238 disposed along a central axis of the frame assembly 3210 extending through a central axis of the support collar 3210 and the hub assembly 3010 when the hub assembly 3010 is axially aligned with the support collar 3210. Each of the upper arms 3230 is secured to one another at the central hub 3238. The central hub 3238 may include a hanger or grip 3250 extending upward therefrom and positioned about the central axis. Each of the upper arms 3230 defines a substantially continuous arc from the joint 3228 to the central hub 3238. Each upper arm 3230 may deflect downward adjacent the central hub 3238 such that an upper surface of the grip 3250 is substantially planar with an apex of each of the upper arms 3230. In some embodiments, the central hub 3238 is positioned at an apex of each of the upper arms 3230 with the grip extending upward from the central hub 3238. The deflection downward of each of the upper arms 3230 may reduce an overall size of the frame assembly 3210. The upper arms 3230 may each have a substantially I-shaped cross-section to increase rigidity thereof. The shape and cross-sectional shape of the upper arms 3230 should not been seen as limiting as the upper arms 3230 are configured to accurately position and rigidly secure the vessel collar 3240 relative to the support collar 3210. In certain embodiments, the upper arms 3230 may be linear elements and have any suitable cross-section.

The vessel collar 3240 is configured to accurately secure each of the secondary vessels 3130 relative to the support collar 3210. The vessel collar 3240 is continuous and includes an outer ring 3242, arm nodes 3244, and vessel receivers 3246. The outer ring 3242 is a segmented or broken ring that defines an outer radial dimension of the frame assembly 3200 and is axially aligned with the central axis of the frame assembly 3200. The vessel collar 3240 extends inward from the outer ring 3242 at each of the arm nodes 3244 and vessel receivers 3246 to form segments or breaks in the outer ring 3242. The outer ring 3242 may define a plane above, below, or equal to a plane defined by the support collar 3210. The outer ring 3242 may form a tangent with an outer side of a neck 3132 of each of the secondary vessels 3130.

The arm nodes 3244 extend inward from the outer ring 3242 adjacent each of the joints 3228 and define a joint receiver 3245 that receives a respective one of the joints 3228 to secure the vessel collar 3240 to the arms 3220, 3230. The joints 3228 may include a barb 3229 that extends through the joint receiver 3245 to releasably couple the joint 3228 to the joint receiver 3245. In some embodiments, each joint 3228 is secured to a joint receiver 3245 by adhesive or a fastener.

The vessel receivers 3246 extend inward from the outer ring 3242 and are configured to accurately position and secure the secondary vessels 3130 relative to the support collar 3210. Each vessel receiver 3246 includes an entry 3248 defined as a gap in the outer ring 3242 and a hooked portion 3249 extending inward from the ends of the entry 3248. The hooked portion 3249 is sized and shaped to circumscribe a lower portion of a neck 3132 of a respective secondary vessel 3130. The hooked portion 3249 may be shaped to circumscribe greater than half of the neck 3132 of the secondary vessel 3130 such that the entry 3248 is smaller than a diameter of the neck 3132 such that the hooked portion 3249 grips the neck 3132 of the secondary vessel 3130. In use, when a secondary vessel 3130 is secured within a respective vessel receiver 3246, the neck 3132 may urge the entry 3248 apart as the neck 3132 passes through the entry 3248 with the entry 3248 closing behind the neck 3132 as the neck 3132 is received within the hooked portion 3249. As shown, the neck 3132 of the secondary vessels 3130 is substantially cylindrical in shape and the hooked portion 3249 is arcuate to complement the neck 3132. In some embodiments, the neck 3132 of the secondary vessels 3130 may be rectangular in cross-section or have a different cross-section. In such embodiments, the hooked portions 3249 may be shaped to complement the neck 3132. In particular embodiments, the neck 3132 includes key (not shown) and the hooked portion 3249 includes a keyway (not shown) to orient the secondary container 130 within the vessel receiver 3246.

The secondary vessels 3130 may define a recess 3133 about the neck 3132 configured to receive the hook portion 3249 therein to secure the secondary vessel 3130 to the vessel collar 3240. Each secondary vessel 3130 may include a vessel cap 3136 configured to aseptically close an opening 3134 of the secondary vessel 3130. The vessel cap 3136 may include one or more apertures 3138 therethrough that provide access to an interior of the secondary vessel 3130. One or more of the apertures 3138 may include a tubular member, a vent, a plug, or another element extending therethrough. For example, the vessel cap 3136 may include three apertures 3138 defined therethrough. Each aperture 3138 may include a port 3140 extending above and/or below a planar surface of the vessel cap 3136. As shown, a first aperture 3138*a* includes an inflow conduit 3142 extending therethrough, a second aperture 3138*b* includes an outflow conduit 3144 extending therethrough, and a third aperture 3138*c* includes a vent 3146 extending therethrough. Each of the inflow conduit 3142, outflow conduit 3144, or vent 3146 may be secured within the respective aperture 3138 by an aseptic cast seal as disclosed in the '305 patent, supra. In addition, the inflow conduit 3142 or the outflow conduit 3144 may include a deformable sleeve 3148 similar to the deformable sleeve 3126 of the input tube 3120. The inflow conduit 3142 may include an open end 3143 opposite the second vessel 3130 configured to receive a coupler as detailed below. The outflow conduit 3144 may include a securement device or flow regulator on an end opposite the second vessel 3130. For example, the outflow conduit 3144 may include a securement device 3145 that aseptically seals the end of the secondary vessel 3130 until the securement device 3145 is connected to complementary connector. The vent 3146 provides an aseptic vent for the secondary vessel 3130 to allow air to escape the secondary vessel 3130 as fluid flows into the interior of the secondary vessel 3130 through the inflow conduit 3142. The vent 3146 may allow gases, e.g., air, to pass while preventing liquid from passing therethrough.

With particular reference to FIG. 59, distribution system 3001 includes a distribution conduit 3160 secured to each of the conduit connectors 3032 of the distribution cap 3012 of the hub assembly 3010. Each of the distribution conduits 3160 has a first end 3162 secured to a respective conduit connector 3032 and in communication with the plenum 3030 of the hub assembly 3010 through one of the outlets 3033 that is defined through the respective conduit connecter 3032. The first end 3162 of each distribution conduit 3160 may be secured to the respective conduit connector 3032 by an aseptic cast seal as disclosed in the '305 patent. For example, each conduit connector 3032 may be potted with a vulcanizable silicone to form a cast seal when the first end 3162 is received over the conduit connector 3032. The second end 3164 of each distribution conduit 3160 includes a coupler 3166 configured to couple the second end 3164 of the distribution conduit 3160 to the open end 3143 of a respective inflow conduit 3142 as shown in FIG. 60.

Continuing to refer to FIG. 60, when the second end 3164 of the distribution conduit 3160 is coupled to the open end 3143 of a respective inflow conduit 3142, the distribution conduit 3160 and the inflow conduit 3142 form an output tube 3190 that has a continuous arc between the outlet 3033 of the distribution cap 3012 and the secondary vessel 3130. The lengths of the distribution conduits 3160 and the inflow conduits 3142 are tuned such that each output tube 3190 has the same length between the outlet 3033 and the secondary vessel 3130. As a result of each of the output tubes 3190 having equal length and the frame assembly 3200 secures each of the secondary vessels 3130 at an equal distance from the distribution cap 3012 and in substantially the same plane, an arc segment 3192 formed by each output tube 3190 between the outlet 3033 and the secondary vessel 3130 is substantially equal to one another. As used herein, arc segment may refer to something curved in shape, a traditional arc (i.e., a part of the circumference of a circle or other curved line), a curved and straight length of conduit, or any combination thereof. The arc segment 3192 is positioned such that a substantially equal amount of fluid, e.g., ±1% of the average amount of fluid in each secondary vessel, is distributed from the distribution cap 3012 to each of the secondary vessels 3130 as fluid is delivered to the hub assembly 3010 through the inlet 3051. The vessel cap 3136 of each secondary vessel 3130 is oriented in a similar orientation relative to the hub assembly 3010 such that a distance between the port 3141 receiving the inflow conduit 3142 and the outlet 3033 in communication with the port 3141 is substantially equal for each of the secondary vessel 3130. For example, the port 3141 receiving the inflow conduit 3142 may be oriented towards the hub assembly 3010.

The pressure or flow rate of fluid into the hub assembly 3010 through the inlet 3051 may affect an amount of fluid distributed to each of the secondary vessels 3130. In addition, the pressure or flow rate of fluid into the hub assembly 3010 combined with the arc segment 3192 may affect the accuracy of the flow to each of the secondary vessels 3130. The output tubes 3190 are sufficiently stiff to maintain the arc segments 3192 during a distribution process. In addition, the stiffness of the output tubes 3190 can allow a user to pick up the fluid distribution system 3001 and transport the fluid distribution system 3001 while maintaining the arc segments 3192. For example, the grip 3250 may be used to transport the fluid distribution system 3001 with the output tubes 3190 maintaining the arc segments 3192 between the hub assembly 3010 and the secondary vessels 3130.

The assembly of the fluid distribution system 3001 is described below with reference to FIGS. 55-60 above. The assembly of the fluid distribution system 3001 may occur in a cleanroom with the entire fluid distribution system 3001 being sterilized after being assembled and packaged. Initially, the hub assembly 3010 is assembled as detailed above. The hub assembly 3010 may be provided in an assembled state and in an aseptic manner. In some embodiments, the hub assembly 3010 is provided in a sterilized package and opened in an aseptic environment for assembly of the fluid distribution system 3001. The distribution cap 3012 or the hub assembly 3010 may be selected by a number of conduit connectors 3032 of the distribution cap 3012.

With the hub assembly 3010 provided, the input tube 3120 is secured to the inlet 3051 (FIG. 56) of the hub assembly 3010. The input cap 3015 may be potted about the inlet 3051 with a vulcanizable silicone to form an aseptic cast seal with the input tube 3120 to secure the input tube 3120 to the input cap 3015 such that an input lumen 3124 of the input tube 3120 is in fluid communication with the plenum 3030 of the hub assembly 3010. The distribution conduits 3160 are also secured to the conduit connectors 3032 of the distribution cap 3012 such that a lumen of each distribution conduit 3160 is in fluid communication with the plenum 3030 through a respective one of the outlets 3033.

The distribution cap 3012 may be potted about each of the conduit connectors 3032 with a vulcanizable silicone to form an aseptic cast seal between each of the distribution conduits 3160 and respective conduit connector 3032 to secure the distribution conduit 3160 to the respective conduit connector 3032.

With the tube 3120, and conduits 3160 secured to the hub assembly 3010, the hub assembly 3010 is positioned on the frame assembly 3200. Specifically, the hub assembly 3010 is positioned on the support collar 3210 of the frame assembly 3200. As the hub assembly 3010 is positioned on the support collar 3210, the input tube 3120 may pass through the central receiver of the support collar 3210. As the hub assembly 3010 is positioned on the support collar 3210, the plate 3080 of the lower clamp 3018 rests on the support collar 3210 with the alignment nubs 3058 of the input cap 3015 interacting with the support collar 3210 to axially align the hub assembly 3010 with the support collar 3210 and thus, the frame assembly 3200. In particular embodiments, the support collar 3210 may define detents similar to the detents 3076, 3086 of the upper and lower clamps 3017, 3018 (FIG. 56) that are configured to receive the alignment nubs 3058 to radially align the hub assembly 3010 with the support collar 3210. In some embodiments, the input conduit 3160 and/or the distribution conduits 3160 are secured to the hub assembly 3010 after the hub assembly 3010 is positioned on the support collar 3210 of the frame assembly 3200.

With the hub assembly 3010 positioned on the support collar 3210, the nodes 3244 of the vessel collar 3240 are secured to the joints 3228 of the lower and upper arms 3220, 3230. The vessel collar 3240 is loaded with the secondary vessels 3130. In some embodiments, the vessel collar 3240 is loaded with the secondary vessels 3130 before being secured to the joints 3228 and in other embodiments; the vessel collar 3240 is secured to the joints 3228 and then loaded with the secondary vessels 3130.

The secondary vessels 3130 are loaded into the vessel receivers 3246 of the vessel collar 3240 with the vessel caps 3136 secured to the secondary vessels 3130. Specifically, the neck 3132 of each secondary vessel 3130 is inserted or pushed through a respective entry 3248 of the vessel collar 3140 with recess 3143 of the neck 3132 receiving the hooked portion 3249 of the vessel collar 3240 to secure the secondary vessel 3130 to the vessel collar 3240. As the secondary vessels 3130 are secured to the vessel collar 3240, each secondary vessel 3130 is oriented such that the port 3141 receiving the inflow conduit 3142 is oriented towards the center of the of the vessel collar 3240, e.g., towards the support collar 3210.

The secondary vessels 3130 may be provided assembled with the vessel caps 3136 secured to the secondary vessels 3130. In addition, the vessel caps 3136 may be provided fully assembled with an inflow conduit 3142, an outflow conduit 3144, and a vent 3146 secured to each vessel cap 3136. In some embodiments, the vessel caps 3136 may be assembled by securing an inflow conduit 3142, an outflow conduit 3144, and a vent 3146 to each vessel cap 3136. For example, the ports 3141 of the vessel caps 3136 may be potted with a vulcanizable silicone to form an aseptic cast seal between each of the inflow conduits 3142, the outflow conduits 3144, or the vents 3146 a respective port 3141 of the vessel cap 3136. In certain embodiments, the vessel caps 3136 may include additional ports 3141 that may receive plugs (not shown) to aseptically close the additional ports 3141. In particular embodiments, the vessel caps 3136 may include less than three ports 3141 with either the outlet conduit 3144 and/or the vent 3146 omitted.

With the secondary vessels 3130 loaded into the vessel collar 3240 and the vessel collar 3240 secured to the arms 3230, 3240, the coupler 3166 of each distribution conduit 3160 is coupled to an open end 3143 of a respective inflow conduit 3142 to form an output tube 3190. When the output tube 3190 is formed, each output tube 3190 forms the arc 3192 between the distribution hub 3010 and the respective secondary vessel 3130. In some embodiments, the secondary vessels 3130 may be loaded into the vessel collar 3240 at the point of use. For example, when the secondary vessels 3130 are large, it may be beneficial to provide the secondary vessels 3130 separate from the rest of the fluid distribution system 3001. In such embodiments, the inflow conduit 3142 can be terminated with a corresponding aseptic connector (not shown) during shipping and before assembly.

When the output tubes 3190 are formed with the hub assembly 3010 positioned on the support collar 3210 and the vessel collar 3240 secured at the joints 3248, the frame assembly 3200 is assembled.

When the frame assembly 3200 is assembled, the entire distribution system 3001 can be sealed in a single or double bag package and subjected to gamma irradiation to sterilize the assembly of the hub assembly 3010 and the frame assembly 3200. When irradiated, the entire assembly of the hub assembly 3010 and the frame assembly 3200 may be provided preassembled. The assembly of the hub assembly 3010 and the frame assembly 3200 may be assembled as detailed above in a cleanroom, packaged, irradiated, and then shipped to another facility, e.g., a customer facility, for use.

Figure 61:
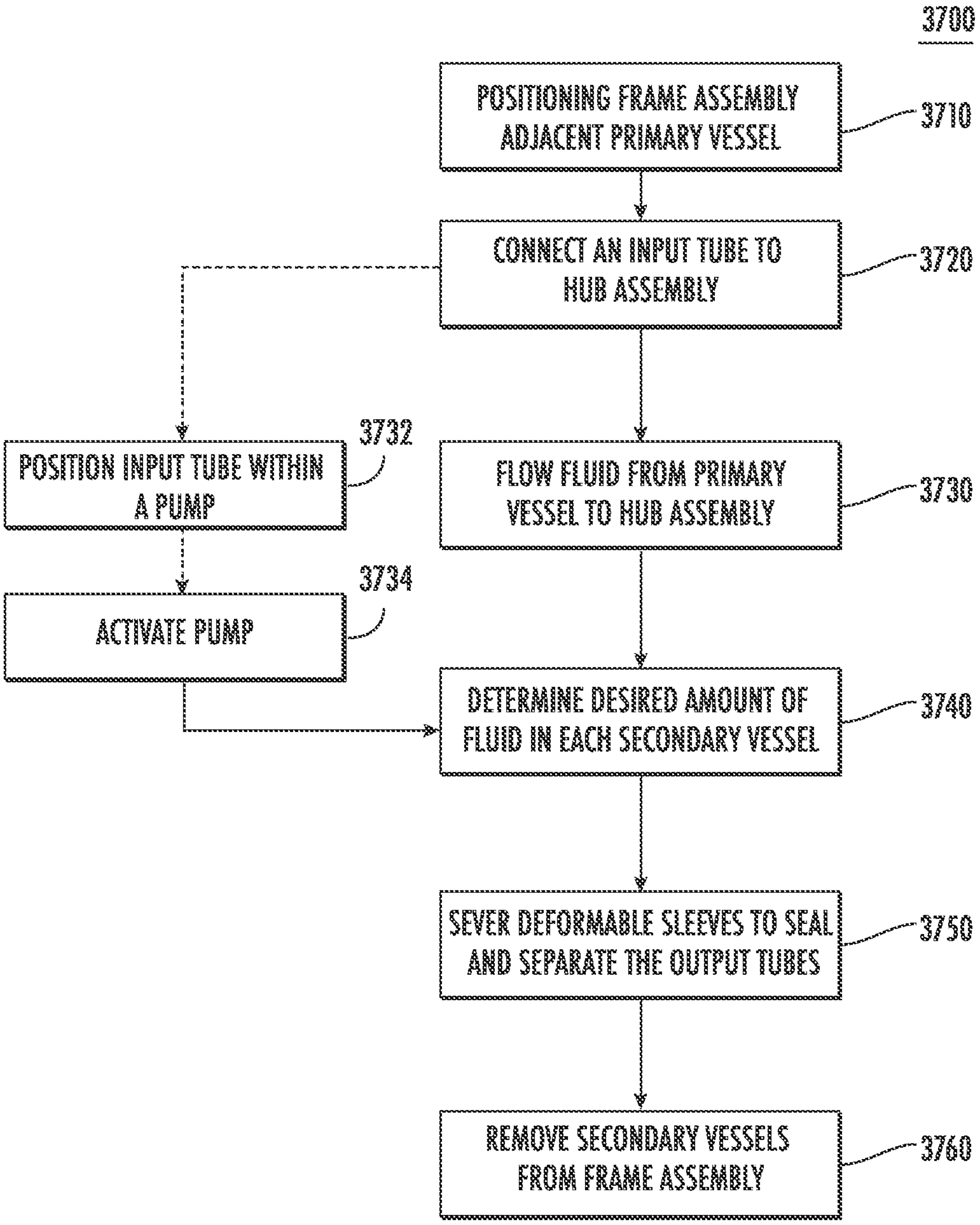
FIG. 61 is a flowchart of an exemplary method of distributing fluid from a primary vessel to a plurality of secondary vessels in accordance with the present disclosure.
Figure 63:
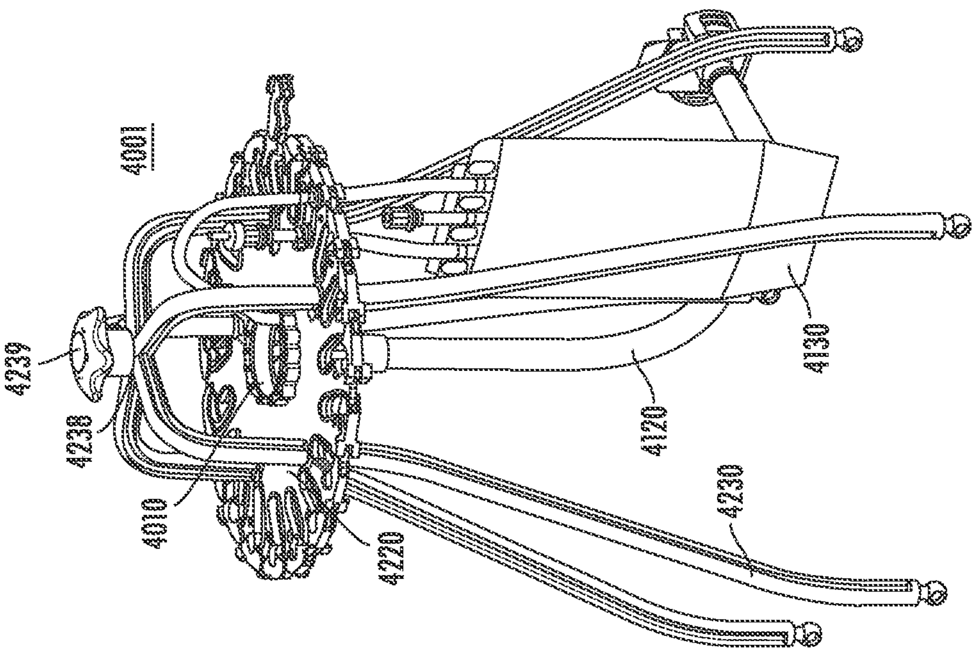
FIG. 63 is another perspective view of the fluid distribution system of FIG. 62.
Figure 62:
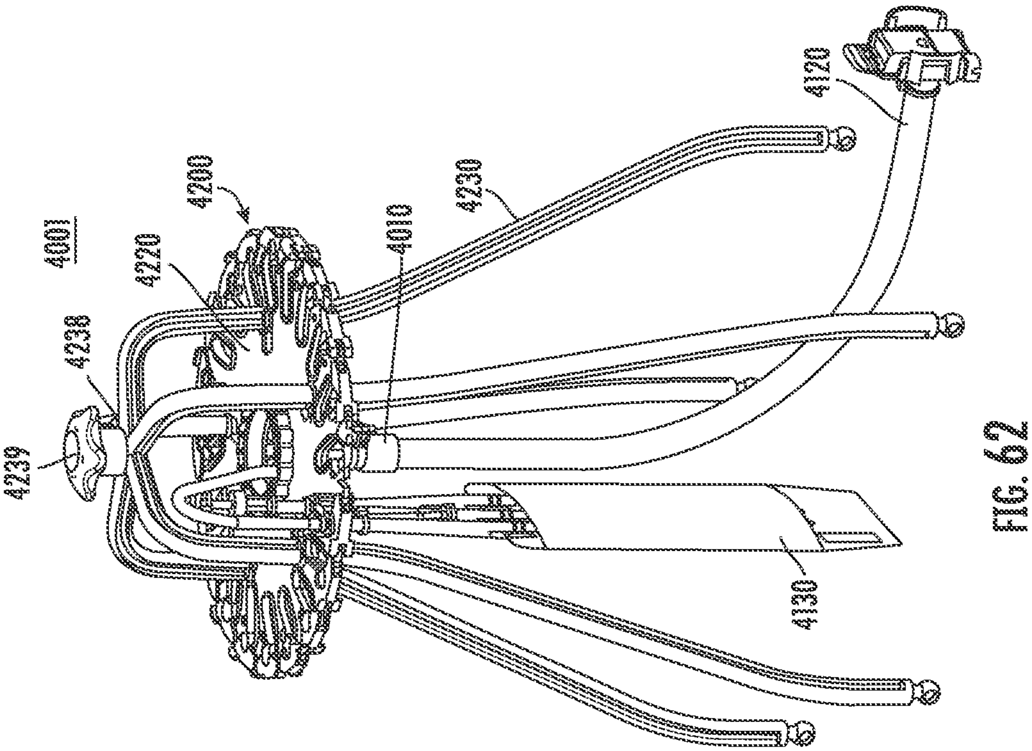
FIG. 62 is a perspective view of another fluid distribution system provided in accordance with the present disclosure including a single vessel locked into a holding disc.
Figure 64:
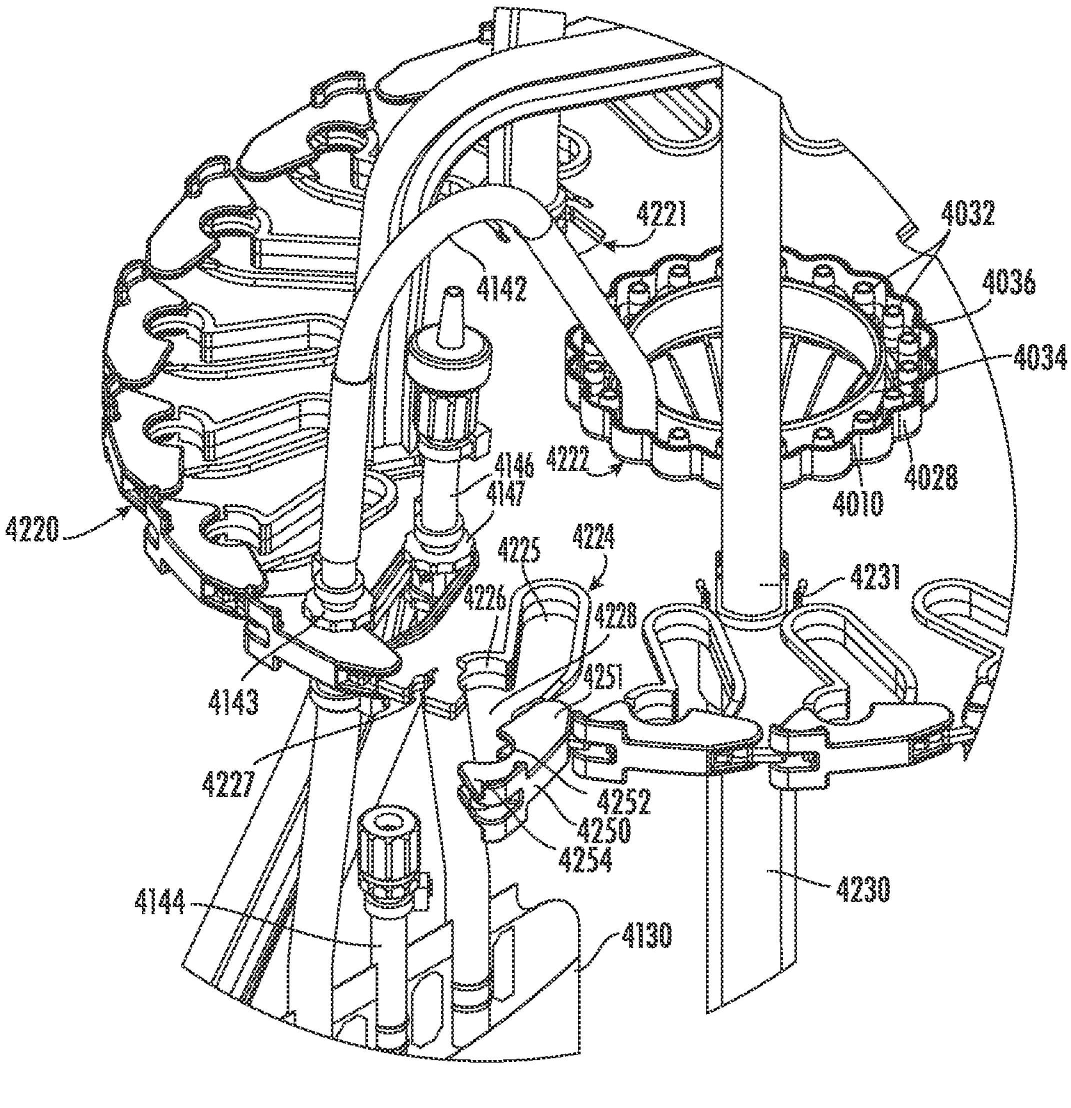
FIG. 64 is an enlargement of a portion of the fluid distribution system of FIG. 62.

With reference to FIG. 61, a method of aseptically distributing a fluid from a first vessel to a plurality of second vessels 3700 is described in accordance with the present disclosure with reference to the fluid distribution system 3001 of FIGS. 55-60. Initially, a hub assembly 3010 and a frame assembly 3200 are assembled or provided as detailed above. When the frame assembly 3200 is assembled, the hub assembly 3010 is positioned on the support collar 3210 with the input tube 3120 extending through the support collar 3210. In some embodiments, the assembly of the hub assembly 3010 and the frame assembly 3200 are provided assembled together in a single sterilized package.

With the frame assembly 3200 assembled, the frame assembly 3200 is positioned adjacent to a primary vessel 3110 (Step 3710). The primary vessel 3110 may be any suitable container for holding a fluid to be distributed to the secondary vessels 3130. For example, the primary vessel 3110 may be a bag hung from a hanger or may be a rigid container placed on, above, or below a surface supporting the frame assembly 3200. The frame assembly 3200 may be positioned on a surface in the proximity of the primary vessel 3110 or may be hung from a hanger in the proximity of the primary vessel 3110. For example, the grip 3250 may be utilized to hang the frame assembly 3200 in the proximity of the primary vessel 3110.

With the frame assembly positioned adjacent the primary vessel 3110, the input tube 3120 is connected with the opening 3112 of the primary vessel 3110 (Step 3720). The first end 3122 of the input tube 3120 is connected to the opening 3112 of the primary vessel 3110 with a suitable aseptic connection, e.g., an aseptic connection, a barb connection, a luer connection, a needle connection, etc. The input tube 3120 may also be positioned within a pump 3170 between the primary vessel 3110 and the hub assembly 3010 (Step 3732). When the input tube 3120 passes through the pump 3170, the pump 3170 is used to establish a desired pressure or flow rate of a fluid into the plenum 3030 of the hub assembly 3010. The pump 3170 may increase or decrease a pressure of a fluid from the primary vessel 3110.

With the input tube 3120 connected to the primary vessel 3110, fluid from within the primary vessel 3110 flows through the input tube 3120 into the plenum 3030 (FIG. 56) of the hub assembly 3010 (Step 3730). Fluid may be drawn from the primary vessel 3110 by the pump 3170. Specifically, the pump 3170 may be a peristaltic pump including a rotatable head 3174 that is configured to compress the input tube 3120 as the head 3174 rotates within the pump 3170 to flow the fluid into the plenum 3030 through the inlet 3051 (Step 3734). In some embodiments, the fluid distribution system 3001 may flow fluid without a pump. For example, the primary vessel 3110 may be pressurized to flow fluid from the primary vessel 3110 into the plenum 3030. Alternatively, fluid may flow from the primary vessel 3110 into the plenum 3030 as a result of gravity only.

As the fluid flows into the plenum 3030, pressure within the plenum 3030 is increased until the fluid flows from the plenum 3030 into the distribution conduits 3160 through the outlets 3033. The arc segment 3192 of the output tubes 3190, including the distribution conduits 3160, controls the fluid flow from the plenum 3030 into the output tubes 3190 such that the fluid flow into each output tube 3190 is substantially equal to the fluid flow in each of the other output tubes 3190. The output tubes 3190 are sufficiently rigid to maintain the arc segments 3192 during fluid flow. As the fluid flow reaches an apex 3194 of the arc segments 3192, the fluid flows into the secondary vessels 3130 through the ports 3141. In some embodiments, each vent 3146 vents the respective secondary vessel 3130 at a predetermined pressure that is greater than a pressure about the distribution system 3001, e.g., atmospheric pressure. By venting each of the secondary vessels 3130 at the same predetermined pressure, fluid flow into the secondary vessels 3130 may be equalized as fluid flow between the secondary vessels 3130 may be limited by a pressure within the secondary vessels 3130. During distribution of the fluid, the frame assembly 3200 may be maintained level such that planes perpendicular to a central longitudinal axis of the hub assembly 3010 is parallel with a ground plane. Further, during distribution, the secondary vessels 3130 are maintained in substantially the same plane relative to one another. In addition, the secondary vessels 3130 may be located substantially equidistant from the hub during distribution.

When a desired amount of fluid is disposed within each of the secondary vessels 3130, the pump 3170 may be stopped to terminate fluid flow into the plenum 3030 (Step 3740). Even with the pump 3170 stopped, the pump 3170 may maintain a pressure within the plenum 3030. In embodiments, without a pump, the fluid flow may be terminated by closing a valve or clamp adjacent the primary vessel 3110. In some embodiments, the input tube 3120 includes a deformable sleeve 3126. In such embodiments, the input tube 3120 may be severed in the deformable sleeve 3126 with the deformable sleeve sealing the input tube 3120 as the input tube 3120 is severed. The deformable sleeve 3126 may be severed while maintaining an aseptic seal.

With the fluid flow terminated, the deformable sleeve 3148 of each inflow conduit 3142 of each output tube 3190 is severed with the deformable sleeve 3148 sealing the input tube 3120 (Step 3750). The deformable sleeve 3148 forms an aseptic seal on both sides such that the hub assembly 3010 and the secondary vessel 3130 are each sealed by the deformable sleeve 148. With the secondary vessel 3130 sealed by the deformable sleeve 3148, the secondary vessel 3130 may be removed from the vessel collar 3240 (Step 3760).

With the secondary vessel 3130 removed from the vessel collar 3240, the secondary vessel 3130 may be used to aseptically transport the fluid therein. The fluid may be removed from the secondary vessel 3130 through the outflow conduit 3144. In some embodiments, the vent 3146 and/or the inflow conduit 3142 may be removed from the secondary vessel 3130 and the respective ports 3141 may be sealed with a plug (not shown). Dip tube tips, such as those disclosed in U.S. Pat. Nos. 9,944,510, D814,025, and D813,385, may also be helpful to remove fluid from a filled vessel.

The method of distributing the fluid detailed above may be utilized to simultaneously distribute an equal amount of fluid from a single vessel into a plurality of secondary vessels. The method and distribution system detailed herein allow for a precise amount of fluid to be distributed into each of the secondary vessels without requiring secondary measurement or flow control valves. The method and distribution system may allow for distribution of fluid in a reduced time, less opportunity for contamination, and less waste when compared to previous methods and distribution systems that may reduce the cost of manufacturing fluids that require distribution from one vessel to smaller vessels for distribution. Another benefit of this method is reduced hold-up volume compared to traditional filling manifolds.

In addition, the method of distributing the fluid detailed above may be reversed to combine fluids from a plurality of small vessels, e.g., secondary vessels 3130, into a single large vessel, e.g., primary vessel 3110, with a substantially equal amount of fluid being drawn from each of the smaller vessels. In such a method, a pump, e.g., pump 3170, may draw fluid from the plenum 3030 through the input tube 3120 such that fluid is drawn from the smaller vessels through the output tubes 3190. As an alternative to the pump 3170, the large vessel may be a negative pressure vessel to draw fluid from the smaller vessels. The arc segments 3192 of the output tubes 3190 may be positioned such that a substantially equal amount of fluid is drawn from each of the smaller vessels.

Referring now to FIGS. 62-66, another fluid distribution system 4001 is provided in accordance with the present disclosure. The fluid distribution system 4001 includes a hub 4010, an input tube 4120, one or more containers or vessels 4130, and a frame or stand assembly 4200. The stand assembly 4200 includes a holding disc 4220 and legs 4230.

The holding disc 4220 supports the hub 4010 and maintains a position of the vessels 4130 relative to the hub 4010 and maintains the vessels in substantially the same plane relative to one another. The legs 4230 extend through the holding disc 4220 and support the holding disc 4220 above a fixed structure such as a table top (not shown). For example, as shown, the vessel 4130 is a collapsible fluid bag and the legs 4230 are sized to support the holding disc 4220 such that the vessel 4130 is supported above the fixed surface. The holding disk 4220 may define openings 4221 (FIG. 64) that each receive one of the legs 4230. Each leg 4230 may include a securement member 4231 that secures or locks the leg 4230 within the opening 4221 of the holding disc 4220. The openings 4221 may be linear extending radially in a direction away from a center of the holding disc 4220. The openings 4221 may be larger than the securement member 4231 and may allow the securement member 4231 and thus, the leg 4230 to translate within the respective opening 4221. Each of the legs 4230 may include an upper end that join together with the upper ends of the other legs 4230 at a central hub 4238. The central hub 4238 may include a grip 4239 that allows a user to pick up, move, or handle the frame assembly 4220.

The holding disc 4220 defines a hub opening 4222 at the center thereof. The hub opening 4222 is sized and dimensioned to receive and support a distribution portion 4012 of the hub 4010. The hub opening 4222 may be circular or may be a scalloped circle. As shown, the hub opening 4222 is a scalloped circle that is sized to complement scallops of the distribution portion 4012 such that the hub 4010 is rotatably fixed relative to the holding disc 4220.

The holding disc 4220 defines a plurality of vessel slots 4224 adjacent an outer circumference thereof that extend radially inward towards the center of the holding disc 4220. Each vessel slot 4224 is configured to receive and secure a vessel 4130 in the holding disc 4220. Each vessel slot 4224 includes an inner end 4225, a tube grip 4226, and an outer opening 4228. Each vessel slot 4224 may include a locking arm 4250 secured about the outer circumference of the holding disc 4220 adjacent the outer opening 4228 of the vessel slot 4224. Each locking arm 4250 includes a pivot end 4251 that is pivotally secured adjacent the outer circumference of the holding disc 4220 such that the locking arm 4250 is pivotable between an open or unlocked position in which one or more tubes associated with a vessel 4130 can slide into or out of the vessel slot 4224 through the outer opening 4228 and a closed or locked position in which the one or more tubes associated with a vessel 4130 are secured within the vessel slot 4224. Each locking arm 4250 may include a tube notch 4252 that forms a portion of the tube grip 4226 when the locking arm 4250 is in the closed position. Each locking arm 4250 may also include a locking tab 4254 that is configured to be received within a locking notch 4227 of the holding disc 4220 that is defined between adjacent vessel slots 4224 to secure the locking arm 4250 in the locked or closed position.

Figure 66:
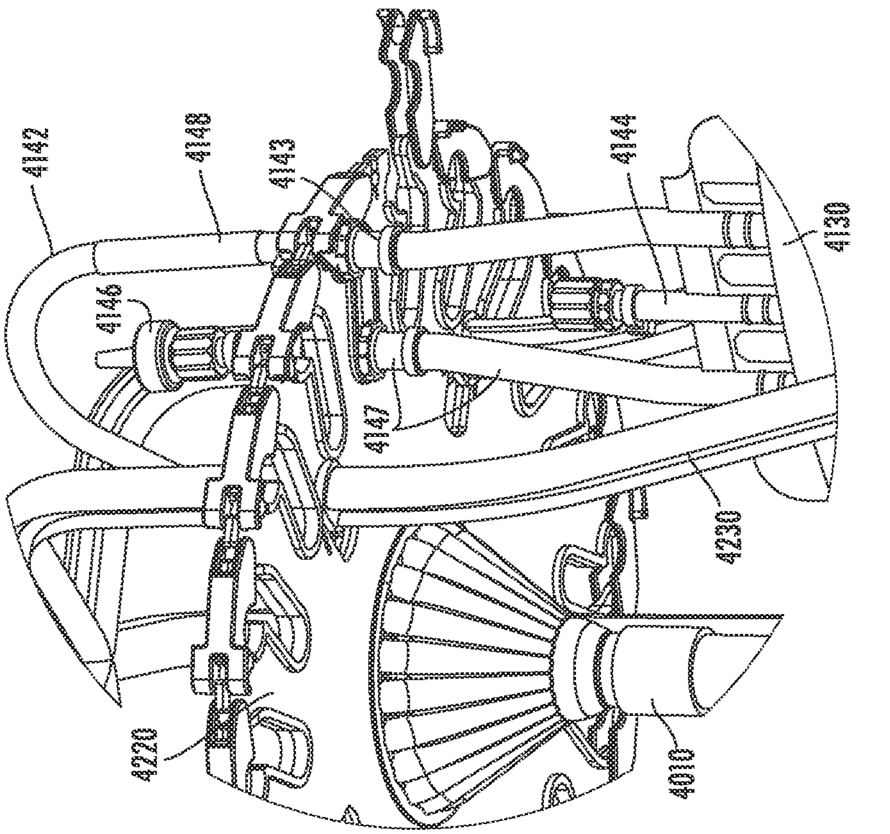
FIG. 66 is an enlargement of a portion of the fluid distribution system of FIG. 65.
Figure 65:
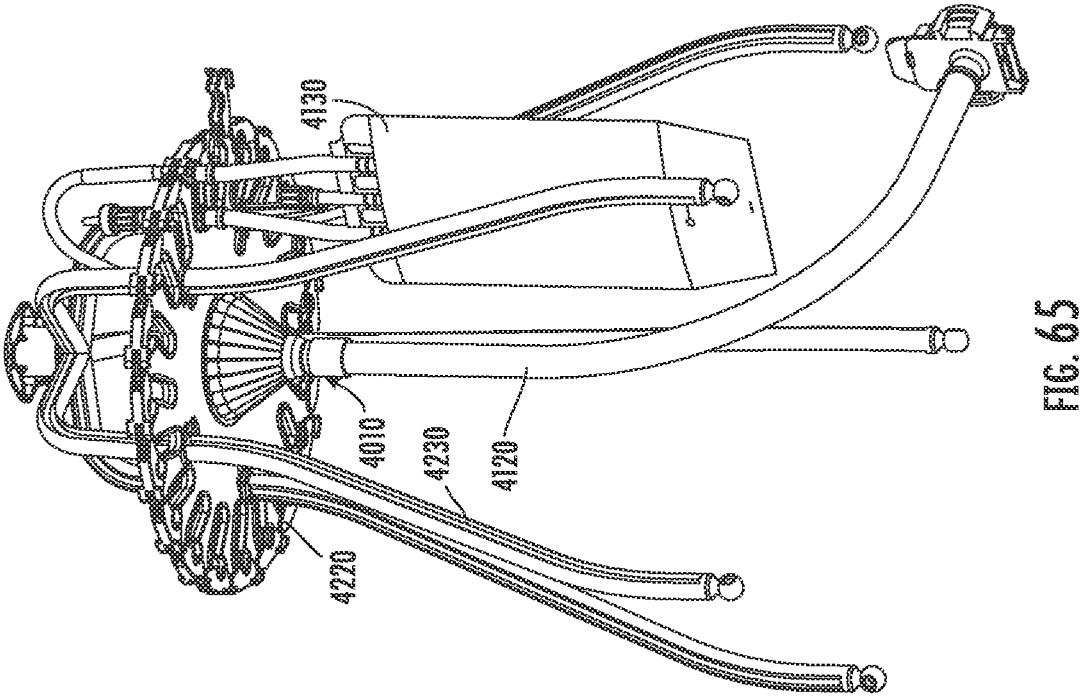
FIG. 65 is a lower perspective view of the fluid distribution system of FIG. 62.

Each vessel 4130 is secured in a respective vessel slot 4224 by one or more tubes that extend from the vessel 4130 such that the vessel 4130 is suspended from the holding disc 4220. With particular reference to FIG. 66, the vessel 4130 includes an inflow conduit 4142, and an outflow conduit 4144. Each of the conduits 4142, 4144 and optionally a vent 4146 are in communication with a main volume of the vessel 4130. The outflow conduit 4144 may include a coupling or open end that is positioned below the holding disc 4220. The coupling or open end is configured to connect to another tube or receive a syringe to draw fluid from the vessel 4130 subsequent to the distribution of fluid to the vessel 4130 as detailed below. The inflow conduit 4142 is configured to connect to an outflow connector of the hub 4010 and provide an inflow of fluid into the vessel 4130. The inflow conduit 4142 may include a sleeve 4148 similar to the sleeves 3148 detailed above. The inflow conduit 4142 may be a single continuous conduit from the outflow connector of the hub 4010 or may have a coupling before or after the sleeve 4148. In addition, the inflow conduit 4142 may include a mount 4143 that is configured to interact with the vessel slot 4224 to secure the inflow conduit 4142 to the holding disc 4220. Similarly, the vent 4146 may include a mount 4147 that is configured to interact with the vessel slot 4224 to secure the inflow conduit 4142 to the holding disc 4220.

With reference to FIGS. 62-66, a method of suspending a vessel relative to a frame assembly is described in accordance with the present disclosure. Initially, the frame assembly 4200 is assembled with the legs 4230 supporting the holding disc 4220 above a fixed surface with sufficient room below the holding disc 4220 to allow a vessel 4130 secured to the holding disc 4220 to be suspended above the fixed surface. As described in greater detail below, the hub 4010 may include a rim that supports the hub 4010 within the hub opening 4222 of the holding disc 4220. The hub 4010 may be loaded into the holding disc 4220 before or after the legs 4230 are secured to the holding disc 4220. To secure the legs 4230 to the holding disc 4220, each leg 4230 is passed through an opening 4221 in the holding disc 4220 until a securement member 4231 of the leg 4230 engages the opening 4221. The securement member 4231 may provide audible or tactile indicia when the securement member 4231 engages the opening 4221.

With the frame assembly 4200 assembled with the holding disc 4220, the legs 4230, and the hub 4010, each vessel 4130 is suspended within a respective vessel slot 4224 of the holding disc 4220. Initially, to suspend each vessel 4130 within a vessel slot 4224, a locking arm 4250 associated with the vessel slot 4224 is pivoted to its open position. With the locking arm 4250 in the open position, the vent 4146 of the vessel 4130 is passed through the outer opening 4228 of the vessel slot 4224 until the vent 4146 is positioned at the inner end 4225 of the vessel slot 4224. A mount 4147 of the vent 4146 may be received at the inner end 4225 to vertically fix the vent 4146 within the vessel slot 4224. With the mount 4147 received at the inner end 4225, the inflow conduit 4142 is passed through the outer opening 4228 of the vessel slot 4224 and positioned within the tube grip 4226 of the vessel slot 4224. The mount 4143 of the inflow conduit 4142 may be received in the tube grip 4226 to vertically fix the inflow conduit 4142 within the vessel slot 4224. With the inflow conduit 4142 and the vent 4146 secured in the vessel slot 4224, the locking arm 4250 is pivoted to the closed position. In the closed position, the tube notch 4252 may engage the mount 4143 of the inflow tube to secure the inflow conduit 4142 within the tube grip 4226. When the locking arm 4250 is pivoted to the closed position, the inflow conduit 4142 and the vent 4146 are secured within the vent slot. The interaction between the mounts 4143, 4147 and the vessel slot 4224 vertically fix the vessel 4130 to the holding disc 4220 such that the vessel 4130 is suspended above the fixed surface and in substantially the same plane as other vessels 4130, as well as equidistant from the hub 4010. In some embodiments, the mounts 4143, 4147 may be adjustable along the inflow conduit 4142 and the vent 4146 to adjust a position of the vessel 4130 relative to the holding disc 4220. In such embodiments, interaction between the vessel slot 4224 and the mounts 4143, 4147 may fix the mounts 4143, 4147 to the inflow conduit 4142 or the vent 4146, respectively.

With the vessel 4130 suspended from the holding disc 4220, the inflow conduit 4142 may be coupled to the outflow connector of the hub 4010. The inflow conduit 4142 may be coupled to the outflow connector of the hub 4010 before or after the inflow conduit 4142 and/or the vent 4146 are secured within the vessel slot 4224.

Figure 67:
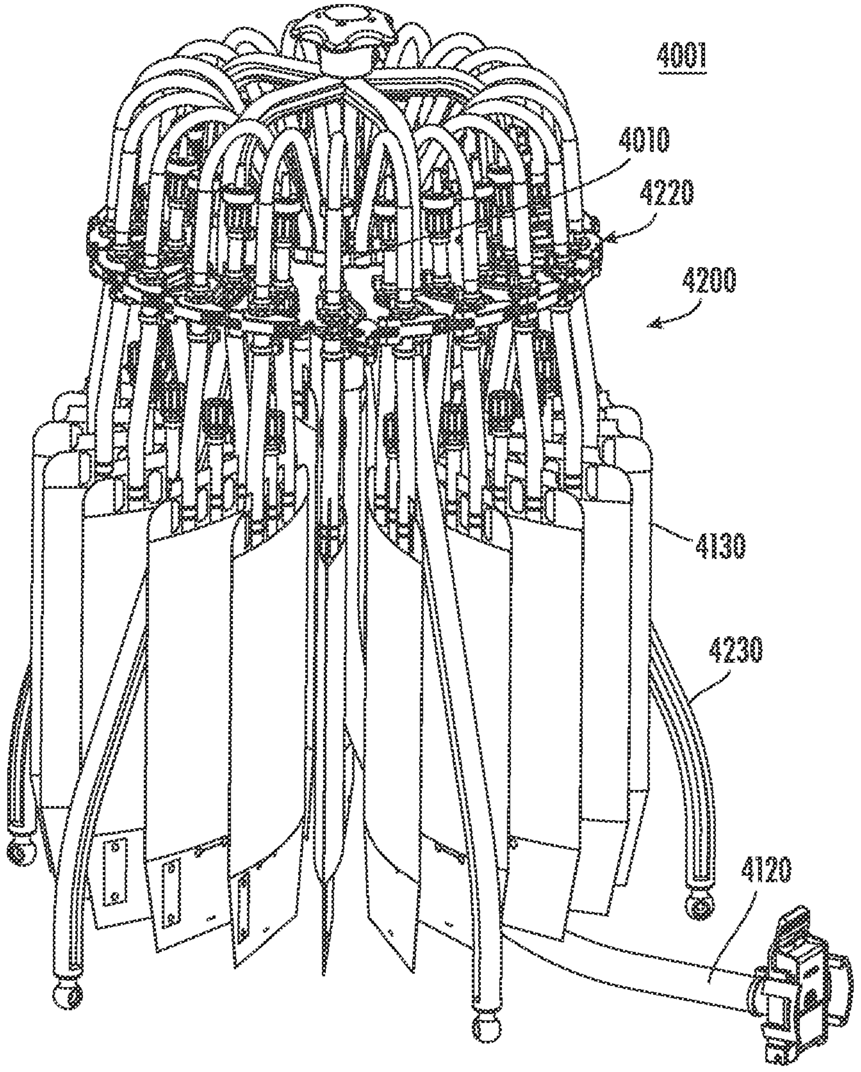
FIG. 67 is a perspective view of the fluid distribution system of FIG. 62 including twenty vessels locked into the holding disc.

As shown in FIG. 67, when each vessel 4130 is suspended from the holding disc 4220, the fluid distribution system 4001 is prepared for distribution of fluid through the input tube 4120 into each of the vessels 4130 in a similar manner as detailed above with respect to method 3700. In use, the input tube 4120 is connected to an input vessel (not shown) and fluid is pumped or flowed from the input vessel through the input tube 4120 and into each of the vessels 4130. In a preferred embodiment, the input tube 4120 has an outer diameter of ⅝" and an inner diameter of ⅜". In some embodiments, a pump, e.g., a peristaltic pump, engages the input tube 4120 to flow fluid from the input vessel into the vessels 4130. Conduits other than tubes may be used in place of input tube 4120. As shown, the fluid distribution system 4001 includes twenty vessels 4130 that are suspended about the hub 4010. The vessels 4130 are fluid bags that are suspended from the holding disc 4220 such that as fluid flows through the hub 4010 from the input tube 4120, the fluid is substantially equally distributed, with a precision of ±5%, ±4%, ±3%, ±2%, down to at least ±1%, to the average amount of fluid in each of the vessels 4130. It has been shown that the position and suspension of the vessels 4130 relative to the hub 4010, the arc of the inflow conduits 4142, and/or the vents 4146 may contribute to the precision of the distribution system 4001. In a preferred embodiment, the inflow conduits 4142 have an outer diameter of ¼" and an inner diameter of ⅛". Maintaining sufficient flow and back pressure is important to filling precision. Flow restrictors may be added at any location between the hub and the receiving vessels to improve precision. Flow restrictors may also be added to the inflow conduits 4142. In one embodiment the flow restrictor is located on a portion of the inflow conduit 4142 within the interior of the vessel 4130, including but not limited to, at or near the terminus of the inflow conduit 4142 within the vessels 4130. Suitable flow restrictors may include the devices disclosed in U.S. Pat. Nos. 9,944,510, D814,025, and D813,385. Smaller orifices at the terminal end of inflow conduits 4142 or at some intermediary position between the hub and the terminus, may improve precision but must not be so small as to creating foaming or cause cell lysing.

Figure 69:
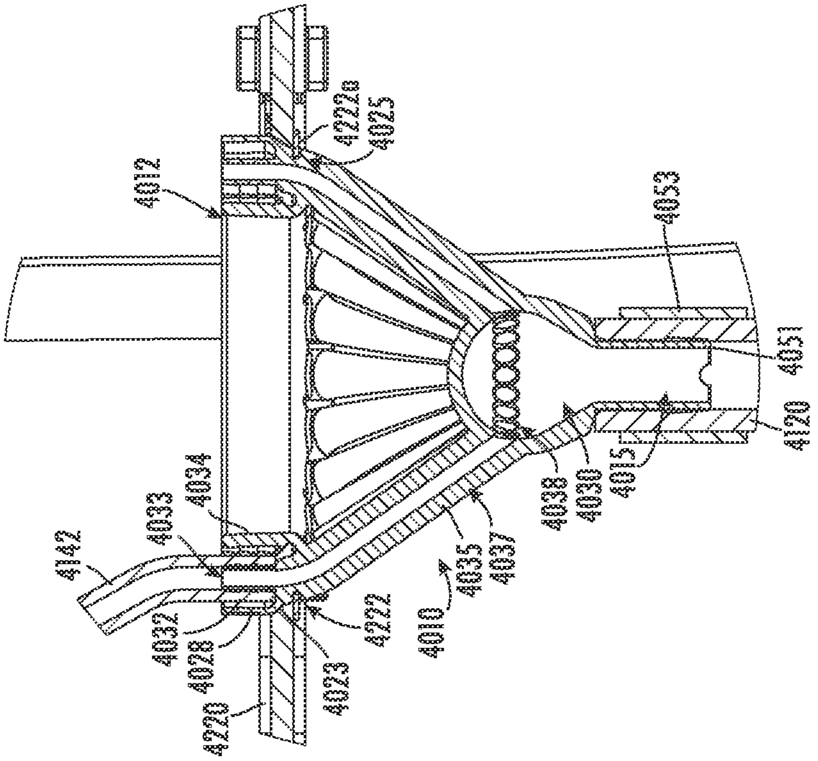
FIG. 69 is an enlargement of a portion of the fluid distribution system of FIG. 68.
Figure 68:
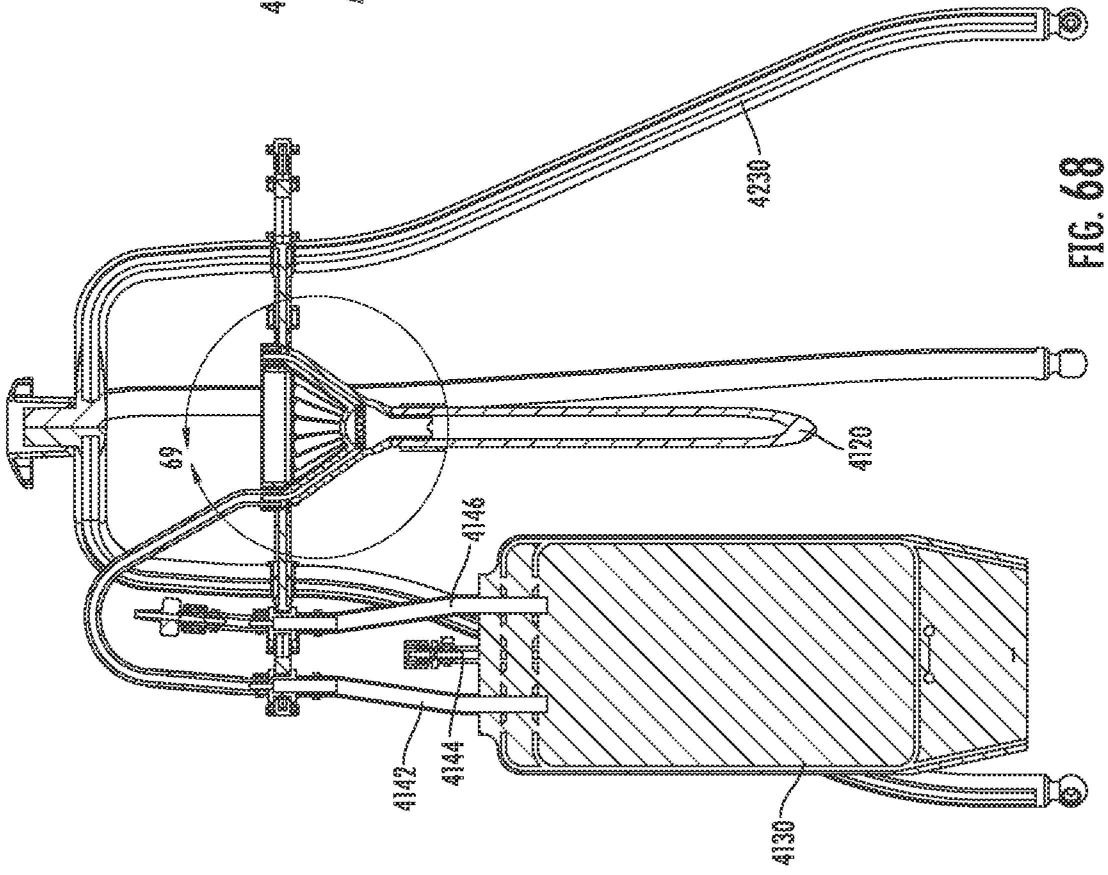
FIG. 68 is a vertical cross-sectional view of the fluid distribution system of FIG. 62 taken through the center of the vessel.

Referring now to FIGS. 68 and 69, the construction of the hub 4010 is detailed in accordance with the present disclosure. The hub 4010 is a single piece, i.e., of monolithic construction, but may be referred to as a hub assembly and/or as a junction. The hub 4010 may be molded, formed from an additive manufacturing process, thermoforming process, casting process, or injection molding process. For example, the hub 4010 may be three-dimensionally printed. The hub 4010 may be monolithically formed. In some embodiments, the hub 4010 may be sterilized after being packaged for shipping. For example, gamma irradiation can be used to terminally sterilize the entire product assembly and packaging material.

The hub 4010 includes a distribution cap or end 4012 and an input cap or end 4015. The input end 4015 includes an inlet 4051 defined therethrough and is configured to receive the input tube 4120 thereabout. A clip or clamp 4053 may be received about the input tube 4120 and the input end 4015 to secure the input tube 4120 about the input end 4015.

Between the input end 4015 and the distribution end 4012 the hub 4010 defines a plenum 4030 that is in fluid communication with the inlet 4015 and outlets 4033 of the distribution end 4012 as described below. The plenum 4030 may have a diameter larger than the inlet 4051 and be in the form of a bulb or pear shaped. The plenum 4030 is sized and dimensioned such that pressure of fluid flowing through the inlet 4051 is substantially constant or equalized before flowing through the outlets 4033 as described below.

The distribution end 4012 of the hub 4010 includes a plurality of tube connectors 4032 that each define an outlet 4033. Each of the tube connectors 4032 is sized and dimensioned to receive and secure an end of one of the inflow conduits 4142 of the vessels 4130. The conduit connectors 4032 may be barbed such that when an end of the inflow conduit 4142 is slid over the conduit connector 4032, the barbs secure the end of the inflow conduit 4142 and prevent the inflow conduit 4142 from disconnecting or separating from the conduit connector 4032. In some embodiments, the conduit connectors 4032 include retention features other than barbs, e.g., annular ribs, etc.

When the inflow conduit 4142 is secured to the conduit connector 4032, the plenum 4030 is in fluid communication with a main volume of a respective one of the vessels 4130. The distribution end 4012 may include an inner wall 4034 and an outer wall 4028 that define an annular recess 4036 between the inner and outer walls 4034, 4028. The inner wall 4034 may substantially form a circle in a plane parallel to the holding disc 4220. The outer wall 4028 may form a scalloped circle (FIG. 64) in the plane parallel to the holding disc 4220. The outer wall 4028 may form a rim 4023 that is configured to be received within the hub opening 4222. The hub opening 4222 may define a sloped or angled surface that is configured to complement the rim 4023 to secure the hub 4010 within the hub opening 4222. The hub opening 4222 may define a scalloped shape to complement the scalloped circle of the outer wall 4028. In some embodiments, a lower portion of the rim 4023 defines an annular groove 4025 in the outer surface thereof that is configured to receive a retainer 4222*a* of the holding disc 4220 to retain or secure the hub 4010 relative to the holding disc 4220.

The hub 4010 includes a plurality of conduits 4035 that extend from the plenum 4030 to each of the outlets 4033 to define an output lumen 4037 there between. Each conduit 4035 includes a plenum opening 4038 that provides communication between plenum 4030 and the output lumen 4037 such that the output lumen 4037 fluidly connects the plenum 4030 with a respective outlet 4033. The plenum openings 4038 form a ring with one another at the plenum 4030 with the conduits 4035 forming a substantially conical shape as the conduits 4035 extend from the plenum 4030 to the outlets 4033. As shown, the hub 4010 includes twenty conduits 4035 to allow for the single inlet 4051 to flow to twenty outlets 4033. In some embodiments, the hub 4010 may include less than twenty outlets 4033, e.g., five, eight, ten, twelve, or may include more than twenty outlets 4033.

With reference briefly back to FIG. 67, the fluid distribution system 4001 includes reusable parts, e.g., the frame assembly 4200 including the holding disc 4220 and the legs 4230, and single use elements, e.g., the vessels 4130, the hub 4010. The use of reusable parts may allow for a reduction in costs compared to systems consisting entirely of single use elements. One or more elements of the fluid distribution system 4001 can be replaced with alternative elements to allow for use of different vessels, e.g., vessels 4130, a different number of vessels, etc.

Figure 70:
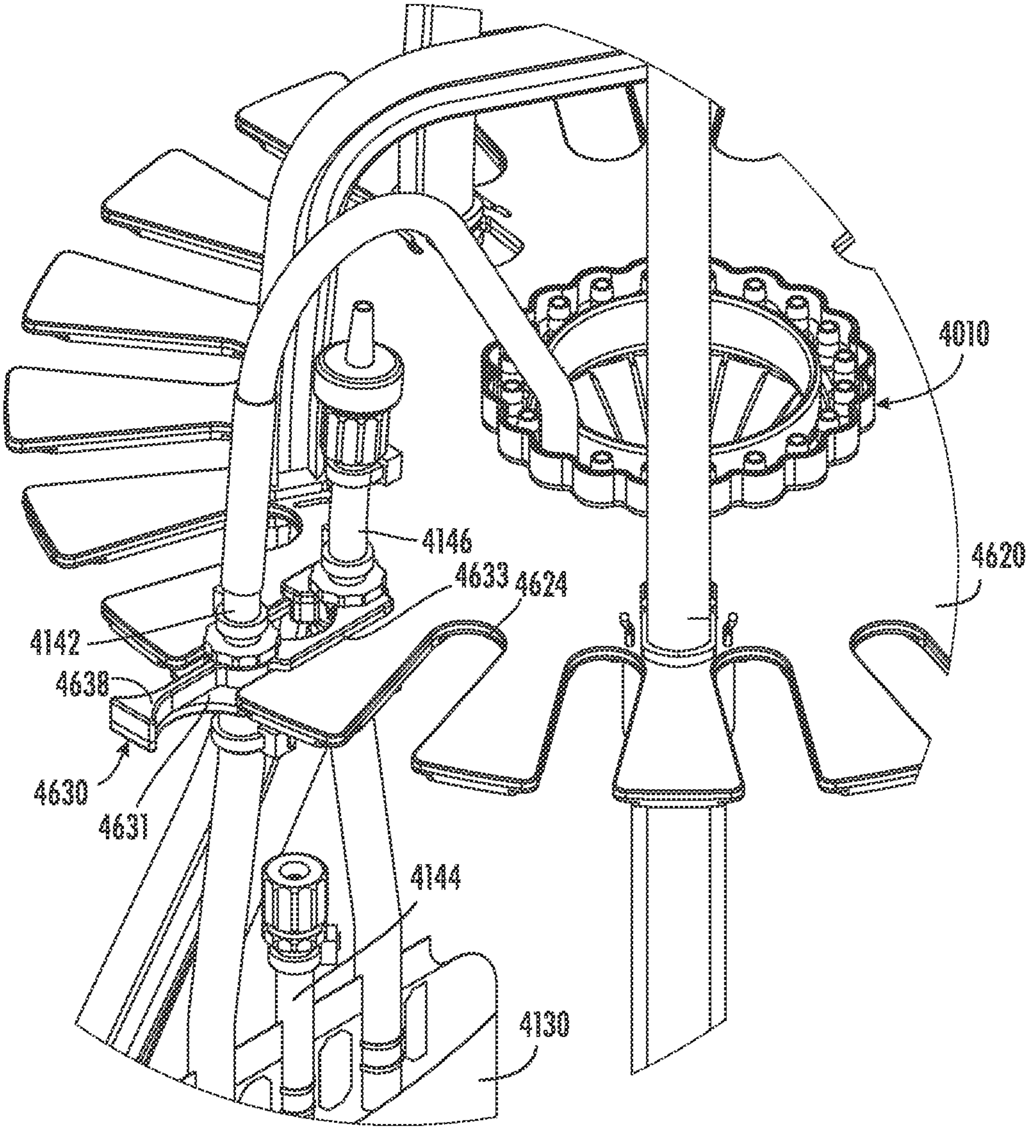
FIG. 70 is a top perspective view of a portion of another holding disc provided in accordance with the present disclosure used with the fluid distribution system of FIG. 62.
Figure 71:
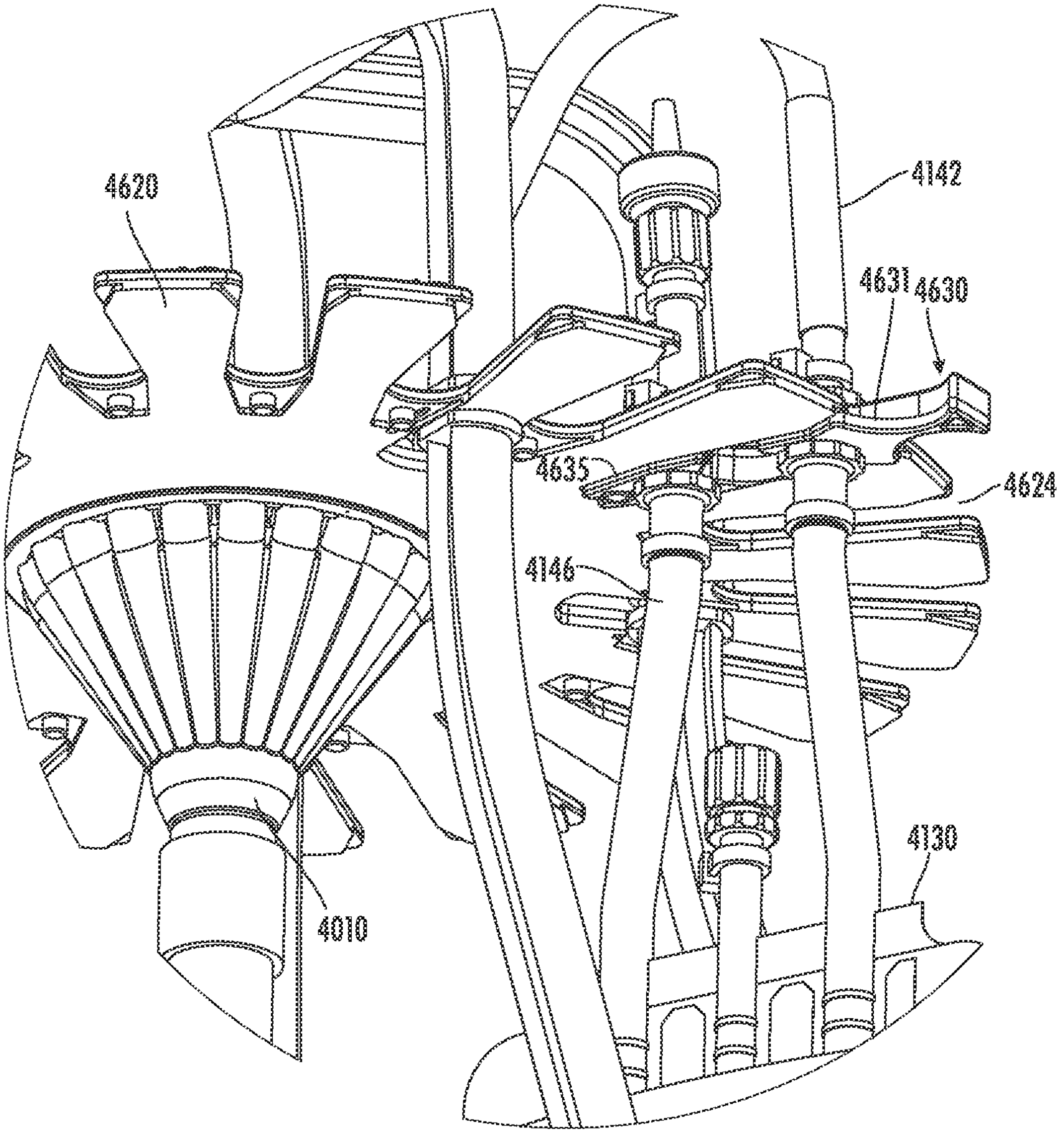
FIG. 71 is a bottom perspective view of a portion of the holding disc of FIG. 70.

With reference to FIGS. 70 and 71, the fluid distribution system 4001 includes another holding disc 4620 provided in accordance with the present disclosure. The holding disc 4620 is similar to the holding disc 4220 detailed above such that like elements will not be detailed for brevity.

The holding disc 4620 defines a plurality of vessel slots 4624 that are each configured to receive and suspend a vessel 4130 from the holding disc 4620. Specifically, each vessel slot 4624 is configured to receive a vessel clip 4630 that retains the inflow conduit 4142 and the vent 4146 of the vessel 4130 within a body 4631 thereof. The vessel clip 4630 includes the body 4631 and a tongue 4638. The body 4631 retains the inflow conduit 4142 and the vent 4146 and is received within the vessel slot 4624 of the holding disc 4620. The tongue 4638 extends from an outer circumference of the holding disk 4620 when the body 4631 is received within the vessel slot 4620 to provide a grip or tab for a user to engage to insert or remove the vessel 4130 relative to the holding disc 4620. The body 4631 may form a friction fit with the holding disc 4620 to secure the vessel 4130 to the holding disc 4620. In some embodiments, the body 4631 includes an upper flange 4633 and a lower flange 4635 that form a channel there between. The channel formed between the upper and lower flanges 4633, 4635 may be slightly smaller than a thickness of the holding disc 4620 such that the upper and lower flanges 4633, 4635 frictionally engage the holding disc 4620 to suspend the vessel 4130 from the holding disc 4620 and to prevent inadvertent separation of the vessel clip 4630 from the holding disc 4620.

The vessel clip 4630 may be assembled with the vessel 4130 by a manufacturer of the vessel 4130 such that labor to load and unload a plurality of vessels 4130 into a holding disc 4620 can be reduced when compared to the holding disk 4220 detailed above. The pre-assembly of the vessel clip 4630 with each vessel 4130 may also improve positioning of the vessels 4130 relative to the hub 4010 when loaded in the holding disc 4620 by reducing the number of steps and possible errors of loading the vessels 4130.

Figure 72:
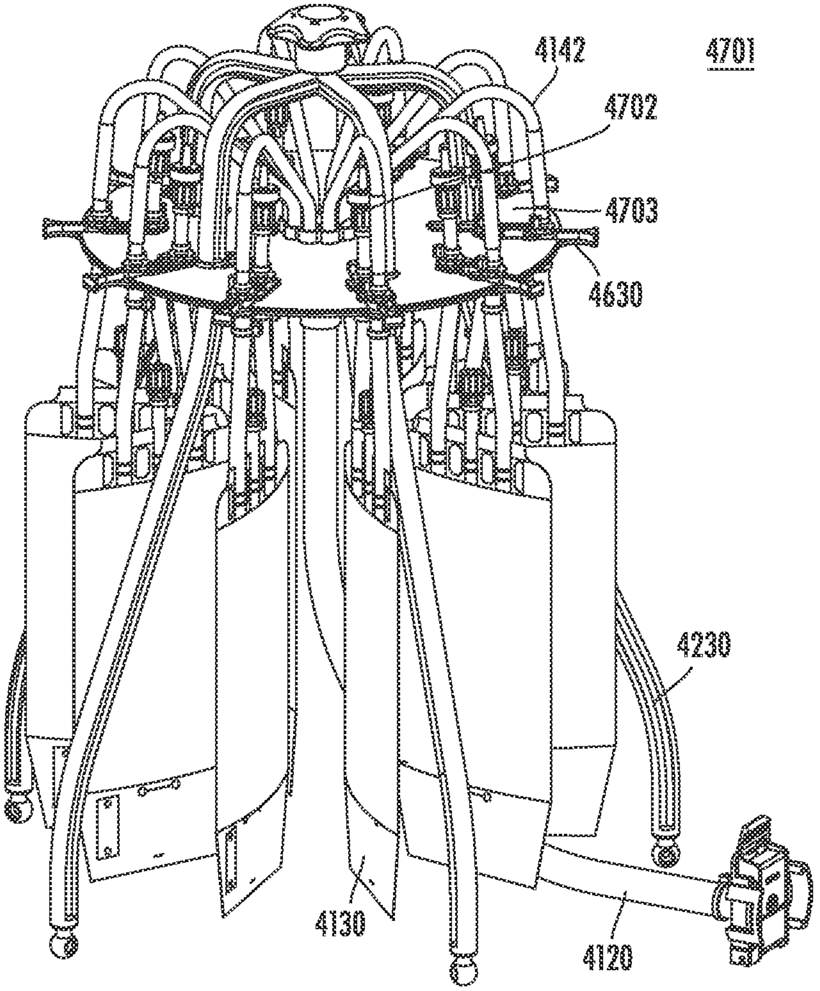
FIG. 72 is a perspective view of another fluid distribution system provided in accordance with the present disclosure.

With reference to FIG. 72, another fluid distribution system 4701 is provided in accordance with the present disclosure. The fluid distribution system 4701 includes a hub 4702 similar to the hub 4010 detailed above with a single inlet in fluid communication with the input tube 4120 and ten outlets each in fluid communication with an inflow conduit 4142 of a respective vessel 4130. The fluid distribution system 4701 also includes a holding disc 4703 with ten vessel slots with each vessel slot receiving a vessel clip 4630 to suspend a vessel 4130 from the holding disc 4703.

Figure 73:
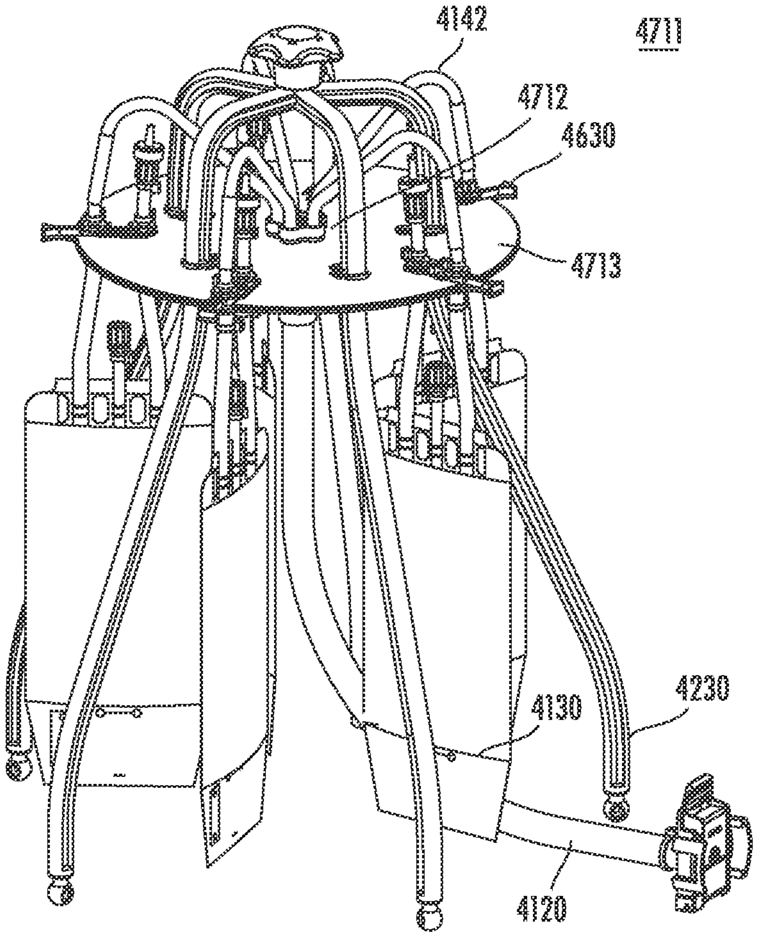
FIG. 73 is a perspective view of another fluid distribution system provided in accordance with the present disclosure.

Referring now to FIG. 73, another fluid distribution system 4711 is provided in accordance with the present disclosure. The fluid distribution system 4711 includes a hub 4712 similar to the hub 4010 detailed above with a single inlet in fluid communication with the input tube 4120 and five outlets each in fluid communication with an inflow conduit 4142 of a respective vessel 4130. The fluid distribution system 4711 also includes a holding disc 4713 with five vessel slots with each vessel slot receiving a vessel clip 4630 to suspend a vessel 4130 from the holding disc 4713.

Figure 74:
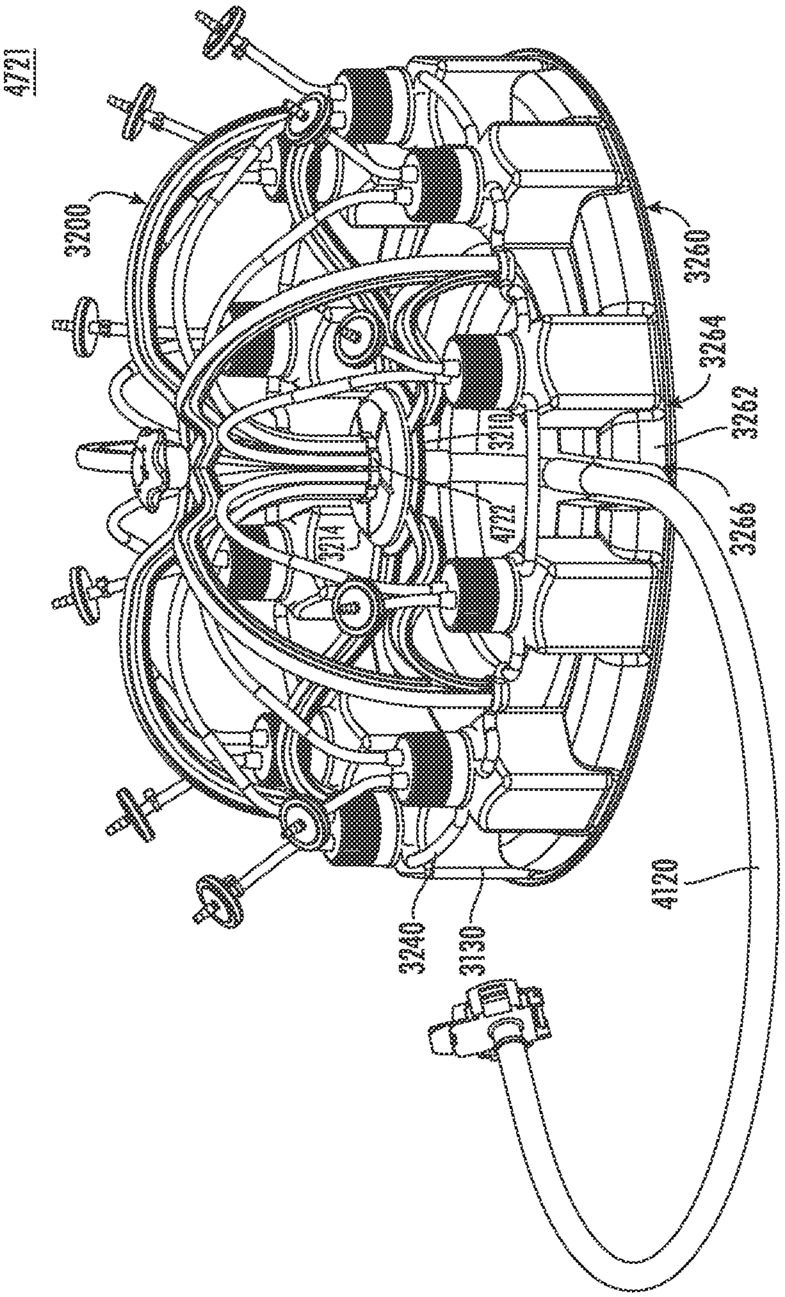
FIG. 74 is a perspective view of another fluid distribution system provided in accordance with the present disclosure.
Figure 76:
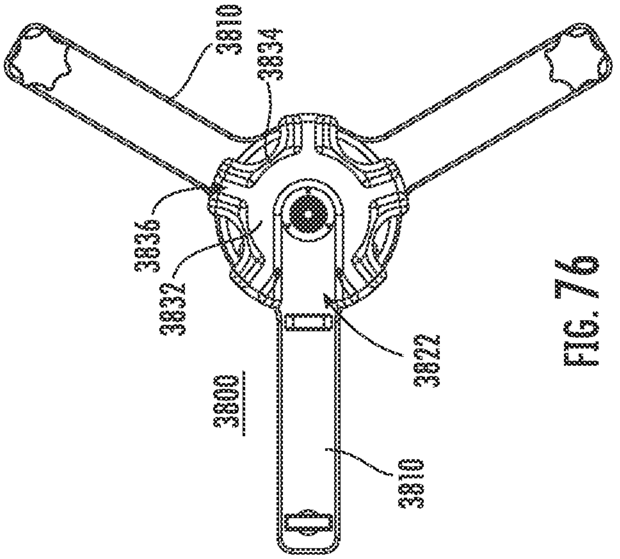
FIG. 76 is a top view of the stand of FIG. 75.
Figure 77:
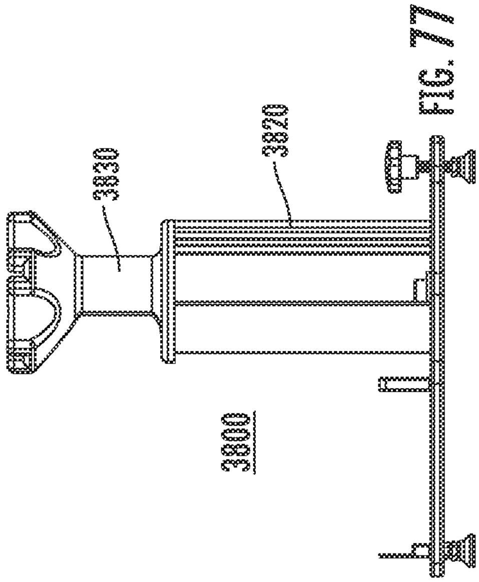
FIG. 77 is a side view of the stand of FIG. 75.
Figure 75:
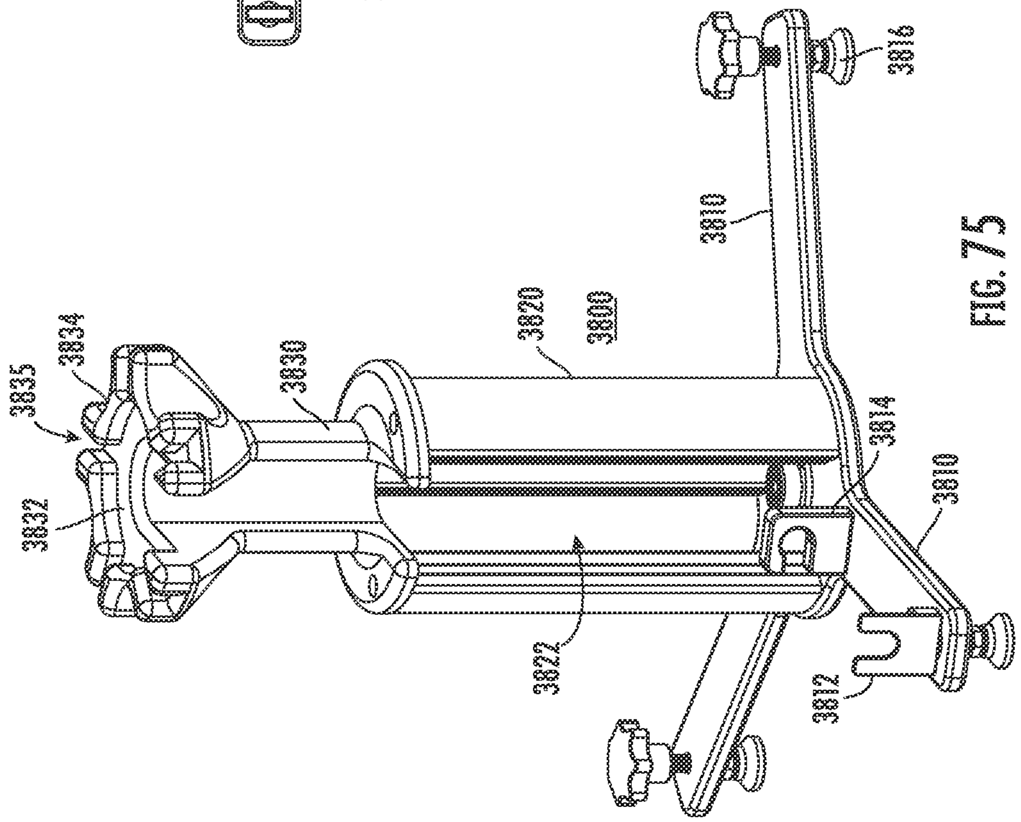
FIG. 75 is a perspective view of a reusable stand provided in accordance with the present disclosure.

Referring now to FIG. 74, another fluid distribution system 4721 is provided in accordance with the present disclosure. The fluid distribution system 4721 includes a hub 4722 similar to the hub 4010 detailed above with a single inlet in fluid communication with the input tube 4120 and ten outlets each in fluid communication with an inflow tube 3142 of a respective vessel 3130. The fluid distribution system 4721 also includes a frame assembly 3200 that is configured to retain the vessels 3130 relative to the hub 4722. The frame assembly 3200 may include an insert 3214 that receives the hub 4722 in a similar manner to the holding disc 4220 detailed above such that the hub 4722 is supported by the support collar 3210 of the frame assembly 3200.

The frame assembly 3200 may include a plate 3260 that is configured to rest on a fixed surface and support a lower portion of each of the vessels 3130 to retain the vessels 3130 relative to the hub 4722. The plate 3260 may include dividers 3262 that form receptacles 3264 that are sized to receive a bottom portion of each of the vessels 3130. The plate 3260 may define a tube slot 3266 that is configured to receive the input tube 4120. The tube slot 3266 may be required when the vessels 3130 are small, e.g., 125 mL, due to a small clearance between the vessel collar 3240 and the plate 3260. The tube slot 3266 may be omitted when the vessels 3130 are large, e.g., 1000 mL, due to an increased clearance between the vessel collar 3240 and the plate 3260.

Referring now to FIGS. 75-79, a reusable stand 3800 is provided in accordance with the present disclosure. The stand 3800 includes legs 3810, a vertical cylinder 3820, and a collar holder 3830. As shown, the stand 3800 includes three legs 3810 that extend radially outward and are equally spaced from one another. In some embodiments, the stand includes more than three legs 3810, e.g., four, five, or six legs. The legs 3810 are configured to support the stand 3800 and level the stand 3800. For example, when a fixed surface is not level, the stand 3800 may be leveled such that a hub supported by the stand 3800 is level. Each leg 3810 may include a foot 3816 that supports the leg 3810 on a fixed surface. The feet 3816 may be adjustable to assist in leveling the stand 3800. One of the legs 3810 may include one or more tube guides 3812, 3814 that are configured to receive an input tube, e.g., input tube 4120.

The vertical cylinder 3820 extends upward from the legs 3810 and defines a slot 3822. When one of the legs 3810 includes the tube guides 3812, the slot 3822 is aligned with the leg 3810 including the tube guides 3812. The slot 3822 allows an input tube to be inserted into a hub without encumbrances.

The collar holder 3830 extends upward from the vertical cylinder 3820 and is configured to support the support collar 3210 of a frame assembly 3200 as detailed below. The collar holder 3830 includes a collar shelf 3832, a retainer wall 3834, and arm channels 3836 defined through the retainer wall 3834. The collar shelf 3832 is sized to receive a support collar of a frame assembly, e.g., support collar 3210. The collar shelf 3832 is sized and dimensioned to complement the support collar while allowing a hub received within the support collar to pass through the collar shelf 3832. The retainer wall 3834 extends upward from an outer circumference of the collar shelf 3832 and is configured to retain the support collar on the collar shelf 3832. The arm channels 3836 are each configured to receive a lower arm of the frame assembly, e.g., lower arms 3220, to clock or rotatably fix the frame assembly 3200 relative to the stand 3800.

Figure 80:
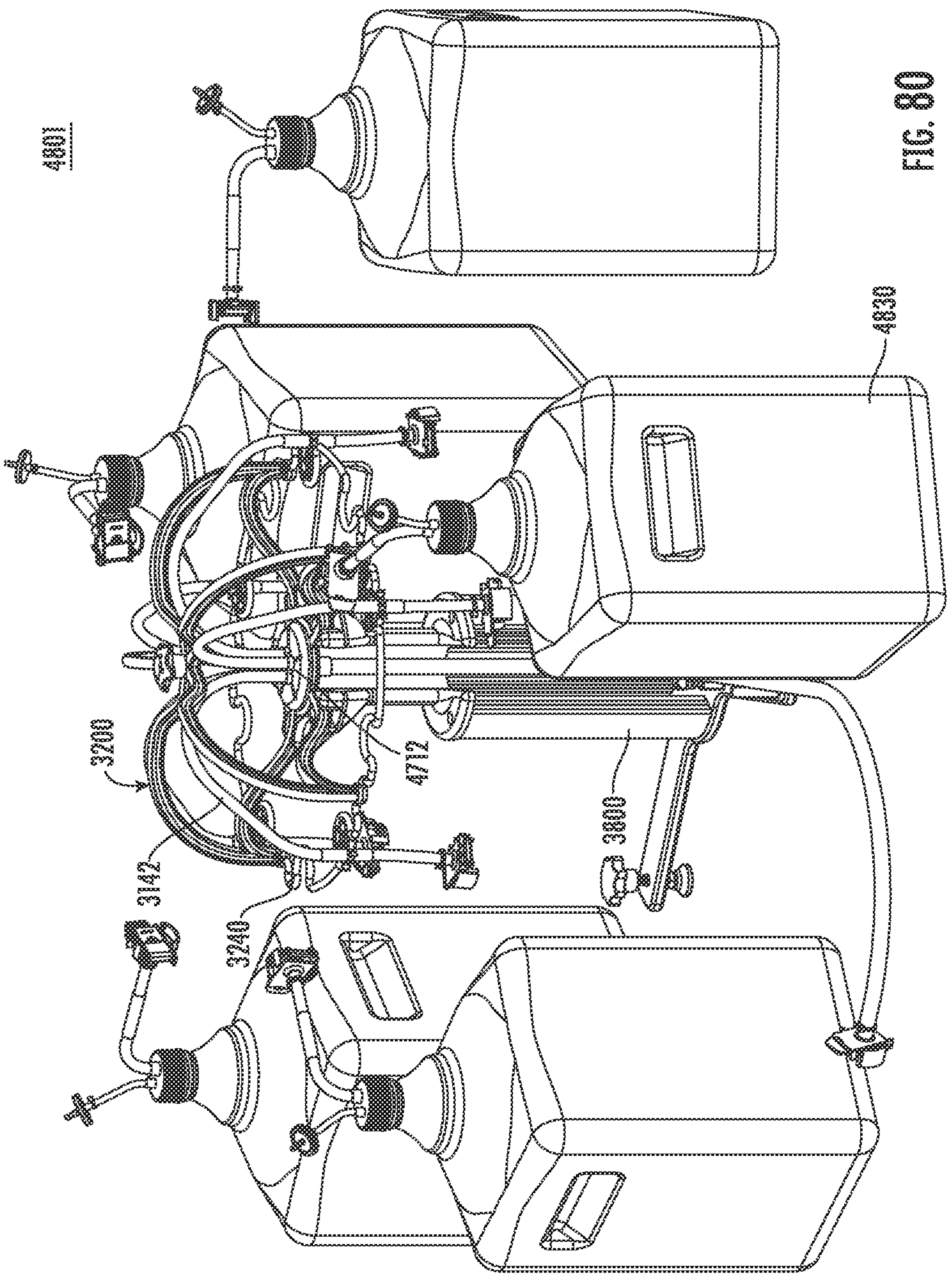
FIG. 80 is a perspective view of another fluid distribution system provided in accordance with the present disclosure.

The stand 3800 may be used with a variety of vessels and hubs. For example, the vertical cylinder 3820 may be adjustable or telescoping to accommodate vessels of varying height. In some embodiments, the vertical cylinder 3820 may be replaceable to match a height of the vessels. In some embodiments, the stand 3800 may be used with a holding disc that is configured to suspend the vessels. In addition, the stand 3800 may be used with a hub having any number of outlets, e.g., five, ten, or twenty outlets. With particular reference to FIG. 80, the stand 3800 may be used in a fluid distribution system 4801 with very large vessels 4830, e.g., 20 L vessels, that are similar to the vessels 3130 but rest on the fixed surface instead of being supported by the frame assembly 3200. In such embodiments, the frame assembly 3200 supports the hub 4712. The frame assembly 3200 maintains the position and arc of the inflow conduits 3142 such that fluid flows equally to each of the vessels 4830 as detailed above with respect to method 3700.

Figure 81:
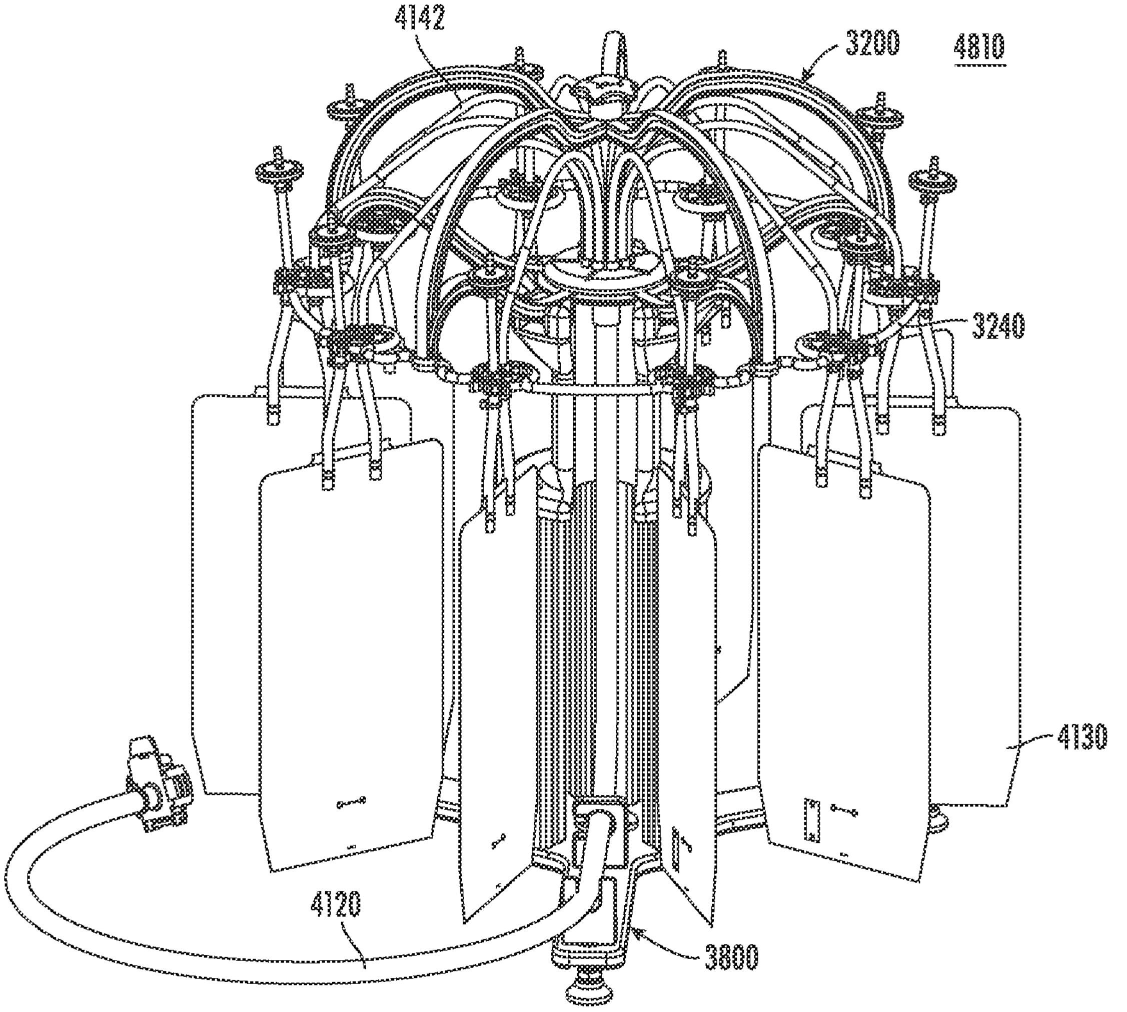
FIG. 81 is a perspective view of another fluid distribution system provided in accordance with the present disclosure.
Figure 82:
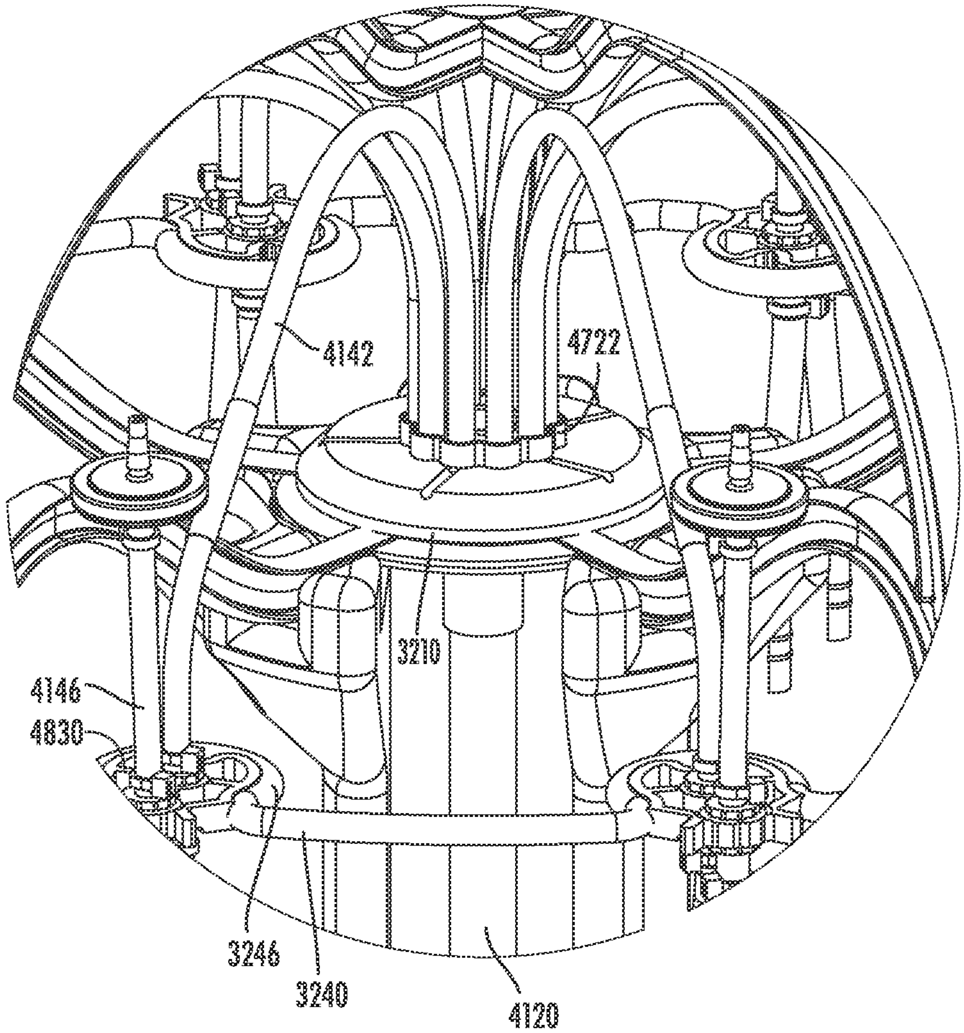
FIG. 82 is an enlarged view of a portion of the fluid distribution system of FIG. 81.

Referring now to FIGS. 81 and 82, another fluid distribution system 4810 is provided in accordance with the present disclosure. The fluid distribution system 4810 includes a stand 3800, a frame 3200, a hub 4722, and vessels 4130. The stand 3800 supports the support collar 3210 that holds the hub 4722. The hub 4722 includes ten outlets that distribute fluid to the inflow conduits 4142 of the vessels 4130. The vessels 4130 are in the form of bags that are suspended from the vessel collar 3240. To suspend the vessels 4130 from the vessel collar 3240, each vessel 4130 is provided with a clip 4830 that is configured to releasably engage a vessel receiver 3246 of the vessel collar 3240. The clip 4830 is similar to the clips 4630 detailed above and vertically fix the inflow conduit 4142 and the vent 4146 of a respective vessel 4130 to suspend the vessel 4130 from the vessel collar 3240.

Referring briefly back to method 3700 detailed with respect to FIG. 61, any of the fluid distribution systems detailed herein including, but not limited to, fluid distribution systems 3001, 4001, 4701, 4711, 4721, 4801, 4810, may practice method 3700. For example, with respect to fluid distribution system 4001 of FIG. 67, the input tube 4120 may be connected to a primary vessel (not shown) and a pump used to flow fluid through the hub 4010 such that fluid is distributed equally to each of the twenty vessels 4130. After the fluid is distributed to each of the twenty vessels 4130, the sleeves 4148 may be severed and the vessels 4130 may be used to dispense the fluid through the outflow conduits 4144.

Further, as detailed with respect to method 3700, fluid flow may be reversed such that fluid flows from the multiple vessels, e.g., vessels 4130, back through the input tube 4120 into a vessel attached thereto. This may be used to mix an equal amount of each fluid into a single vessel.

In addition, while several fluid distribution systems have been detailed herein with specific combinations of elements including stands (e.g., stand 3800), frames (e.g., frame assembly 3200, 4200), vessels (e.g., vessels 3130, 4130, 4830), and hubs (e.g., hubs 3010, 4010, 4702, 4712, 4722) this should not be seen as limiting such that other combinations of elements disclosed herein to form a fluid distribution system is within the scope of this disclosure.

The fluid distribution systems detailed herein may be suitable for use in conveying liquids, mixtures, or suspensions during the manufacture of biopharmaceutical and pharmaceutical products in an aseptic manner. The fluid distribution systems detailed herein are intended to provide aseptic fluid distribution. The fluid distribution systems detailed herein are not particularly limited to use in pharmaceutical development or manufacturing.

The conduits or tubes detailed herein, e.g., input tube 3120, inflow conduits 3142, outflow conduits 3144, distribution conduits 3160, input tube 4120, inflow conduits 4142, or outflow conduits 4144, may be flexible conduits suitable for use in medical or pharmaceutical environments. The conduits may be constructed of a thermoset or a thermoplastic polymer. If a thermoset is used, silicones, polyurethanes, fluoroelastomers or perfluoropolyethers may be used for the conduits. If a thermoplastic is used, C-Flex® tubing, block copolymers of styrene-ethylene-butylene-styrene, PureWeld, TuFlux® TPE, PVC, polyolefins, polyethylene, blends of EPDM and polypropylene (such as Santoprene™) may be used as construction materials. Semi-rigid thermoplastics including, but not limited to, fluoropolymers PFA, FEP, PTFE, THV, PVDF and other thermoplastics, such as polyamide, polyether sulfone, polyolefins, polystyrene, PEEK, also can be used in one or more portions or sections of the conduits to render them flexible. The conduits may have various inner and outer diameters depending on the intended use of the fluid distribution system 3001.

The vessels detailed herein may include, but are not limited to, containers, beakers, bottles, canisters, flasks, bags, receptacles, tanks, vats, vials, conduits, syringes, carboys, tanks, pipes and the like that are generally used to contain liquids, slurries, and other similar substances. The vessels may be closed by a MYCAP™, available from Sartorius Stedim North America. The conduits may terminate in components or vessels that include other aseptic connectors or fittings such as an AseptiQuik® connector available from Colder Products Company of St. Paul Minnesota, an OPTA® aseptic connector available from Sartorius Stedim North America, a ReadyMate® connector available from GE Healthcare of Chicago, Illinois, or other terminus such as syringes, centrifuge conduits, or a plug.

Components of the hub assembly 3010 and the frame assembly 3200 may include thermoplastics such as polyolefins, polypropylene, polyethylene, polysulfone, polyester, polycarbonate, and glass filled thermoplastics. The hub assembly 3010 and the frame assembly 3200 may also be made from thermosets such as epoxies, pheonolics, silicone, copolymers of silicone and novolacs. Other suitable materials may include polyamide, PEEK, PVDF, polysulfone, cyanate ester, polyurethanes, MPU100, CE221, acrylates, methacrylates, and urethane methacrylate. Yet metallic materials, such as stainless steel, aluminum, titanium, etc., or ceramics, such as aluminum oxide, may be used. The present disclosure however is not limited to a junction made from any particular material(s) and any suitable materials or combinations thereof may be used without departing from the scope of the present disclosure.

Additive manufacturing techniques may allow for the creation of structures that may not be capable of being manufactured with traditional molding or machining steps. These structures can lead to a reduction in packaging space and a reduction in components, which can help to reduce leak points and reduce the costs of assembling the fluid distribution systems detailed herein, e.g., fluid distribution system 3001, 4001, 4810. For example, the distribution cap 3012 or the input cap 3015 may be manufactured using additive manufacturing techniques, e.g., three-dimensional printing.

In some embodiments, components of the fluid distribution systems detailed herein may be surface treated to affect appearance, hydrophobicity, and/or surface roughness. In bioprocesses particularly, minimizing surface roughness may minimize the potential for trapped bacteria. Examples of surface treatment can include metalizing with electroless nickel, copper, or other metal to fill in surface pits. A metalized surface may also improve adhesion and allow for inductive heating. In another example, components of the fluid distribution system 3001 can be coated with an inorganic material, such as oxides of silicon (glass or glass like) or coated with organometallic materials. Silane coupling agents can be applied to the surface to change the surface hydrophobicity. If metallic, components of the fluid distribution system 3001 can be electropolished to improve surface roughness. The components of the fluid distribution system 3001 further can be polished using paste abrasives, such as paste abrasives available from Extrude Hone, LLC of Irwin, Pennsylvania.

The cast seals detailed herein may be constructed from a self-leveling, pourable silicone such as room-temperature-vulcanizing ("RTV") silicone. The RTV silicone may be a two-component system (base plus curative) ranging in hardness from relatively soft to a medium hardness, such as from approximately 9 Shore A to approximately 70 Shore A. Suitable RTV silicones include Wacker® Elastocil® RT 622, a pourable, addition-cured two-component silicone rubber that vulcanizes at room temperature (available from Wacker Chemie AG), and Rhodorsil® RTV 1556, a two-component, high strength, addition-cured, room temperature or heat vulcanized silicone rubber compound (available from Bluestar Silicones). Both the Wacker® Elastocil® RT 622 and the Bluestar Silicones Rhodorsil® RTV 1556 have a viscosity of approximately 12,000 cP (mPa·s). The aforementioned silicones and their equivalents offer low viscosity, high tear cut resistance, high temperature and chemical resistance, excellent flexibility, low shrinkage, and the ability to cure a cast silicone seal at temperatures as low as approximately 24° C. (approximately 75° F.). The cast seal may also be constructed from dimethyl silicone or low temperature diphenyl silicone or methyl phenyl silicone. An example of phenyl silicone is Nusil MED 6010. Phenyl silicones are particularly appropriate for cryogenic applications. In some embodiments, the casting agent is a perfluoropolyether liquid. The perfluoropolyether liquid may be Sifel 2167, available from Shin-Etsu Chemical Co., Ltd. of Tokyo, Japan. In some instances, a primer may be used to promote bonding of the cast seal to the components of the fluid distribution system 3001. Suitable primers are SS-4155 available from Momentive™, Med-162 available from NuSil Technology, and Rodorsil® V-O6C available from Bluestar Silicones of Lyon, France.

Figure 85:
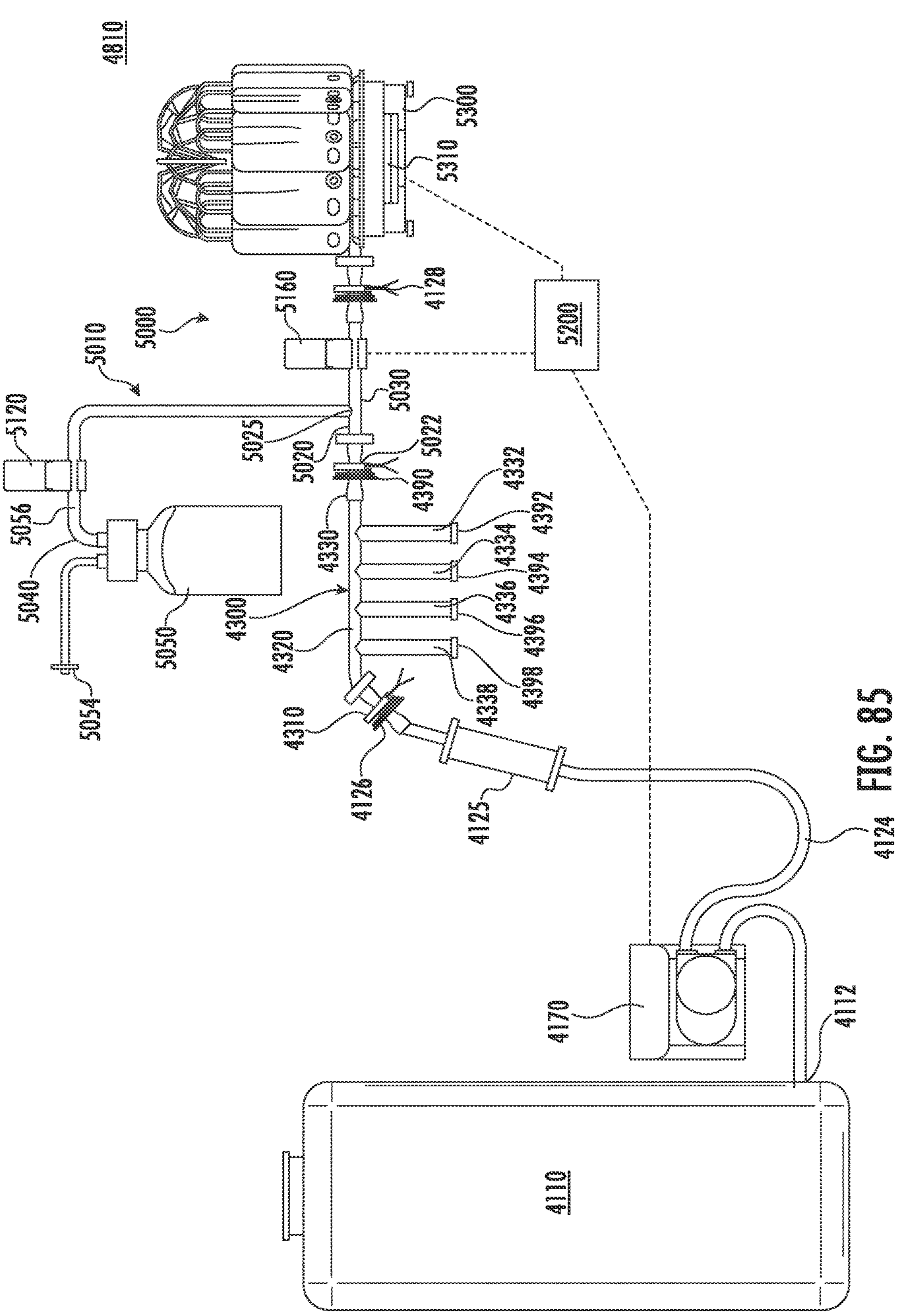
FIG. 85 is a perspective view of another fluid distribution system and a control system provided in accordance with an embodiment of the present disclosure.
Figure 86:
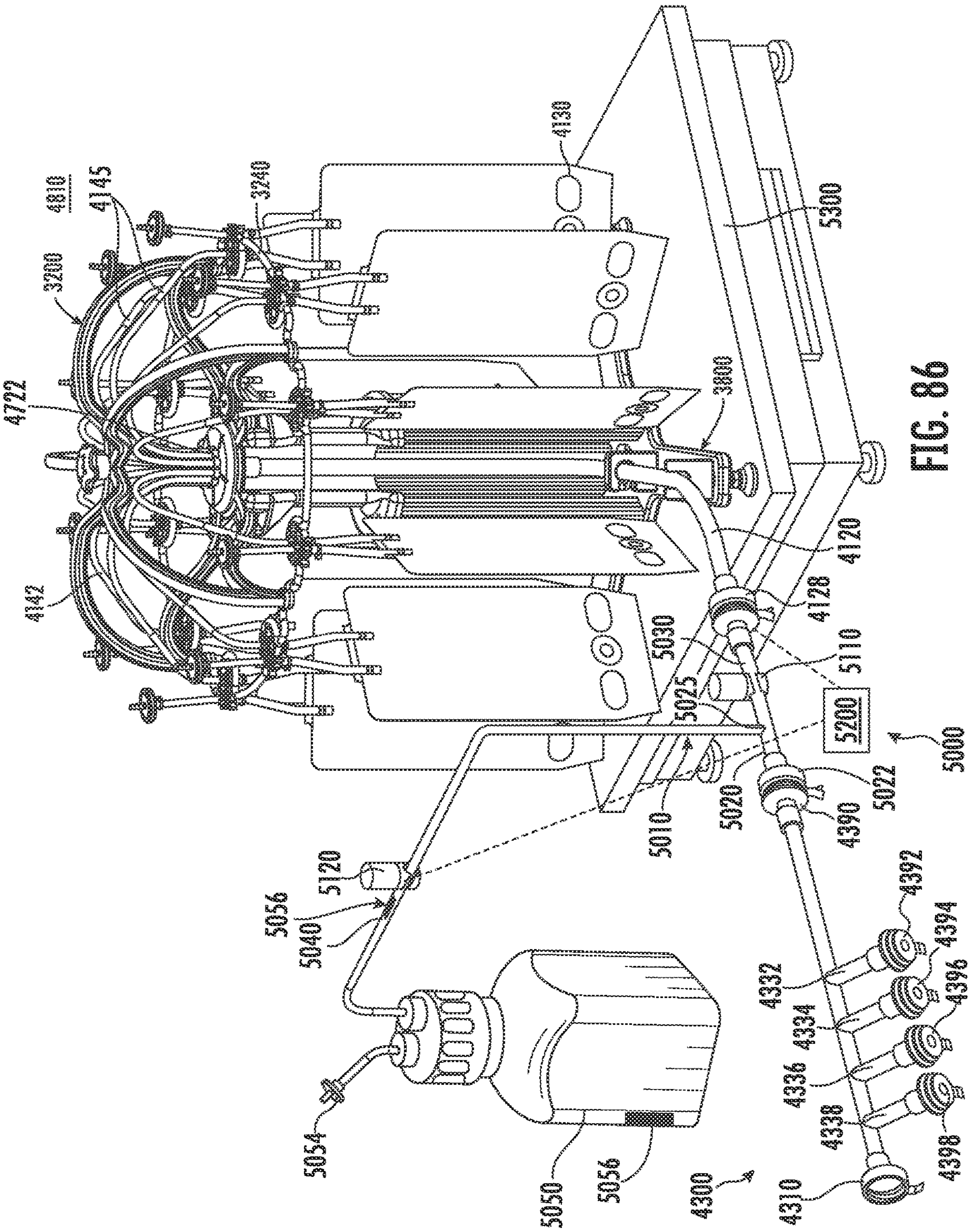
FIG. 86 is an enlarged view of a portion of the fluid distribution system and the control system of FIG. 85.
Figure 87:
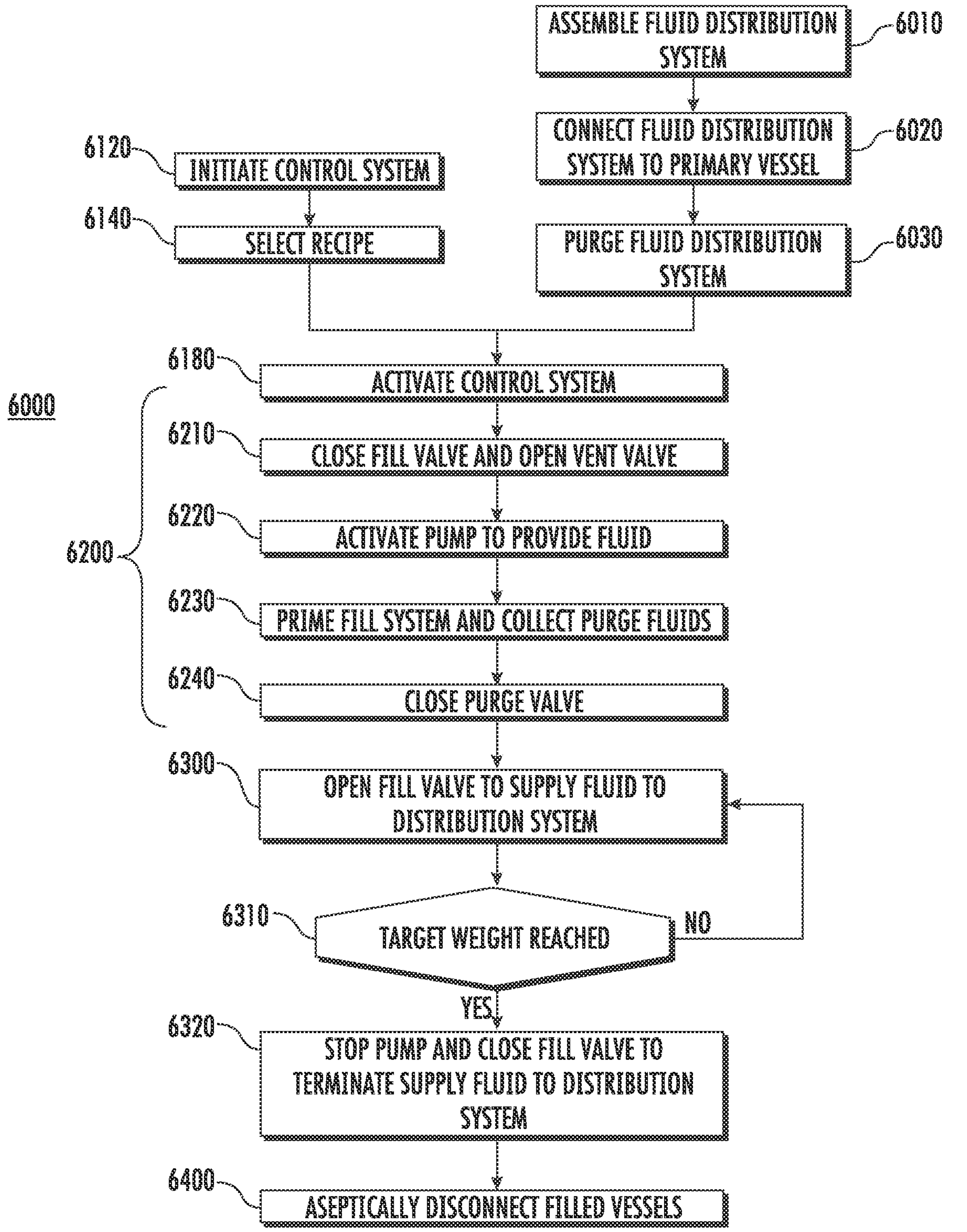
FIG. 87 is a flow chart of a method of priming a control assembly in accordance with an embodiment of the present disclosure.

Referring now to FIGS. 85 and 86, an exemplary control assembly 5000 is provided in accordance with the present disclosure. As shown, the control assembly 5000 is shown with the fluid distribution system 4810 which is detailed above. However, the control assembly 5000 may be used with any of the fluid distribution systems detailed herein. The fluid distribution system 4810 may include a stand 3800, a frame 3200, a hub 4722, and vessels 4130. The stand 3800 may be supported on a scale 5300 that measures a mass or weight of the fluid distribution system 4810. The scale 5300 may be used to determine an amount of fluid in the vessels 4130 as detailed below. In some embodiments, the primary vessel 4110 is supported on a scale, e.g., scale 5300, such that a mass or weight of media distributed can be measured by a loss of mass or weight as a result of removal of media from the primary vessel 4110.

As detailed above, a primary vessel 4110 includes an opening 4112 that is in fluid communication with a supply tube or feedline 4124 that may pass through a pump 4170 and terminating in a feedline tube terminus 4126. The feedline 4124 may include a filter 4125 that is configured to filter media or fluid flowing through the feedline 4124 from the primary vessel 4110. The feedline terminus 4126 may be connected to the control assembly 5000 or may be connected to a manifold 4300.

The manifold 4300 may include an inlet 4310 and a plurality of outlets 4390, 4392, 4394, 4396, 4398. The inlet 4310 and the outlets 4390, 4392, 4394, 4396, 4398 may include a male or female aseptic connector such as an AseptiQuik® connector available from Colder Products Company of St. Paul Minnesota, an OPTA® aseptic connector available from Sartorius Stedim North America, a ReadyMate® connector available from GE Healthcare of Chicago, Illinois. The manifold 4300 includes a trunk 4320 and a plurality of branches 4330, 4332, 4334, 4336, 4338. The trunk 4320 receives fluid from the inlet 4310 and distributes the fluid to each of the branches 4330, 4332, 4334, 4336, 4338 such that each of the outlets 4390, 4392, 4394, 4396, 4398 are in fluid communication with the inlet 4310. As shown, each of the branches 4330, 4332, 4334, 4336, 4338 have a substantially similar diameter. In some embodiments, one of the branches 4330 may be a vent branch that is configured to vent the feedline 4124 and the manifold 4300 before or after connection to a fluid distribution system 4810. In such embodiments, the vent branch 4330 may have a diameter that is smaller than the other branches.

With particular reference to FIG. 86, the control assembly 5000 includes a tube assembly 5010, a fill valve 5110, a purge valve 5120, and a controller 5200. The tube assembly 5010 includes an inlet tube 5020, a fill tube 5030, and a purge tube 5040. The inlet tube 5020 is fluidly connected with the feedline 4124 via a purge inlet 5022 such that the inlet tube 5020 is fluidly connected to the primary vessel 4110. As shown, the purge inlet 5022 fluidly connected to the outlet 4390 of the manifold to fluidly connect the feedline 4124 to the purge inlet 5022. In embodiments where the purge inlet 5022 is connected to an outlet of a manifold 4300, e.g., outlet 4390, the manifold 4300 may be physically positioned such that the outlet connected to the purge inlet 5022 is the highest point of the manifold 4300 such that gases trapped within the manifold 4300 rise to the purge inlet 5022 as the manifold 4300 fills with fluid.

The inlet tube 5020 is in fluid communication with the fill tube 5030 and the purge tube 5040. The tube assembly 5010 may include a junction 5025 that is in fluid communication with each of the inlet tubes 5020, the fill tube 5030, and the purge tube 5040. The fill tube 5030 is in fluid communication with an input tube 4120 of the fluid distribution system 4810 to provide fluid from the primary vessel 4110 to the fluid distribution system 4810. The fill tube 5030 and the input tube 4120 may connect to one another through any known aseptic connection 4126, e.g., an AseptiQuik® connector available from Colder Products Company of St. Paul Minnesota, an OPTA® aseptic connector available from Sartorius Stedim North America, a ReadyMate® connector available from GE Healthcare of Chicago, Illinois.

The purge tube 5040 is fluidly connected to a purge vent 5054. The purge tube 5040 may be fluidly connected to a purge vessel 5050 such that fluid flowing through the purge tube 5040 flows into the purge vessel 5050 and gases that flow into the purge vessel 5050 can exit through the purge vent 5054. The purge vessel 5050 may be a bottle, a bag, a tube, or a vessel. The purge vessel 5050 may include one or more sensors 5056 to detect fluid, a fluid level, an absence of air, or a mass of fluid within the purge vessel 5050. The tube assembly 5010 may maintain an aseptic environment for fluid flowing from the primary vessel 4110 to the vessels 4130. The direction of flow from the primary vessel 4110 towards the tube assembly 5010 and the fluid distribution system 4810 may be referred to as downstream. Similarly, the direction of flow from the inlet tube 5020 towards the purge vessel 5050 may be referred to as downstream. Likewise, the direction opposite of downstream may be referred to as upstream.

The fill valve 5110 is disposed about the fill tube 5030 and is configured to control flow of fluid through the fill tube 5030. Specifically, the fill valve 5110 has a fully closed position in which the fill valve 5110 prevents flow of fluid through the fill tube 5030 into the input tube 4120 and has a fully open position in which the fill valve 5110 allows fluid through the fill tube 5030 into the input tube 4120 without obstruction. The fill valve 5110 may have a plurality of intermediate positions between the fully open and fully closed positions. The intermediate positions may be considered open or partially open positions. The fill valve 5110 is in signal communication with the controller 5200 such that the controller 5200 is capable of varying the position of the fill valve 5110.

The purge valve 5120 is disposed about the purge tube 5040 and is configured to control flow of fluid through the purge tube 5040. Specifically, the purge valve 5120 has a fully closed position in which the purge valve 5120 prevents flow of fluid through the purge tube 5040 into the purge vessel 5050 and has a fully open position in which the purge valve 5120 allows fluid through the purge tube 5040 into the purge vessel 5050 without obstruction. The purge valve 5120 may have a plurality of intermediate positions between the fully open and fully closed positions. The intermediate positions may be considered open or partially open positions. The purge valve 5120 is in signal communication with the controller 5200 such that the controller 5200 is capable of varying the position of the purge valve 5120.

The controller 5200 is configured to automatically purge the feedline 4124 and to fill the vessels 4130 with fluid from the primary vessel 4110. The controller 5200 is in signal communication with the fill valve 5110 and the purge valve 5120 to control the flow of fluid through the tube assembly 5010. The controller 5200 may be in fluid communication with the pump 4170 to control delivery of fluid from the primary vessel 4110 to the tube assembly 5010. The controller 5200 may also be in signal communication with the scale 5300 to determine a mass or a weight of the fluid distribution system 4810 which may include fluid within the vessels 4130.

The fill valve 5110 and the purge valve 5120 may be a pinch valve or a diaphragm valve. The fill valve 5110 and the purge valve 5120 may be any suitable valve such as a pneumatic pinch valve, proportional pinch valves, and solenoid pinch valves available from Norgren Ltd. of Lichfield, UK, Bio-Chem Valve™ Pinch Valves available from Bio-Chem of Boonton, NJ, or Diaphragm Valve available from GEMU® SUMONDO® of Germany.

In embodiments where the manifold 4300 includes a purge outlet, the control assembly 5000 may include a purge tube 5040 that extends directly from the purge inlet 5022 and flows to a purge vent 5054 with or without a purge vessel 5050. In such embodiments, the purge valve 5120 is disposed about the purge tube 5040 and the fill valve 5110 may be disposed about the feedline 4124, the trunk 4320, or one of the other branches 4332, 4334, 4336, 4338 to control flow of fluid into the fluid distribution system 4810. In certain embodiments, the control assembly 5000 may be provided without a fill valve 5110 with the flow of fluid from the primary vessel 4110 being controlled only by the activation and deactivation of the pump 4170. In the embodiments without a fill tube 5030, the fluid distribution system 4810 may be fluidly connected to one of the other branches 4332, 4334, 4336, 4338 after the feedline 4124 and manifold 4300 are purged of gases as detailed below.

With reference now to FIG. 86, a method 6000 of automatically filling vessels is described in accordance with an embodiment of the present disclosure with reference to the fluid distribution system 4810 and the control assembly 5000 of FIG. 85. The method 6000 may be embodied in non-transitory computer-readable storage medium that is executed on the controller 5200. The controller 5200 may include a processor and a memory with the method being stored within the memory and executed on the processor. In some embodiments, the controller 5200 may include an interface to receive instructions from a user or from another controller. In certain embodiments, the controller 5200 includes a control interface that is in wired or wireless connection with the fill valve 5110, the purge valve 5120, the pump 4170, and/or the scale 5300.

The control assembly 5000 is configured to remove gases from a supply or feed side including the feedline 4124, the manifold 4300, and the control assembly 5000 to prime the control assembly 5000 before providing or conveying fluid to the input tube 4120 of the fluid distribution system 4810. As detailed with respect to method 6000 below, the control assembly 5000 automatically primes by controlling the fill valve 5110 and the purge valve 5120 to remove gases from within the feedline 4124, the manifold 4300, and the control assembly 5000 before providing fluid to the fluid distribution system 4810. In some embodiments, the method 6000 may include priming a supply or feed side including a feedline 4124 and a control assembly 5000 without a manifold 4300.

The method 6000 may include assembling the fluid distribution system 4810 (Step 6010). Assembly of the fluid distribution system may include positioning a stand 3800 on a scale 5300, connecting vessels 4130 to inflow conduits 4142, securing the vessels 4130 in a frame 3200, and positioning a hub 4722 in the frame 3200 or the stand 3800. With the fluid distribution system 4810 assembled, the input tube 4120 of the fluid distribution system 4810 is connected to the fill tube 5030 of the control assembly 5000 (Step 6020). The connection between the input tube 4120 and the fill tube 5030 may be an aseptic connection. With the fluid distribution system 4810 connected to the control assembly 5000, the fluid distribution system 4810 may be manually purged of air (Step 6030). In some embodiments, the fluid distribution system 4810 may be purged of air before being connected to the fill tube 5030. In certain embodiments, the fluid distribution system 4810 may be connected to a branch 4332, 4334, 4336, 4338 of the manifold 4300 after the supply or feed side is primed by purging air from within the feed line 4124 and the manifold 4300.

Assembling the fluid distribution system 4810 may include connecting a feedline 4124 to a primary vessel 4110 and to the inlet tube 5020. The connections between the feedline 4124, the primary vessel 4110, and the inlet tube 5020 may be aseptic connections to prevent contamination of a fluid disposed within the primary vessel 4110. The feedline 4124 may be positioned in a pump 4170 to control or draw fluid from the primary vessel 4110 through the feed line 4124. When the fluid distribution system 4810 is assembled and in fluid communication with the primary vessel 4110, the fluid distribution system 4810 through the primary vessel 4110 form a closed aseptic system. The closed aseptic system may include a gas vent, e.g., purge vent 5154, to allow gases to be purged from within the system 4810.

When the fluid distribution system 4810 is assembled, the controller 5200 may be initialized (Step 6120). With the controller 5200 initialized, a recipe or program may be selected for filling the vessels 4130 (Step 6140). The recipe or program may be loaded into a memory of the controller 5200 or be selected on the scale 5300. With the fluid distribution system 4810 assembled and the controller initialized, the controller 5200 is activated (Step 6180).

When the controller 5200 is activated, the controller 5200 automatically purges the supply side of the system, e.g., upstream of the fill valve 5110 which may include the feedline 4124, the manifold 4300, and the tube assembly 5010 (Process 6200). To purge the supply side of the system, the controller 5200 closes the fill valve 5110 such that the fill tube 5030 is closed or occluded to prevent flow of fluid through the fill tube 5030 and opens the purge valve 5120 such that fluid may flow into the purge vessel 5050 (Step 6210). As shown in FIGS. 85 and 86, the purge valve 5120 may be physically positioned at a position higher than the fill valve 5110 such that air within the feedline 4124 and manifold 4300 flows to the inlet tube 5020 and the purge vessel 5050. With the fill valve 5110 closed and the purge valve 5120 open, the controller 5200 sends a control signal to activate the pump 4170 such that the pump 4170 provides fluid from the primary vessel 4110 to the tube assembly 5010 of the control assembly (Step 6220). In some embodiments, the controller 5200 sends a control signal to the scale 5300 to initiate the recipe such that the scale 5300 transmits a control signal to activate the pump 4170. As fluid is provided to the tube assembly 5010 gases, e.g., air, flow from within the tube assembly 5010 towards the purge vessel 5050. Gases within the inlet tube 5020, the fill tube 5030, and the purge tube 5040 flow towards and into the purge vessel 5050. The purge tube 5040 and the purge vessel 5050 may be positioned to encourage air to flow out of the inlet tube 5020 and the fill tube 5030 and into the purge tube 5040 and the purge vessel 5050. For example, the purge tube 5040 and the purge vessel 5050 may be positioned at an elevated position or height above the inlet tube 5020 and the fill tube 5030 such that gases within the inlet tube 5020 and fill tube 5030 flow into the purge tube 5040 and the purge vessel 5050. As fluid flows into the purge vessel 5050, gases may flow out of the purge vessel through a vent 5054.

The controller 5200 continues to keep the pump 4170 activated until the tube assembly 5010 is primed (Step 6230). The tube assembly 5010 is primed when the inlet tube 5020, the fill tube 5030, and the purge tube 5040 up to the purge valve 5120 are free of gases. The controller 5200 may be in signal communication with one or more sensors disposed within the tube assembly 5010 that detect gases or that detect fluid at positions within the tube assembly 5010. In some embodiments, the purge tube 5040 may include a fluid sensor 5056 before the purge valve 5120 and/or may include a fluid sensor 5056 after the purge valve 5120. When the fluid sensor 5056 detects fluid, the fluid sensor 5056 provides a signal to the controller 5200 indicative of fluid being at the fluid sensor 5056. The fluid sensor 5056 may be positioned in the purge tube 5040 or may be positioned in the purge vessel 5050 to detect fluid beyond the purge valve 5120. When the fluid sensor 5056 is positioned in the purge vessel 5050, the fluid sensor 5056 may be positioned to detect a predetermined amount of fluid within the purge vessel 5050. The predetermined amount of fluid within the purge vessel 5050 may be indicative of the tube assembly 5010 be free of gases up to the purge valve 5120. The predetermined amount of fluid within the purge vessel 5050 may be at least 50 mL and may be in range of 50 mL to 5L, e.g., 1.5 L or 2 L. When the controller 5200 receives a signal from the fluid sensor 5056 indicative of fluid detected by the fluid sensor 5056, the controller 5200 may close the purge valve 5120 such that any gases are prevented from flowing from the purge vessel 5050 towards the fill tube 5030 after priming. In certain embodiments, the fluid sensor 5056 may detect fluid by detecting a lack of gases. For example, when a fluid sensor 5056 downstream of the purge valve 5120 and upstream of the purge vessel 5050 detects a lack of gases within the purge tube 5040, the fluid sensor 5056 may provide a signal indicative of a lack of gases within the purge tube 5040 to the controller 5200.

In some embodiments, the controller 5200 may activate the pump 4170 for a predetermined amount of time to prime the tube assembly 5010. The predetermined amount of time may be sufficient to flow a volume of fluid equal to a volume of the tube assembly 5010 or a factor thereof. For example, the predetermined amount of time may be sufficient for the pump 4170 to provide a range of fluid from a factor of 0.5 or 50% to a factor of 2 or 200% of the volume of the tube assembly 5010 such that any gases within the tube assembly 5010 are evacuated from the tube assembly 5010 and into the purge vessel 5050 or the purge tube 5040 beyond the purge valve 5120. The predetermined amount of time may be minimized to prevent a loss or waste of media in the form of fluid from the primary vessel 4110. After the predetermined amount of time, the controller may close the purge valve 5120 such that any gases are prevented from flowing from the purge vessel 5050 towards the fill tube 5030 after priming.

In certain embodiments, the controller 5200 may activate the pump 4170 until it receives a signal from a fluid sensor and be limited by the predetermined amount of time in the event a signal is not received.

When the tube assembly 5010 is primed and the purge valve 5120 is closed (Step 6240), the controller 5200 may open the fill valve 5110 such that fluid flows from the primary vessel 4110 into the vessels 4130 via the distribution hub 4722 (Step 6300). When the fill valve 5110 is opened, the pump 4170 continues to provide fluid through the inlet tube 5020 which flows through the fill valve 5110 connected to the fill tube 5030 such that fluid is provided to the distribution hub 4722 via the input tube 4120 that is connected to the fill tube 5030. As detailed above, the distribution hub 4722 and the vessels 4130 are arranged such that an equal amount of fluid is simultaneously distributed to each of the vessels 4130.

Components of the fluid distribution system 4810, e.g., the distribution hub 4722, the frame 3200, and the stand 3800, may be supported on a scale 5300 such that an amount of fluid within the vessels 4130 may be determined by a change in mass or weight detected by the scale 5300. The controller 5200 may be in signal communication with the scale 5300 such that a prefill mass or weight is taken before the fill valve 5110 is opened. The controller 5200 may continue to receive signals from the scale 5300 when the fill valve 5110 is open indicative of the mass or weight of the components of the fluid distribution system 4810 on the scale including fluid received within the vessels 4130. The controller 5200 may compare the mass or weight with the prefill mass or weight and terminate flow when the mass or weight reaches a target mass or weight (Step 6320). The controller 5200 may terminate flow by deactivating the pump 4170 and/or closing the fill valve 5110. In certain embodiments, the controller 5200 may close the fill valve 5110 before sending a signal to deactivate the pump 4170. The target mass or weight may be included in the recipe provided to the controller 5200. In certain embodiments, the target mass or weight may be programmed into the scale 5300 and the scale 5300 may provide a signal to the controller 5200 when the target mass or weight is reached. In particular embodiments, the controller 5200 may send a tare signal to the scale 5300 before opening the fill valve 5110 such that the scale 5300 may zero before flow of fluid into the input tube 4120 is initiated such that the scale 5300 is capable of determining a target mass or weight based on the difference between the zero and a mass or weight. The controller 5200 keeps the fill valve 5110 open and the pump activated until the target weight is reached. In some embodiments, the primary vessel 4110 is disposed on a scale, e.g., scale 5300, such that the target mass or weight of media distributed is measured by a change in mass or weight of the primary vessel 4110 after the system is purged.

After the target mass or weight is reached, the controller 5200 closes the fill valve 5110 and deactivates the pump 4170 to terminate fluid flow from the primary vessel 4110. After flow is terminated from the primary vessel 4110, the vessels 4130 may be aseptically disconnected from the distribution hub 4722 and the frame 3200 (Step 6400). To disconnect the vessels 4130, a QUICKSEAL® 4145 associated with a respective vessel 4130 may be severed to aseptically seal an inlet conduit of the vessel 4130 to aseptically seal the vessel 4130 to disconnect the vessel 4130 from the distribution hub 4722 and to allow the vessel 4130 to be removed from the frame 3200.

When the vessels 4130 are removed, the fluid distribution system 4810 may be disconnected from the control assembly 5000. Portions of the fluid distribution system 4810 may be reused. For example, the frame 3200 and the stand 3800 may be reused. In some embodiments, the frame 3200 and the stand 3800 may be sterilized before being reused. The fluid distribution system 4810 may be disconnected from the control assembly 5000 by separating the supply tube terminus 4128 from the fill tube 5030. As detailed above, the supply tube terminus 4128 may include an aseptic connector such that the connection between the input tube 4120 and the control assembly 5000 remains aseptic before and after separation.

The fluid distribution system 4810 may be disconnected from the manifold 4300 or the control system 5000 before or after the vessels 4130 are disconnected from the fluid distribution system 4810. To maintain a closed system when disconnecting the fluid distribution from the manifold 4300 or the control system 5000, the input tube 4120 or a respective branch of the manifold, e.g., 4330, 4332, 4334, 4336, 4338 may include a closure system to allow for the aseptic disconnection of the fluid distribution system 4810 while maintaining a closed aseptic system in both the fluid distribution system 4810 and the feed line 4124, the manifold 4300, and the control system 5000. The closure system may be a QUICKSEAL®, a Clipster®, or formed with a Biosealer® which are all available from Sartorius Stedim North America.

When the fluid distribution system 4810 is disconnected, another or second fluid distribution system 4810 may be positioned on the scale 5300 and fluidly connected to the primary vessel 4110. For example, another fluid distribution system 4810 may be fluidly connected to an unused branch of the manifold 4300. With the new fluid distribution system 4810 connected, another or the same recipe may be selected (Step 6140) and then the control system may be used to fill vessels of the new fluid distribution system 4810. As the supply side was primed with the first fluid distribution system 4810, the supply side may not need to be reprimed after being disconnected from the first fluid distribution system 4810 and after being connected to the second fluid distribution system 4810. With the second fluid distribution system 4810 fluidly connected to the manifold 4300, the controller 5200 may repeat steps 6300, 6310, and 6320 to fill secondary vessels 4130 of the second fluid distribution system 4810. The disconnecting and reconnecting of fluid distribution systems may continue until the fluid from the primary vessel 4110 is exhausted or the branches of the manifold 4300 have all been used.

While some of the components of the control system 5000 and the fluid distribution system 4810 may be reused, portions that contact the fluid or media from the primary vessel 4110 are generally single use and disposed of after use or when an aseptic environment is broken. As such, the manifold 4300 may include more or less branches such that the manifold 4300 is capable of connecting to enough fluid distribution systems 4810 to empty all of the fluid or media from within the primary vessel 4110.

Figure 88:
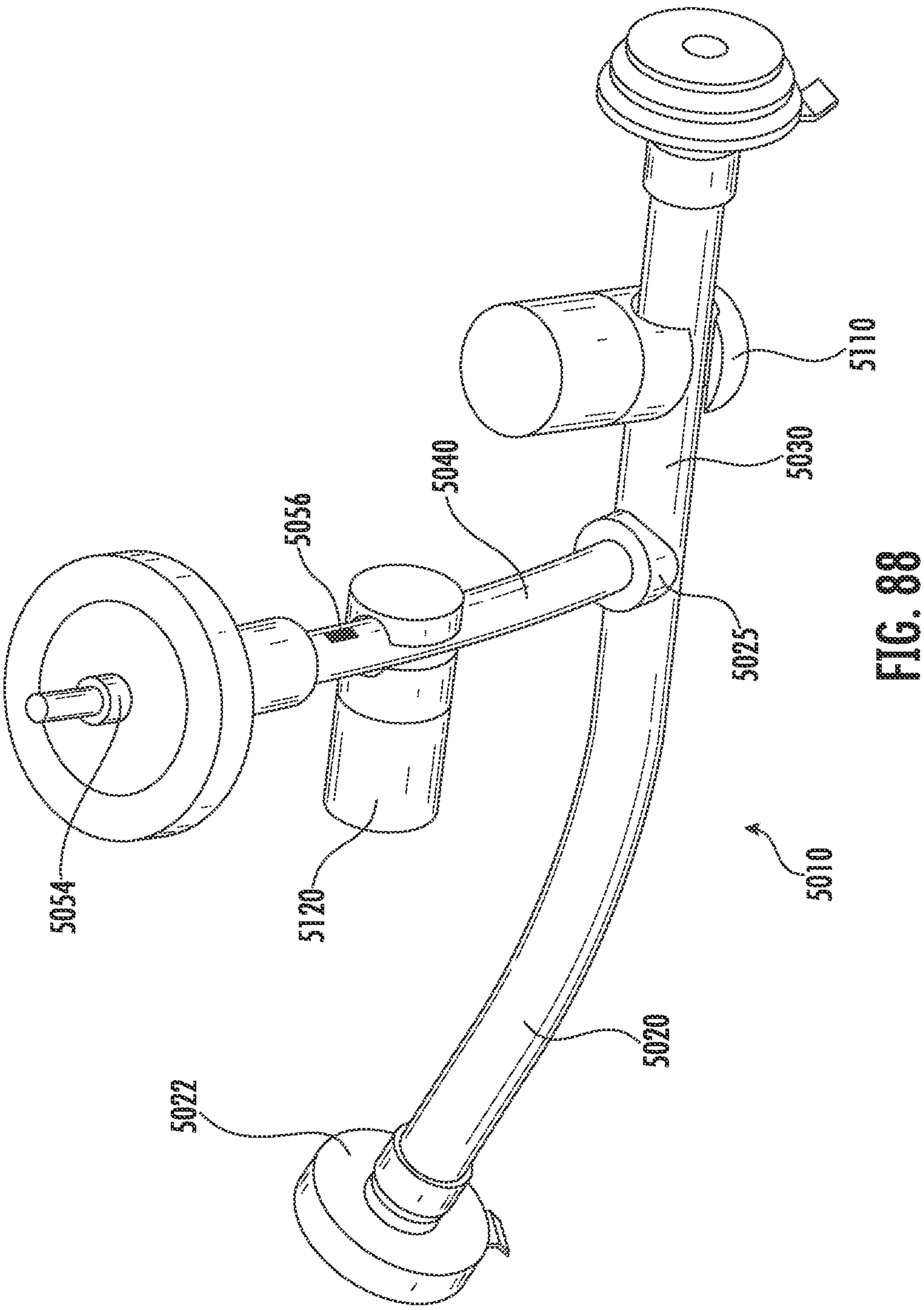
FIG. 88 is a perspective view of a tube assembly of another control system provided in accordance with the present disclosure.

With reference to FIG. 88, another tube system 5010 of a control system is described in accordance with an embodiment of the present disclosure. The tube assembly 5010 includes an input tube 5020, a purge tube 5040, a purge vent 5054, and a purge valve 5120. As shown, the input tube 5020 and the purge tube 5040 are fluidly connected by a junction 5025; however, in some embodiments, the input tube 5020 and the purge tube 5040 are a single continuous tube without a junction or a connector therebetween. In some embodiments, the tube assembly 5010 includes a fill tube 5030 and a fill valve 5110. In such embodiments, the fill tube 5030 is configured to fluidly connect to an input tube 4120 of a fluid distribution assembly 4810 (FIG. 85).

The fill tube 5020 includes an inlet 5022 that is configured to fluidly connect to a branch of a manifold, e.g., manifold 4300 (FIG. 85). The purge tube 5040 terminates in the purge vent 5054. The tube system 5010 may include a sensor 5056 between the purge valve 5120 and the purge vent 5054 to detect fluid or a lack of gases within the purge tube 5040 downstream of the purge valve 5120.

The sensor 5056, the purge valve 5120, and the fill valve 5110, when included, may be in signal communication with a controller, e.g., controller 5200 (FIG. 85). The tube assembly 5010 may be used to purge a manifold of gases prior to conveying fluid through the manifold. The tube assembly 5010 may be used to execute the method 6000 detailed above.

Figure 89:
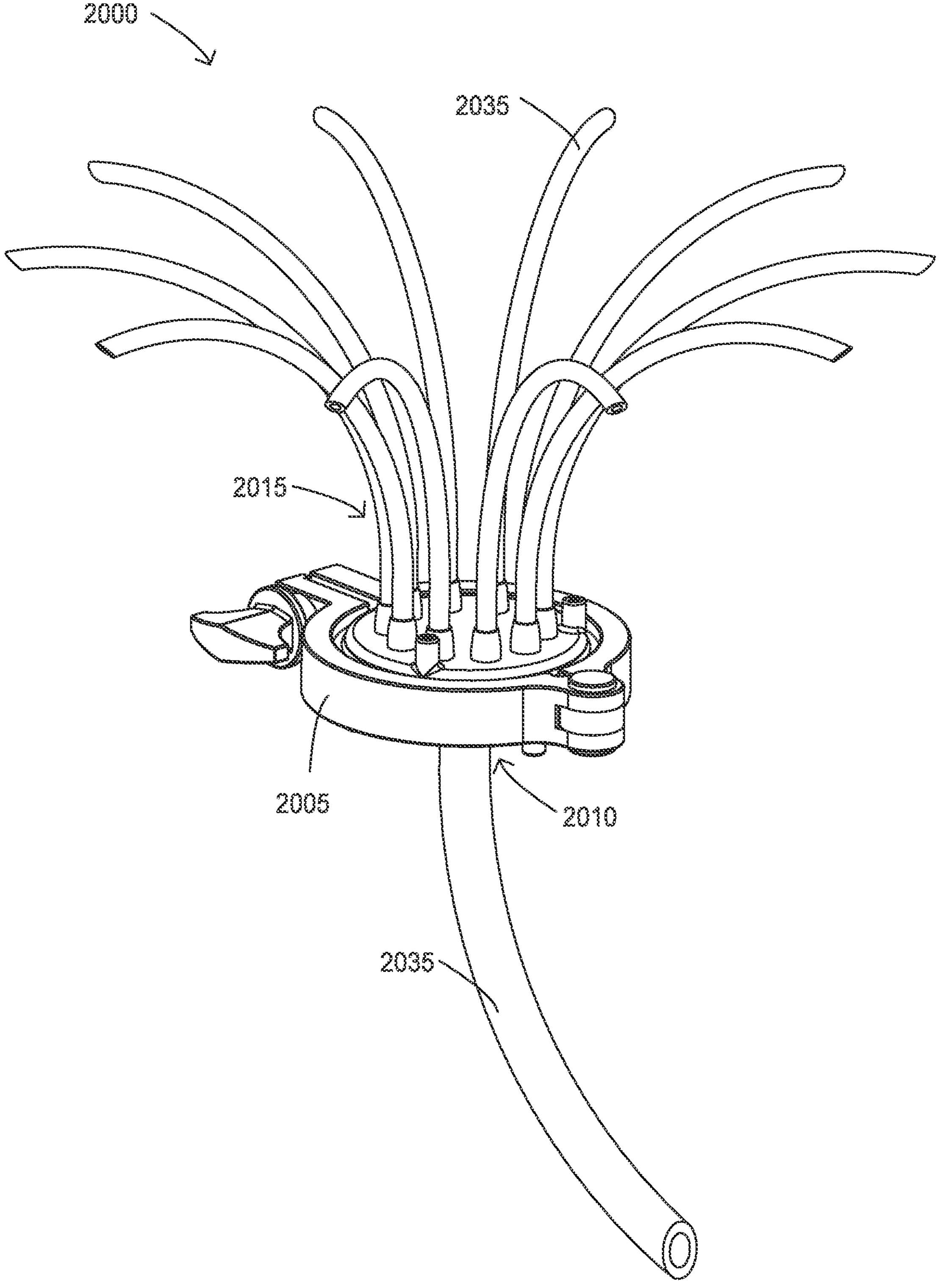
FIG. 89 is a perspective view of another fluid transfer hub formed from a pair of vessel closures provided in accordance with an embodiment of the present disclosure.
Figure 90:
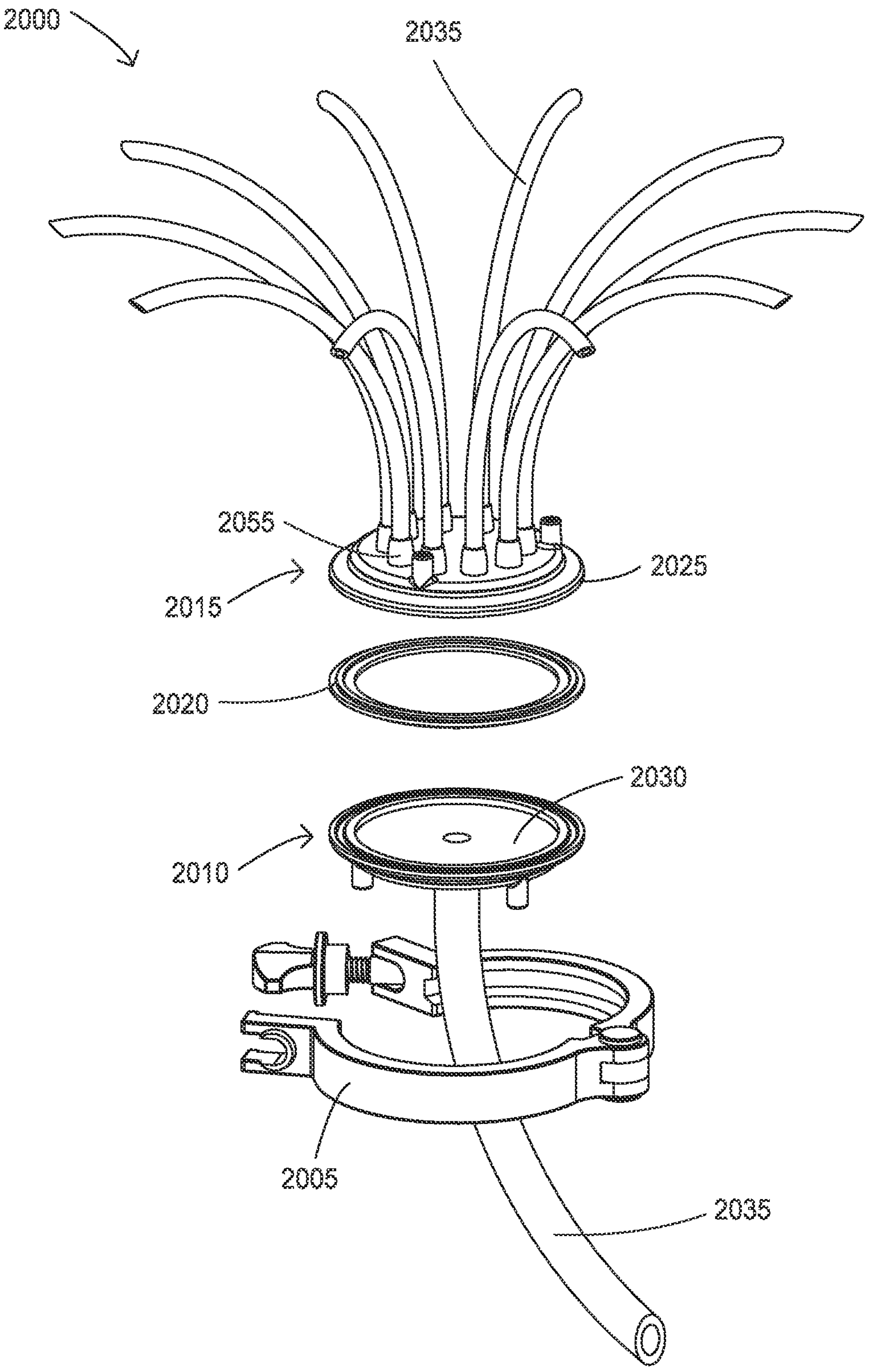
FIG. 90 is an exploded view of the fluid transfer hub of FIG. 89 showing the parts thereof.

FIG. 89 depicts another fluid transfer hub 2000 in accordance with an embodiment of the present disclosure. FIG. 90 depicts an exploded view of the fluid transfer hub 2000 to provide a clearer illustration of the components thereof according to one embodiment. The fluid transfer hub 2000 may be comprised of a tri-clamp 2005, a first tri-clamp vessel closure 2010, a second tri-clamp vessel closure 2015, and a gasket 2020.

The tri-clamp 2005 in the illustrated embodiment is a 2-segment, single-hinge type clamp. Alternatives that are well-known to one having ordinary skill in the art include 3-segment, double-hinge clamps, and high-pressure, no-hinge type clamps. Each tri-clamp vessel closure 2010, 2015 is a tri-clamp fitting that includes a body 2025, a cast seal 2030, and at least one insert 2035. The body 2025 may include one or more apertures extending axially through the body. The body 2025 is a clamp body and can have any dimensions, but may be among the standard clamp dimensions for hygienic and sanitary uses as discussed above. The inserts 2035 may be silicone tubing, thermoplastic tubing, or other components consistent with the inserts discussed elsewhere in the present disclosure.

To help create a seal between the two tri-clamp vessel closures 2010, 2015, a gasket 2020 is provided. Gaskets 2020 are available in standard sizes that corresponding with the standard dimensions of tri-clamps and their corresponding fittings. Gaskets 2020 are available in several materials, including copolymers of acrylonitrile and butadiene (BUNA-N), VITON®, fluoroelastomers as defined by ASTM D1418 (FKM), ethylene propylene diene monomer (EPDM), polytetrafluoroethylene (PTFE), silicone, and others. An open gasket 2020 may be used within the fluid transfer hub 2000. Alternative gaskets 2020 include orifice gaskets, screen gaskets, and perforated plate gaskets that may control flow of a fluid through the fluid transfer hub 2000, or provide a filtering function. Each of these alternative gaskets are available in several sizes, or can be customized, based upon the dimensions of the fittings, the orifice diameter through the gasket, or the pore size of the perforated plate or screen gaskets. Suitable gaskets 2020 are available from Flow Smart Inc. and others.

Figure 91:
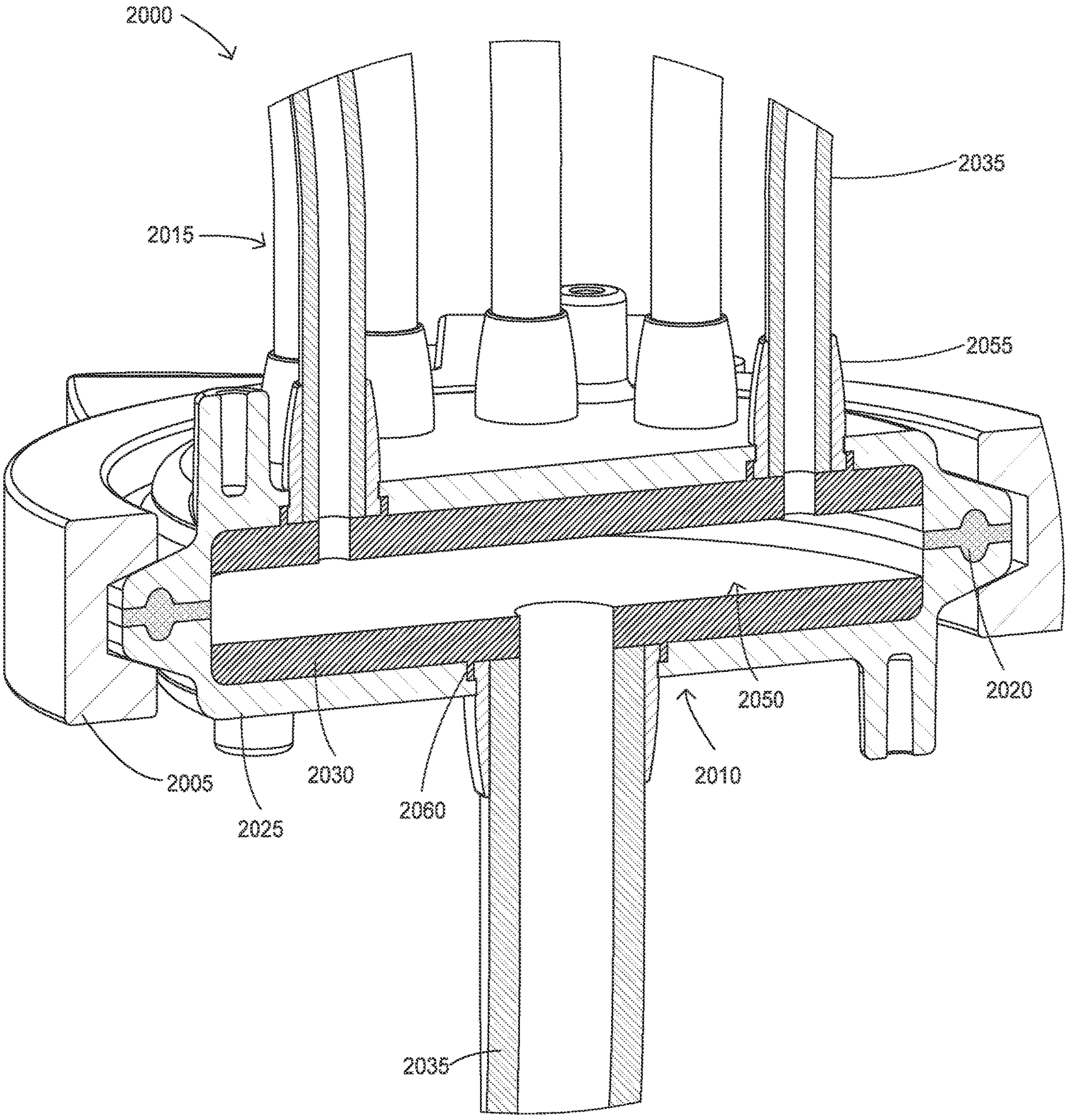
FIG. 91 is a cross-section of the fluid transfer hub of FIG. 89 according to an embodiment.
Figure 92:
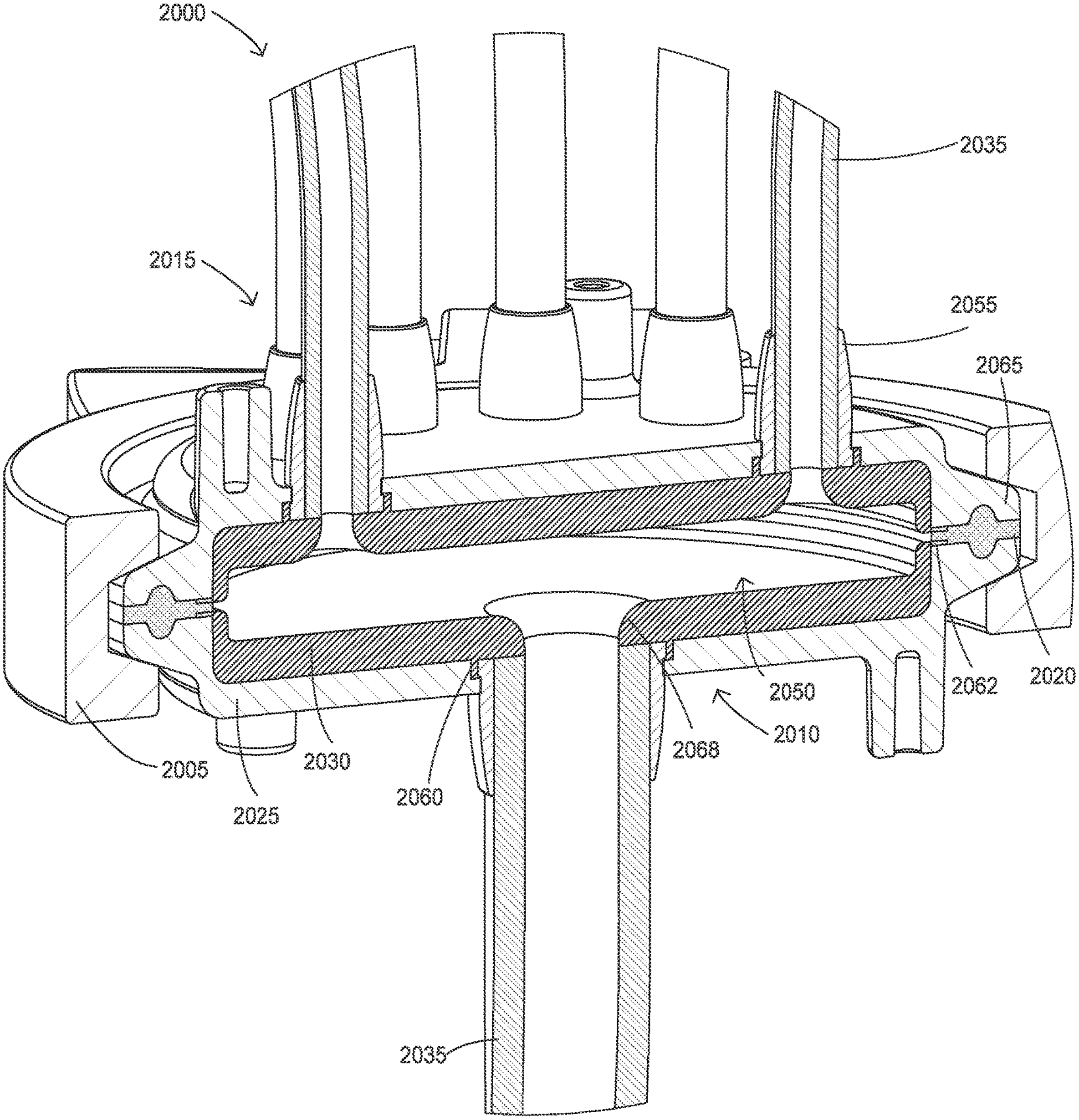
FIG. 92 is a cross-section of the fluid transfer hub of FIG. 89 according to another embodiment.

FIGS. 91 and 92 illustrate alternative cross sections of a fluid transfer hub 2000. The tri-clamp 2005, first tri-clamp vessel closure 2010, and second tri-clamp vessel closure 2015 are illustrated along with the gasket 2020. The inserts 2035 of each tri-clamp vessel closure 2010, 2015 include tubing. In the illustrated embodiment, the first tri-clamp vessel closure 2010 includes only one insert 2035 providing a single inlet into a chamber 2050 from a source vessel. The second tri-clamp vessel closure 2015 includes a plurality of inserts 2035 that provide a plurality of outlets from the chamber 2050 for distributing a fluid into a plurality of receptacles. With the illustrated configuration, the fluid transfer hub 2000 may be described as a manifold. The chamber 2050 may be bisected by the screen or perforated plate of a corresponding gasket 2020, if applicable.

The inserts 2035 pass through apertures in the bodies 2025 of each tri-clamp vessel closure 2010, 2015, and are connected to the bodies by the cast seal 2030. In addition, in the illustrated embodiments of FIGS. 91 and 92, each insert 2035 is coupled to an optional anchor 2055 that provides an interface between the insert and the body 2025. The tri-clamp vessel closures 2010, 2015 are illustrated with a similar anchor 2055 on each insert 2035, however, a variety of different anchors, or no anchors at all, may also be used. Each anchor 2055 may be any of the types of anchors described above. For example, the anchor 2055 may be in the form of a retaining nut affixed in place around an insert 2035. The retaining nut prevents the insert 2035 from being pulled out of the body 2025. The illustrated anchor 2055 has a retaining nut portion and a cone-shaped portion. The retaining nut portion is located toward the interior of the body 2025, while the cone-shaped section is on the exterior of the body. Further, the anchor 2055 could be a sleeve that prevents the insert 2035 from being pulled out of the body 2025 and provides a surface to which the cast seal 2030 may bond. The anchors 2055 may be constructed of such material that is particularly suitable for bonding with the cast seal 2030, such as metal (aluminum, stainless steel, etc.), plastic, glass-filled plastic, ceramics, and composites. In an embodiment, the anchors 2055 are adhesively attached to the inserts 2035 and combined with the vessel closures 2010, 2015 as discussed above.

FIG. 91 shows a first embodiment of the cast seal 2030. As discussed above, the cast seal 2030 may be a self-leveling silicone that is poured into the body 2025 of each tri-clamp vessel closure 2010, 2015 after the inserts 2035 and optional anchors 2055 are in place. The cast seal 2030 may coat a bottom interior surface of the body 2025. The cast seal 2030 may fill in a seam 2060 between the anchor 2055 and the body 2025 to increase the surface contact with the cast seal and improve the retention of the insert 2035.

FIG. 92 shows a second embodiment of the cast seal 2030. In FIG. 92, the cast seal 2030 includes additional material to coat both the bottom interior surface of the body 2025 as well as the interior sidewalls of each body. The cast seal 2030 is also configured to wrap onto a flange 2065 of the body 2025 to be in contact with the gasket 2020 at tip 2062. In the illustrated embodiment, the tip 2062 of the cast seal 2030, and therefore also the parting seam of the cast seal created by the body 2025 and the cast form (discussed below), is positioned along the top of the flange 2065 and outside of the fluid pathway through the fluid transfer hub 2000. The illustrated positioning of the tip 2062 can help limit any potential for particles of the cast seal 2035 to enter the fluid stream. The cast seal 2030 is also represented with a rounded edge 2068 leading from the chamber 2050 into each insert 2035. The rounded or curved configuration of the edges 2068 reduces the potential for air to become trapped in the chamber 2050 as fluid is transfers across the fluid transfer hub 2000. The curved configuration of the edges 2068 may also improve the flow of fluid exiting the fluid transfer hub 2000 to improve the accuracy of fluid distribution from the hub to the individual receiving vessels.

Figure 93:
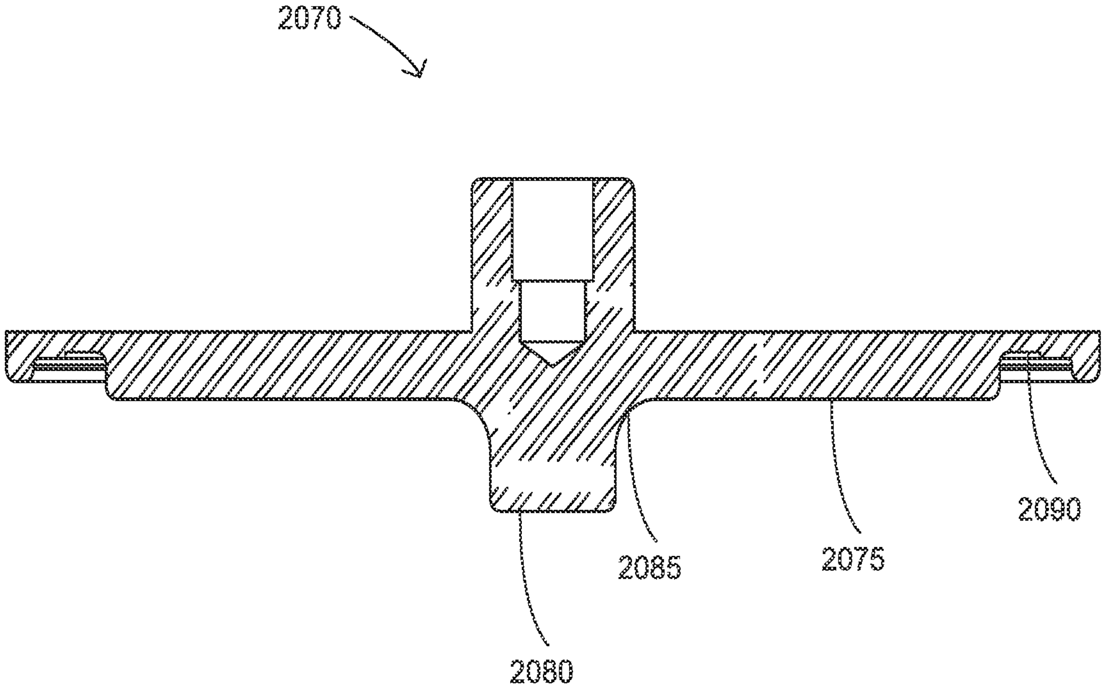
FIG. 93 is a cross-section of a cast form suitable for manufacturing a vessel closure of the fluid transfer hub of FIG. 92.

FIG. 93 shows a cast form 2070 according to one embodiment. The cast form 2070 may be a Teflon® coated aluminum tool. The cast form 2070 includes a base surface 2075 and at least one boss 2080 extending from the base surface 2075. A curved surface 2085 may transition from the base surface 2075 to the boss 2080. The illustrated cast form 2070 may further comprise a circumferential channel 2090 along the flange thereof. The cast form 2070 may also include small holes (not shown) drilled or otherwise provided in communication with the base surface 2075 for providing a fill port and a vent port for use in the casting process as will be understood by one having ordinary skill in the art.

The cast form 2070 of FIG. 93 is particularly suitable for manufacture of the first tri-clamp vessel closure 2010 of the embodiment shown in FIG. 92. The curved surface 2085 of the cast form 2070 is configured to create the rounded edge 2068 leading from the chamber 2050 into each insert 2035 of the first vessel closure 2010. The quantity and arrangement of the at least one boss 2080 on the base surface 2075 is configured to correspond with the quantity and arrangement of apertures in a corresponding body 2025 of a corresponding tri-clamp vessel closure. Further, the circumferential channel 2090 of the cast form 2070 of FIG. 93 provides for the tip 2062 of the cast seal 2030 that wraps onto the flange 2065 of the first tri-clamp vessel closure 2010 of FIG. 92.

While several embodiments of the disclosure have been shown in the drawings, it is not intended that the disclosure be limited thereto, as it is intended that the disclosure be as broad in scope as the art will allow and that the specification be read likewise. Any combination of the above embodiments is also envisioned and is within the scope of the appended claims. Therefore, the above description should not be construed as limiting, but merely as exemplifications of particular embodiments. Those skilled in the art will envision other modifications within the scope of the claims appended hereto.

What is claimed:

1. A fluid distribution system comprising:

an input tube configured to extend from a supply container;

a plurality of vessels, each vessel of the plurality of vessels including an inflow conduit and an outlet conduit, the outlet conduit configured to vent air from within the vessel; and a distribution hub comprising:

a single inlet defined in a bottom of the distribution hub and in fluid communication with the input tube such that the distribution hub is configured to receive fluid through the single inlet in the bottom of the distribution hub from the input tube; and a plurality of outlets, each outlet of the plurality of outlets in fluid communication with the single inlet and in fluid communication with a respective inflow conduit such that the distribution hub is configured to provide an equal portion of the fluid received through the single inlet to each of the inflow conduits.

2. The fluid distribution system according to claim 1, wherein the inflow conduits are free of obstructions between the plurality of outlets and each vessel of the plurality of vessels.

3. The fluid distribution system according to claim 1, wherein the fluid distribution system is configured to aseptically transfer fluid from the supply container to each of the plurality of vessels.

4. The fluid distribution system according to claim 1, wherein the single inlet is centrally located in the bottom of the distribution hub.

5. The fluid distribution system according to claim 1, wherein each vessel of the plurality of vessels includes a vessel cap having an inlet aperture and an outlet aperture defined therethrough, the vessel cap sealing an interior of a respective vessel.

6. The fluid distribution system according to claim 5, wherein the inlet aperture of each vessel cap is in fluid communication with a respective one of outlets via a respective inflow conduit.

7. The fluid distribution system according to claim 5, wherein the outlet aperture of each vessel cap is in fluid communication with a respective outlet conduit.

8. The fluid distribution system according to claim 5, wherein the outlet aperture of each vessel cap is in fluid communication with a vent through the outlet conduit of the vessel.

9. The fluid distribution system according to claim 1, wherein the distribution hub includes a plenum disposed between the single inlet and the plurality of outlets.

10. The fluid distribution system according to claim 1, further comprising a frame assembly configured to position each vessel a substantially equal distance from the distribution hub such that the inflow conduits of the respective vessels form an arc segment between the distribution hub and the vessel.

11. The fluid distribution system according to claim 1, wherein the distribution hub is configured to provide±5% of the average amount of fluid to each of the other vessels of the plurality of vessels.

12. The fluid distribution system according to claim 1, wherein an arc of each inflow conduit between a respective outlet to a respective vessel controls an amount of fluid flowing through the inflow conduit.

13. The fluid distribution system according to claim 1, further comprising a stand supporting each of the vessels.

14. The fluid distribution system according to claim 13, wherein the stand supports each of the vessels an equal distance from the distribution hub.

15. A fluid distribution system comprising:

an inlet pipe configured to extend from a supply vessel;

a plurality of receptacles, each receptacle of the plurality of receptacles including an outlet fluid conduit; and a fluid distribution manifold comprising:

a single inlet defined in a bottom of the fluid distribution manifold and in fluid communication with the inlet pipe such that the fluid distribution manifold is configured to receive fluid through the single inlet in the bottom of the fluid distribution manifold from the inlet pipe; and a plurality of outlets, each outlet in fluid communication with the single inlet and in fluid communication with a respective outlet fluid conduit such that the fluid distribution manifold is configured to provide an equal portion of the fluid received through the single inlet to each of the outlet fluid conduits.

16. The fluid distribution system according to claim 15, wherein the fluid distribution system is configured to aseptically transfer fluid from the supply vessel to each of the plurality of receptacles.

17. The fluid distribution system according to claim 15, wherein each receptacle includes a vent conduit.

18. The fluid distribution system according to claim 15, further comprising a support stand supporting each of the vessels an equal distance from the fluid distribution manifold.

19. The fluid distribution system according to claim 15, wherein an arc of each outlet fluid conduit between a respective outlet to a respective receptacle controls an amount of fluid flowing through the outlet fluid conduit.

20. A method of aseptically distributing fluid to a plurality of vessels, the method comprising:

securing a plurality of vessels relative to a hub, each vessel having an inflow conduit extending from the hub to the vessel, each vessel also having an outflow conduit configured to vent air from within the vessel; and aseptically flowing fluid from a supply vessel through an input tube into the hub through a single inlet defined in a bottom of the hub such that a substantially equal amount of fluid flows from the hub into each of the vessels simultaneously.

* * * * *